US008837806B1

(12) United States Patent  (10) Patent No.: US 8,837,806 B1
Ethington et al.  (45) Date of Patent: Sep. 16, 2014

(54) REMOTE DEPOSIT IMAGE INSPECTION APPARATUSES, METHODS AND SYSTEMS

(75) Inventors: Seth Ethington, San Antonio, TX (US); Bharat Prasad, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 62 days.

(21) Appl. No.: 13/156,007

(22) Filed: Jun. 8, 2011

Related U.S. Application Data

(60) Provisional application No. 61/352,762, filed on Jun. 8, 2010, provisional application No. 61/352,772, filed on Jun. 8, 2010, provisional application No. 61/352,775, filed on Jun. 8, 2010.

(51) Int. Cl.
 *G06K 9/00* (2006.01)
(52) U.S. Cl.
 USPC ......................................................... 382/140
(58) Field of Classification Search
 None
 See application file for complete search history.

(56) References Cited

U.S. PATENT DOCUMENTS

| | | | |
|---|---|---|---|
| 3,005,282 A | 10/1961 | Christiansen |
| 3,341,820 A | 9/1967 | Grillmeier, Jr. et al. |
| 3,576,972 A | 5/1971 | Wood |
| 3,593,913 A | 7/1971 | Bremer |
| 3,620,553 A | 11/1971 | Donovan |
| 3,648,242 A | 3/1972 | Grosbard |
| 3,800,124 A | 3/1974 | Walsh |
| 3,816,943 A | 6/1974 | Henry |
| 4,002,356 A | 1/1977 | Weidmann |
| 4,060,711 A | 11/1977 | Buros |
| 4,070,649 A | 1/1978 | Wright, Jr. et al. |
| 4,128,202 A | 12/1978 | Buros |
| 4,136,471 A | 1/1979 | Austin |
| 4,205,780 A | 6/1980 | Burns |
| 4,264,808 A | 4/1981 | Owens |
| 4,305,216 A | 12/1981 | Skelton |
| 4,321,672 A | 3/1982 | Braun |
| 4,433,436 A | 2/1984 | Carnes |
| 4,454,610 A | 6/1984 | Sziklai |
| RE31,692 E | 10/1984 | Tyburski et al. |
| 4,523,330 A | 6/1985 | Cain |
| 4,636,099 A | 1/1987 | Goldston |
| 4,640,413 A | 2/1987 | Kaplan |

(Continued)

FOREIGN PATENT DOCUMENTS

EP  0 984 410 A1  3/2000

OTHER PUBLICATIONS

"Accept "Customer Not Present" Checks," Accept Check Online, http://checksoftware.com, Patent No. 7,900,822, as dated 2007 (1 pg).

(Continued)

*Primary Examiner* — Stephen R Koziol
*Assistant Examiner* — Delomia Gilliard
(74) *Attorney, Agent, or Firm* — Brinks Gilson & Lione

(57) ABSTRACT

The REMOTE DEPOSIT IMAGE INSPECTION APPARATUSES, METHODS AND SYSTEMS (hereinafter "Image-Inspector") transforms uploaded check images and check deposit information inputs via ImageInspector components image into deposit confirmation outputs. For example, in one embodiment, a user may employ a personal computer connected to a web camera, and/or a smartphone with a built-in camera to initiate the remote deposit by holding a check in front of the camera, and the ImageInspector may capture images of the check and send them to a financial institution for deposit processing.

17 Claims, 102 Drawing Sheets

(56) References Cited

U.S. PATENT DOCUMENTS

| | | |
|---|---|---|
| 4,644,144 A | 2/1987 | Chandek |
| 4,722,444 A | 2/1988 | Murphy et al. |
| 4,722,544 A | 2/1988 | Weber |
| 4,727,435 A | 2/1988 | Otani et al. |
| 4,774,574 A * | 9/1988 | Daly et al. ................. 348/406.1 |
| 4,774,663 A | 9/1988 | Musmanno |
| 4,790,475 A | 12/1988 | Griffin |
| 4,806,780 A | 2/1989 | Yamamoto |
| 4,837,693 A | 6/1989 | Schotz |
| 4,890,228 A | 12/1989 | Longfield |
| 4,927,071 A | 5/1990 | Wood |
| 4,934,587 A | 6/1990 | McNabb |
| 4,960,981 A | 10/1990 | Benton |
| 4,975,735 A | 12/1990 | Bright |
| 5,022,683 A | 6/1991 | Barbour |
| 5,053,607 A | 10/1991 | Carlson |
| 5,146,606 A | 9/1992 | Grondalski |
| 5,157,620 A | 10/1992 | Shaar |
| 5,159,548 A | 10/1992 | Caslavka |
| 5,191,525 A | 3/1993 | LeBrun |
| 5,193,121 A | 3/1993 | Elischer et al. |
| 5,220,501 A | 6/1993 | Lawlor |
| 5,227,863 A | 7/1993 | Bilbrey et al. |
| 5,229,589 A | 7/1993 | Schneider |
| 5,237,159 A | 8/1993 | Stephens |
| 5,257,320 A | 10/1993 | Etherington et al. |
| 5,265,008 A | 11/1993 | Benton |
| 5,321,816 A | 6/1994 | Rogan |
| 5,347,302 A | 9/1994 | Simonoff |
| 5,350,906 A | 9/1994 | Brody |
| 5,373,550 A | 12/1994 | Campbell |
| 5,419,588 A | 5/1995 | Wood |
| 5,422,467 A | 6/1995 | Graef |
| 5,444,794 A | 8/1995 | Uhland, Sr. |
| 5,475,403 A | 12/1995 | Havlovick et al. |
| 5,504,538 A | 4/1996 | Tsujihara |
| 5,504,677 A | 4/1996 | Pollin |
| 5,528,387 A | 6/1996 | Kelly et al. |
| 5,577,179 A | 11/1996 | Blank |
| 5,583,759 A | 12/1996 | Geer |
| 5,590,196 A | 12/1996 | Moreau |
| 5,594,225 A | 1/1997 | Botvin |
| 5,598,969 A | 2/1997 | Ong |
| 5,602,936 A | 2/1997 | Green |
| 5,610,726 A | 3/1997 | Nonoshita |
| 5,611,028 A | 3/1997 | Shibasaki |
| 5,630,073 A | 5/1997 | Nolan |
| 5,631,984 A | 5/1997 | Graf et al. |
| 5,668,897 A | 9/1997 | Stolfo |
| 5,673,320 A | 9/1997 | Ray et al. |
| 5,677,955 A | 10/1997 | Doggett |
| 5,678,046 A | 10/1997 | Cahill et al. |
| 5,679,938 A | 10/1997 | Templeton |
| 5,680,611 A | 10/1997 | Rail |
| 5,691,524 A | 11/1997 | Josephson |
| 5,699,452 A | 12/1997 | Vaidyanathan |
| 5,734,747 A | 3/1998 | Vaidyanathan |
| 5,737,440 A | 4/1998 | Kunkler |
| 5,748,780 A | 5/1998 | Stolfo |
| 5,751,842 A | 5/1998 | Riach |
| 5,784,503 A | 7/1998 | Bleecker, III et al. |
| 5,830,609 A | 11/1998 | Warner |
| 5,832,463 A | 11/1998 | Funk |
| 5,838,814 A | 11/1998 | Moore |
| 5,863,075 A | 1/1999 | Rich |
| 5,870,456 A | 2/1999 | Rogers |
| 5,870,724 A | 2/1999 | Lawlor |
| 5,870,725 A | 2/1999 | Bellinger et al. |
| 5,878,337 A | 3/1999 | Joao |
| 5,893,101 A | 4/1999 | Balogh et al. |
| 5,897,625 A | 4/1999 | Gustin |
| 5,898,157 A | 4/1999 | Mangili et al. |
| 5,901,253 A | 5/1999 | Tretter |
| 5,903,878 A | 5/1999 | Talati |
| 5,903,881 A | 5/1999 | Schrader |
| 5,910,988 A | 6/1999 | Ballard |
| 5,917,931 A | 6/1999 | Kunkler |
| 5,924,737 A | 7/1999 | Schrupp |
| 5,926,548 A | 7/1999 | Okamoto |
| 5,930,778 A | 7/1999 | Geer |
| 5,937,396 A | 8/1999 | Konya |
| 5,940,844 A | 8/1999 | Cahill |
| 5,982,918 A | 11/1999 | Mennie |
| 5,987,439 A | 11/1999 | Gustin et al. |
| 6,012,048 A | 1/2000 | Gustin et al. |
| 6,014,454 A | 1/2000 | Kunkler |
| 6,021,202 A | 2/2000 | Anderson |
| 6,021,397 A | 2/2000 | Jones |
| 6,029,887 A | 2/2000 | Furuhashi |
| 6,030,000 A | 2/2000 | Diamond |
| 6,032,137 A | 2/2000 | Ballard |
| 6,038,553 A | 3/2000 | Hyde |
| 6,053,405 A | 4/2000 | Irwin, Jr. et al. |
| 6,073,119 A | 6/2000 | Borenmisza-wahr |
| 6,085,168 A | 7/2000 | Mori |
| 6,097,834 A | 8/2000 | Krouse |
| 6,097,845 A | 8/2000 | Ng et al. |
| 6,097,885 A | 8/2000 | Rayner |
| 6,105,865 A | 8/2000 | Hardesty |
| 6,141,339 A | 10/2000 | Kaplan et al. |
| 6,145,738 A | 11/2000 | Stinson et al. |
| 6,151,426 A | 11/2000 | Lee |
| 6,159,585 A | 12/2000 | Rittenhouse |
| 6,170,744 B1 | 1/2001 | Lee |
| 6,188,506 B1 | 2/2001 | Kaiserman |
| 6,189,785 B1 | 2/2001 | Lowery |
| 6,192,165 B1 | 2/2001 | Irons |
| 6,195,694 B1 | 2/2001 | Chen et al. |
| 6,199,055 B1 | 3/2001 | Kara |
| 6,236,009 B1 | 5/2001 | Emigh et al. |
| 6,243,689 B1 | 6/2001 | Norton |
| 6,278,983 B1 | 8/2001 | Ball |
| 6,282,826 B1 | 9/2001 | Richards |
| 6,293,469 B1 | 9/2001 | Masson et al. |
| 6,304,860 B1 | 10/2001 | Martin |
| 6,314,452 B1 | 11/2001 | Dekel |
| 6,317,727 B1 | 11/2001 | May |
| 6,328,207 B1 | 12/2001 | Gregoire et al. |
| 6,330,546 B1 | 12/2001 | Gopinathan et al. |
| 6,339,658 B1 | 1/2002 | Moccagatta |
| 6,363,162 B1 | 3/2002 | Moed et al. |
| 6,363,164 B1 | 3/2002 | Jones et al. |
| 6,390,362 B1 | 5/2002 | Martin |
| 6,397,196 B1 | 5/2002 | Kravetz |
| 6,408,084 B1 | 6/2002 | Foley |
| 6,411,725 B1 | 6/2002 | Rhoads |
| 6,411,737 B2 | 6/2002 | Wesolkowski et al. |
| 6,411,938 B1 | 6/2002 | Gates et al. |
| 6,413,305 B1 | 7/2002 | Mehta |
| 6,417,869 B1 | 7/2002 | Do |
| 6,425,017 B1 | 7/2002 | Dievendorff |
| 6,429,952 B1 | 8/2002 | Olbricht |
| 6,439,454 B1 | 8/2002 | Masson et al. |
| 6,449,397 B1 | 9/2002 | Che-chu |
| 6,450,403 B1 | 9/2002 | Martens et al. |
| 6,463,220 B1 | 10/2002 | Dance et al. |
| 6,464,134 B1 | 10/2002 | Page |
| 6,469,745 B1 | 10/2002 | Yamada et al. |
| 6,470,325 B1 | 10/2002 | Leemhuis |
| 6,505,178 B1 | 1/2003 | Flenley |
| 6,546,119 B2 | 4/2003 | Ciolli et al. |
| 6,574,609 B1 | 6/2003 | Downs |
| 6,578,760 B1 | 6/2003 | Otto |
| 6,587,837 B1 | 7/2003 | Spagna |
| 6,606,117 B1 | 8/2003 | Windle |
| 6,609,200 B2 | 8/2003 | Anderson |
| 6,611,598 B1 | 8/2003 | Hayosh |
| 6,614,930 B1 | 9/2003 | Agnihotri et al. |
| 6,643,416 B1 | 11/2003 | Daniels |
| 6,654,487 B1 | 11/2003 | Downs, Jr. |
| 6,661,910 B2 | 12/2003 | Jones et al. |
| 6,672,452 B1 | 1/2004 | Alves |
| 6,682,452 B2 | 1/2004 | Quintus |
| 6,695,204 B1 | 2/2004 | Stinson |

(56) References Cited

U.S. PATENT DOCUMENTS

| | | |
|---|---|---|
| 6,711,474 B1 | 3/2004 | Treyz et al. |
| 6,726,097 B2 | 4/2004 | Graef |
| 6,728,397 B2 | 4/2004 | McNeal |
| 6,738,496 B1 | 5/2004 | Van Hall |
| 6,742,128 B1 | 5/2004 | Joiner |
| 6,745,186 B1 | 6/2004 | Testa et al. |
| 6,754,640 B2 | 6/2004 | Bozeman |
| 6,755,340 B1 | 6/2004 | Voss et al. |
| 6,763,226 B1 | 7/2004 | McZeal |
| 6,781,962 B1 | 8/2004 | Williams |
| 6,786,398 B1 | 9/2004 | Stinson et al. |
| 6,789,054 B1 | 9/2004 | Makhlouf |
| 6,796,491 B2 | 9/2004 | Nakajima |
| 6,806,903 B1 | 10/2004 | Okisu et al. |
| 6,813,733 B1 | 11/2004 | Li |
| 6,829,704 B2 | 12/2004 | Zhang |
| 6,844,885 B2 | 1/2005 | Anderson |
| 6,856,965 B1 | 2/2005 | Stinson |
| 6,863,214 B2 | 3/2005 | Garner et al. |
| 6,870,947 B2 | 3/2005 | Kelland |
| 6,883,140 B1 | 4/2005 | Acker |
| 6,898,314 B2 | 5/2005 | Kung et al. |
| 6,902,105 B2 | 6/2005 | Koakutsu |
| 6,913,188 B2 | 7/2005 | Wong |
| 6,931,591 B1 | 8/2005 | Brown |
| 6,934,719 B2 | 8/2005 | Nally |
| 6,957,770 B1 | 10/2005 | Robinson |
| 6,961,689 B1 | 11/2005 | Greenberg |
| 6,970,843 B1 | 11/2005 | Forte |
| 6,973,589 B2 | 12/2005 | Wright |
| 6,983,886 B2 | 1/2006 | Natsukari et al. |
| 6,993,507 B2 | 1/2006 | Meyer |
| 6,996,263 B2 | 2/2006 | Jones et al. |
| 6,999,943 B1 | 2/2006 | Johnson |
| 7,003,040 B2 | 2/2006 | Yi |
| 7,004,382 B2 | 2/2006 | Sandru |
| 7,010,155 B2 | 3/2006 | Koakutsu et al. |
| 7,010,507 B1 | 3/2006 | Anderson |
| 7,016,704 B2 | 3/2006 | Pallakoff |
| 7,039,048 B1 | 5/2006 | Monta |
| 7,058,036 B1 | 6/2006 | Yu |
| 7,062,099 B2 | 6/2006 | Li et al. |
| 7,062,456 B1 | 6/2006 | Riehl et al. |
| 7,062,768 B2 | 6/2006 | Kubo |
| 7,072,862 B1 | 7/2006 | Wilson |
| 7,076,458 B2 | 7/2006 | Lawlor et al. |
| 7,086,003 B2 | 8/2006 | Demsky |
| 7,092,561 B2 | 8/2006 | Downs, Jr. |
| 7,104,443 B1 | 9/2006 | Paul et al. |
| 7,113,925 B2 | 9/2006 | Waserstein |
| 7,114,649 B2 | 10/2006 | Nelson |
| 7,139,594 B2 | 11/2006 | Nagatomo |
| 7,140,539 B1 | 11/2006 | Crews |
| 7,163,347 B2 | 1/2007 | Lugg |
| 7,178,721 B2 | 2/2007 | Maloney |
| 7,181,430 B1 | 2/2007 | Buchanan et al. |
| 7,184,980 B2 | 2/2007 | Allen-Rouman et al. |
| 7,197,173 B2 | 3/2007 | Jones et al. |
| 7,200,255 B2 | 4/2007 | Jones |
| 7,204,412 B2 | 4/2007 | Foss, Jr. |
| 7,216,106 B1 | 5/2007 | Buchanan |
| 7,219,082 B2 | 5/2007 | Forte |
| 7,219,831 B2 | 5/2007 | Murata |
| 7,249,076 B1 | 7/2007 | Pendleton |
| 7,252,224 B2 | 8/2007 | Verma |
| 7,257,246 B1 | 8/2007 | Brodie et al. |
| 7,266,230 B2 | 9/2007 | Doran |
| 7,290,034 B2 | 10/2007 | Budd |
| 7,299,970 B1 | 11/2007 | Ching |
| 7,299,979 B2 | 11/2007 | Phillips |
| 7,313,543 B1 | 12/2007 | Crane |
| 7,314,163 B1 | 1/2008 | Crews et al. |
| 7,321,874 B2 | 1/2008 | Dilip |
| 7,321,875 B2 | 1/2008 | Dilip |
| 7,325,725 B2 | 2/2008 | Foss, Jr. |
| 7,328,190 B2 | 2/2008 | Smith et al. |
| 7,330,604 B2 | 2/2008 | Wu et al. |
| 7,336,813 B2 | 2/2008 | Prakash et al. |
| 7,343,320 B1 | 3/2008 | Treyz |
| 7,349,566 B2 | 3/2008 | Jones et al. |
| 7,356,505 B2 | 4/2008 | March |
| 7,377,425 B1 | 5/2008 | Ma |
| 7,379,978 B2 | 5/2008 | Anderson |
| 7,385,631 B2 | 6/2008 | Maeno |
| 7,386,511 B2 | 6/2008 | Buchanan |
| 7,391,897 B2 | 6/2008 | Jones et al. |
| 7,391,934 B2 | 6/2008 | Goodall et al. |
| 7,392,935 B2 | 7/2008 | Byrne |
| 7,401,048 B2 | 7/2008 | Rosedale |
| 7,403,917 B1 | 7/2008 | Larsen |
| 7,406,198 B2 | 7/2008 | Aoki et al. |
| 7,421,107 B2 | 9/2008 | Lugg |
| 7,421,410 B1 | 9/2008 | Schechtman et al. |
| 7,427,016 B2 | 9/2008 | Chimento |
| 7,433,098 B2 | 10/2008 | Klein et al. |
| 7,437,327 B2 | 10/2008 | Lam |
| 7,440,924 B2 | 10/2008 | Buchanan |
| 7,447,347 B2 | 11/2008 | Weber |
| 7,455,220 B2 | 11/2008 | Phillips |
| 7,455,221 B2 | 11/2008 | Sheaffer |
| 7,460,108 B2 | 12/2008 | Tamura |
| 7,461,779 B2 | 12/2008 | Ramachandran |
| 7,461,780 B2 | 12/2008 | Potts |
| 7,471,818 B1 | 12/2008 | Price |
| 7,475,040 B2 | 1/2009 | Buchanan |
| 7,477,923 B2 | 1/2009 | Wallmark |
| 7,480,382 B2 | 1/2009 | Dunbar |
| 7,480,422 B2 | 1/2009 | Ackley et al. |
| 7,489,953 B2 | 2/2009 | Griffin |
| 7,490,242 B2 | 2/2009 | Torres |
| 7,497,429 B2 | 3/2009 | Reynders |
| 7,503,486 B2 | 3/2009 | Ahles |
| 7,505,759 B1 | 3/2009 | Rahman |
| 7,506,261 B2 | 3/2009 | Satou |
| 7,509,287 B2 | 3/2009 | Nutahara |
| 7,512,564 B1 | 3/2009 | Geer |
| 7,519,560 B2 | 4/2009 | Lam |
| 7,520,420 B2 | 4/2009 | Phillips |
| 7,520,422 B1 | 4/2009 | Robinson et al. |
| 7,536,354 B1 | 5/2009 | deGroeve et al. |
| 7,536,440 B2 | 5/2009 | Budd |
| 7,539,646 B2 | 5/2009 | Gilder |
| 7,540,408 B2 | 6/2009 | Levine |
| 7,542,598 B2 | 6/2009 | Jones |
| 7,545,529 B2 | 6/2009 | Borrey et al. |
| 7,548,641 B2 | 6/2009 | Gilson et al. |
| 7,566,002 B2 | 7/2009 | Love et al. |
| 7,571,848 B2 | 8/2009 | Cohen |
| 7,587,066 B2 | 9/2009 | Cordery et al. |
| 7,587,363 B2 | 9/2009 | Cataline |
| 7,590,275 B2 | 9/2009 | Clarke et al. |
| 7,599,543 B2 | 10/2009 | Jones |
| 7,599,888 B2 | 10/2009 | Manfre |
| 7,602,956 B2 | 10/2009 | Jones |
| 7,606,762 B1 | 10/2009 | Heit |
| 7,609,873 B2 | 10/2009 | Foth et al. |
| 7,619,721 B2 | 11/2009 | Jones |
| 7,620,231 B2 | 11/2009 | Jones |
| 7,620,604 B1 | 11/2009 | Bueche, Jr. |
| 7,630,518 B2 | 12/2009 | Frew et al. |
| 7,644,037 B1 | 1/2010 | Ostrovsky |
| 7,644,043 B2 | 1/2010 | Minowa |
| 7,647,275 B2 | 1/2010 | Jones |
| 7,668,363 B2 | 2/2010 | Price |
| 7,672,022 B1 * | 3/2010 | Fan ............................. 358/474 |
| 7,672,940 B2 | 3/2010 | Viola |
| 7,676,409 B1 | 3/2010 | Ahmad |
| 7,680,735 B1 | 3/2010 | Loy |
| 7,689,482 B2 | 3/2010 | Lam |
| 7,697,776 B2 | 4/2010 | Wu et al. |
| 7,698,222 B1 | 4/2010 | Bueche, Jr. |
| 7,702,588 B2 | 4/2010 | Gilder et al. |
| 7,734,545 B1 | 6/2010 | Fogliano |
| 7,743,979 B2 | 6/2010 | Fredman |

(56) References Cited

U.S. PATENT DOCUMENTS

| | | |
|---|---|---|
| 7,753,268 B1 | 7/2010 | Robinson et al. |
| 7,761,358 B2 | 7/2010 | Craig et al. |
| 7,766,244 B1 | 8/2010 | Field |
| 7,769,650 B2 | 8/2010 | Bleunven |
| 7,792,752 B1 | 9/2010 | Kay |
| 7,792,753 B1 | 9/2010 | Slater et al. |
| 7,810,714 B2 | 10/2010 | Murata |
| 7,812,986 B2 | 10/2010 | Graham et al. |
| 7,818,245 B2 | 10/2010 | Prakash et al. |
| 7,831,458 B2 | 11/2010 | Neumann |
| 7,856,402 B1 | 12/2010 | Kay |
| 7,873,200 B1 | 1/2011 | Oakes, III et al. |
| 7,876,949 B1 | 1/2011 | Oakes, III et al. |
| 7,885,451 B1 | 2/2011 | Walls et al. |
| 7,885,880 B1 | 2/2011 | Prasad et al. |
| 7,894,094 B2 | 2/2011 | Nacman et al. |
| 7,896,232 B1 | 3/2011 | Prasad et al. |
| 7,900,822 B1 | 3/2011 | Prasad et al. |
| 7,903,863 B2 | 3/2011 | Jones et al. |
| 7,904,386 B2 | 3/2011 | Kalra et al. |
| 7,912,785 B1 | 3/2011 | Kay |
| 7,949,587 B1 | 5/2011 | Morris et al. |
| 7,950,698 B2 | 5/2011 | Popadic et al. |
| 7,953,441 B2 | 5/2011 | Lors |
| 7,962,411 B1 | 6/2011 | Prasad et al. |
| 7,970,677 B1 | 6/2011 | Oakes, III et al. |
| 7,974,899 B1 | 7/2011 | Prasad et al. |
| 7,978,900 B2 | 7/2011 | Nepomniachtchi et al. |
| 7,996,314 B1 | 8/2011 | Smith et al. |
| 7,996,315 B1 | 8/2011 | Smith et al. |
| 7,996,316 B1 | 8/2011 | Smith et al. |
| 8,001,051 B1 | 8/2011 | Smith et al. |
| 8,045,784 B2 | 10/2011 | Price et al. |
| 8,046,301 B1 | 10/2011 | Smith et al. |
| 8,060,442 B1 | 11/2011 | Hecht et al. |
| 8,091,778 B1 | 1/2012 | Block et al. |
| 8,204,293 B2 | 6/2012 | Csulits et al. |
| 8,235,284 B1 | 8/2012 | Prasad et al. |
| 8,271,385 B2 | 9/2012 | Emerson et al. |
| 8,290,237 B1 | 10/2012 | Burks et al. |
| 8,320,657 B1 | 11/2012 | Burks et al. |
| 8,351,677 B1 | 1/2013 | Oakes, III et al. |
| 8,351,678 B1 | 1/2013 | Medina, III |
| 8,358,826 B1 | 1/2013 | Medina, III et al. |
| 8,391,599 B1 | 3/2013 | Medina, III |
| 8,392,332 B1 | 3/2013 | Oakes, III et al. |
| 8,401,962 B1 | 3/2013 | Bent et al. |
| 8,422,758 B1 | 4/2013 | Bueche, Jr. |
| 8,433,127 B1 | 4/2013 | Harpel et al. |
| 8,452,689 B1 | 5/2013 | Medina, III |
| 8,464,933 B1 | 6/2013 | Prasad et al. |
| 8,538,124 B1 | 9/2013 | Harpel et al. |
| 8,542,921 B1 | 9/2013 | Medina |
| 8,559,766 B2 | 10/2013 | Tilt et al. |
| 8,611,635 B1 | 12/2013 | Medina, III |
| 8,688,579 B1 | 4/2014 | Ethington et al. |
| 8,699,779 B1 | 4/2014 | Prasad et al. |
| 8,708,227 B1 | 4/2014 | Oakes, III et al. |
| 2001/0004235 A1 | 6/2001 | Maloney |
| 2001/0014881 A1 | 8/2001 | Drummond |
| 2001/0018739 A1 | 8/2001 | Anderson |
| 2001/0027994 A1 | 10/2001 | Hayashida |
| 2001/0037299 A1 | 11/2001 | Nichols et al. |
| 2001/0042171 A1 | 11/2001 | Vermeulen |
| 2001/0042785 A1 | 11/2001 | Walker |
| 2001/0043748 A1 | 11/2001 | Wesolkowski et al. |
| 2001/0047330 A1 | 11/2001 | Gephart |
| 2001/0054020 A1 | 12/2001 | Barth et al. |
| 2002/0001393 A1 | 1/2002 | Jones |
| 2002/0016763 A1 | 2/2002 | March |
| 2002/0016769 A1 | 2/2002 | Barbara et al. |
| 2002/0026418 A1 | 2/2002 | Koppel et al. |
| 2002/0032656 A1 | 3/2002 | Chen |
| 2002/0038289 A1 | 3/2002 | Lawlor et al. |
| 2002/0052841 A1 | 5/2002 | Guthrie |
| 2002/0052853 A1 | 5/2002 | Munoz |
| 2002/0065786 A1 | 5/2002 | Martens et al. |
| 2002/0072974 A1 | 6/2002 | Pugliese |
| 2002/0075524 A1 | 6/2002 | Blair |
| 2002/0084321 A1 | 7/2002 | Martens |
| 2002/0087467 A1 | 7/2002 | Mascavage, III et al. |
| 2002/0107767 A1 | 8/2002 | McClair et al. |
| 2002/0107809 A1 | 8/2002 | Biddle et al. |
| 2002/0116329 A1 | 8/2002 | Serbetcioglu |
| 2002/0116335 A1 | 8/2002 | Star |
| 2002/0118891 A1 | 8/2002 | Rudd |
| 2002/0120562 A1 | 8/2002 | Opiela |
| 2002/0129249 A1 | 9/2002 | Maillard et al. |
| 2002/0130868 A1 | 9/2002 | Smith |
| 2002/0133409 A1 | 9/2002 | Sawano et al. |
| 2002/0138522 A1 | 9/2002 | Muralidhar |
| 2002/0147798 A1 | 10/2002 | Huang |
| 2002/0150279 A1 | 10/2002 | Scott |
| 2002/0152160 A1 | 10/2002 | Allen-Rouman et al. |
| 2002/0152161 A1 | 10/2002 | Aoike |
| 2002/0152164 A1 | 10/2002 | Dutta |
| 2002/0152165 A1 | 10/2002 | Dutta et al. |
| 2002/0152169 A1 | 10/2002 | Dutta et al. |
| 2002/0159648 A1 | 10/2002 | Alderson et al. |
| 2002/0171820 A1 | 11/2002 | Okamura |
| 2002/0178112 A1 | 11/2002 | Goeller |
| 2002/0186881 A1 | 12/2002 | Li |
| 2002/0188564 A1 | 12/2002 | Star |
| 2002/0195485 A1 | 12/2002 | Pomerleau et al. |
| 2003/0005326 A1 | 1/2003 | Flemming |
| 2003/0023557 A1 | 1/2003 | Moore |
| 2003/0038227 A1 | 2/2003 | Sesek |
| 2003/0050889 A1 | 3/2003 | Burke |
| 2003/0055756 A1 | 3/2003 | Allan |
| 2003/0055776 A1 | 3/2003 | Samuelson |
| 2003/0074315 A1 | 4/2003 | Lam |
| 2003/0075596 A1 | 4/2003 | Koakutsu |
| 2003/0075916 A1 | 4/2003 | Gorski |
| 2003/0081824 A1 | 5/2003 | Mennie |
| 2003/0093367 A1 | 5/2003 | Allen-Rouman et al. |
| 2003/0093369 A1 | 5/2003 | Ijichi et al. |
| 2003/0102714 A1 | 6/2003 | Rhodes et al. |
| 2003/0105688 A1 | 6/2003 | Brown |
| 2003/0105714 A1 | 6/2003 | Alarcon-Luther et al. |
| 2003/0126078 A1 | 7/2003 | Vihinen |
| 2003/0132384 A1 | 7/2003 | Sugiyama et al. |
| 2003/0139999 A1 | 7/2003 | Rowe |
| 2003/0159046 A1 | 8/2003 | Choi et al. |
| 2003/0167225 A1 | 9/2003 | Adams |
| 2003/0191615 A1 | 10/2003 | Bailey |
| 2003/0191869 A1 | 10/2003 | Williams |
| 2003/0200174 A1 | 10/2003 | Star |
| 2003/0212904 A1 | 11/2003 | Randle et al. |
| 2003/0217005 A1 | 11/2003 | Drummond et al. |
| 2003/0225705 A1 | 12/2003 | Park et al. |
| 2003/0233278 A1 | 12/2003 | Marshall |
| 2003/0233318 A1 | 12/2003 | King et al. |
| 2004/0010466 A1 | 1/2004 | Anderson |
| 2004/0012496 A1 | 1/2004 | De Souza |
| 2004/0013284 A1 | 1/2004 | Yu |
| 2004/0024626 A1 | 2/2004 | Bruijning |
| 2004/0024708 A1 | 2/2004 | Masuda |
| 2004/0030741 A1 | 2/2004 | Wolton et al. |
| 2004/0044606 A1 | 3/2004 | Buttridge et al. |
| 2004/0057697 A1 | 3/2004 | Renzi |
| 2004/0058705 A1 | 3/2004 | Morgan |
| 2004/0066031 A1 | 4/2004 | Wong |
| 2004/0069841 A1 | 4/2004 | Wong |
| 2004/0071333 A1 | 4/2004 | Douglas et al. |
| 2004/0076320 A1 | 4/2004 | Downs, Jr. |
| 2004/0078299 A1 | 4/2004 | Down-Logan |
| 2004/0080795 A1 | 4/2004 | Bean et al. |
| 2004/0089711 A1 | 5/2004 | Sandru |
| 2004/0093303 A1 | 5/2004 | Picciallo |
| 2004/0093305 A1 | 5/2004 | Kight |
| 2004/0103057 A1 | 5/2004 | Melbert et al. |
| 2004/0103296 A1 | 5/2004 | Harp |
| 2004/0109596 A1 | 6/2004 | Doran |
| 2004/0110975 A1 | 6/2004 | Osinski et al. |

(56) References Cited

U.S. PATENT DOCUMENTS

| | | |
|---|---|---|
| 2004/0111371 A1 | 6/2004 | Friedman |
| 2004/0117302 A1 | 6/2004 | Weichert |
| 2004/0122754 A1 | 6/2004 | Stevens |
| 2004/0133511 A1 | 7/2004 | Smith et al. |
| 2004/0138974 A1 | 7/2004 | Shimamura |
| 2004/0148235 A1 | 7/2004 | Craig et al. |
| 2004/0158549 A1 | 8/2004 | Matena |
| 2004/0165096 A1 | 8/2004 | Maeno |
| 2004/0170259 A1 | 9/2004 | Park |
| 2004/0184766 A1* | 9/2004 | Kim et al. ............... 386/46 |
| 2004/0210515 A1 | 10/2004 | Hughes |
| 2004/0210523 A1 | 10/2004 | Gains et al. |
| 2004/0228277 A1 | 11/2004 | Williams |
| 2004/0236647 A1 | 11/2004 | Acharya |
| 2004/0236688 A1 | 11/2004 | Bozeman |
| 2004/0240722 A1 | 12/2004 | Tsuji et al. |
| 2004/0245324 A1 | 12/2004 | Chen |
| 2004/0247199 A1 | 12/2004 | Murai et al. |
| 2004/0248600 A1 | 12/2004 | Kim |
| 2004/0252679 A1 | 12/2004 | Williams |
| 2004/0260636 A1 | 12/2004 | Marceau |
| 2004/0267666 A1 | 12/2004 | Minami |
| 2005/0001421 A1 | 1/2005 | Luth et al. |
| 2005/0010108 A1 | 1/2005 | Rahn et al. |
| 2005/0021466 A1 | 1/2005 | Buchanan et al. |
| 2005/0033645 A1 | 2/2005 | Duphily |
| 2005/0033685 A1 | 2/2005 | Reyes |
| 2005/0033695 A1 | 2/2005 | Minowa |
| 2005/0035193 A1 | 2/2005 | Gustin et al. |
| 2005/0038746 A1 | 2/2005 | Latimer et al. |
| 2005/0038754 A1 | 2/2005 | Geist |
| 2005/0044042 A1 | 2/2005 | Mendiola |
| 2005/0044577 A1 | 2/2005 | Jerding |
| 2005/0049950 A1 | 3/2005 | Johnson |
| 2005/0071283 A1 | 3/2005 | Randle et al. |
| 2005/0075969 A1 | 4/2005 | Nielson et al. |
| 2005/0075974 A1 | 4/2005 | Turgeon |
| 2005/0078336 A1 | 4/2005 | Ferlitsch |
| 2005/0080725 A1 | 4/2005 | Pick |
| 2005/0082364 A1 | 4/2005 | Alvarez et al. |
| 2005/0086140 A1 | 4/2005 | Ireland |
| 2005/0086168 A1 | 4/2005 | Alvarez |
| 2005/0089209 A1 | 4/2005 | Stefanuk |
| 2005/0091161 A1 | 4/2005 | Gustin |
| 2005/0096992 A1 | 5/2005 | Geisel |
| 2005/0097019 A1 | 5/2005 | Jacobs |
| 2005/0097046 A1 | 5/2005 | Singfield |
| 2005/0097050 A1 | 5/2005 | Orcutt |
| 2005/0108164 A1 | 5/2005 | Salafia |
| 2005/0108168 A1 | 5/2005 | Halpin |
| 2005/0115110 A1 | 6/2005 | Dinkins |
| 2005/0125338 A1 | 6/2005 | Tidwell et al. |
| 2005/0125360 A1 | 6/2005 | Tidwell et al. |
| 2005/0127160 A1 | 6/2005 | Fujikawa |
| 2005/0131820 A1 | 6/2005 | Rodriguez |
| 2005/0149436 A1 | 7/2005 | Elterich |
| 2005/0168566 A1 | 8/2005 | Tada |
| 2005/0171899 A1 | 8/2005 | Dunn |
| 2005/0171907 A1 | 8/2005 | Lewis |
| 2005/0177499 A1 | 8/2005 | Thomas |
| 2005/0177518 A1 | 8/2005 | Brown |
| 2005/0182710 A1 | 8/2005 | Anderson |
| 2005/0188306 A1 | 8/2005 | Mackenzie |
| 2005/0203430 A1 | 9/2005 | Williams et al. |
| 2005/0205661 A1 | 9/2005 | Taylor |
| 2005/0209961 A1 | 9/2005 | Michelsen |
| 2005/0213805 A1* | 9/2005 | Blake et al. ............... 382/137 |
| 2005/0228733 A1 | 10/2005 | Bent |
| 2005/0244035 A1* | 11/2005 | Klein et al. ............... 382/112 |
| 2005/0252955 A1 | 11/2005 | Sugai |
| 2005/0267843 A1 | 12/2005 | Acharya et al. |
| 2005/0268107 A1 | 12/2005 | Harris et al. |
| 2005/0269412 A1 | 12/2005 | Chiu |
| 2005/0273368 A1 | 12/2005 | Hutten et al. |
| 2005/0278250 A1 | 12/2005 | Zair |
| 2005/0281448 A1 | 12/2005 | Lugg |
| 2005/0281471 A1 | 12/2005 | LeConte |
| 2005/0281474 A1 | 12/2005 | Huang |
| 2005/0289030 A1 | 12/2005 | Smith |
| 2005/0289182 A1 | 12/2005 | Pandian et al. |
| 2006/0002426 A1 | 1/2006 | Madour |
| 2006/0004660 A1 | 1/2006 | Pranger |
| 2006/0025697 A1 | 2/2006 | Kurzweil |
| 2006/0039628 A1 | 2/2006 | Li et al. |
| 2006/0039629 A1 | 2/2006 | Li et al. |
| 2006/0041506 A1 | 2/2006 | Mason et al. |
| 2006/0045321 A1 | 3/2006 | Yu |
| 2006/0047593 A1 | 3/2006 | Naratil |
| 2006/0053056 A1 | 3/2006 | Alspach-Goss |
| 2006/0059085 A1 | 3/2006 | Tucker |
| 2006/0064368 A1 | 3/2006 | Forte |
| 2006/0080245 A1 | 4/2006 | Bahl |
| 2006/0085357 A1 | 4/2006 | Pizarro |
| 2006/0085516 A1 | 4/2006 | Farr et al. |
| 2006/0102704 A1 | 5/2006 | Reynders |
| 2006/0106691 A1 | 5/2006 | Sheaffer |
| 2006/0106717 A1 | 5/2006 | Randle |
| 2006/0110063 A1 | 5/2006 | Weiss |
| 2006/0112013 A1 | 5/2006 | Maloney |
| 2006/0115110 A1 | 6/2006 | Rodriguez |
| 2006/0115141 A1 | 6/2006 | Koakutsu et al. |
| 2006/0118613 A1 | 6/2006 | McMann |
| 2006/0124730 A1 | 6/2006 | Maloney |
| 2006/0144924 A1 | 7/2006 | Stover |
| 2006/0144950 A1 | 7/2006 | Johnson |
| 2006/0159367 A1* | 7/2006 | Zeineh et al. ............... 382/276 |
| 2006/0161501 A1 | 7/2006 | Waserstein |
| 2006/0164682 A1 | 7/2006 | Lev |
| 2006/0167818 A1 | 7/2006 | Wentker et al. |
| 2006/0182331 A1 | 8/2006 | Gilson et al. |
| 2006/0182332 A1 | 8/2006 | Weber |
| 2006/0186194 A1 | 8/2006 | Richardson et al. |
| 2006/0206506 A1 | 9/2006 | Fitzpatrick |
| 2006/0208059 A1 | 9/2006 | Cable et al. |
| 2006/0210138 A1 | 9/2006 | Hilton et al. |
| 2006/0212391 A1 | 9/2006 | Norman et al. |
| 2006/0214940 A1 | 9/2006 | Kinoshita |
| 2006/0215204 A1 | 9/2006 | Miyamoto et al. |
| 2006/0215230 A1 | 9/2006 | Borrey et al. |
| 2006/0222260 A1 | 10/2006 | Sambongi et al. |
| 2006/0229976 A1 | 10/2006 | Jung |
| 2006/0229986 A1 | 10/2006 | Corder |
| 2006/0238503 A1 | 10/2006 | Smith |
| 2006/0242062 A1 | 10/2006 | Peterson |
| 2006/0242063 A1 | 10/2006 | Peterson |
| 2006/0249567 A1 | 11/2006 | Byrne |
| 2006/0274164 A1 | 12/2006 | Kimura et al. |
| 2006/0279628 A1 | 12/2006 | Fleming |
| 2006/0282383 A1 | 12/2006 | Doran |
| 2006/0291744 A1 | 12/2006 | Ikeda et al. |
| 2007/0016796 A1 | 1/2007 | Singhal |
| 2007/0019243 A1 | 1/2007 | Sato |
| 2007/0022053 A1 | 1/2007 | Waserstein |
| 2007/0027802 A1 | 2/2007 | VanDeburg et al. |
| 2007/0031022 A1 | 2/2007 | Frew |
| 2007/0038561 A1 | 2/2007 | Vancini et al. |
| 2007/0041629 A1 | 2/2007 | Prakash et al. |
| 2007/0050292 A1 | 3/2007 | Yarbrough |
| 2007/0053574 A1 | 3/2007 | Verma et al. |
| 2007/0058851 A1 | 3/2007 | Quine |
| 2007/0063016 A1 | 3/2007 | Myatt |
| 2007/0064991 A1 | 3/2007 | Douglas et al. |
| 2007/0065143 A1 | 3/2007 | Didow et al. |
| 2007/0075772 A1 | 4/2007 | Kokubo |
| 2007/0076940 A1 | 4/2007 | Goodall et al. |
| 2007/0076941 A1 | 4/2007 | Carreon et al. |
| 2007/0077921 A1 | 4/2007 | Hayashi |
| 2007/0080207 A1 | 4/2007 | Williams |
| 2007/0082700 A1 | 4/2007 | Landschaft |
| 2007/0084911 A1 | 4/2007 | Crowell |
| 2007/0086642 A1 | 4/2007 | Foth |
| 2007/0086643 A1 | 4/2007 | Spier |
| 2007/0094088 A1 | 4/2007 | Mastie |
| 2007/0094140 A1 | 4/2007 | Riney et al. |

(56) References Cited

U.S. PATENT DOCUMENTS

| | | |
|---|---|---|
| 2007/0100748 A1 | 5/2007 | Dheer |
| 2007/0110277 A1 | 5/2007 | Hayduchok et al. |
| 2007/0118472 A1 | 5/2007 | Allen-Rouman et al. |
| 2007/0122024 A1 | 5/2007 | Haas et al. |
| 2007/0127805 A1 | 6/2007 | Foth et al. |
| 2007/0129955 A1 | 6/2007 | Dalmia |
| 2007/0136198 A1 | 6/2007 | Foth et al. |
| 2007/0140545 A1 | 6/2007 | Rossignoli |
| 2007/0140594 A1 | 6/2007 | Franklin |
| 2007/0143208 A1 | 6/2007 | Varga |
| 2007/0150337 A1 | 6/2007 | Hawkins et al. |
| 2007/0156438 A1 | 7/2007 | Popadic et al. |
| 2007/0168265 A1 | 7/2007 | Rosenberger |
| 2007/0168283 A1 | 7/2007 | Alvarez et al. |
| 2007/0171288 A1 | 7/2007 | Inoue |
| 2007/0172107 A1 | 7/2007 | Jones et al. |
| 2007/0172148 A1 | 7/2007 | Hawley |
| 2007/0179883 A1 | 8/2007 | Questembert |
| 2007/0183000 A1 | 8/2007 | Eisen et al. |
| 2007/0183741 A1 | 8/2007 | Lerman et al. |
| 2007/0194102 A1 | 8/2007 | Cohen |
| 2007/0198432 A1 | 8/2007 | Pitroda et al. |
| 2007/0203708 A1 | 8/2007 | Polcyn et al. |
| 2007/0208816 A1 | 9/2007 | Baldwin et al. |
| 2007/0214086 A1 | 9/2007 | Homoki |
| 2007/0217669 A1 | 9/2007 | Swift et al. |
| 2007/0233525 A1 | 10/2007 | Boyle |
| 2007/0233585 A1 | 10/2007 | Simon et al. |
| 2007/0235518 A1 | 10/2007 | Mueller et al. |
| 2007/0235520 A1 | 10/2007 | Smith et al. |
| 2007/0241179 A1 | 10/2007 | Davis |
| 2007/0244782 A1 | 10/2007 | Chimento |
| 2007/0246525 A1 | 10/2007 | Smith et al. |
| 2007/0251992 A1 | 11/2007 | Sharma et al. |
| 2007/0255652 A1 | 11/2007 | Tumminaro |
| 2007/0255653 A1 | 11/2007 | Tumminaro |
| 2007/0255662 A1 | 11/2007 | Tumminaro |
| 2007/0258634 A1 | 11/2007 | Simonoff |
| 2007/0268540 A1 | 11/2007 | Gaspardo et al. |
| 2007/0271182 A1 | 11/2007 | Prakash et al. |
| 2007/0278286 A1 | 12/2007 | Crowell et al. |
| 2007/0288380 A1 | 12/2007 | Starrs |
| 2007/0288382 A1 | 12/2007 | Narayanan et al. |
| 2007/0295803 A1 | 12/2007 | Levine et al. |
| 2007/0299928 A1 | 12/2007 | Kohli et al. |
| 2008/0002911 A1 | 1/2008 | Eisen |
| 2008/0021802 A1 | 1/2008 | Pendleton |
| 2008/0040280 A1 | 2/2008 | Davis et al. |
| 2008/0052182 A1 | 2/2008 | Marshall |
| 2008/0059376 A1 | 3/2008 | Davis |
| 2008/0063253 A1 | 3/2008 | Wood |
| 2008/0068674 A1 | 3/2008 | McIntyre |
| 2008/0071721 A1 | 3/2008 | Wang |
| 2008/0073423 A1 | 3/2008 | Heit et al. |
| 2008/0080760 A1 | 4/2008 | Ronca |
| 2008/0086420 A1 | 4/2008 | Gilder et al. |
| 2008/0086421 A1 | 4/2008 | Gilder |
| 2008/0091599 A1 | 4/2008 | Foss, Jr. |
| 2008/0097899 A1 | 4/2008 | Jackson et al. |
| 2008/0103790 A1 | 5/2008 | Abernethy |
| 2008/0103967 A1 | 5/2008 | Ackert et al. |
| 2008/0113674 A1 | 5/2008 | Baig |
| 2008/0114739 A1 | 5/2008 | Hayes |
| 2008/0116257 A1 | 5/2008 | Fickling |
| 2008/0117991 A1 | 5/2008 | Peddireddy |
| 2008/0119178 A1 | 5/2008 | Peddireddy |
| 2008/0133411 A1 | 6/2008 | Jones et al. |
| 2008/0147549 A1 | 6/2008 | Rathbun |
| 2008/0156438 A1 | 7/2008 | Stumphauzer et al. |
| 2008/0162319 A1 | 7/2008 | Breeden et al. |
| 2008/0162350 A1 | 7/2008 | Allen-Rouman et al. |
| 2008/0162371 A1 | 7/2008 | Rampell et al. |
| 2008/0177659 A1 | 7/2008 | Lacey et al. |
| 2008/0180750 A1 | 7/2008 | Feldman |
| 2008/0208727 A1 | 8/2008 | McLaughlin et al. |
| 2008/0214180 A1 | 9/2008 | Cunningham et al. |
| 2008/0219543 A1 | 9/2008 | Csulits |
| 2008/0245869 A1 | 10/2008 | Berkun et al. |
| 2008/0247629 A1 | 10/2008 | Gilder |
| 2008/0247655 A1 | 10/2008 | Yano |
| 2008/0249931 A1 | 10/2008 | Gilder et al. |
| 2008/0249951 A1 | 10/2008 | Gilder et al. |
| 2008/0262953 A1 | 10/2008 | Anderson |
| 2008/0275821 A1 | 11/2008 | Bishop et al. |
| 2008/0316542 A1 | 12/2008 | Mindrum et al. |
| 2009/0024520 A1 | 1/2009 | Drory et al. |
| 2009/0046938 A1 | 2/2009 | Yoder |
| 2009/0060396 A1 | 3/2009 | Blessan et al. |
| 2009/0066987 A1 | 3/2009 | Inokuchi |
| 2009/0108080 A1 | 4/2009 | Meyer |
| 2009/0110281 A1 | 4/2009 | Hirabayashi |
| 2009/0141962 A1 | 6/2009 | Borgia et al. |
| 2009/0166406 A1 | 7/2009 | Pigg et al. |
| 2009/0167870 A1 | 7/2009 | Caleca et al. |
| 2009/0171819 A1 | 7/2009 | Emde et al. |
| 2009/0171825 A1 | 7/2009 | Roman |
| 2009/0173781 A1 | 7/2009 | Ramachandran |
| 2009/0185737 A1* | 7/2009 | Nepomniachtchi ........... 382/139 |
| 2009/0185738 A1* | 7/2009 | Nepomniachtchi ........... 382/140 |
| 2009/0190823 A1 | 7/2009 | Walters |
| 2009/0192938 A1 | 7/2009 | Amos |
| 2009/0236413 A1 | 9/2009 | Mueller et al. |
| 2009/0252437 A1 | 10/2009 | Li |
| 2009/0254447 A1 | 10/2009 | Blades |
| 2009/0281904 A1 | 11/2009 | Pharris |
| 2009/0290751 A1* | 11/2009 | Ferman et al. ................ 382/100 |
| 2009/0313167 A1 | 12/2009 | Dujari et al. |
| 2010/0007899 A1 | 1/2010 | Lay |
| 2010/0027679 A1 | 2/2010 | Sunahara et al. |
| 2010/0047000 A1 | 2/2010 | Park et al. |
| 2010/0057578 A1 | 3/2010 | Blair et al. |
| 2010/0061446 A1 | 3/2010 | Hands et al. |
| 2010/0082470 A1 | 4/2010 | Walach |
| 2010/0165015 A1 | 7/2010 | Barkley et al. |
| 2010/0226559 A1 | 9/2010 | Najari et al. |
| 2010/0260408 A1 | 10/2010 | Prakash et al. |
| 2010/0262522 A1 | 10/2010 | Anderson et al. |
| 2010/0312705 A1 | 12/2010 | Caruso et al. |
| 2011/0016084 A1 | 1/2011 | Mundy et al. |
| 2011/0112967 A1 | 5/2011 | Anderson et al. |
| 2011/0310442 A1 | 12/2011 | Popadic et al. |
| 2012/0062732 A1 | 3/2012 | Marman et al. |
| 2012/0185388 A1 | 7/2012 | Pranger |
| 2013/0021651 A9 | 1/2013 | Popadic et al. |

OTHER PUBLICATIONS

"Adjusting Brightness and Contrast", www.eaglesoftware.com/adjustin.htm, retrieved on May 4, 2009 (4 pgs).

"Best practices for producing quality digital image files," Digital Images Guidelines, http://deepblue.lib.umich.edu/bitstream/2027.42/40247/1/Images-Best_Practice.pdf, downloaded 2007 (2 pgs).

"Chapter 7 Payroll Programs," Uniform Staff Payroll System, http://www2.oecn.k12.oh.us/www/ssdt/usps/usps_user_guide_005.html, Patent No. 7,900,822, as dated 2007 (9 pgs).

"Check 21—The check is not in the post", RedTitan Technology 2004 http://www.redtitan.com/check21/htm (3 pgs)

"Check 21 Solutions," Columbia Financial International, Inc. http://www.columbiafinancial.us/check21/solutions.htm, Patent No. 7,900,822, as dated 2007 (8 pgs).

"Check Fraud: a Guide to Avoiding Losses", All Net, http://all.net/books/audit/checkfraud/security.htm, Patent No. 7,900,822, as dated 2007 (1 pg).

"Compliance with Regulation CC", http./www/federalreserve.gov/Pubs/regcc/regcc.htm, Jan. 24, 2006 (6 pgs).

"Customer Personalized Bank Checks and Address Labels" Checks Your Way Inc., http://www.checksyourway.com/htm/web_pages/faq.htm, Patent No. 7,900,822, as dated 2007 (6 pgs).

"Direct Deposit Application for Payroll", Purdue University, Business Office Form 0003, http://purdue.edu/payroll/pdf/directdepositapplication.pdf, Jul. 2007 (2 pgs).

(56) References Cited

OTHER PUBLICATIONS

"Direct Deposit Authorization Form", www.umass.edu/humres/library/DDForm.pdf, May 2003 (3 pgs).
"Direct Deposit," University of Washington, http://www.washington.edu/admin/payroll/directdeposit.html, Patent No. 7,900,822, as dated 2007 (3 pgs).
"Electronic Billing Problem: The E-check is in the mail" American Banker—vol. 168, No. 95, May 19, 2003 (4 pgs).
"Frequently Asked Questions" Bank of America, http://www/bankofamerica.com/deposits/checksave/index.cfm?template-lc_faq_bymail, Patent No. 7,900,822, as dated 2007 (2 pgs).
"Full Service Direct Deposit", www.nonprofitstaffing.com/images/upload/dirdepform.pdf. Patent No. 7,900,822, as dated 2001, (2 pgs).
"How to Digitally Deposit a Check Image", Smart Money Daily, Copyright 2008 (5 pgs).
"ImageNet Mobile Deposit Provides Convenient Check Deposit and Bill Pay to Mobile Consumers," Miteksystems, 2008 (2 pgs).
"It's the easiest way to Switch banks", LNB, http://www.inbky.com/pdf/LNBswitch-kit10-07.pdf Patent No. 7,996,316, as dated 2007 (7 pgs).
"Lesson 38—More Bank Transactions", Turtle Soft, http://www.turtlesoft.com/goldenseal-software-manual.lesson38.htm, Patent No. 7,900,822, as dated 2007 (8 pgs).
"Middleware", David E. Bakken, Encyclopedia of Distributed Computing, Kluwer Academic Press, 2001 (6 pgs).
"Mitek Systems Announces Mobile Deposit Application for Apple iPhone," http://prnewswire.com/cgi-bin/stories/pl?ACCT=104&STORY=/www/story/10-01- . . . , Nov. 25, 2008 (2 pgs).
"Personal Finance", PNC, http://www.pnc.com/webapp/unsec/productsandservice.do?sitearea=/PNC/home/personal/account+services/quick+switch/quick+switch+faqs, Patent No. 7,900,822, as dated 2007 (12 pgs).
"Refractive index" Wikipedia, the free encyclopedia; http://en.wikipedia.org/wiki/refractiveindex.com Oct. 16, 2007 (4 pgs).
"Remote Deposit Capture", Plante & Moran, http://plantemoran.com/industries/fincial/institutions/bank/resources/community+bank+advisor/2007+summer+issue/remote+deposit+capture.htm, Patent No. 7,900,822, as dated 2007 (3 pgs).
"Remote Deposit" National City, http://www.nationalcity.corn/smallbusiness/cashmanagement/rernotedeposit/default.asp; Patent No. 7,900,822, as dated 2007 (1 pg).
"Save on ATM Fees", RedEye Edition, Chicago Tribune, Chicago, IL Jun. 30, 2007 (2 pgs).
"Switching Made Easy," Bank of North Georgia, http://www.banknorthgeorgia.com/cmsmaster/documents/286/documents616.pdf, 2007 (7 pgs).
"Two Words Every Business Should Know: Remote Deposit," Canon, http://www.rpsolutions.com/rpweb/pdfs/canon_rdc.pdf, 2005 (7 pgs).
"Virtual Bank Checks", Morebusiness.com, http://www.morebusiness.com/running_your business/businessbits/d908484987.brc, Patent No. 7,900,822, as dated 2007 (3 pgs).
"WallStreetGrapevine.com" Stocks on the Rise: JADG, BKYI, MITK; Mar. 3, 2008 (4 pgs).
"What is check Fraud", National Check Fraud Center, http://www.ckfraud.org/ckfraud.html, Patent No. 7,900,822, as dated 2007 (12 pgs).
Affinity Federal Credit Union, "Affinity Announces Online Deposit," Aug. 4, 2005 (1 pg).
Albrecht, W. Steve, "Check Kiting: Detection, Prosecution and Prevention," The FBI Law Enforcement Bulletin, Nov. 1, 1993 (6 pgs).
Alves, Vander and Borba, Paulo; "Distributed Adapters Pattern: A Design for Object-Oriented Distributed Applications"; First Latin American Conference on Pattern Languages of Programming; Oct. 2001; pp. 132-142; Rio de Janeiro, Brazil (11 pgs).
Amber Avalona-Butler/Paraglide, "At Your Service: Best iPhone Apps for Military Lifestyle," Jul. 9, 2010 (2 pgs).
Anderson, Milton M. "FSML and Echeck", Financial Services Technology Consortium, 1999 (17 pgs).

Archive Index Systems; Panini My Vision X-30 or VX30 or X30 © 1994-2008 Archive Systems, Inc. P./O. Box 40135 Bellevue, WA USA 98015 (2 pgs).
Associate of German Banks, SEPA 2008: Uniform Payment Instruments for Europe, Berlin, Patent No. 7,900,822, as dated Jul. 2007, Bundesverbankd deutscher banker ev (42 pgs).
Automated Merchant Systems, Inc., "Electronic Check Conversion," http://www.automatedmerchant.com/electronic_check_conversion.cfm, 2006, downloaded Oct. 18, 2006 (3 pgs).
Bank Systems & Technology, Untitled Article, May 1, 2006, http://www.banktech.com/showarticle.jhtml? articlelD=187003126, "Are you Winning in the Payment World?" (4 pgs).
BankServ, "DepositNow: What's the difference?" Patent No. 7,970,677, as dated 2006, (4 pgs).
BankServ, Product Overview, http://www.bankserv.com/products/remotedeposit.htm, Patent No. 7,970,677, as dated 2006, (3 pgs).
Blafore, Bonnie "Lower Commissions, Fewer Amenities", Better Investing, Madison Heights: Feb. 2003, vol. 52, Iss 6, (4 pgs).
BLM Technologies, "Case Study: Addressing Check 21 and RDC Error and Fraud Threats," Remote Deposit Capture News Articles from Jun. 11, 2007, Retrieved from http://www.remotedepositcapture.com/News/june_11_2007.htm on Feb. 19, 2008 (5 pgs).
Blue Mountain Consulting, from URL:www.bluemontainconsulting.com, Patent No. 7,900,822, as dated Apr. 26, 2006 (3 pgs).
Board of Governors of the federal reserve system, "Report to the Congress on the Check Clearing for the $21^{st}$ Century Act of 2003" Apr. 2007, Submitted to Congress pursuant to section 16 of the Check Clearing for the $21^{st}$ Century Act of 2003, (59 pgs).
Bruene, Jim; "Check Free to Enable In-Home Remote Check Deposit for Consumers and Small Business", NetBanker.com, Financial Insite, Inc., http://www. netbankercom/2008/02/checkfree_to_enableinhome_rem.html, Feb. 5, 2008 (3 pgs).
Bruene, Jim; "Digital Federal Credit Union and Four Others Offer Consumer Remote Deposit Capture Through EasCorp", NetBanker—Tracking Online Finance, www.netbankercom/2008/04/digital_federal_credit_union_a.html, Apr. 13, 2008 (3 pgs).
Bruno, M., "Instant Messaging, Bank Technology News," Dec. 2002 (3 pgs).
Burnett, J. "Depository Bank Endorsement Requirements," BankersOnline.com, http://www.bankersonline.com/cgi-bin/printview/printview.pl, Jan. 6, 2003 (3 pgs).
Canon, ImageFormula CR-25/CR-55, "Improve Your Bottom Line with Front-Line Efficiencies", 0117W117, 1207-55/25-1 OM-BSP, U.S. Pat. No. 7,949,587 as dated 2007. (4 pgs).
Carrubba, P. et al., "Remote Deposit Capture: A White Paper Addressing Regulatory, Operational and Risk Issues," NetDeposit Inc., 2006 (11 pgs).
Century Remote Deposit High-Speed Scanner User's Manual Release 2006, (Century Manual), Century Bank, 2006, (32 pgs).
Chiang, Chuck, The Bulletin, "Remote banking offered", http://bendbulletin.com/apps/pbcs.d11/article?AlD=/20060201/BIZ0102/602010327 &tempi . . . , May 23, 2008 (2 pgs).
CNN.com/technology, "Scan, deposit checks from home", www.cnn.com/2008ITECH/biztech/02/07/check.scanning.ap/index.html, Feb. 7, 2008 (3 pgs).
Constanzo, Chris, "Remote Check Deposit: Wells Captures A New Checking Twist", Bank Technology News Article—May 2005, www.americanbanker.com/btn_article.html?id=20050502YQ5OFSYG (2 pgs).
Craig, Ben, "Resisting Electronic Payment Systems: Burning Down the House?", Federal Reserve Bank of Cleveland, Jul. 1999 (4 pgs).
Creativepaymentsolutions.com, "Creative Payment Solutions—Websolution," www.creativepaymentsolution.com/cps/financialservices/websolution/default.html, Copyright 2008, Creative Payment Solutions, Inc. (1 pg).
Credit Union Journal, "The Ramifications of Remote Deposit Capture Success", www.cuiournal.com/orintthis.html?id=20080411 EODZT57G, Apr. 14, 2008 (1 pg).
Credit Union Journal, "AFCU Averaging 80 DepositHome Transactions Per Day", Credit Union Journal, Aug. 15, 2005 (1 pg).
Credit Union Management, "When You wish Upon an Imaging System . . . the Right Selection Process can be the Shining Star," Credit

(56) References Cited

OTHER PUBLICATIONS

Union Management, Aug. 1993, printed from the internet at <http://search.proquest.com/docview/227756409/14138420743684F7722/15?acc ountid=14 . . . >, on Oct. 19, 2013 (11 pgs).

DCU Member's Monthly—Jan. 2008, "PC Deposit—Deposit Checks from Home!", http://www.mycreditunionnewsletter.com/dcu/01 08/page1.html, Copyright 2008 Digital Federal Credit Union (2 pgs).

De Jesus, A. et al., "Distributed Check Processing in a Check 21 Environment: An educational overview of the opportunities and challenges associated with implementing distributed check imaging and processing solutions," Panini, 2004, pp. 1-22.

De Queiroz, Ricardo et al., "Mixed Raster Content (MRC) Model for Compound Image Compression", 1998 (14 pgs).

Debello, James et al., "RDM and Mitek Systems to Provide Mobile Check Deposit," Mitek Systems, Inc., San Diego, California and Waterloo, Ontario, (Feb. 24, 2009), 2 pgs.

DeYoung, Robert; "The Financial Performance of Pure Play Internet Banks"; Federal Reserve Bank of Chicago Economic Perspectives; 2001; pp. 60-75; vol. 25, No. 1 (16 pgs).

Dias, Danilo et al., "A Model for the Electronic Representation of Bank Checks", Brasilia Univ. Oct. 2006 (5 pgs).

Digital Transactions News, "An ACH-Image Proposal for Check Roils Banks and Networks" May 26, 2006 (3 pgs).

Dinan, R.F. et al., "Image Plus High Performance Transaction System", IBM Systems Journal, 1990 vol. 29, No. 3 (14 pgs).

Doermann, David et al., "Progress in Camera-Based Document Image Analysis," Proceedings of the Seventh International Conference on Document Analysis and Recognition (ICDAR 2003) 0/7695-1960-1/03, 2003 IEEE (11 pages).

eCU Technologies, "Upost Remote Deposit Solution," Retrieved from the internet https://www.eutechnologies.com/products/upost.html, downloaded 2009 (1 pg).

EFT Network Unveils FAXTellerPlus, EFT Network, Inc., www.eftnetwork.com, Jan. 13, 2009 (2 pgs).

ElectronicPaymentProviders, Inc., "FAQs: ACH/ARC, CheckVerification/Conversion/Guarantee, RCK Check Re-Presentment," http://www.useapp.com/faq.htm, downloaded Oct. 18, 2006 (3 pgs).

Federal Check 21 Act, "New Check 21 Act effective Oct. 28, 2004: Bank No Longer Will Return Original Cancelled Checks," Consumer Union's FAQ's and Congressional Testimony on Check 21, www.consumerlaw.org.initiatives/content/check21_content.html, Patent No. 7,873,200, as dated Dec. 2005 (20 pgs).

Federal Reserve Board, "Check Clearing for the 21st Century Act", FRB, http://www.federalreserve.gov/paymentsystems/truncation/, Mar. 1, 2006 (1 pg).

Federal Reserve System, "12 CFR, Part 229 [Regulation CC]: Availability of Funds and Collection of Checks," Federal Registrar, Apr. 28, 1997, pp. 1-50.

Federal Reserve System, "Part IV, 12 CFR Part 229 [Regulation CC]: Availability of Funds and Collection of Checks; Final Rule," Federal Registrar, vol. 69, No. 149, Aug. 4, 2004, pp. 47290-47328.

Fest, Glen., "Patently Unaware" Bank Technology News, Apr. 2006, Retrieved from the internet at URL:http://banktechnews.com/article.html?id=2006403T7612618 (5 pgs).

Fidelity Information Services, "Strategic Vision Embraces Major Changes in Financial Services Solutions: Fidelity's long-term product strategy ushers in new era of application design and processing," Insight, 2004, pp. 1-14.

Fisher, Dan M., "Home Banking in the 21st Century: Remote Capture Has Gone Retail", May 2008 (4 pgs).

Furst, Karen et al., "Internet Banking: Developments and Prospects", Economic and Policy Analysis Working Paper 2000-9, Sep. 2000 (60 pgs).

Garry, M., "Checking Options: Retailers face an evolving landscape for electronic check processing that will require them to choose among several scenarios,"Supermarket News, vol. 53, No. 49, 2005 (3 pgs).

German Shegalov, Diplom-Informatiker, "Integrated Data, Message, and Process Recovery for Failure Masking in Web Services", Dissertation Jul. 2005 (146 pgs).

Gupta, Amar et al., "An Integrated Architecture for Recognition of Totally Unconstrained Handwritten Numerals", WP#3765, Jan. 1993, Productivity from Information Technology "Profit" Research Initiative Sloan School of Management (20 pgs).

Gupta, Maya R. et al., "OCR binarization and image pre-processing for searching historical documents," Pattern Recognition, vol. 40, No. 2, Feb. 2007, pp. 389-397.

Hale, J., "Picture this: Check 21 uses digital technology to speed check processing and shorten lag time," Columbus Business First, http://columbus.bizjournals.com/columbus/stories/2005/03/14focus1.html, downloaded 2007 (3 pgs).

Hartly, Thomas, "Banks Check Out New Image", Business First, Buffalo: Jul. 19, 2004, vol. 20, Issue 43, (3 pgs).

Heckenberg, D. "Using Mac OS X for Real-Time Image Processing" Oct. 8, 2003 (15 pgs).

Hildebrand, C. et al., "Electronic Money," Oracle, http://www.oracle.com/oramag/profit/05-feb/p15financial.html, 2005, downloaded Oct. 18, 2006 (5 pgs).

Hillebrand, G., "Questions and Answers About the Check Clearing for the 21st Century Act, 'Check 21," ConsumersUnion.org, http://www.consumersunion.org/finance/ckclear1002.htm, Jul. 27, 2004, downloaded Oct. 18, 2006 (6 pgs).

Iida, Jeanne, "The Back Office: Systems—Image Processing Rolls on as Banks ReapBenefits," American Banker, Jul. 19, 1993, printed from the internet at <http://search.proquest.com/docview/292903245/14138420743684F7722/14?acc ountid=14 . . . >, on Oct. 19, 2013 (3 pgs).

Image Master, "Photo Restoration: We specialize in digital photo restoration and photograph repair of family pictures", http://www.imphotorepair.com, Patent No. 7,900,822, as downloaded Apr. 2007 (1 pg).

Investment Systems Company, "Portfolio Accounting System," 2000, pp. 1-32.

JBC, "What is a MICR Line?," eHow.com, retrieved from http://www.ehow.com/about_4684793_what-micr-line.html on May 4, 2009 (2 pgs).

Johnson, Jennifer J., Secretary of the Board; Federal Reserve System, 12 CFR Part 229, Regulation CC, "Availability of Funds and Collection of Checks". Patent No. 7,900,822, as dated 2009, (89 pgs).

Kendrick, Kevin B., "Check Kiting, Float for Purposes of Profit," Bank Security & Fraud Prevention, vol. 1, No. 2, 1994 (3 pgs).

Kiser, Elizabeth K.; "Modeling the Whole Firm: The Effect of Multiple Inputs and Financial Intermediation on Bank Deposit Rates;" Feds Working Paper No. 2004-07; Jun. 3, 2003; pp. 1-46 (46 pgs).

Knestout, Brian P. et al., "Banking Made Easy" Kiplinger's Personal Finance Washington, Jul. 2003, vol. 57, Iss 7 (5 pgs).

Kornai Andras et al., "Recognition of Cursive Writing on Personal Checks", Proceedings of International Workshop on the Frontiers in Handwriting Recognition, Patent No. 7,900,822, as dated Sep. 1996, (6 pgs).

Levitin, Adam J., Remote Deposit Capture: A Legal and Transactional Overview, Banking Law Journal, p. 115, 2009 (RDC).

Masonson, L., "Check Truncation and ACH Trends—Automated Clearing Houses", healthcare financial management associate, http://www.findarticles.com/p/articles/mLm3276/is_n7_v47/ai_14466034/print, 1993 (2 pgs).

Matthews, Deborah, "Advanced Technology Makes Remote Deposit Capture Less Risky," Indiana Bankers Association, Apr. 2008 (2 pgs).

Metro 1 Credit Union, "Remote Banking Services," hltp://ww\\i.metro1cu.org/metro1cu/remote.html, downloaded Apr. 17, 2007 (4 pgs).

Mitek systems, "Imagenet Mobile Deposit", San Diego, CA, downloaded 2009 (2 pgs).

Mitek Systems: Mitek Systems Launches First Mobile Check Deposit and Bill Pay Application, San Diego, CA, Jan. 22, 2008 (3 pgs).

Mohl, Bruce, "Banks Reimbursing ATM Fee to Compete With Larger Rivals", Boston Globe, Boston, MA, Sep. 19, 2004 (3 pgs).

(56) References Cited

OTHER PUBLICATIONS

Moreau, T., "Payment by Authenticated Facsimile Transmission: a Check Replacement Technology for Small and Medium Enterprises," CONNOTECH Experts-conseils, Inc., Apr. 1995 (31 pgs).
Nelson, B. et al., "Remote deposit capture changes the retail landscape," Northwestern Financial Review, http://findarticles.com/p/articles/mi qa3799/is 200607/ai_n16537250, 2006 (3 pgs).
NetBank, Inc., "Branch Out: Annual Report 2004," 2004 (150 pgs).
NetBank, Inc., "Quick Post: Deposit and Payment Forwarding Service," 2005 (1 pg).
NetDeposit Awarded Two Patents for Electronic Check Process, NetDeposit, Jun. 18, 2007, (1 pg).
Nixon, Julie et al., "Fiserv Research Finds Banks are Interested in Offering Mobile Deposit Capture as an," Fiserv, Inc. Brookfield, Wis., (Business Wire), (Feb. 20, 2009), 2 pgs.
Online Deposit: Frequently Asked Questions, http://www.depositnow.com/faq.html, Copyright 2008 (1 pg).
Onlinecheck.com/Merchant Advisors, "Real-Time Check Debit", Merchant Advisors: Retail Check Processing Check Conversion, http://www.onlinecheck/wach/rcareal.htm, Patent No. 7,900,822, as dated 2006 (3 pgs).
Oxley, Michael G., from committee on Financial Services; "Check Clearing for the 21$^{st}$ Century Act", 108$^{th}$ Congress, 1$^{st}$ Session House of Representatives report 108-132, Jun. 2003 (20 pgs).
Oxley, Michael G., from the committee of conference; "Check Clearing for the 21$^{st}$ Century Act" 108$^{th}$ Congress, 1$^{st}$ Session Senate report 108-291, Oct. 1, 2003 (27 pgs).
Palacios, Rafael et al., "Automatic Processing of Brazilian Bank Checks". Patent No. 7,900,822, as dated 2002 (28 pgs).
Patterson, Scott "USAA Deposit@Home—Another WOW moment for Net Banking", NextCU.com, Jan. 26, 2007 (5 pgs).
Public Law 108-100, 108 Congress; "An Act Check Clearing for the 21$^{st}$ Century Act", Oct. 28, 2003, 117 STAT. 1177 (18 pgs).
Rao, Bharat; "The Internet and the Revolution in Distribution: A Cross-Industry Examination"; Technology in Society; 1999; pp. 287-306; vol. 21, No. 3 (20 pgs).
Remotedepositcapture, URL:www.remotedepositcapture.com, Patent No. 7,900,822, as dated 2006 (5 pgs).
RemoteDepositCapture.com, "PNC Bank to Offer Ease of Online Deposit Service Integrated with QuickBooks to Small Businesses", Remote Deposit Capture News Articles from Jul. 24, 2006, (2 pgs).
RemoteDepositCapture.com, Remote Deposit Capture News Articles from Jul. 6, 2006, "BankSery Announces New Remote Deposit Product Integrated with QuickBooks" (3 pgs).
Remotedepsitcapture.com, LLC, "Remote Deposit Capture Overview," ROC Overview, http://remotedepositcapture.com/overview/RDC_overview.htm, Patent No. 7,900,822, as dated Mar. 12, 2007 (4 pgs).
Richey, J. C. et al., "EE 4530 Check Imaging," Nov. 18, 2008 (10 pgs).
Ritzer, J.R. "Hinky Dinky helped spearhead POS, remote banking movement", Bank Systems and Equipment, vol. 21, No. 12, Dec. 1984 (1 pg).
Rivlin, Alice M. et al., Chair, Vice Chair—Board of Governors, Committee on the Federal Reserve in the Payments Mechanism—Federal Reserve System, "The Federal Reserve in the Payments Mechanism", Jan. 1998 (41 pgs).
Rose, Sarah et al., "Best of the We: The Top 50 Financial Websites", Money, New York, Dec. 1999, vol. 28, Iss. 12 (8 pgs).
Shelby, Hon. Richard C. (Committee on Banking, Housing and Urban Affairs); "Check Truncation Act of 2003", calendar No. 168, 108$^{th}$ Congress, 1$^{st}$ Session Senate report 108-79, Jun. 2003 (27 pgs).
SoyBank Anywhere, "Consumer Internet Banking Service Agreement," Dec. 6, 2004 (6 pgs).
Teixeira, D., "Comment: Time to Overhaul Deposit Processing Systems," American Banker, Dec. 10, 1998, vol. 163, No. 235, p. 15 (3 pgs).
Thailandguru.com: How and where to Pay Bills @ www.thailandguru.com/paying-bills.html, © 1999-2007 (2 pgs).
The Automated Clearinghouse, "Retail Payment Systems; Payment Instruments Clearing and Settlement: The Automated Clearinghouse (ACH)", www.ffiec.gov/ffiecinfobase/booklets/retailretail_02d.html, Patent No. 7,900,822, as dated Dec. 2005 (3 pgs).
The Green Sheet 2.0: Newswire, "CO-OP adds home deposit capabilities to suite of check imaging products", www.greensheet.com/newswire.php?newswire_id=8799, Mar. 5, 2008 (2 pgs).
Tygar, J.D., Atomicity in Electronic Commerce, in ACM Networker, 2:2, Apr./May 1998 (12 pgs).
Valentine, Lisa, "Remote Deposit Capture Hot Just Got Hotter," ABA Banking Journal, Mar. 2006, pp. 1-9.
Wade, Will, "Early Notes: Updating Consumers on Check 21" American Banker Aug. 10, 2004 (3 pgs).
Wallison, Peter J., "Wal-Mart Case Exposes Flaws in Banking-Commerce Split", American Banker, vol. 167. No. 8, Jan. 11, 2002 (3 pgs).
Wells Fargo 2005 News Releases, "The New Wells Fargo Electronic Deposit Services Break Through Banking Boundaries in the Age of Check 21", San Francisco Mar. 28, 2005, www.wellsfargo.com/press/3282005_check21Year=2005 (1 pg).
Wells Fargo Commercial, "Remote Deposit", www.wellsfargo.com/com/treasury mgmtlreceivables/electronic/remote deposit, Copyright 2008 (1 pg).
White, J.M. et al., "Image Thresholding for Optical Character Recognition and Other Applications Requiring Character Image Extraction", IBM J. Res. Development, Jul. 1983, vol. 27, No. 4 (12 pgs).
Whitney et al., "Reserve Banks to Adopt DSTU X9.37-2003 Format for Check 21 Image Services", American Bankers Association, May 18, 2004, http://www.aba/com/NR/rdonlyres/CBDC1 A5C-43E3-43CC-B733-BE417C638618/35930/DSTUFormat.pdf (2 pages).
Wikipedia®, "Remote Deposit," http://en.wikipedia.org/wiki/Remote_deposit, 2007 (3 pgs).
Windowsfordevices.com, "Software lets camera phone users deposit checks, pay bills", www.windowsfordevices.com/news/NS3934956670.html, Jan. 29, 2008 (3 pgs).
Wolfe, Daniel, "Check Image Group Outlines Agenda," American Banker, New York, N.Y.: Feb. 13, 2009, vol. 174, Iss. 30, p. 12. (2 pgs).
Woody Baird Associated Press, "Pastor's Wife got Scammed—She Apparently Fell for Overseas Money Scheme," The Commercial Appeal, Jul. 1, 2006, p. A. 1.
Zhang, C.Y., "Robust Estimation and Image Combining" Astronomical Data Analysis Software and Systems IV, ASP Conference Series, 1995 (5 pgs).
Zions Bancorporation, "Moneytech, the technology of money in our world: Remote Deposit," http://www.bankjunior.com/pground/moneytech/remote_deposit.jsp, 2007 (2 pgs).
Application as filed on Aug. 19, 2010 for U.S. Appl. No. 12/859,741 (235 pgs).
Application as filed on Aug. 21, 2008 for U.S. Appl. No. 12/195,723 (38 pgs).
Application as filed on Aug. 21, 2009 for U.S. Appl. No. 12/545,127 (45 pgs).
Application as filed on Dec. 20, 2006 for U.S. Appl. No. 11/613,656 (21 pgs).
Application as filed on Dec. 30, 2010 for U.S. Appl. No. 12/982,494 (280 pgs).
Application as filed on Dec. 30, 2010 for U.S. Appl. No. 12/982,561 (275 pgs).
Application as filed on Dec. 30, 2010 for U.S. Appl. No. 12/982,578 (274 pgs).
Application as filed on Jun. 8, 2011 for U.S. Appl. No. 13/156,007 (356 pgs).
Application as filed on Mar. 15, 2007 for U.S. Appl. No. 11/686,924 (34 pgs).
Application as filed on Mar. 4, 2009 for U.S. Appl. No. 12/397,930 (37 pgs).
Application as filed on Oct. 23, 2007 for U.S. Appl. No. 11/877,335 (29 pgs).
Application as filed on Oct. 31, 2006 for U.S. Appl. No. 11/591,008 (27 pgs).
Application as filed on Oct. 31, 2006 for U.S. Appl. No. 11/591,273 (56 pgs).

(56) References Cited

OTHER PUBLICATIONS

Application as filed on Oct. 8, 2007 for U.S. Appl. No. 11/868,878 (30 pgs).
Application as filed on Sep. 28, 2007 for U.S. Appl. No. 11/864,569 (35 pgs).
Application as filed on Sep. 8, 2008 for U.S. Appl. No. 12/205,996 (30 pgs).
Claims as filed on Apr. 1, 2013 for U.S. Appl. No. 13/854,521 (5 pgs).
Claims as filed on Apr. 3, 2008 for U.S. Appl. No. 12/062,163 (3 pgs).
Claims as filed on Apr. 3, 2008 for U.S. Appl. No. 12/062,175 (3 pgs).
Claims as filed on Apr. 30, 2013 for U.S. Appl. No. 13/874,145 (5 pgs).
Claims as filed on Aug. 21, 2009 for U.S. Appl. No. 12/545,127 (5 pgs).
Claims as filed on Dec. 15, 2011 for U.S. Appl. No. 13/327,478 (4 pgs).
Claims as filed on Dec. 29, 2005 for U.S. Appl. No. 11/320,998 (3 pgs).
Claims as filed on Dec. 29, 2005 for U.S. Appl. No. 11/321,027 (3 pgs).
Claims as filed on Dec. 8, 2010 for U.S. Appl. No. 12/963,513 (7 pgs).
Claims as filed on Feb. 12, 2013 for U.S. Appl. No. 13/765,412 (1 pg).
Claims as filed on Feb. 15, 2012 for U.S. Appl. No. 13/397,437 (6 pgs).
Claims as filed on Feb. 16, 2011 for U.S. Appl. No. 13/028,477 (3 pgs).
Claims as filed on Jun. 20, 2013 for U.S. Appl. No. 13/922,686 (7 pgs).
Claims as filed on Mar. 15, 2007 for U.S. Appl. No. 11/686,925 (5 pgs).
Claims as filed on Oct. 23, 2007 for U.S. Appl. No. 11/877,382 (6 pgs).
Claims as filed on Sep. 14, 2012 for U.S. Appl. No. 13/619,026 (3 pgs).
Claims as filed on Sep. 8, 2008 for U.S. Appl. No. 12/206,001 (3 pgs).
Claims as filed on Sep. 8, 2008 for U.S. Appl. No. 12/206,007 (3 pgs).

\* cited by examiner

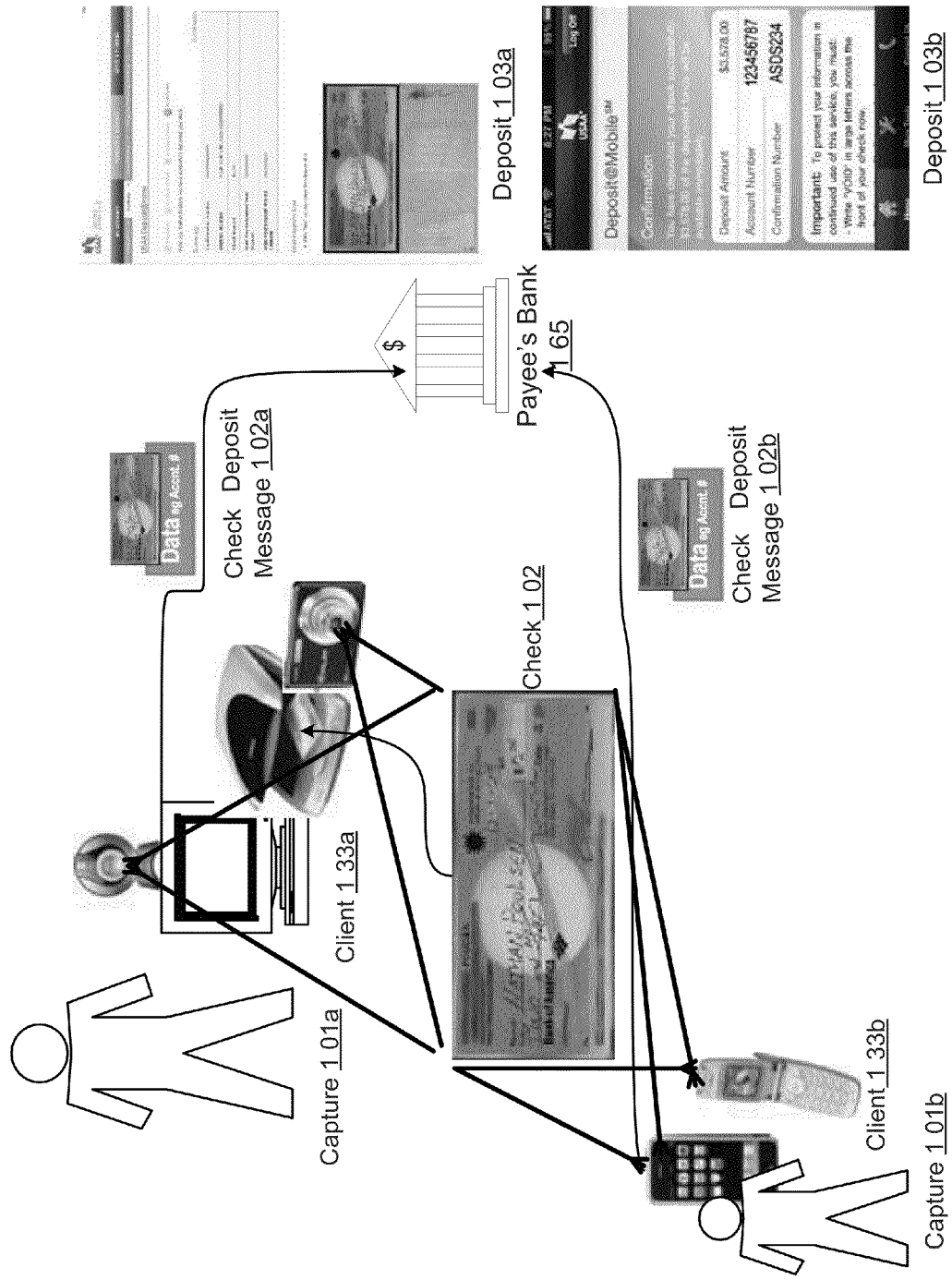

Example: Multiple Check Image Cropping

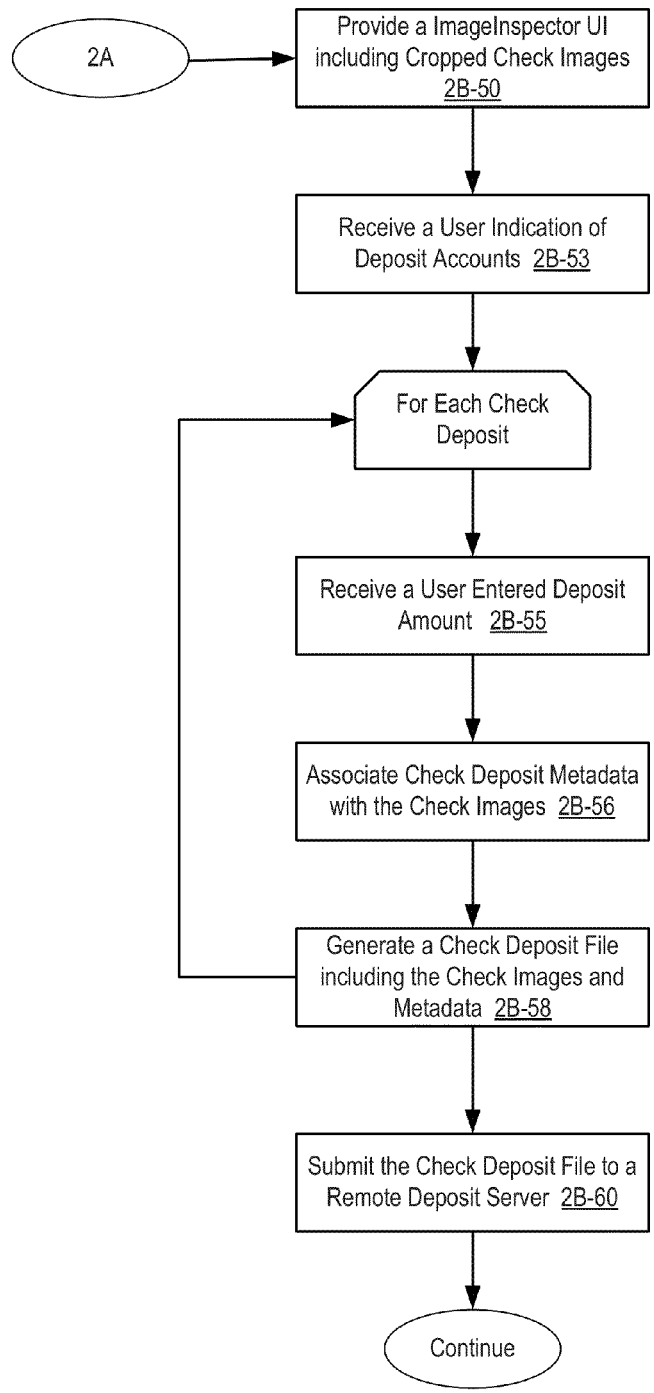

Example: Multiple Check Image Cropping

Example: Multiple Check Image Cropping

Example: Multiple Check Image Cropping

Example: Multiple Check Image Cropping

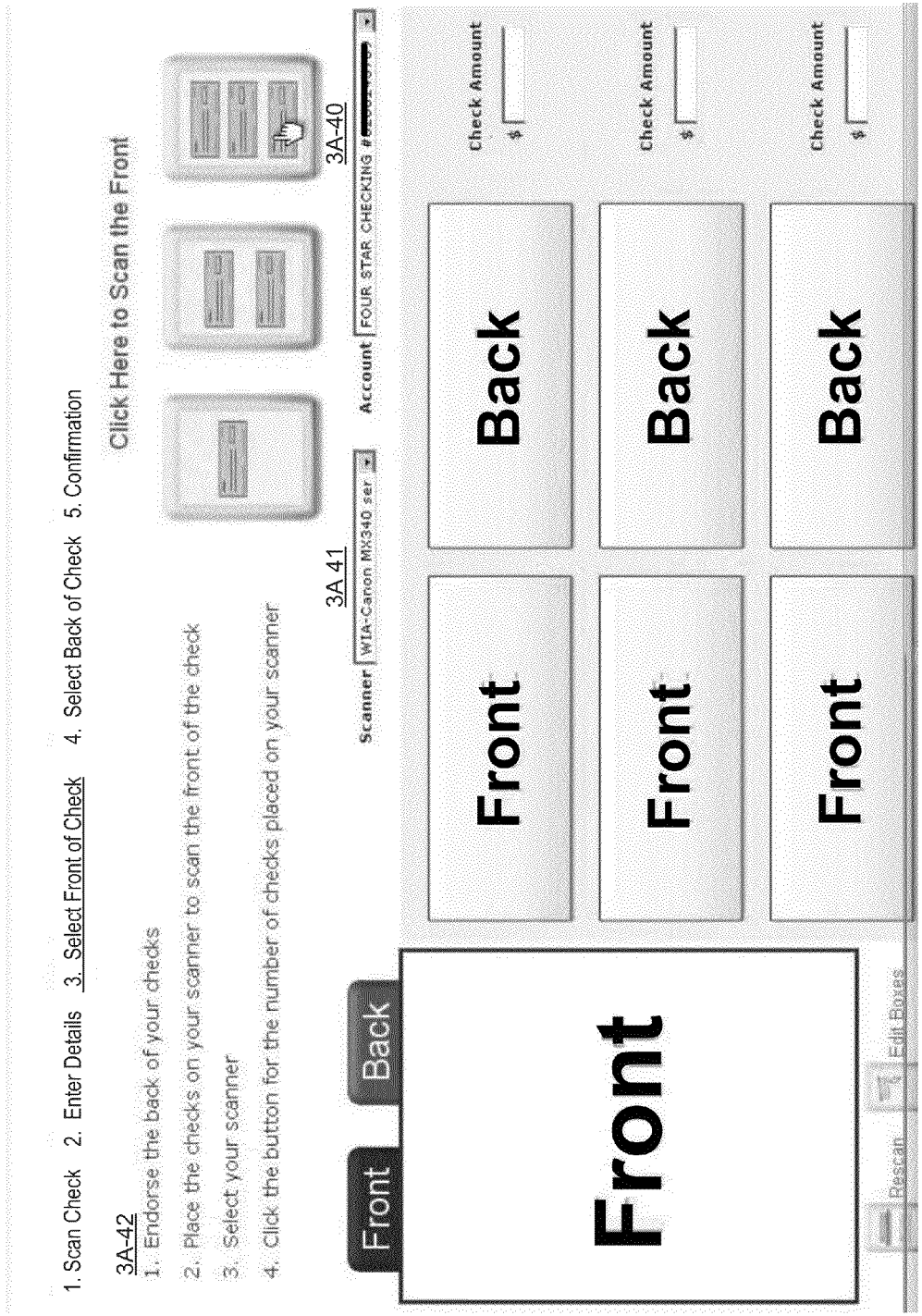

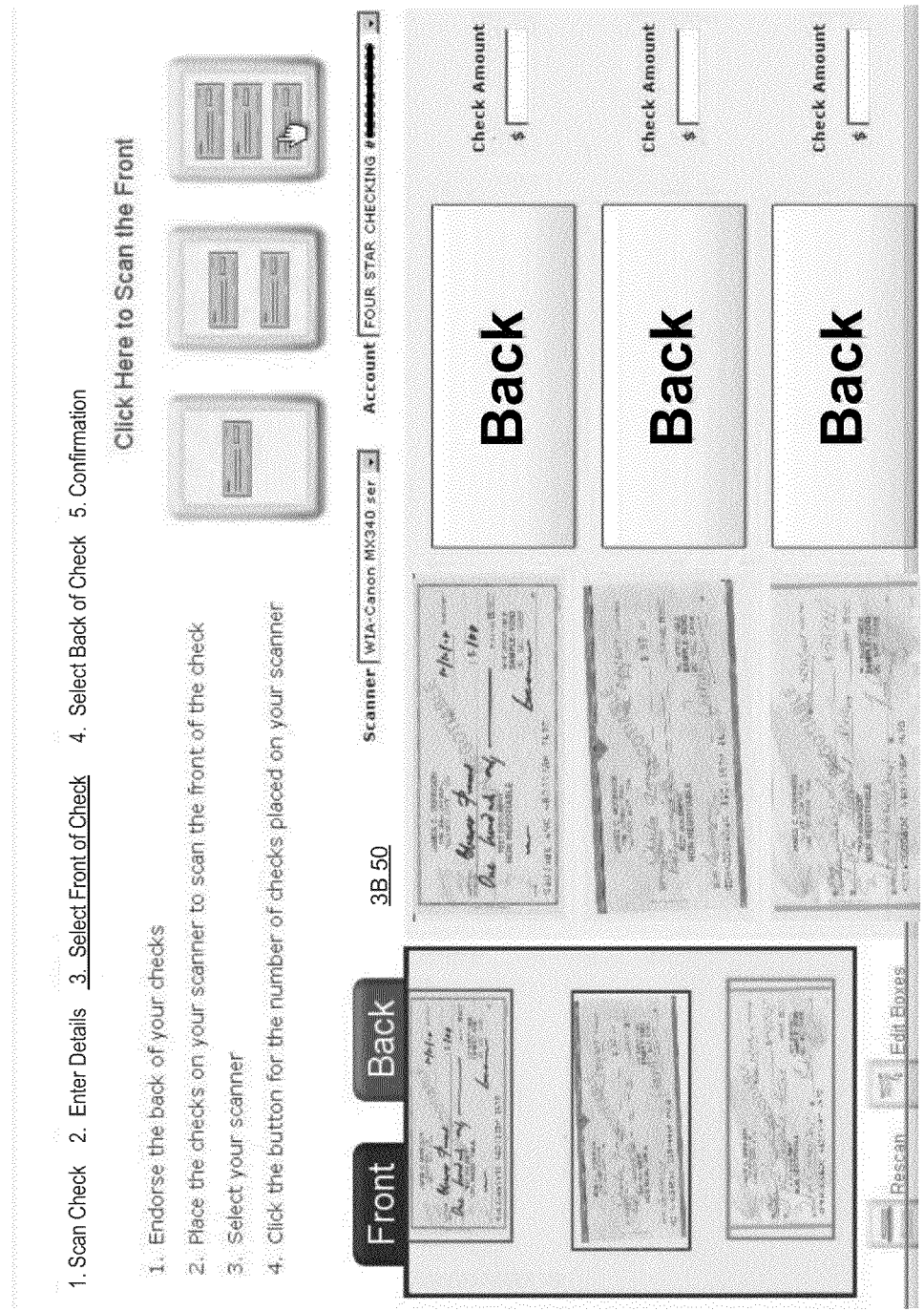

Example Screen Shots: Multiple Check Image Cropping

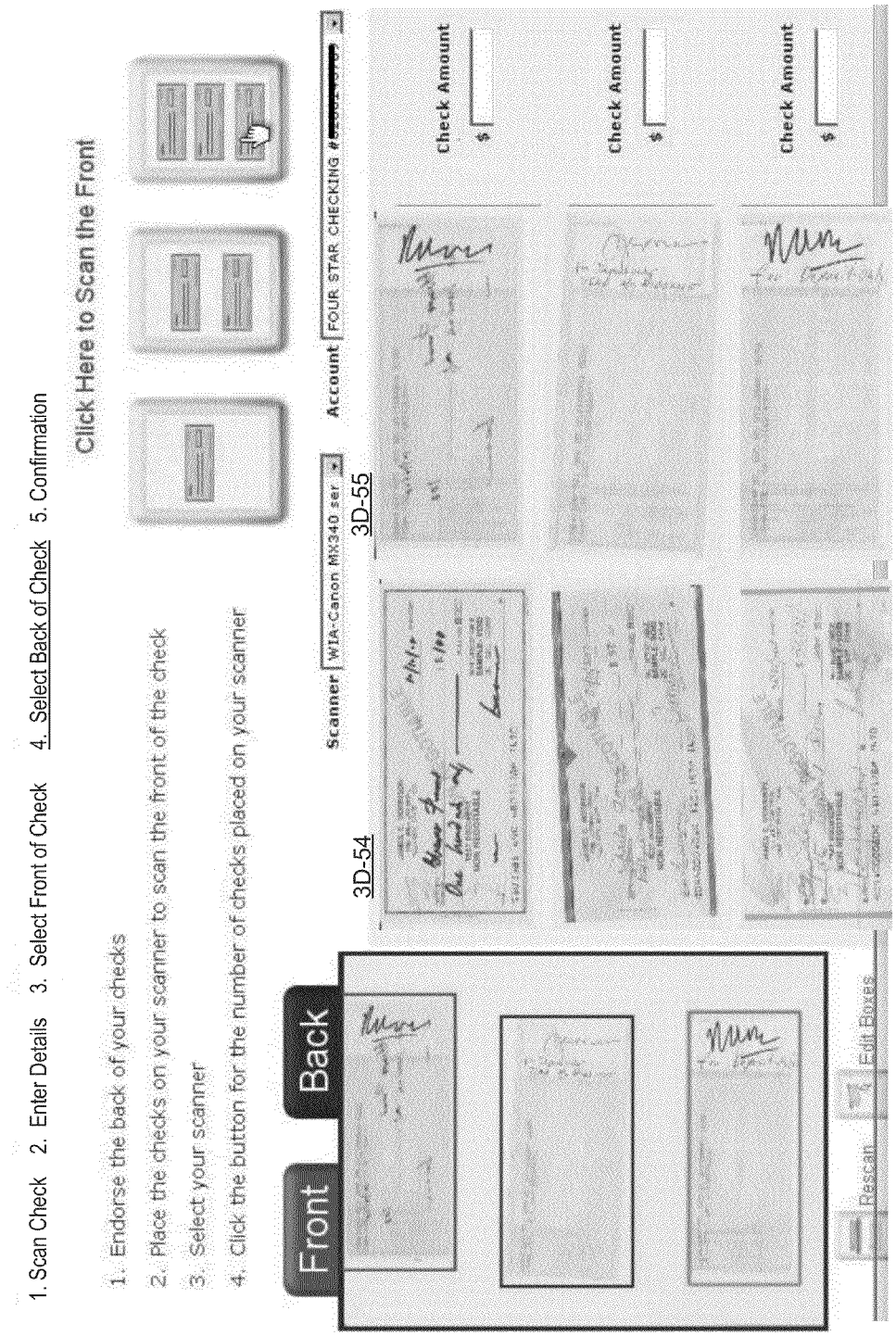

Example Screen Shots: Multiple Check Image Cropping

Example: Mobile Check Image Cropping

FIGURE 4B
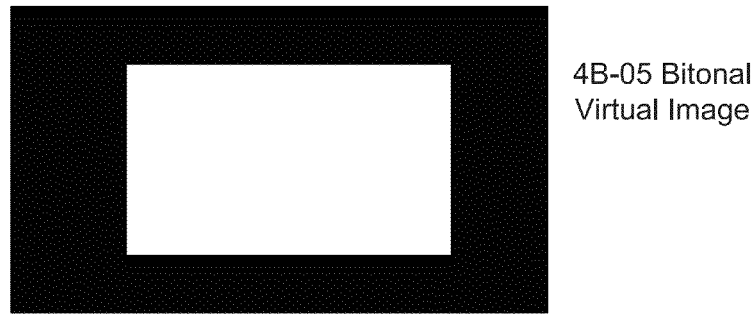
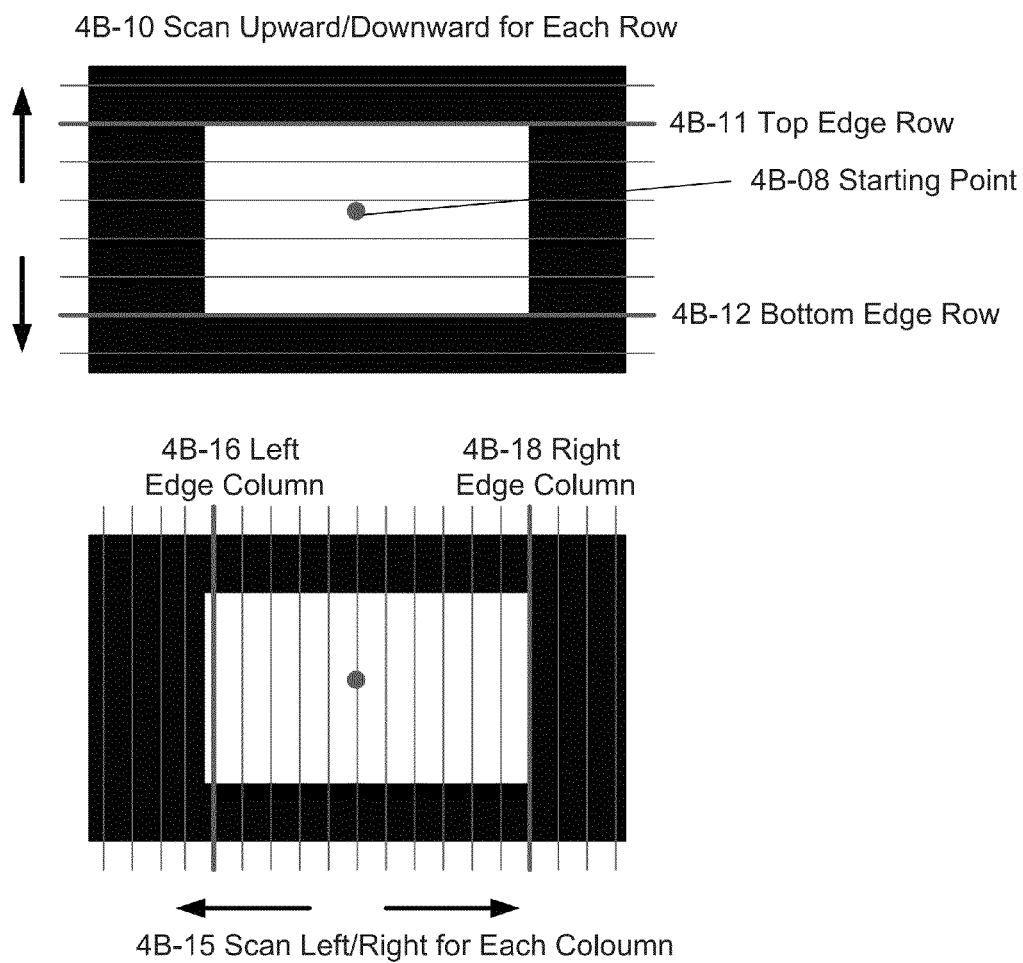
Example: Mobile Check Image Cropping

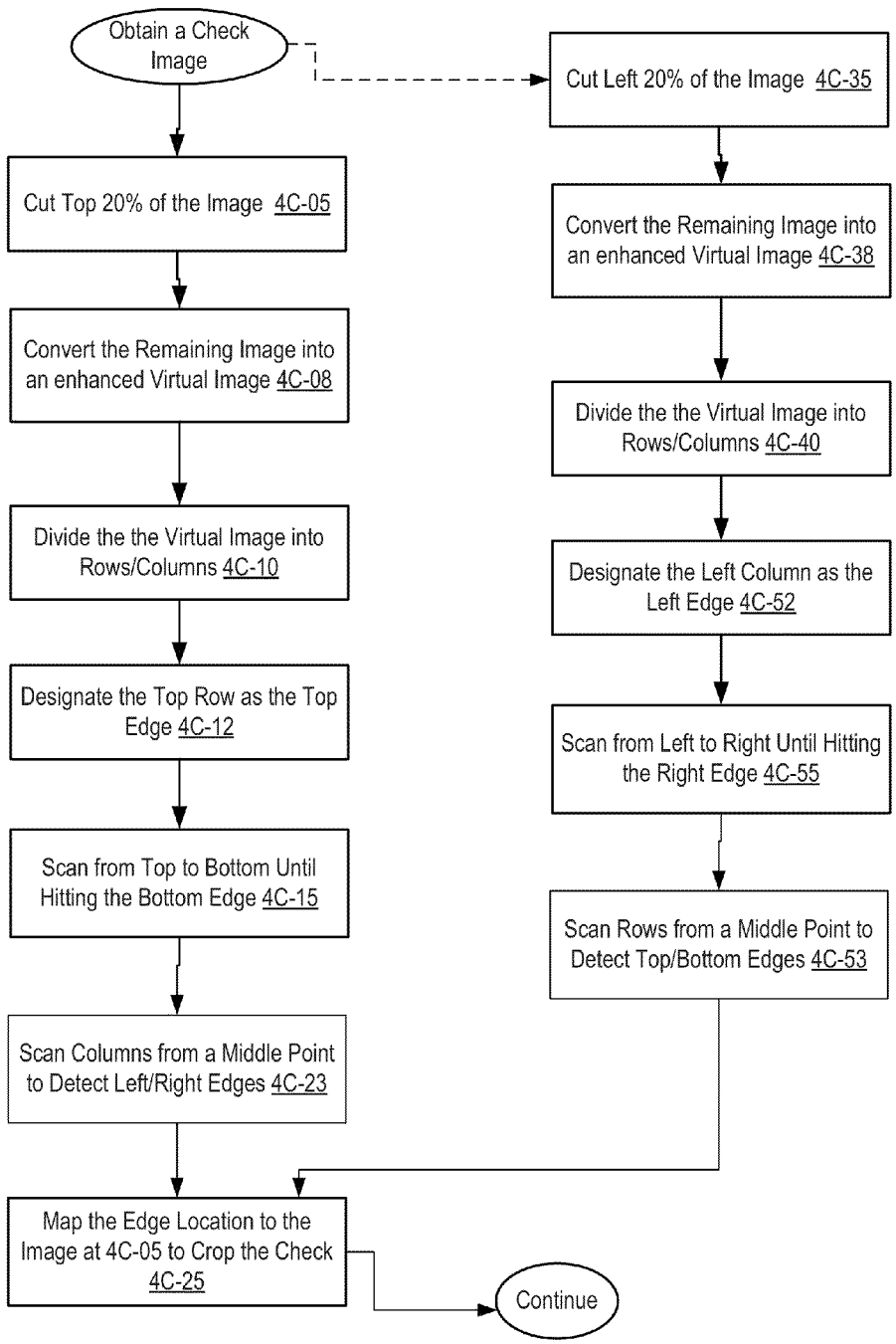
Example: Mobile Check Image Cropping

FIGURE 4D
4D-05 Cut Top 20% of Received Check Image
4D-06 Designate Top Edge
4D-08 Bottom Edge Detected
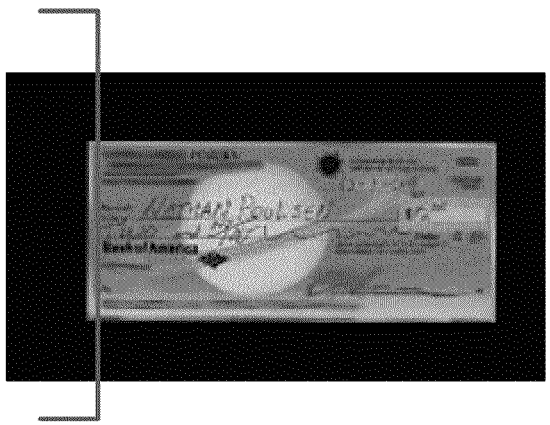
4D-15 Cut Left 20% of Received Check Image
4D-16 Designate Left Edge
4D-18 Right Edge Detected
Example: Mobile Check Image Cropping

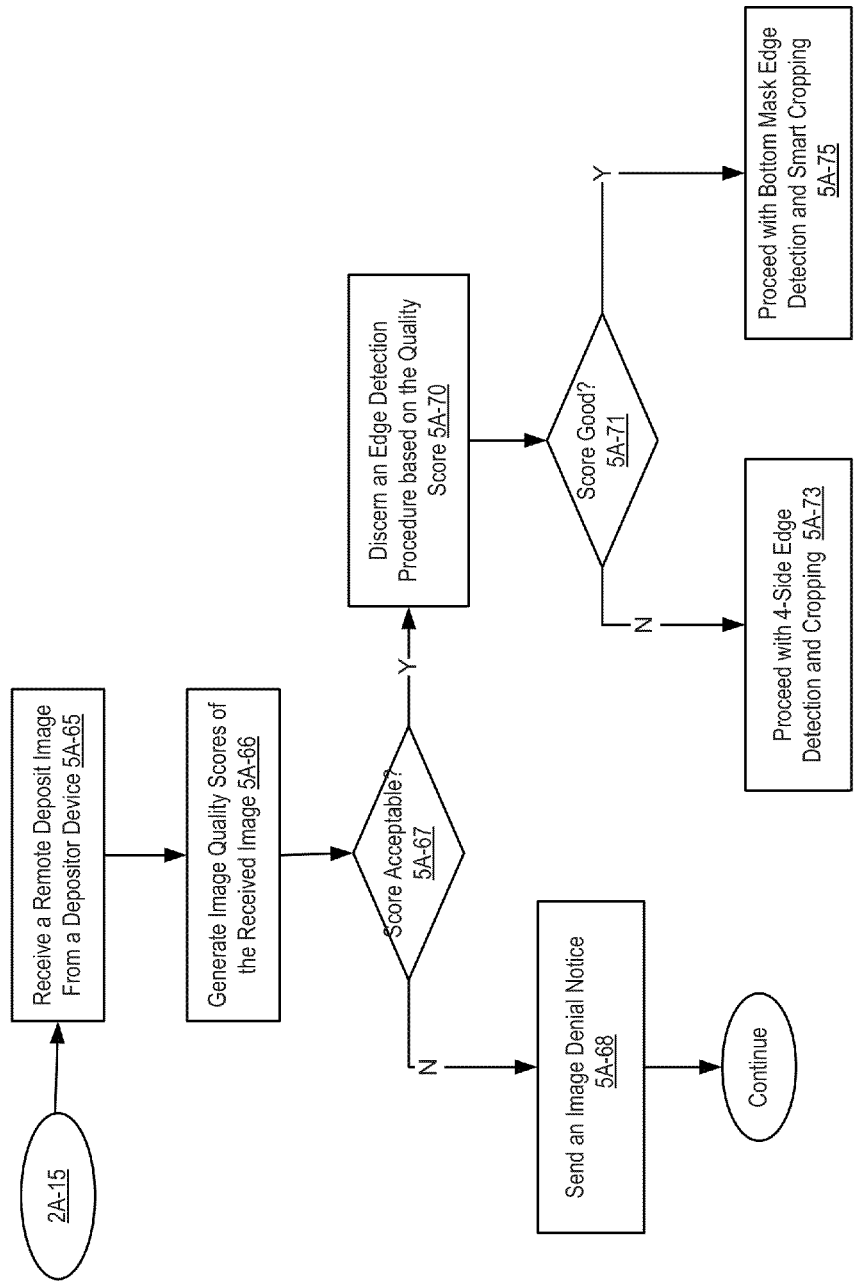

Example: Check Image Quality Assessment

Example: Check Image Quality Assessment

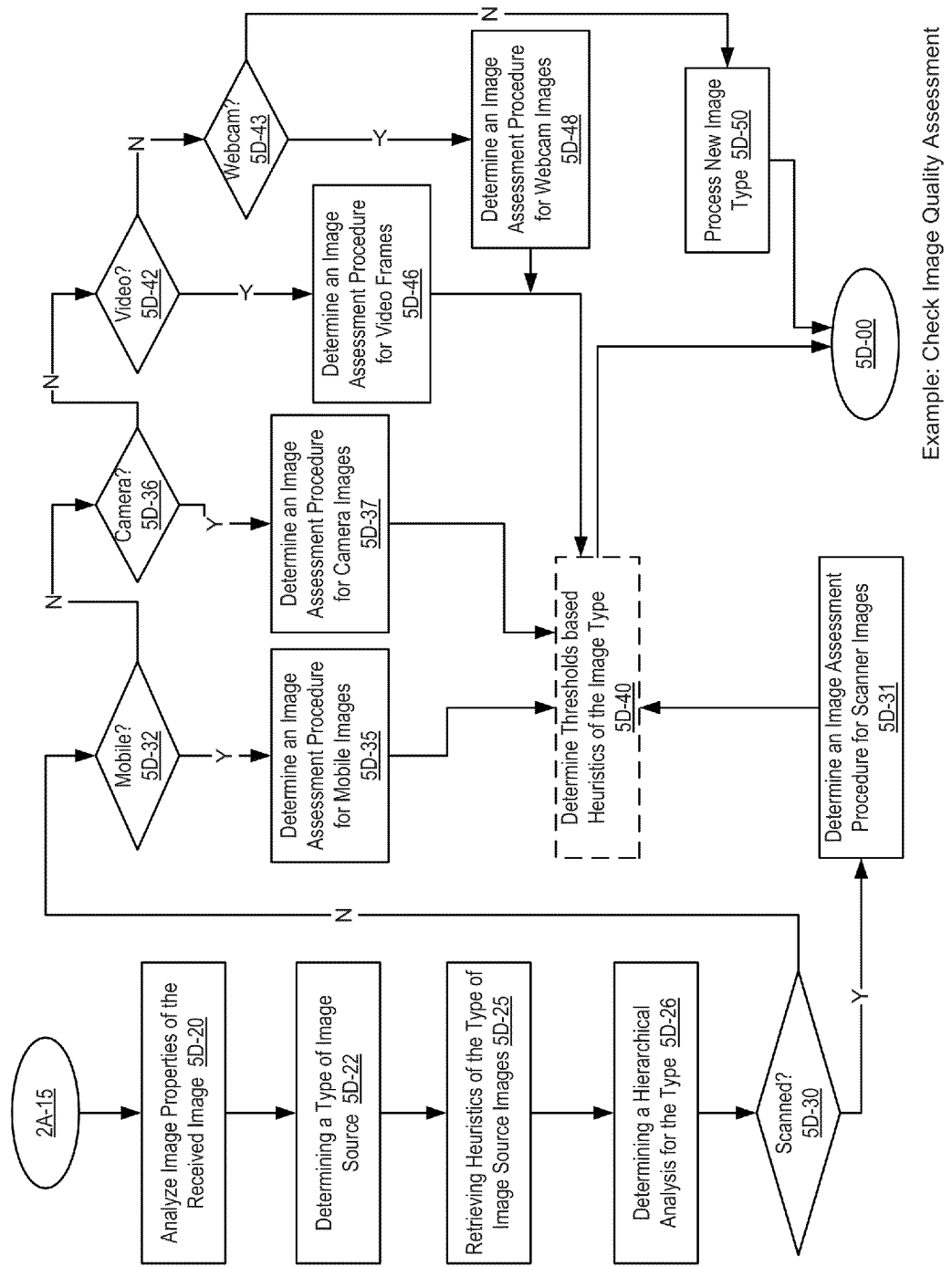

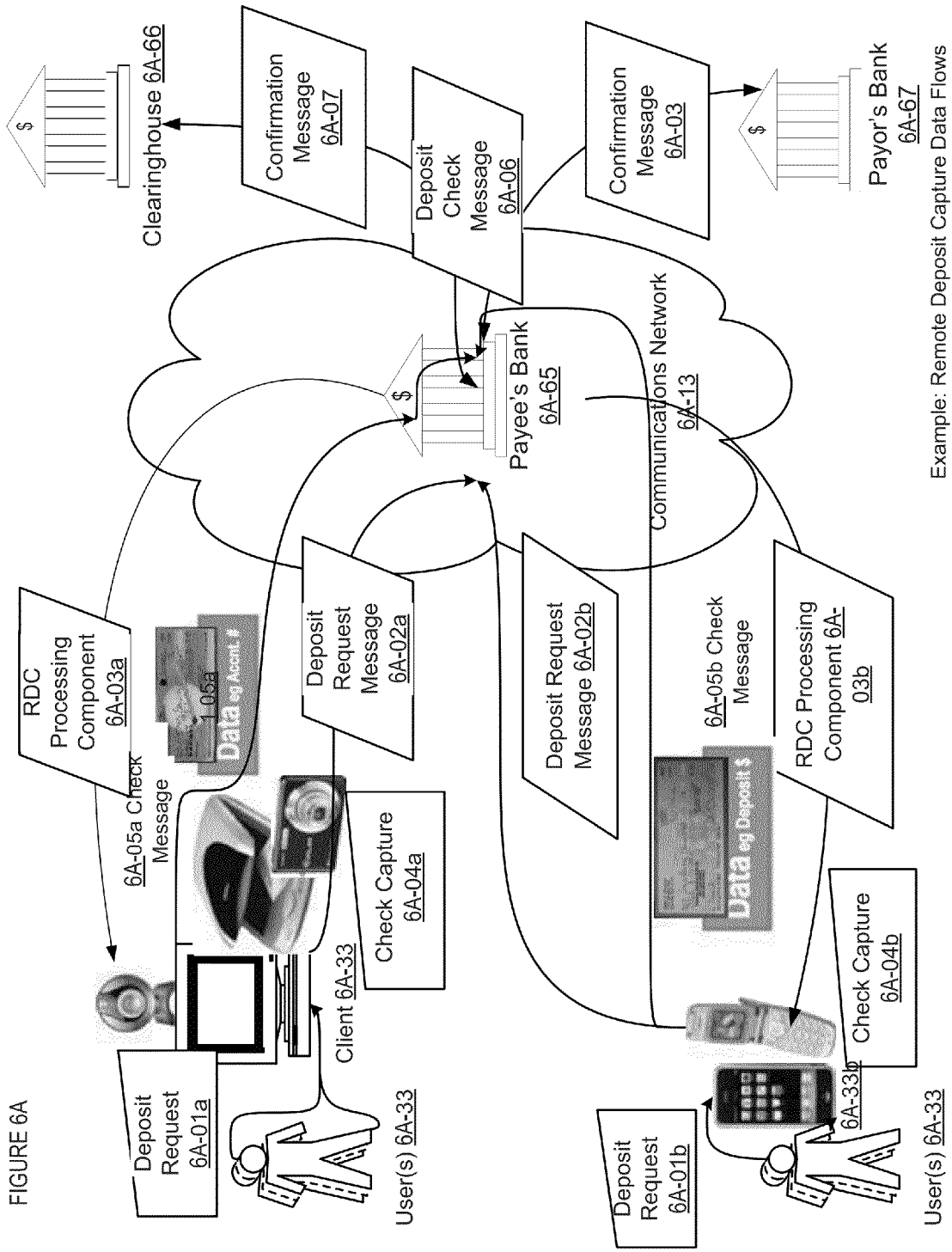

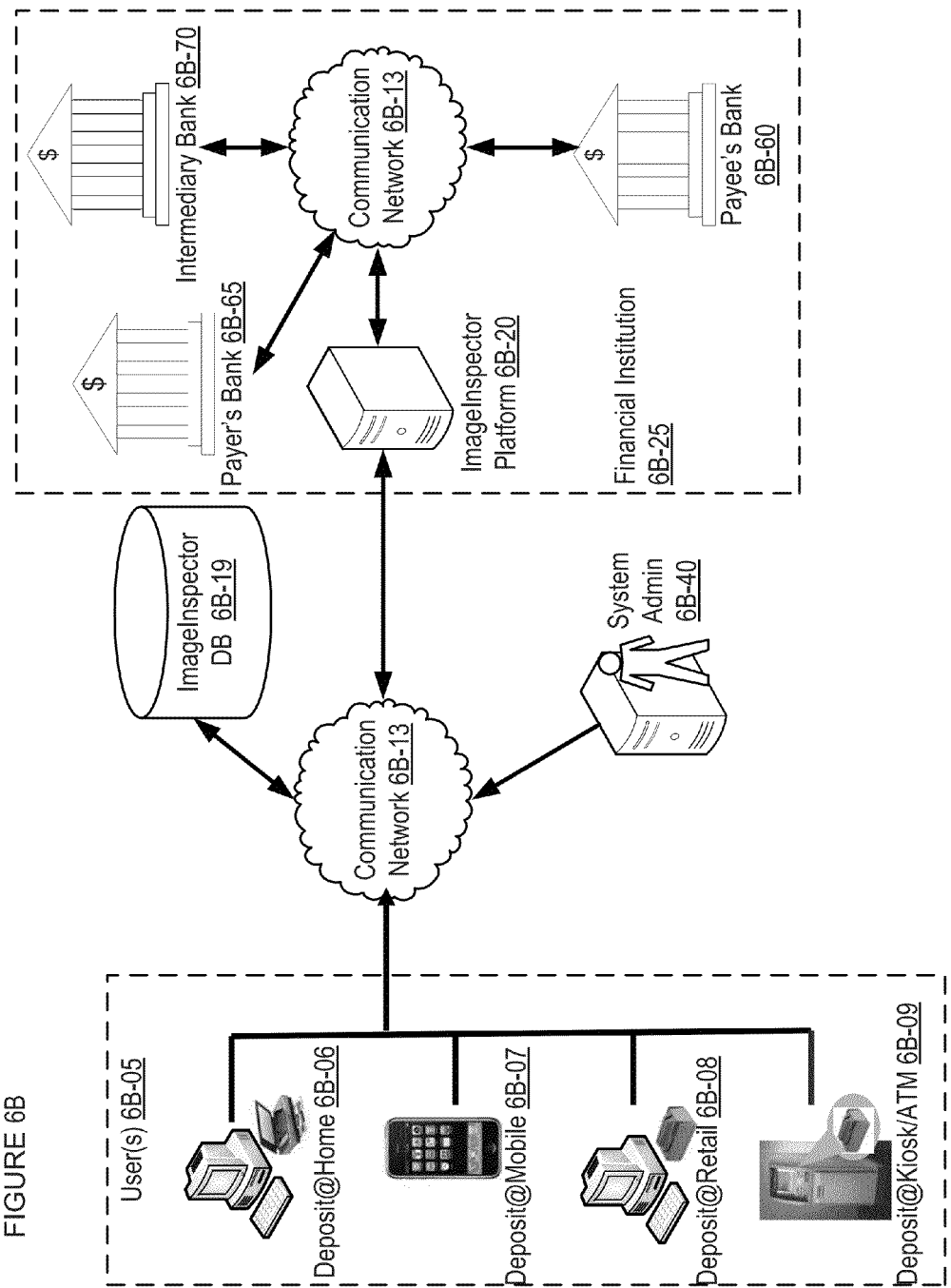
FIGURE 6B  Example: Remote Deposit Capture Data Flows

Example: Remote Deposit Capture Data Flows

Example: Remote Deposit Capture Infrastructure

Example: Remote Deposit Capture Infrastructure

Example: Remote Deposit Capture Infrastructure

Example: Remote Deposit Capture Logic Flow

Example: Remote Deposit Capture Logic Flow

Example: Remote Deposit Capture Logic Flow

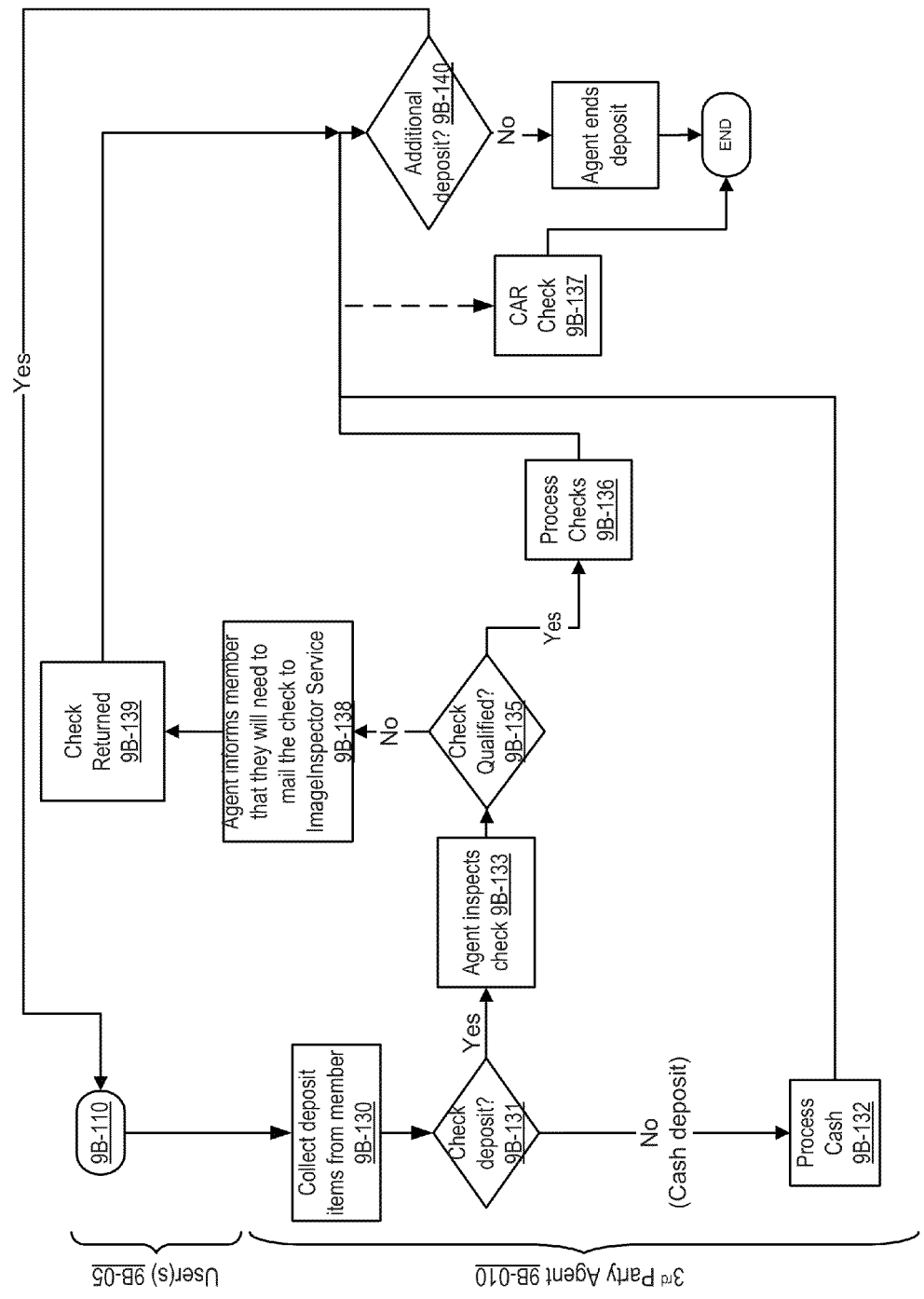

Example: Remote 3rd Party Deposit

Example: Remote 3rd Party Deposit

FIGURE 10A

Remote Deposit

Time: 10/03/2009 13:45:23
AMOUNT $15,000
Maximum Deposit Amount: $10,000

**Alert: *Maximum Deposit Amount exceeded!***

Remote Deposit Message Box

*To proceed, please select one of the following and click "continue".*

☐ Request to raise deposit limit (link to payee's bank) 10A-71

☐ Cancel the Deposit and Exit 10A-72

☑ Deposit $ 10,000 for next business day availability and send the deposit information to XXX bank for walk-in deposit service 10A-73

Example: Remote Deposit Capture Eligibility Check

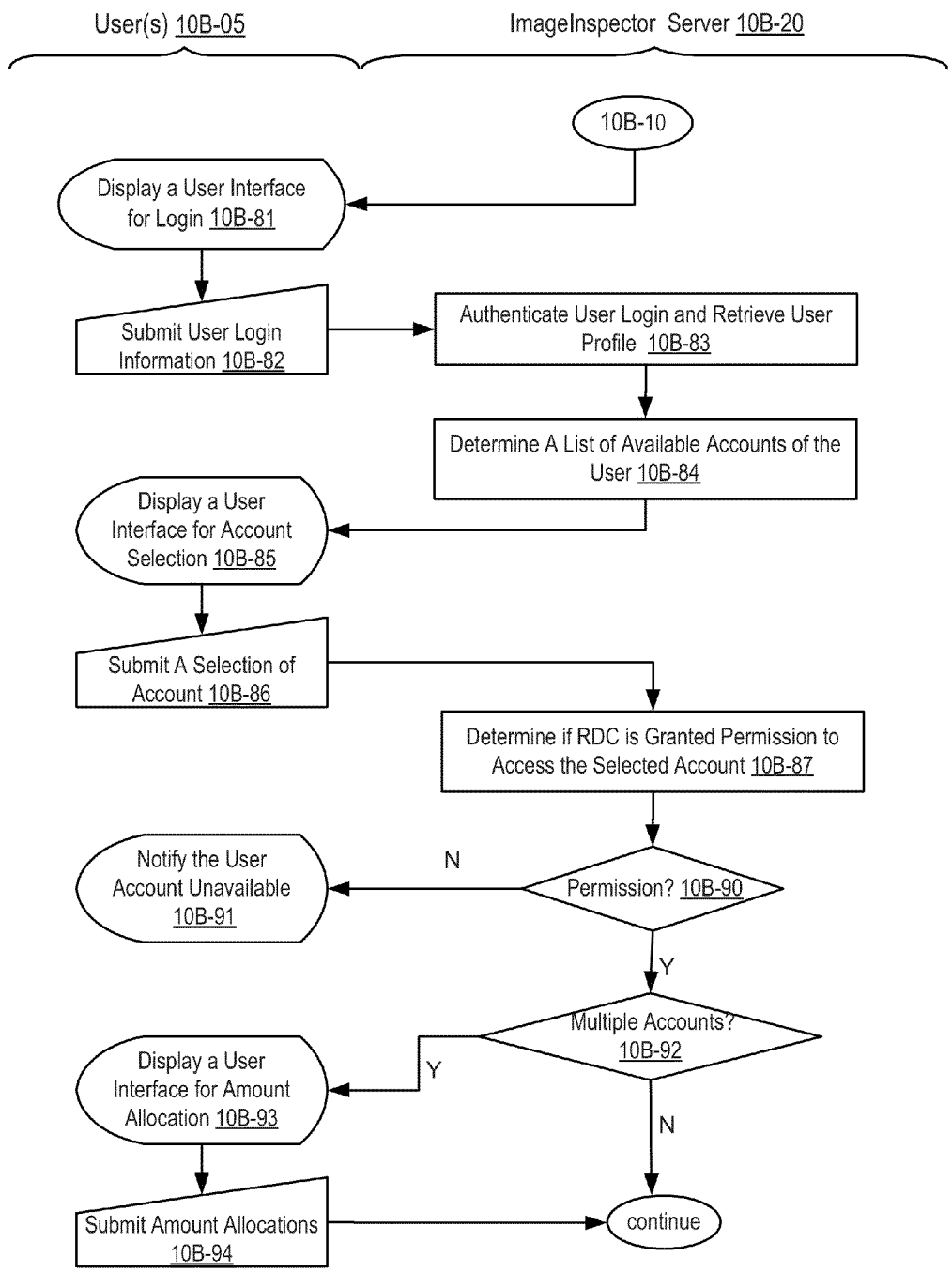
Example: Remote Deposit Capture Eligibility Check

FIGURE 10C

| | FINANCIAL INSTITUTION | |
|---|---|---|
| | | AMOUNT |
| CHECKING ACCOUNT | ✓ | _____ |
| SAVINGS ACCOUNT | ☐ | _____ |
| INVESTMENT ACCOUNT | ✓ | |

Example: Remote Deposit Capture Eligibility Check

Example: Remote Deposit Capture Image Submission

Example: Remote Deposit Capture Image Submission

Example: Remote Deposit Capture Image Submission

Example: Video Remote Deposit Capture

Example: Remote Deposit Capture Image Processing

Example: Remote Deposit Capture Image Processing

Example: Remote Deposit Capture Image Processing

Example: Remote Deposit Capture Image Processing

Example: Remote Deposit Capture Image Processing

Example: Remote Deposit Capture Image Processing

Example: Remote Deposit Capture Image Processing

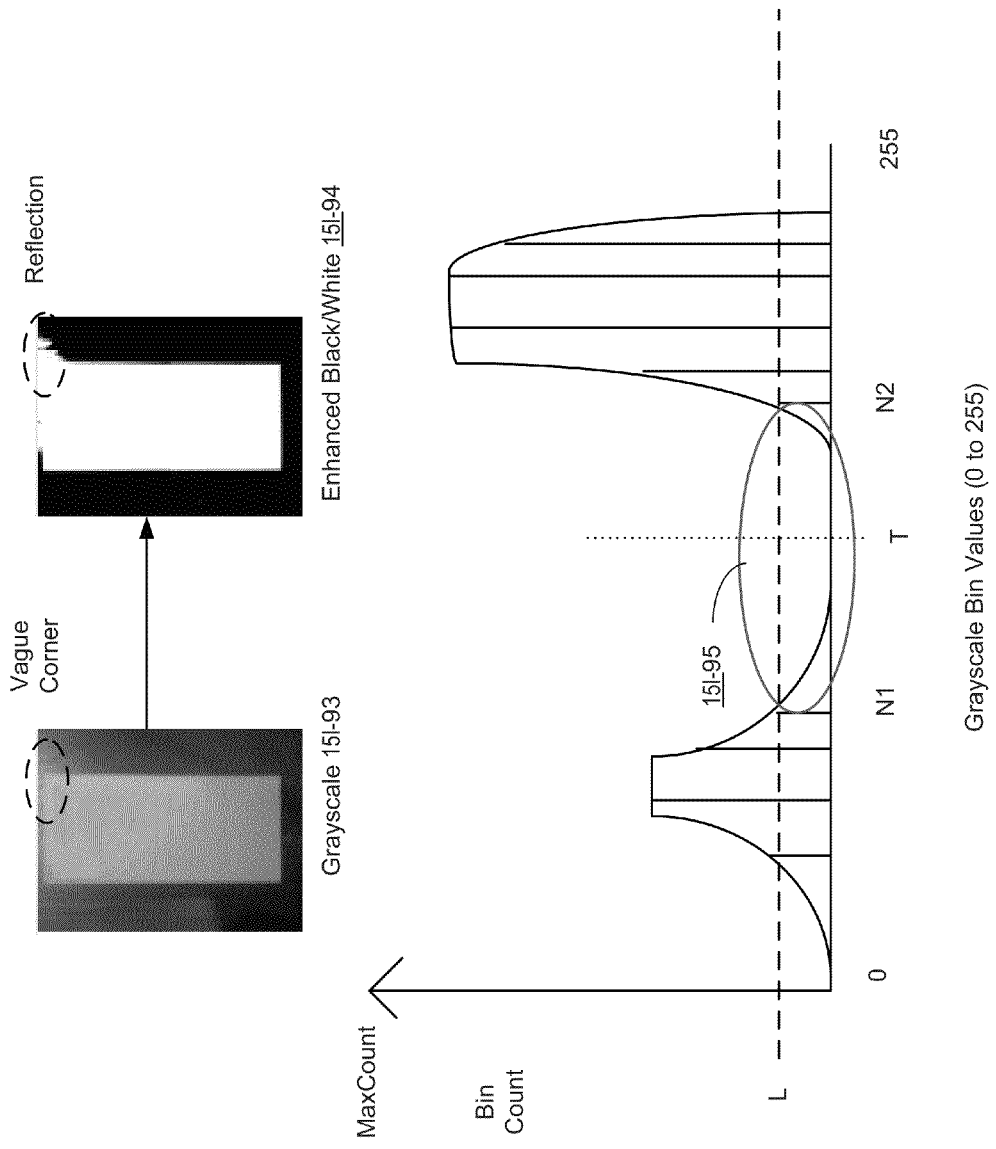

FIGURE 16A
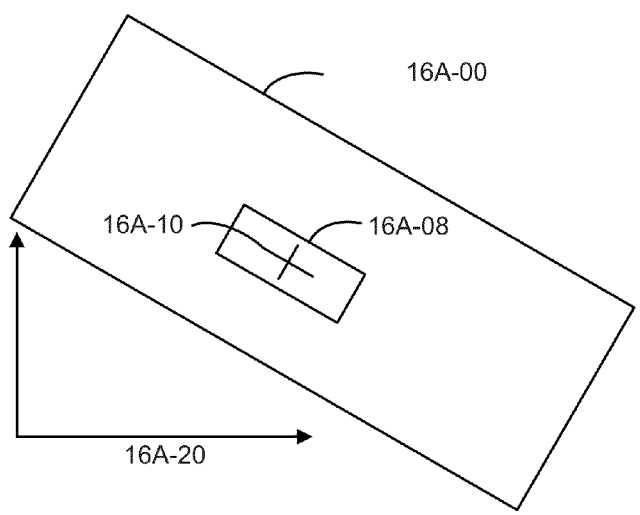
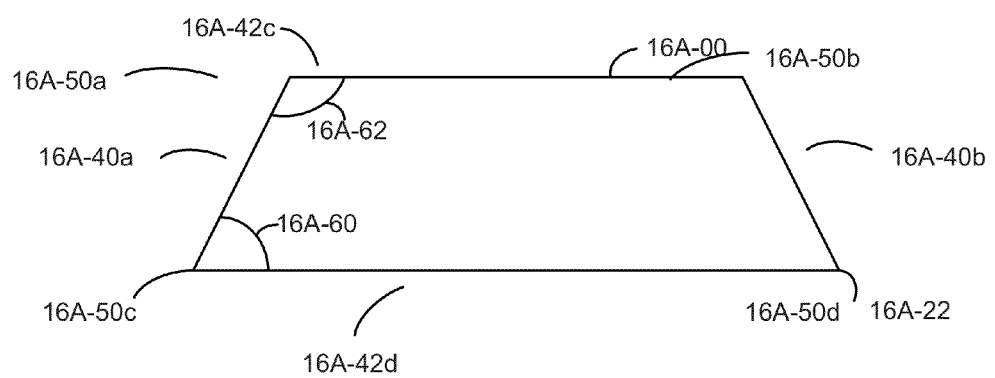
Example: Remote Deposit Capture Image Processing Example: Remote Deposit Capture Image Processing

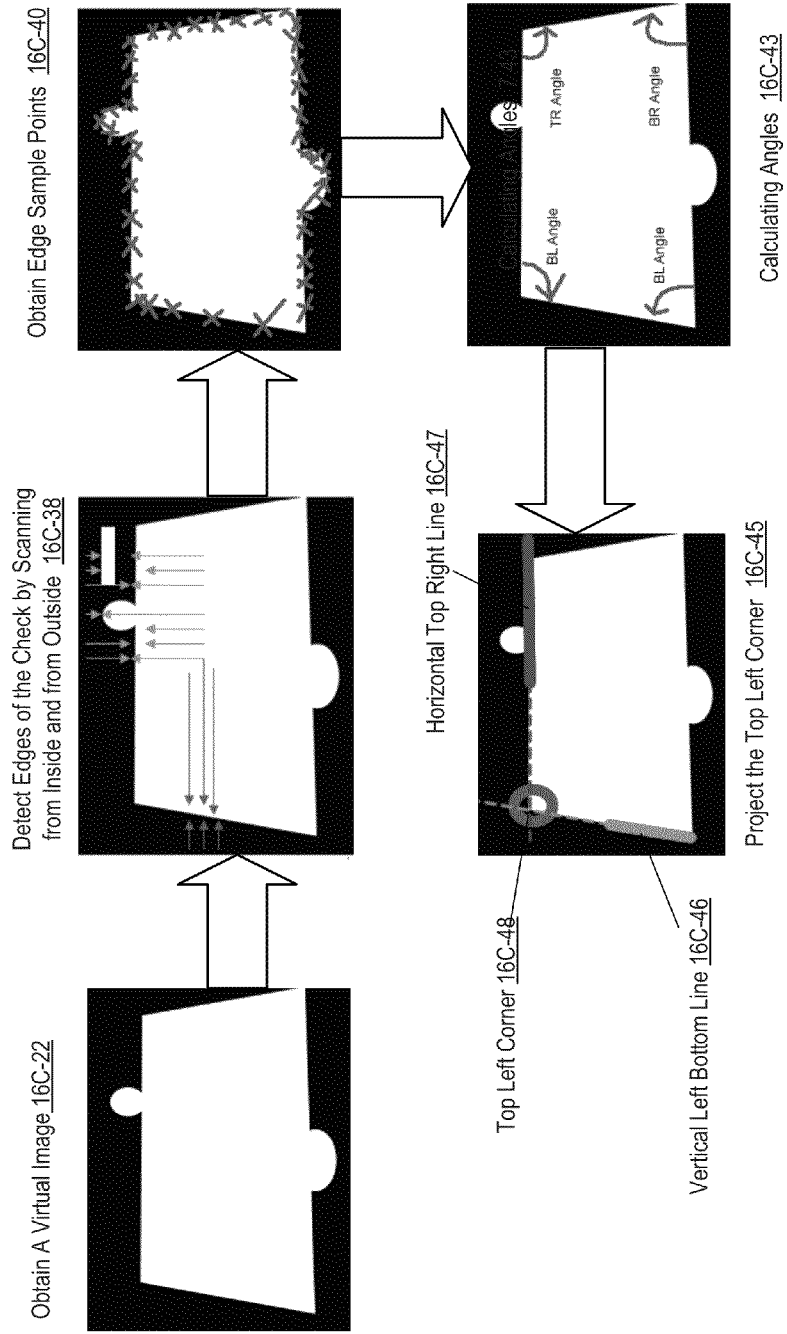

Example: Remote Deposit Capture
Check Representment Detection

Example: Remote Deposit Capture Check Representment Detection

Example: Remote Deposit Capture
Check Representment Detection

Example: Remote Deposit Capture
Check Representment Detection

Example: Remote Deposit Capture
Check Representment Detection

Example: Remote Deposit Capture Check Voidar

Example: Remote Deposit Capture Check Voidance

Example Screen Shots: Remote Deposit Capture@Mobile

Example Screen Shots: Remote Deposit Capture@Mobile

Example Screen Shots: Remote Deposit Capture@Mobile

Example Screen Shots: Remote Deposit Capture@Mobile
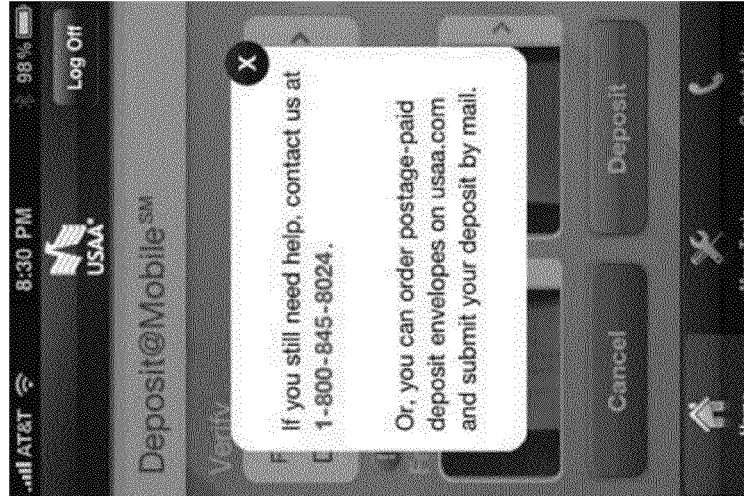
20 48
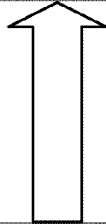
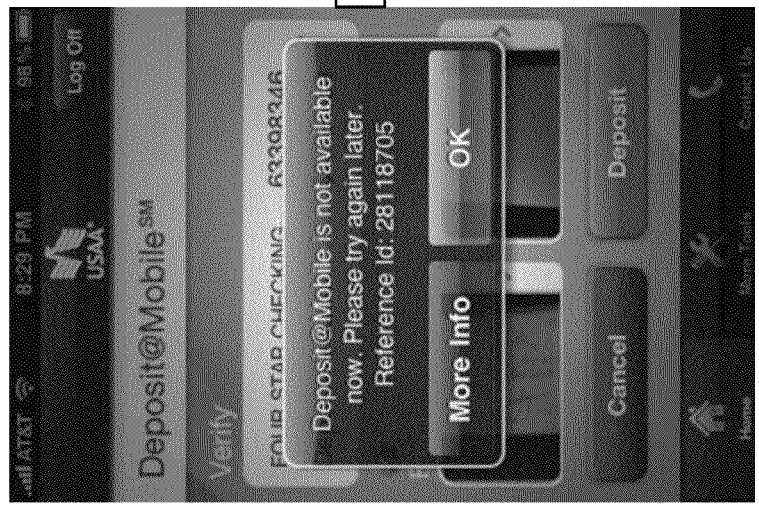
20 45
FIGURE 20G Example Screen Shots: Remote Deposit Capture@Home

1201

Example Screen Shots: Remote Deposit Capture@Home

Example Screen Shots: Remote Deposit Capture@Home

2105

USAA Deposit@Home

1. Enter Details
2. Scan Front of a Check
3. Scan Back of a Check
4. Confirmation Please scan one check at a time.

Deposit Account: FOUR STAR CHECKING #

Check Amount: $ 2

The total amount for all deposits cannot exceed your $5,000 daily limit.

Previous | Cancel | NEXT

Example Screen Shots: Remote Deposit Capture@Home

2108

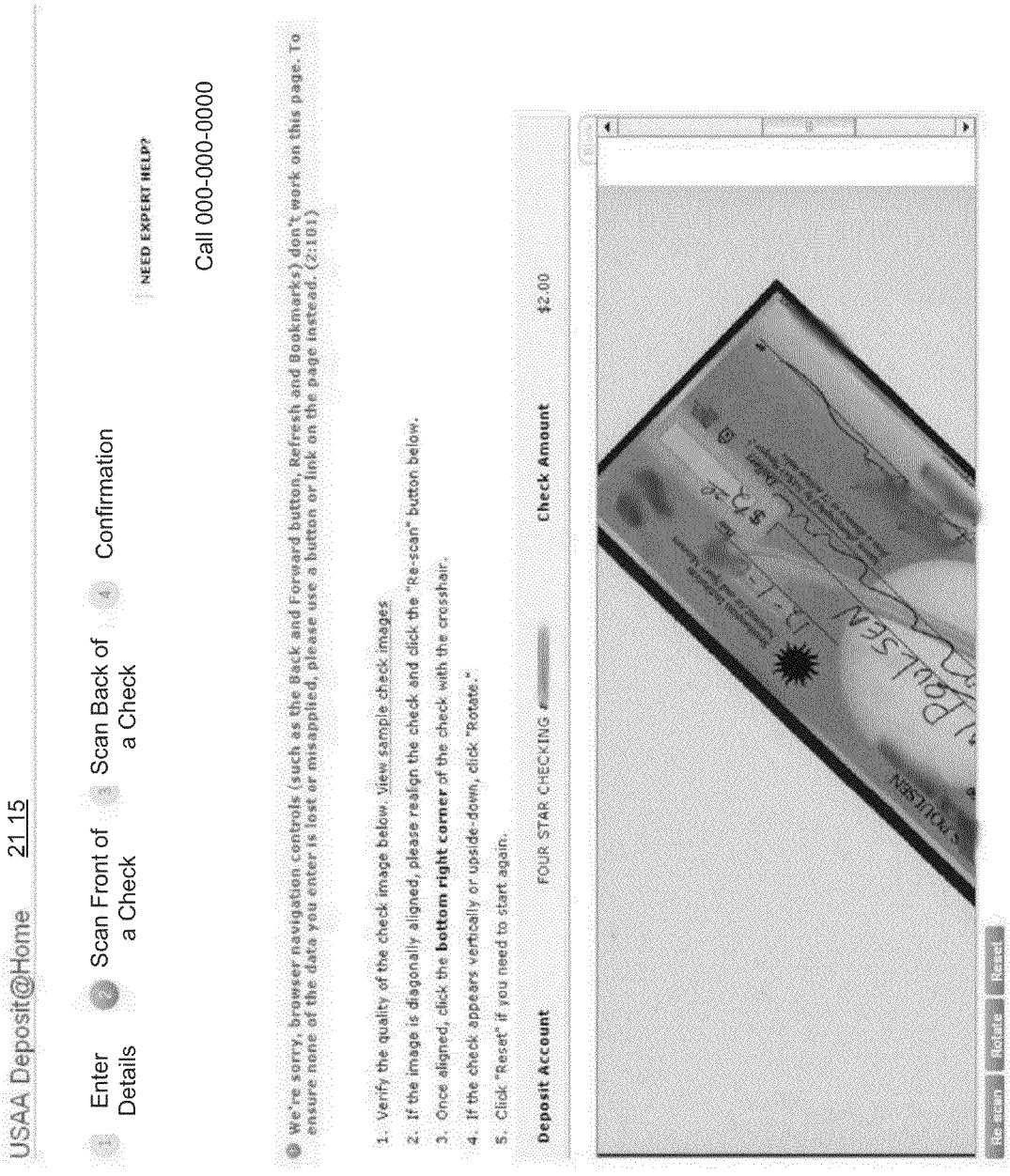

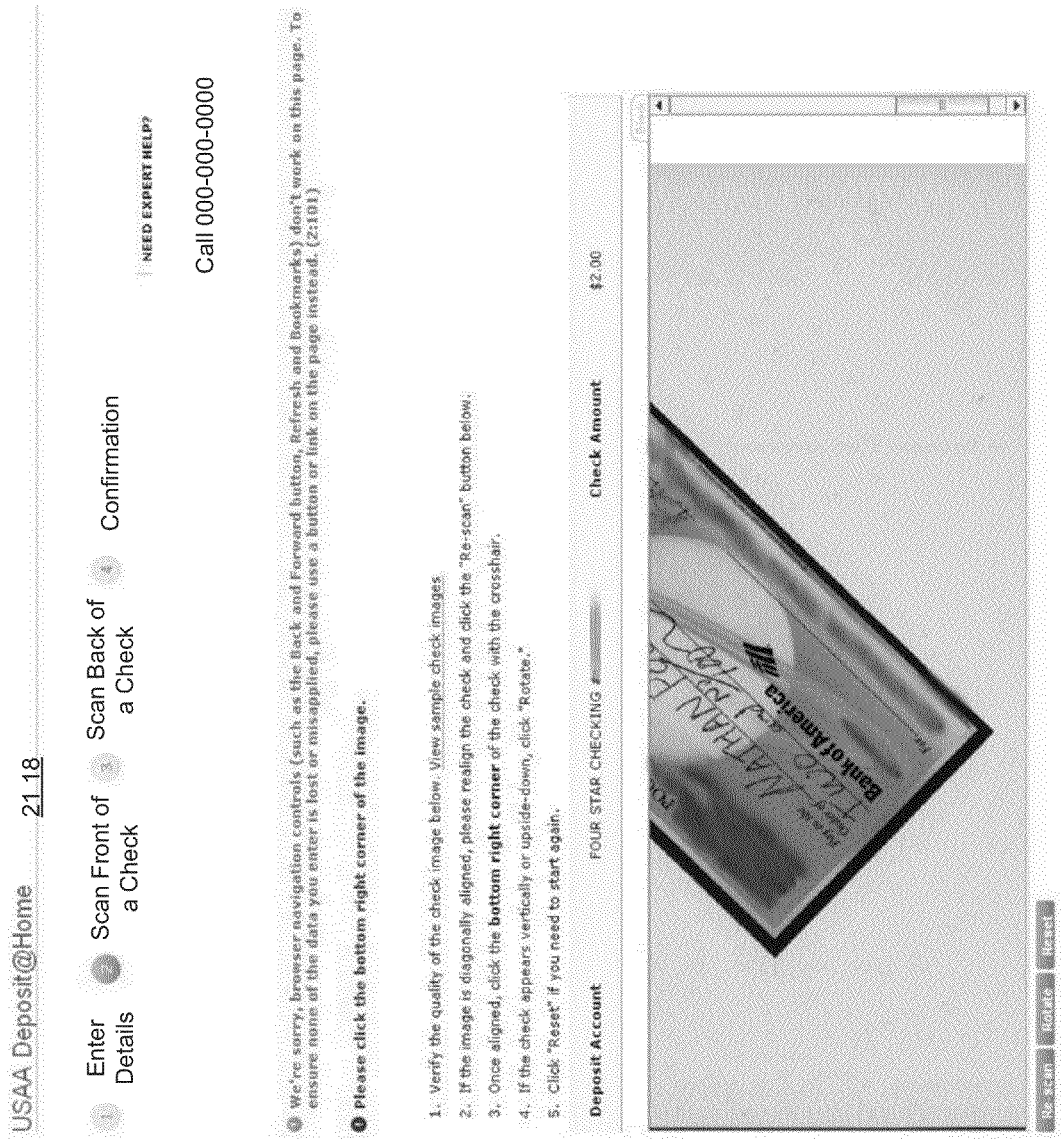

Example Screen Shots: Remote Deposit Capture@Home 21.30

USAA Deposit@Home

1. Enter Details
2. Scan Front of a Check
3. Scan Back of a Check
4. Confirmation We could not complete the deposit due to problems with the check image or a missing endorsement signature. If you haven't already done so, please endorse the check, rescan both sides and submit again. Reference Id: _____ View Possible solutions Please scan one check at a time.

Deposit Account: FOUR STAR CHECKING #

Check Amount: $

The total amount for all deposits cannot exceed your $5,000 daily limit.

[Previous] [Cancel] [NEXT]

Example Screen Shots: Remote Deposit Capture@Home

Example: ImageInspector Controller Systemization

REMOTE DEPOSIT IMAGE INSPECTION APPARATUSES, METHODS AND SYSTEMS

RELATED APPLICATIONS

Applicant hereby claims priority under 35 USC §119 for U.S. provisional patent application Ser. Nos. 61/352,762, 61/352,772 and 61/352,775, all filed on Jun. 8, 2010 and entitled "Apparatuses, Methods And Systems For A Remote Deposit Capture Platform."

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned applications are herein expressly incorporated by reference

FIELD

The present invention is directed generally to apparatuses, methods, and systems of remote deposit of financial instruments, and more particularly, to REMOTE

BACKGROUND

Negotiable instruments such as checks, money orders, banknotes etc., have been widely used to replace cash payments. For example, a payee may receive paychecks as salary payment from his or her employer. In order to obtain the payment amount, the payee may need to deposit the check in an account at the payee's bank, and have the bank process the check. In some cases, the payee may take the paper check to a branch of the payee's bank, and cash the check at the bank counter. Once the check is approved and all appropriate accounts involved have been credited, the check may be stamped with some kind of cancellation mark by a bank clerk, such as a "paid" stamp.

Various software tools, such as Adobe Photoshop, Apple iPhoto, ACDSee, GIMP, and/or the like, may be applied to edit a digital image.

BRIEF DESCRIPTION OF THE DRAWINGS

The accompanying appendices and/or drawings illustrate various non-limiting, example, inventive aspects in accordance with the present disclosure:

FIG. 1 provides a block diagram illustrating an overview of the remote deposit capture within embodiments of the ImageInspector.

FIGS. 2A-2G provide logic flow diagrams illustrating various implementations of cropping multiple check images within embodiments of the ImageInspector.

FIGS. 3A-3F provide example screen shots illustrating cropping multiple check images within embodiments of the ImageInspector;

FIGS. 4A-4D provide logic flow diagrams illustrating implementations of check image edge detection and cropping within embodiments of the ImageInspector;

FIGS. 5A-5D provide logic flow diagrams illustrating implementations of image quality assessment within embodiments of the ImageInspector;

FIGS. 6A-6C diagrams illustrating embodiments of overview data flows between an ImageInspector system and affiliated entities in embodiments of the ImageInspector;

FIGS. 9A-9I provide diagrams illustrating aspects of remote third party deposit in one embodiment of the ImageInspector;

FIGS. 10A-10C provide logic flow diagrams and schematic screen shots illustrating aspects of remote deposit capture eligibility check in one embodiment of the ImageInspector;

FIGS. 20A-20H provide example screen shots illustrating remote deposit capture via a mobile smart phone within embodiments of the ImageInspector;

Figure 2A:
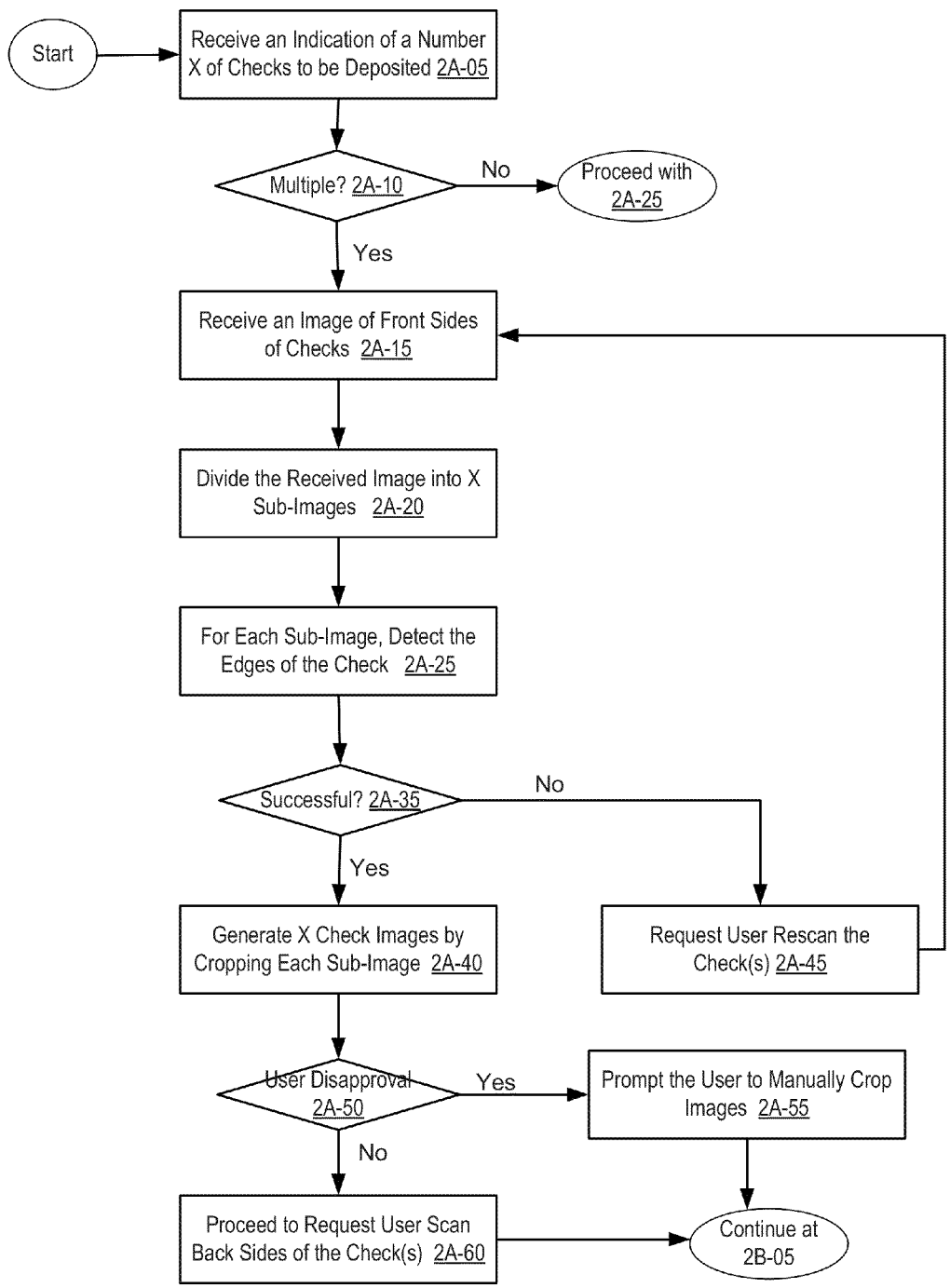

The leading number of each reference number within the drawings indicates the figure in which that reference number is introduced and/or detailed. As such, a detailed discussion of reference number lot would be found and/or introduced in FIG. 1. Reference number 2A-001 is introduced in FIG. 2A, etc.

DETAILED DESCRIPTION

The entire disclosures of the following applications are herein expressly incorporated by reference: U.S. patent application Ser. No. 11/935,584, filed Nov. 6, 2007, entitled "SYSTEMS, METHODS, AND APPARATUS FOR RECEIVING IMAGES OF ONE OR MORE CHECKS," U.S. patent application Ser. No. 11/868,890, filed Oct. 8, 2007, entitled "SYSTEMS AND METHODS FOR PROCESSING REMOTE DEPOSIT OF CHECKS," U.S. patent application Ser. No. 11/926,265, filed Oct. 29, 2007, entitled "Systems and Methods to Address the Multiple Presentment of a Check," U.S. patent application Ser. No. 11/927,814, filed Oct. 30, 2007, entitled "SYSTEMS AND METHODS TO MODIFY A NEGOTIABLE INSTRUMENT," U.S. patent application Ser. No. 11/928,297, filed Oct. 30, 2007, entitled "SYSTEMS AND METHODS TO DEPOSIT A NEGOTIABLE INSTRUMENT," U.S. patent application Ser. No. 11/931,670, filed Oct. 31, 2007, entitled "SYSTEMS AND METHODS TO USE A DIGITAL CAMERA TO REMOTELY DEPOSIT A NEGOTIABLE INSTRUMENT," U.S. patent application Ser. No. 11/930,537, filed Oct. 31, 2007, entitled "SYSTEMS AND METHODS TO MULTIPLE ACCOUNT ELECTRONIC DEPOSIT OF A NEGOTIABLE INSTRUMENT," U.S. patent application Ser. No. 12/062,143, filed Apr. 3, 2008, entitled "CASH DEPOSIT VIA MONEY ORDER," U.S. patent application Ser. No. 12/098,609, filed Apr. 7, 2008, entitled "VIDEO FINANCIAL DEPOSIT," U.S. patent application Ser. No. 12/137,051, filed Jun. 11, 2008, entitled "DUPLICATE CHECK DETECTION," U.S. patent application Ser. No. 12/244,830, filed Jun. 11, 2008, entitled "DUPLICATE CHECK DETECTION," U.S. patent application Ser. No. 12/195,723, filed Aug. 21, 2008, a entitled "SYSTEMS AND METHODS FOR MOBILE DEPOSIT OF NEGOTIABLE INSTRUMENTS," U.S. patent application Ser. No. 12/202,781, filed Sep. 2, 2008, entitled "SYSTEMS AND METHODS OF CHECK RE-PRESENTMENT DETERRENT," U.S. patent application Ser. No. 12/254,185, filed Oct. 20, 2008, entitled "SYSTEMS AND METHODS FOR EMAILING A CHECK," U.S. patent application Ser. No. 12/205,996, filed Sep. 8, 2008, entitled "SYSTEMS AND METHODS FOR LIVE VIDEO FINANCIAL DEPOSIT," U.S. patent application Ser. No. 12/242,063, filed Sep. 30, 2008, entitled "ATOMIC DEPOSIT TRANSACTION," U.S. patent application Ser. No. 12/257,471, filed Oct. 24, 2008, entitled "SYSTEMS AND METHODS FOR FINANCIAL DEPOSITS BY ELECTRONIC MESSAGE," U.S. patent application Ser. No. 12/253,278, filed Oct. 17, 2008, entitled "SYSTEMS AND METHODS FOR ADAPTIVE BINARIZATION OF AN IMAGE," U.S. patent application Ser. No. 12/388,005, filed Feb. 18, 2009, entitled "SYSTEMS AND METHODS OF CHECK DETECTION," U.S. patent application Ser. No. 12/397,671, filed Mar. 4, 2009, entitled "SYSTEMS AND METHODS OF CHECK IMAGE UPLOAD FOR DEPOSIT," U.S. patent application Ser. No. 12/397,930, filed Mar. 4, 2009, entitled "SYSTEMS AND METHODS OF CHECK PROCESSING WITH BACKGROUND REMOVAL," U.S. patent application Ser. No. 12/545,127, filed Aug. 21, 2009, entitled "SYSTEMS AND METHODS FOR IMAGE MONITORING OF CHECK DURING MOBILE DEPOSIT," U.S. patent application Ser. No. 12/509,613, filed Jul. 27, 2009, entitled "SYSTEMS AND METHODS FOR REMOTE DEPOSIT OF NEGOTIABLE INSTRUMENT USING BRIGHTNESS CORRECTION," U.S. patent application Ser. No. 12/509,680, filed Jul. 27, 2009, entitled "SYSTEMS AND METHODS FOR CHECK DATA PROCESSING FOR CHECK RECREATION," U.S. patent application Ser. No. 12/509,680, filed Jul. 27, 2009, entitled "SYSTEMS AND METHODS FOR CHECK DATA PROCESSING FOR CHECK RECREATION," U.S. patent application Ser. No. 11/591,131, filed Oct. 31, 2006, entitled "REMOTE DEPOSIT OF CHECKS," U.S. patent application Ser. No. 11/321,027, filed Dec. 29, 2005, entitled "REMOTE DEPOSIT OF CHECKS," U.S. patent application Ser. No. 11/487,537, filed Jul. 13, 2006, entitled "METHODS AND SYSTEMS FOR IMPROVING NOTIFICATION OF AND ACCESS TO REMOTE DEPOSITS," U.S. patent application Ser. No. 11/591,008, filed Oct. 31, 2006, entitled "DEAD-CHECK REPOSITORY," U.S. patent application Ser. No. 11/591,014, filed Oct. 31, 2006, entitled "SYSTEMS AND METHODS FOR REMOTE DEPOSIT OF CHECKS," U.S. patent application Ser. No. 11/591,003, filed Oct. 31, 2006, entitled "SYSTEMS AND METHODS FOR REMOTE DEPOSIT OF CHECKS," U.S. patent application Ser. No. 11/591,273, filed Oct. 31, 2006, entitled "SYSTEMS AND METHODS FOR REMOTE DEPOSIT OF CHECKS," U.S. patent application Ser. No. 11/591,262, filed Oct. 31, 2006, entitled "SYSTEMS AND METHODS FOR CLEARING NEGOTIABLE INSTRUMENTS IN LIEU OF USING DIGITAL IMAGES," U.S. patent application Ser. No. 11/590,998, filed Oct. 31, 2006, entitled "SYSTEMS AND METHODS FOR DISPLAYING NEGOTIABLE INSTRUMENTS DERIVED FROM VARIOUS SOURCES," U.S. patent application Ser. No. 11/686,930, filed Mar. 15, 2007, entitled "SYSTEMS AND METHODS FOR VERIFICATION OF REMOTELY DEPOSITED CHECKS," U.S. patent application Ser. No. 11/686,928, filed Mar. 15, 2007, entitled "SYSTEMS AND METHODS FOR CHECK REPRESENTMENT PREVENTION," U.S. patent application Ser. No. 11/747,219, filed May 10, 2007, entitled "SYSTEMS AND METHODS FOR REAL-TIME VALIDATION OF CHECK IMAGE QUALITY," U.S. patent application Ser. No. 11/877,307, filed Oct. 23, 2007, entitled "SYSTEMS AND METHODS FOR OBTAINING AN IMAGE OF A CHECK TO BE DEPOSITED," U.S. patent application Ser. No. 11/876,889, filed Oct. 23, 2007, entitled "SYSTEMS, METHODS, AND APPARATUS FOR RECEIVING IMAGES OF ONE OR MORE CHECKS," and U.S. patent application Ser. No. 12/549,443, filed Aug. 28, 2009, entitled "SYSTEMS AND METHODS FOR ALIGNMENT OF CHECK DURING MOBILE DEPOSIT,".

INTRODUCTION

The ImageInspector enhances and leverages the remote deposit capture ("RDC") platform to inspect quality of images of negotiable instruments captured for remote deposit processing.

The RDC provides a platform that allows a user to deposit a check by taking an image of the check and electronically transmitting the image to the user's bank. For example, in one embodiment, the user may operate a smart phone (e.g., an Apple iPhone, etc.) to initiate the remote deposit, wherein the smart phone may automatically download and instantiate a remote deposit software component, which controls the smart phone to capture via its built-in camera, process and send the image of the check. For another example, the user may perform remote deposit by downloading and instantiating the remote deposit software component on their home computer connected to a standard home-use or office-use scanner/photocopier/fax machine. In one embodiment, the user's bank may receive and process the image of the check to obtain deposit information (e.g., via optical character recognition, etc.), and complete the requested deposit based on the deposit information.

The various embodiments described herein may be electronically performed by different entities such as, but not limited to a bank server, a user device, a third party agent, and/or the like. Those embodiments may also be performed by other entities.

FIG. 1 is a block diagram illustrating RDC. In various embodiments, a user 101 can use various client devices 133 to capture an image of a check 102, send it to their bank 165 over a communications network, and cause the deposit of the check 103a, 103b remotely. For example, the user 101a may use a desktop computer with a scanner, webcam, camera, video camera, etc. 133a to scan, video, photograph, etc. a digital copy of the check 102. The scanner employed by the user 101a may comprise myriad scanning devices for general public use and/or other industry use. For example, the scanner may be a general purpose scanning device having a standard document input capacity tray that may accommodate a large variety of document sizes, such as, but not limited to letter size (8.5 by 11 inches), legal size (8.5 by 14 inches), ledger size (17 by 11 inches), tabloid size (11 by 17 inches), and/or the like. In one implementation, these scanning devices 133a may include a sheet fed scanner (e.g., Canon DR-2050C sheetfed scanner, etc.), a flat bed scanner (e.g., Canon CanoScan 8800F, etc.), a manual/hand held scanner (e.g., Canon imageFORMULA P-150M, etc.), and/or the like. In another implementation, the image capture devices 133a may include, but not limited to a multi-functional device which includes a photocopier, a facsimile machine, a facsimile plus email machine and/or the like (e.g., Xerox WorkCentre 6505, etc.), and/or any other multifunction counting/scanning/copying/faxing/etc. devices.

In another embodiment, the user 101b may use a mobile device equipped with a camera 133b to capture a copy of the check, such as a: cellphone, PDA, smartphone, tablet, etc. Once a copy of the check is captured, the user's client 133 sends a check deposit message 102a, 102b to the user's, i.e., the payee's, bank 165; the check deposit image may include an image of the check and accompanying client account information (e.g., account number, deposit amount, etc.). The bank's server(s) may a then evaluate the check deposit message and deposit the check 103 (e.g., via the desktop client 133a and the web, via an application component on the mobile device 3b, etc.).

For example, in one embodiment, a user (e.g., the payee) who wants to deposit a check, may capture an image of the check by a user image capture device, e.g., a scanner connected to a computer, a mobile device having a built-in camera, a digital camera, and/or the like. In another implementation, the user may take a video clip of the check and submit the video file. In one embodiment, the user may send the captured check image to a financial institution, e.g., a payee's bank with RDC service. The RDC platform receiving the check image may then process the check image and extract deposit data from the digital check image. For example, in one implementation, the RDC may perform a series of image analysis procedures to enhance the received check image and extract deposit information such as payee's name, payee's bank, account number, bank routing number, deposit amount, and/or the like. In one implementation, after initial verification of the extracted deposit data, the RDC may post the deposit through direct banking and save the check image and the associated check deposit information in a transaction depository. In one implementation, the RDC may generate a substitute check (e.g., an X9.37 cash letter file) based on the received check image and send it to a clearinghouse bank (e.g., a regional branch of the Federal Reserve) for check clearance. In one implementation, the RDC may confirm, or cancel the soft posting of deposit funds based on the result of check clearance.

In another example implementation, a user may deposit cash or a check at a third party agent which is located remotely from a bank. For example, the third party agent may include, but is not limited to a point of sale at a store participating in the a RDC service, a RDC terminal located at a gas station, and/or the like. In another implementation, the third party agent may be an express mailing service representative carrying a portable check/cash reading device to provide RDC service, e.g., UPS®, Fedex®, etc. In one implementation, the user may walk in a RDC participating store and present a check or cash for deposit. The third party agent may process the remote deposit request by generating and sending an image of the check to a remote deposit server, or by calculating and verifying the presented cash for deposit.

It is to be understood that, depending on the particular needs and/or characteristics of a RDC application, associated IDE, associated operating system, user interface, object, administrator, server, hardware configuration, network framework, and/or the like, various embodiments of the RDC may be implemented that enable a great deal of flexibility and customization. The instant disclosure discusses embodiments of the RDC primarily within the context of remote deposit of "checks" from a payee to a bank hereinafter. However, it is to be understood that the system described herein may be readily adopted for deposits of other types of negotiable instruments, such as a money order, a bank note, and/or the like, and configured/customized for a wide range of other applications or implementations. It is to be understood that the RDC may be further adapted to other implementations or communications and/or data transmission applications, such as but not limited to a general entity-to-entity payment system.

For example, in some embodiments, the RDC may allow a payee to apply the deposit, or a portion thereof, to the payment of one or more bills, such as a credit a card payment, insurance bill payment, car payment, etc.

For another example, in some embodiments, the RDC may allow users to apply the deposit (or portion thereof) to a non-US Dollar denominated account. For example, in one implementation, a user may wish to apply a deposit of a $100 (USD) check into a Euro-denominated account. In one implementation, if the user selects an "USD to Euro" deposit option, the RDC may determine and notify the user of the exchange rate that will be used for the transaction (i.e., how much, in Euros, will be deposited into the user's account). In some embodiments, the RDC may prompt the user to approve the conversion, while in other embodiments, the conversion and deposit will occur automatically.

ImageInspector Multiple Check Cropping

FIGS. 2A-2B provide logic flow diagrams illustrating embodiments of the ImageInspector. In one embodiment, ImageInspector may comprise an image uploading and processing component delivered to and installed at a user device. For example, a user may install an ImageInspector application at his personal computer, smart phone, and/or the like, and may instantiate the ImageInspector application for remote deposit. In an alternative implementation, the ImageInspector may comprise a check image processing module associated with a remote server, wherein the server may remotely control a user device to capture and upload check images for deposit, and process the check images in real-time or in a batch.

Figure 3C:
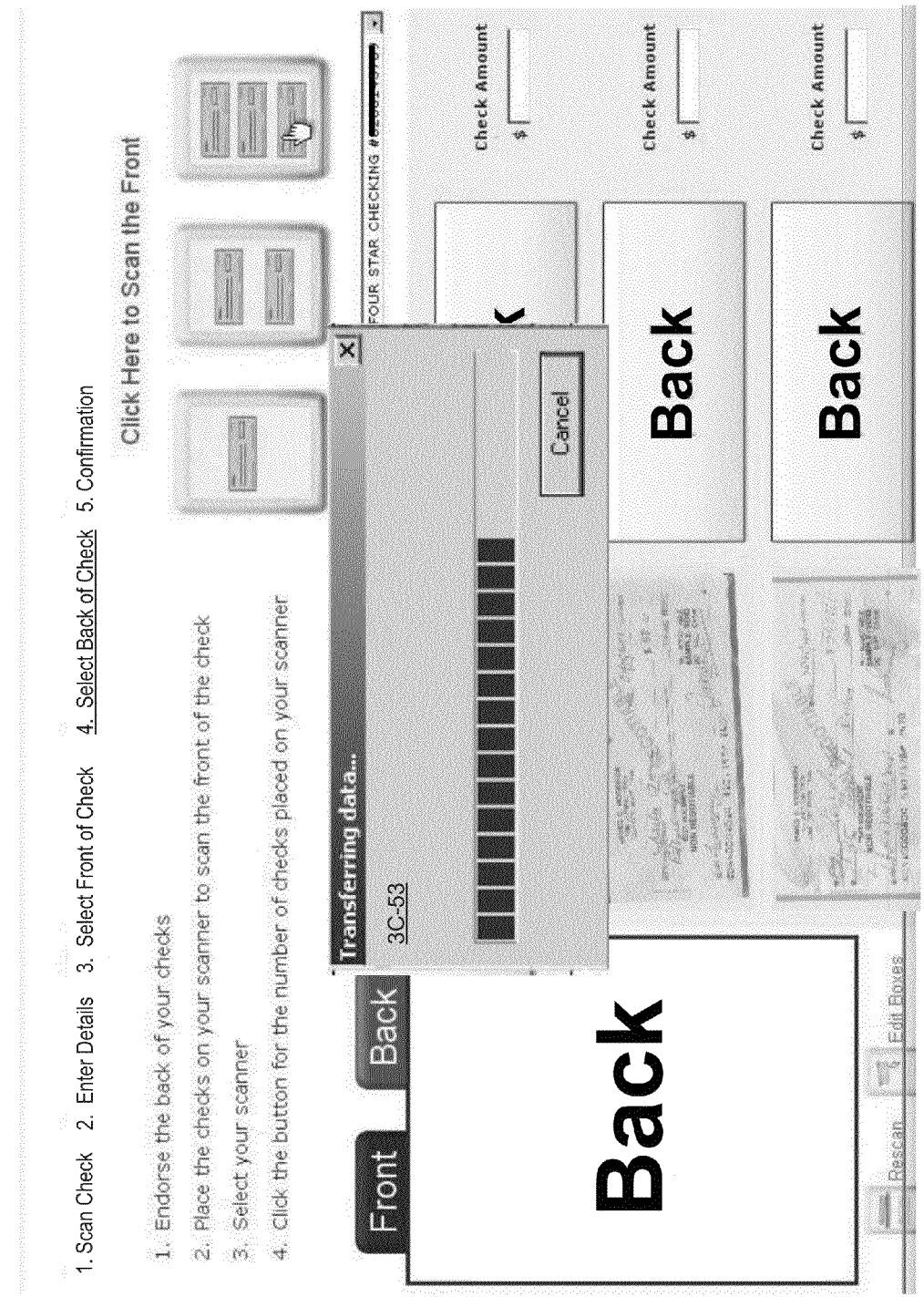

Within implementations, upon receiving a user request to deposit, ImageInspector may prompt a user to provide user credentials to instantiate a remote a deposit, e.g., a user account name, password, and/or the like. Upon user login, the ImageInspector may provide instructions via a user interface for the user to deposit one or more checks. For example, FIG. 3A shows an example screen shot illustrating a user interface of the ImageInspector. As shown in FIG. 3A, the ImageInspector may provide instructions 3A-42 to request the user to endorse the back of the check(s) to be deposited, place the checks on the scanner to scan one side of the check, select the scanner, and click the button for the number of checks placed on the scanner, etc.

In one implementation, as shown in FIG. 3A, the ImageInspector may request the user to select an image capture device 3A-41, e.g., a scanner connected to the personal computer, a camera, etc. For example, the ImageInspector application may be downloaded and installed on the user's personal computer, which may detect and control any image capture device connected to the computer via a TWAIN driver, and/or the like. Alternative implementations of interfacing and controlling the image capture device are discussed in FIG. 11A.

In one implementation, the ImageInspector may receive an indication of a number of checks to be deposited from the user 2A-05. For example, as shown in FIG. 3A, after providing user credentials to log into the ImageInspector application, a user may view icons illustrating deposit a single check, or multiple checks, and may click on the icon (e.g., to deposit three checks) to select 3A-40.

In one implementation, if the user selects a single check to be deposited, the ImageInspector may proceed to process the crop the check image starting at 2A-25. In another implementation, if the user selects to deposit more than one check (e.g., three checks, etc.) 2A-10, the ImageInspector may provide instructions via a user a interface for the user to deposit multiple checks at one time. For example, as shown in FIG. 3A, the ImageInspector may instruct the user via an illustrative icon 3A-40 to request the user to evenly align multiple checks on a scanner bed.

In one implementation, the ImageInspector may receive an image comprising multiple images of front sides of a plurality of checks to be deposited 2A-15. The ImageInspector may then process the received image to extract separate check images. In one implementation, the ImageInspector may divide the received image into a number of subimages 2A-20. For example, if the ImageInspector has received an indication that three checks are to be deposited, the ImageInspector may evenly divide the image received at 4015 into three sub-images, wherein each sub-image contains one check image. For another example, the ImageInspector may convert the received image into a grayscale image and obtain an estimate of locations of the check images based on grayscale value analysis of the image of received at 2A-15, as further illustrated in FIG. 2C. For another example, the ImageInspector may convert the receive image into a bitonal virtual image with a light foreground representing the check portion and a dark background, and scan the virtual image from top to bottom to locate the light foreground so as to divide the virtual image, as further illustrated in FIGS. 2F and 2G.

In one implementation, for each sub-image, the ImageInspector may detect edges of the check 2A-25. For example, the check edge detection at 2A-25 may be performed in one implementation as illustrated in FIGS. 15A-16D. If the edge detection is successful 2A-35, the ImageInspector may crop each sub-image and generate a front side check image for each check to be deposited 2A-40. In another implementation, if the edge detection is not successful for one or more of the sub-images—for example, the corner detection fails to generate a reflection-tolerable result, etc., as illustrated in FIG. 15H—the ImageInspector may request the user the rescan the checks 2A-45.

In one implementation, the ImageInspector may provide a view of aligned cropped check images, as illustrated at 3B-50 in FIG. 3B. In one implementation, a user may request rescanning of the checks, if the displayed cropped check images are skewed, mis-cropped, incomplete, etc. If such user disapproval 2A-50 is indicated, the ImageInspector may prompt the user to manually crop the images 2A-55. For example, in one implementation, the ImageInspector may present the original received image comprising a plurality of check images to the user via an interactive user interface, and request the user select a boundary of each check image. The user may click on the corners of each check image, in a similar manner as illustrated in FIG. 11C, and the ImageInspector may generate a rectangular box for check cropping based on the user indicated check corner points. For example, the user may click on a lower left corner and an upper right corner of a check image, and the ImageInspector may project a rectangular shape out of the indicated corners. For another example, the user may create a rectangular box to bound the check image on the scanner image via a user interface, e.g., the user may click and drag the mouse pointer across the top of the check image until the resulted rectangular area on the image has covered the entire check image portion. In another implementation, the user may elect to rescan the checks upon disapproval of the check images.

In one implementation, if the front sides of the checks are successfully a scanned and processed, the ImageInspector may upload the front images upon user confirmation. For example, the user may click "submit," and the ImageInspector may then transfer the image data to a remote server, as illustrated at 3C-53 in FIG. 3C. The ImageInspector may proceed to request the user scan the back sides of the checks 2A-60, and process/crop back sides of the checks in a similar manner as applied to front sides of the checks.

In one implementation, the ImageInspector may provide a view including the cropped front sides and back sides of the check images, as the illustrated list of front side images 3D-54, and the list of back side images 3D-55 in FIG. 3D. The ImageInspector may then receive a user indication of deposit accounts 2B-53. For example, the user may select a deposit account from a list of accounts associated with the ImageInspector remote deposit account, as shown at 3E-58 in FIG. 3E.

Figure 3E:
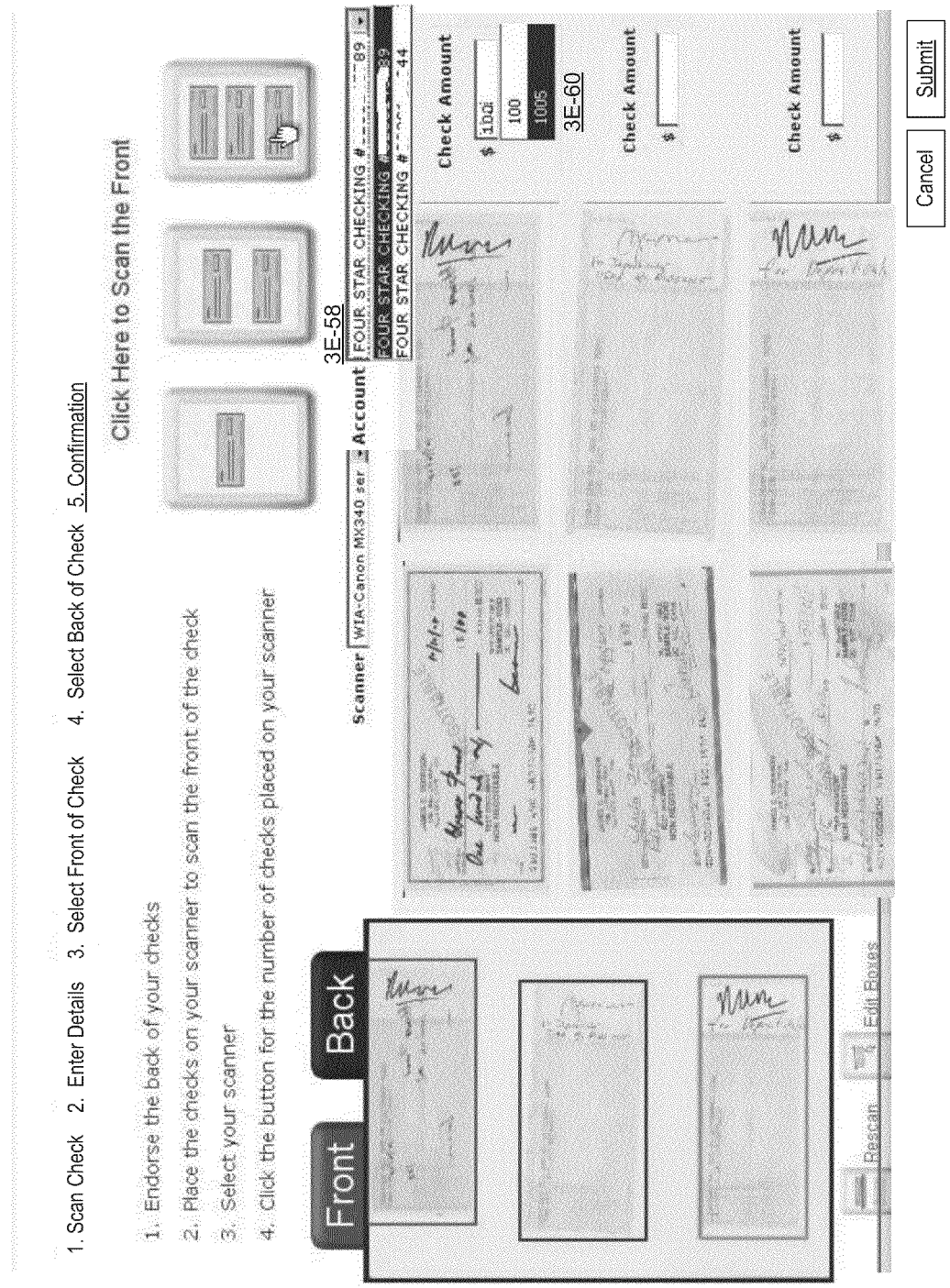

In one implementation, for each check to be deposit, the user may enter a deposit amount 2B-55, e.g., as shown at 1260 in FIG. 3E. The ImageInspector may associate check deposit metadata with each check image 2B-56. For example, the metadata may comprise a deposit account, a deposit amount, a user name, a time stamp of the deposit submission, and/or the like. The ImageInspector may generate a check deposit file including the check images and metadata 2B-58, and submit the generated check deposit file to a remote deposit server 2B-60. For example, in one implementation, the deposit file may comprise a Check 21 compliant check deposit data structure.

Figure 2C:
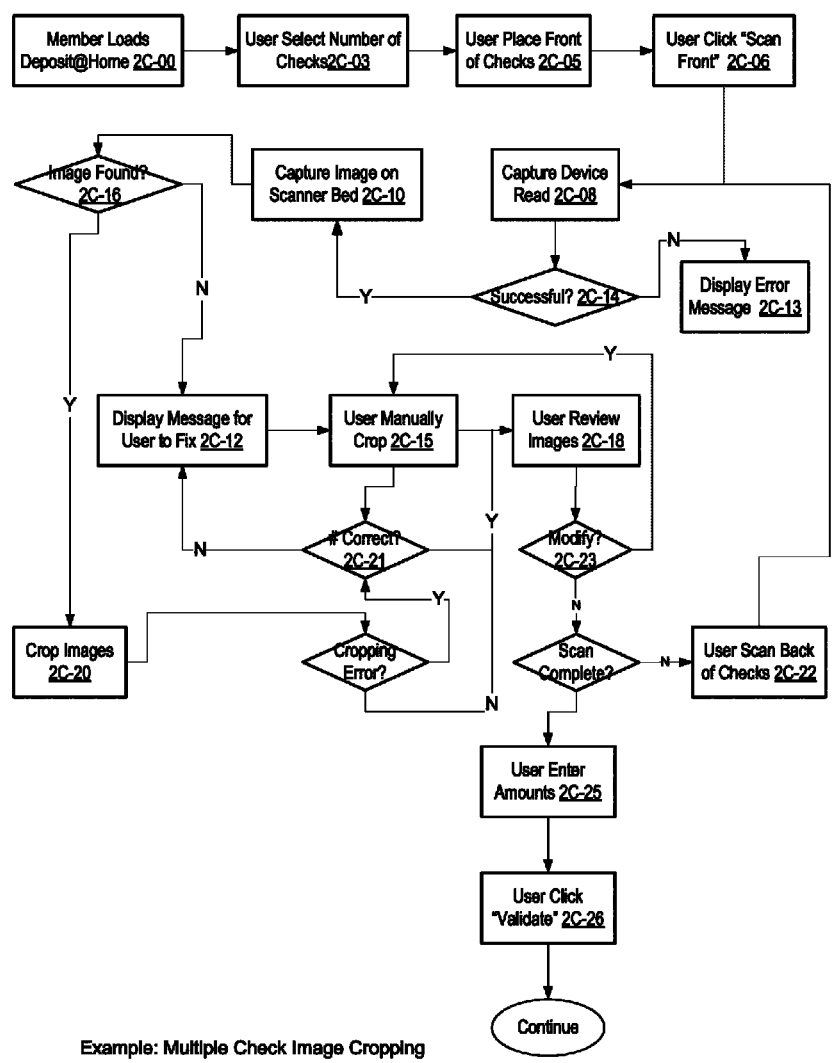
Figure 2D:
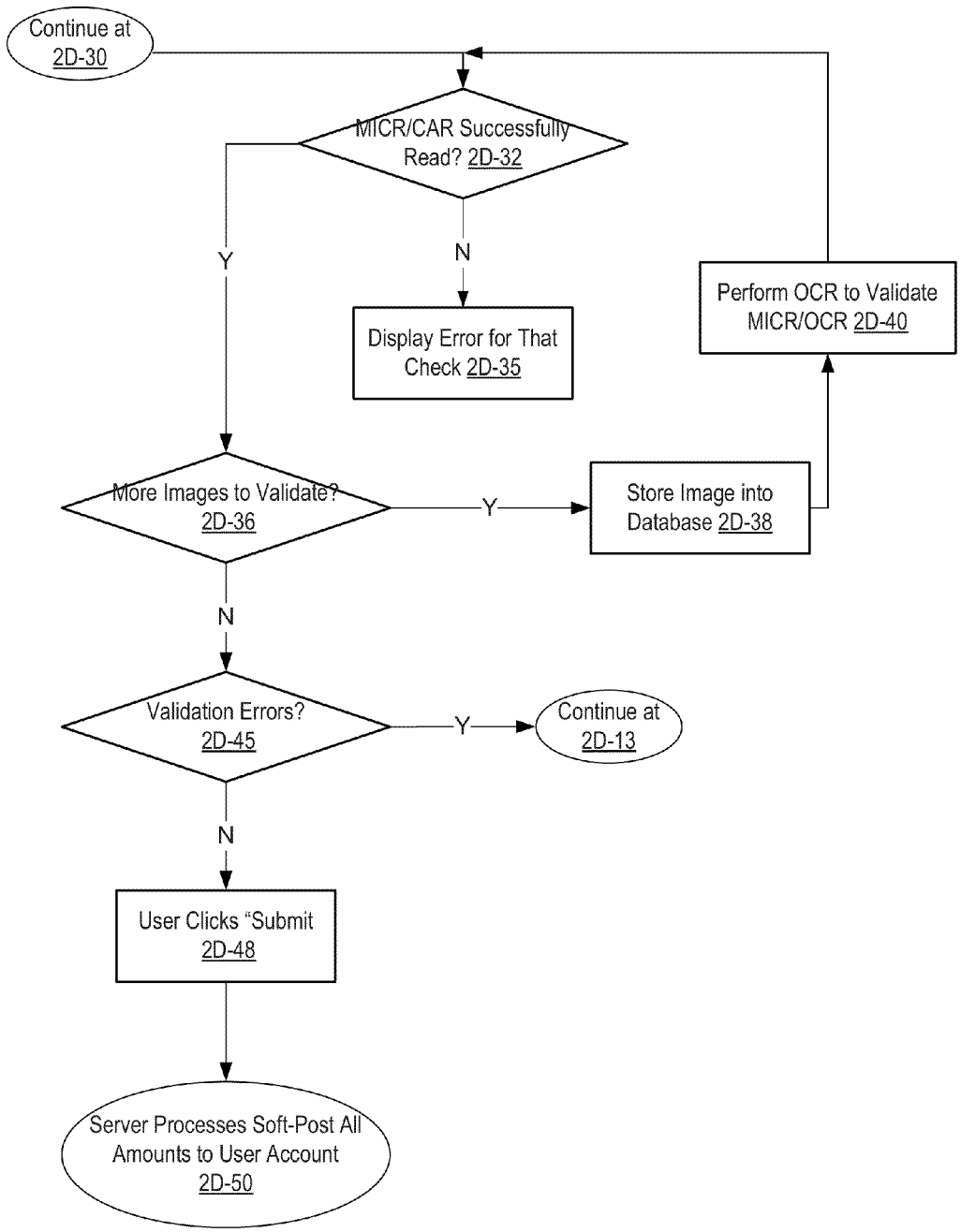

FIGS. 2C and 2D provide logic flow diagrams illustrating multiple cropping and image validation within an alternative embodiment of the ImageInspector. In one embodiment, a user, e.g., a registered member of the remote deposit service, may initiate a "Deposit@Home" remote deposit component installed at his personal computer 2C-00 to start remote deposit. The user may then select the number of checks to be deposited at one time 2C-03, e.g., to click on the icon 1240 as shown in FIG. 3A. In one implementation, the user may be requested to place front sides of the checks 2C-05 in front of an image capture device connected to the personal computer, e.g., to place the checks on a scanner bed. The user may then click "scan front" to proceed 2C-06.

In one implementation, the image capture device may be controlled by the "Deposit@Home" component to read the physical checks 2C-08, e.g., on the scanner bed. If the scanning is successful, the image device may capture an image of front sides of a set of aligned checks 2C-10, e.g., on the scanner bed. If the image capturing is not successful, e.g., when the physical check is placed outside of a scanning range on the scanner bed, etc., the ImageInspector may display an error message 2C-13 to the user.

In one implementation, the ImageInspector may detect check images on the captured image. If check images are successfully found, the ImageInspector may crop the images 2C-20. Otherwise, the ImageInspector may display a message to the user to fix 2C-12. For example, a user may elect to manually crop the check images 4125, and review the cropped image 2C-18. Upon reviewing, if the user desires to modify the cropped image, he may re-crop the images.

Figure 3F:
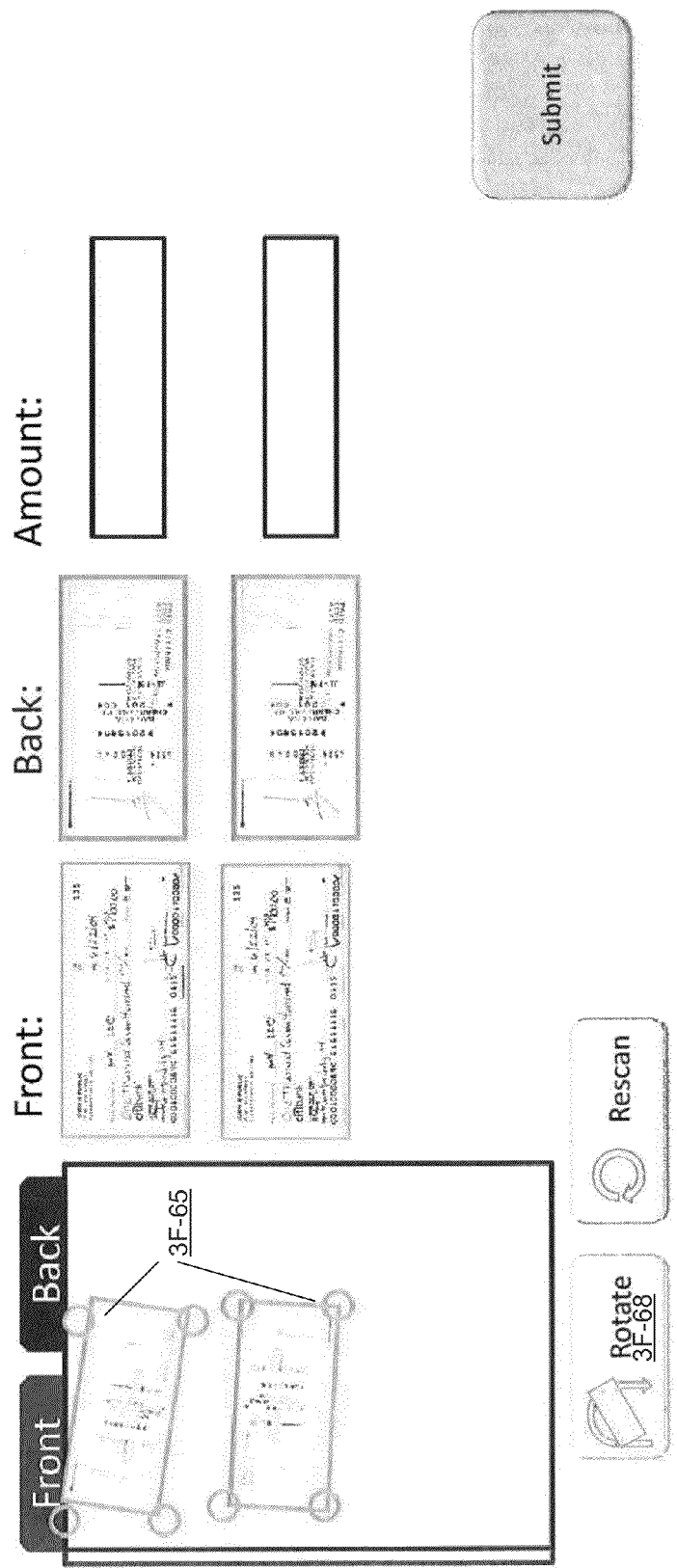

For example, as shown in one implementation in FIG. 3F, a user may click the four corners 3F-65 of a check on the received scanned image via an interactive user interface to facilitate check image cropping. In one implementation, if the check a image is not horizontally placed, the user may click on "Rotate" 3F-68 to horizontalize the check image. For example, the ImageInspector may project the user selected four corners 3F-65 to a rectangular shape and rotate the check image to be horizontally placed.

In one implementation, the ImageInspector may determine whether the user cropped images matches the number of checks. For example, the user may select to submit three checks at one time but only cropped two checks out of the scanned image. For another example, the ImageInspector may perform a searching procedure to detect check images on the obtained scanned image, as further illustrated in FIGS. 2E-2G. The ImageInspector detected number of checks may not match with the user indicated number of checks. If not, the ImageInspector may display messages for the user to fix 2C-12. In one implementation, the ImageInspector may determine whether there is error in the cropping, e.g., the ImageInspector fails to detect the number of check on the received image, etc., and may request user to manually crop the images upon user review.

In one implementation, if the scan is not complete, the user may scan back sides of the checks 2C-22 in a similar manner as discussed at 2C-08. If the scan is complete, the user may be requested to enter deposit amounts 2C-25 for each cropped check, as illustrated at 1260 in FIG. 3E. The user may then click a "validate" button 2C-26 for the ImageInspector to validate the cropped check images.

As shown in one implementation in FIG. 2D, the ImageInspector may validate the received cropped check images by performing an OCR procedure 2D-40 to examine whether the MICR/CAR fields are readable 2D-32. If the information can be a successfully read via OCR, the ImageInspector may consider the check image to be valid. Otherwise, the ImageInspector may display error for the check 2D-35.

In one implementation, the ImageInspector may proceed to inspect every check image if there are more checks to validate 2D-36. If any validation errors are detected 2D-45, e.g., program call errors, invalid image format, etc., the ImageInspector may display an error message, e.g., 2D-13. Otherwise, the ImageInspector may store the validated check images into a check image database 2D-38. In one implementation, the ImageInspector may conduct the check validation (including MICR/CAR validation) at a client computer via the remote deposit component, e.g., an installed "Deposit@Home" application. In a further implementation, the ImageInspector may inspect check images at a remote deposit server after the user has uploaded the image, and assess whether the check image is qualified for remote deposit, as further discussed in FIGS. 4A-4D.

Upon validating each check image, the user may click submit 2D-48 and submit the check images to a remote server to process soft-posting of the deposit amounts 2D-50.

Figure 2E:
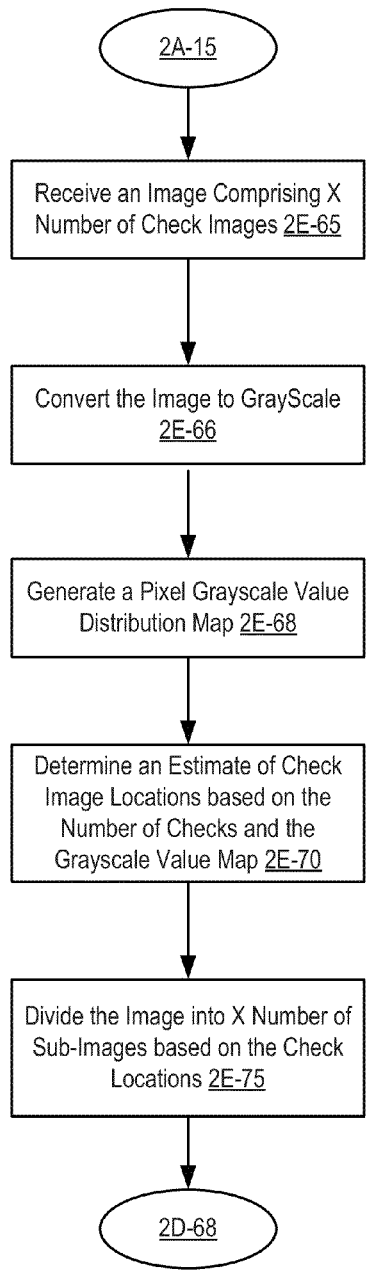

FIG. 2E provides a logic flow diagram illustrating an alternative embodiment of dividing an image comprising a plurality of check images of the ImageInspector. In one embodiment, the ImageInspector may receive an image comprising a number of check images 2E-65 captured by an image capture component (e.g., a scanner, a camera, etc.). The ImageInspector may convert the received image into a grayscale image 2E-66, e.g., with a "tiff" file extension, and generate a pixel grayscale value distribution map 2E-68. For example, the pixel grayscale value a distribution may comprise image data comprising the X-coordinate value, Y-coordinate value, and a grayscale value of the pixel at the coordinate (X, Y).

In one implementation, the ImageInspector may generate an estimate of check image locations based on the number of checks and the grayscale distribution 2E-70. For example, the received check image may be obtained by placing the checks on a scanning bed with a color contrasted to the color of the check (e.g., a dark background color). For another example, the ImageInspector may instruct the user to is capture an image of the aligned checks within a dark background. In one implementation, the grayscale value of the check portions on the image may be "higher" (e.g., on a 0-255 grayscale value scale) as contrasted to the darker background portion. In one implementation, the ImageInspector may divide the received image 2E-75 with cutting lines across portions with "lower" grayscale values, which are deemed to be the background portions.

Figure 2F:
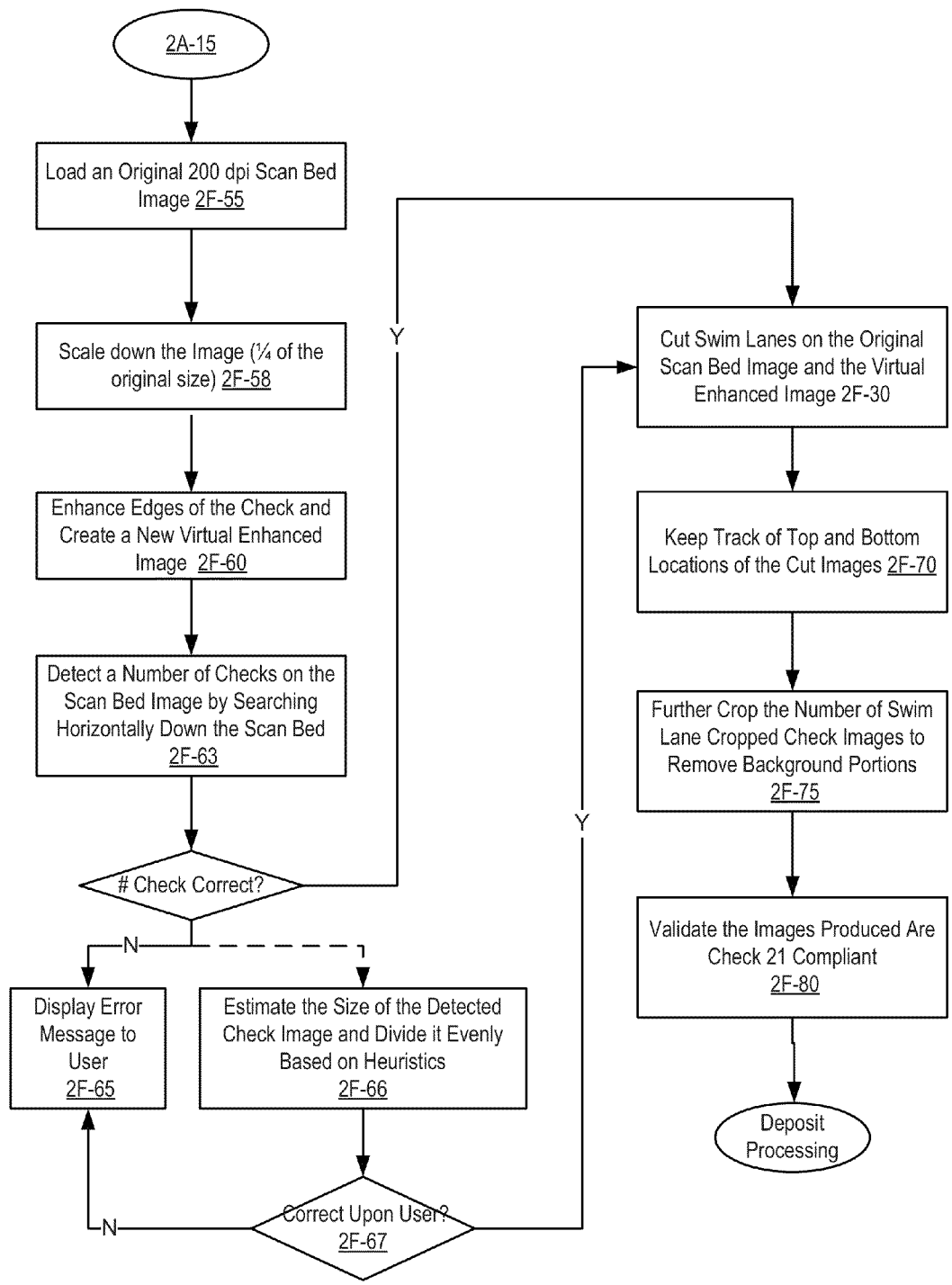

FIG. 2F provides a logic flow diagram illustrating alternative implementations of multiple cropping within embodiments of the ImageInspector. In one embodiment, the ImageInspector may load the obtained image from the image capture device (e.g., a scanner), which may be a 200 dpi scan bed image 2F-55, and may scale the original image down to reduce size (e.g., a quarter of the original size) 2F-58. The ImageInspector may scale down the image to generate and enhance a virtual image more efficiently, wherein the total processing time may be reduced in half by reducing size of the original scanner bed image.

Figure 2G:
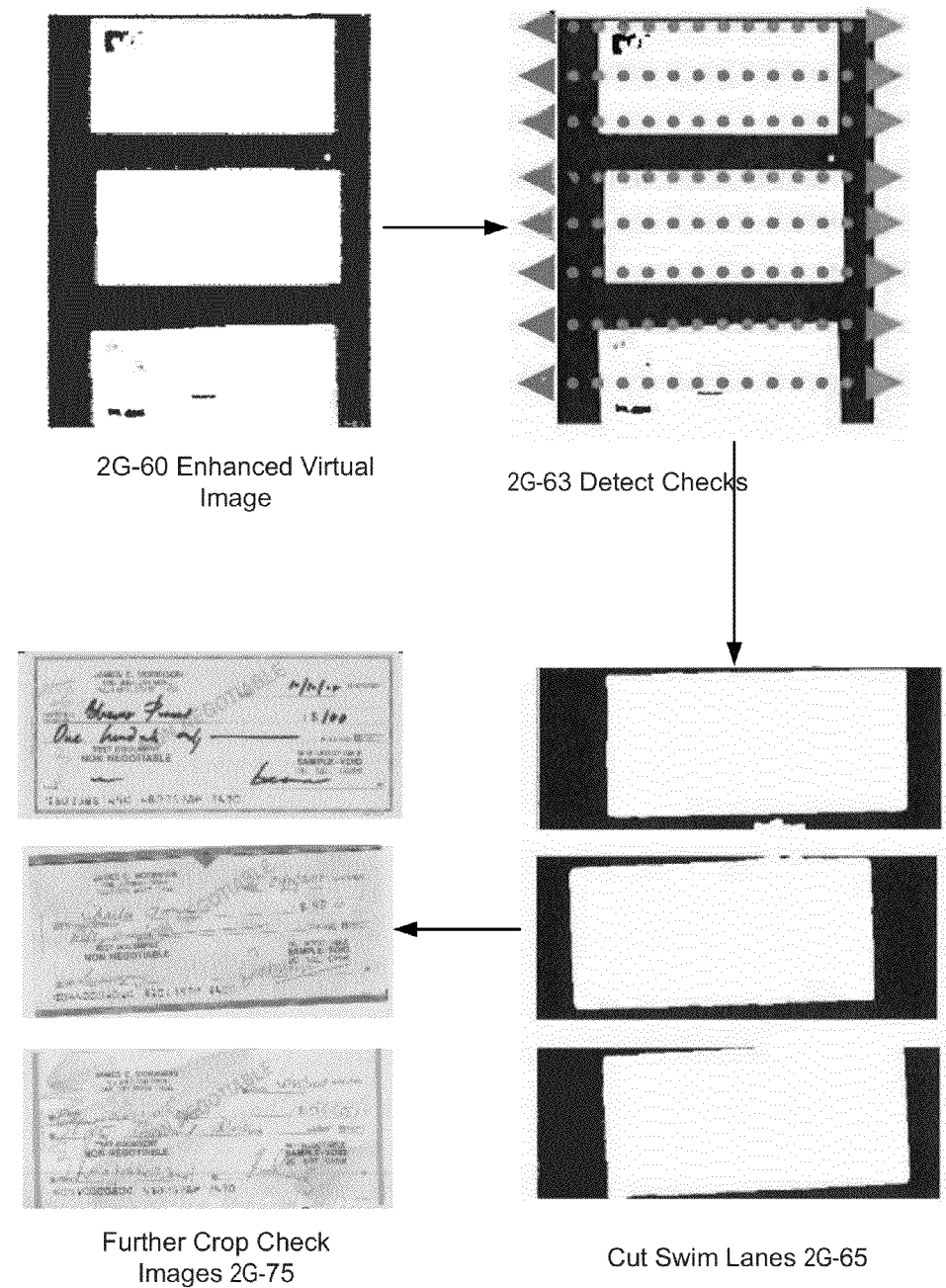

In one embodiment, the ImageInspector may generate a virtual image of the scaled original color image and enhance the edges of the check image 2F-60, e.g., as shown in FIG. 2G. In one implementation, the black and white virtual image may be generated and enhanced in a similar manner as illustrated in one embodiment in FIGS. 4D-4E. For example, the ImageInspector may apply a media filter to remove dust and noise on the scanned image, and apply Gaussian blur to further remove any inconspicuous noise. For another example, the ImageInspector may dilate the dark pixels on the check image by a dilation matrix to convert the check to a dark blob. The ImageInspector may then invert the dilated image, and dynamically convert the image to bitonal via a histogram and threshold analysis, as discussed in one implementation in FIGS. 6A-6C. For another example, the ImageInspector may apply a median matrix to remove blurred areas, lines on the check image, e.g., extra noise, dust, etc, and obtained an enhanced image with check images on a dark background. In one implementation, the aforementioned image transformation filters, such as the median filter, Gaussian Blur filter, and other image filter matrices mentioned throughout, may be applied via a Java image processing library, such as, but not limited to JAI, ImageJ, and/or the like.

In one implementation, an example implementation of a 9×9 Gaussian blur matrix may take a form similar to the following:

```
float data [ ]= {0, 0, 1, 1, 1, 1, 1, 0, 0,
                 0, 1, 2, 3, 3, 3, 2, 1, 0,
                 1, 2, 3, 6, 7, 6, 3, 2, 1,
                 1, 3, 6, 9, 11, 9, 6, 3, 1,
                 1, 3, 7, 11, 12, 11, 7, 3, 1,
                 1, 3, 6, 9, 11, 9, 6, 3, 1,
                 1, 2, 3, 6, 7, 6, 3, 2, 1,
                 0, 1, 2, 3, 3, 3, 2, 1, 0,
                 0, 0, 1, 1, 1, 1, 1, 0, 0};
KernelJAI kernel = new KernelJAI (new Kernel (9, 9, data) );
PlamarImage temp = JAI.create("convolve", img, kernel);
```

In one implementation, the ImageInspector may detect a number of checks on the scan bed image by searching horizontally down the enhanced image 2F-63, e.g., as shown in FIG. 2G. For example, in one implementation, the ImageInspector may generate a histogram of the enhanced bitonal image to find the median value of the virtual image. The ImageInspector may use a half of median value as the threshold for determining if a row of pixels contains portions of the check or not.

For example, in one implementation, the ImageInspector may divide the virtual bitonal image into tiles (e.g., each tile has a width of 6 pixels, or 3% of the total height of the virtual image, etc.). The ImageInspector may start at the top of the image top tile through and average all of the pixel values ranging from 1-256 within the tile. If the average pixel value within a tile is greater than a threshold (e.g., 150, etc.) then the current tile is considered part of the check, e.g., a tile of "light" color. Otherwise, the tile is considered to be part of the background. Then the ImageInspector may start at that row and proceed to look for where the average number of pixels is below the threshold, which is considered as the bottom of the check.

When the ImageInspector scans from top tile to the bottom, if the virtual image contains multiple check images, as shown at 2F-63 in FIG. 2G, the ImageInspector may record a tile as "top edge of the first check," "bottom edges of the first check," "top edge of the second check," "bottom edge of the second check," and/or the like. The gap between the "bottom edge of the first check" and the "top edge of the second check" may be used to cut swim lanes to separate the checks. In one implementation, the ImageInspector may then cut swim lanes on the original scan bed images 2F-68 based on the detected check edges at 2F-63. Once the check images are cut they are set to an image array and returned back to the calling function.

In one implementation, the ImageInspector may examine whether the number of detected number of checks matches with the user entered number of checks. For example, the user may click to select scanning three checks at a time, e.g., at 1240 of FIG. 3A, but the ImageInspector may detect edges for two check images on the virtual image at 2F-63. In one implementation, the ImageInspector may display an error message to the user 2F-65, and request the user either re-scan the physical checks, or re-enter/confirm the number of checks to be deposited.

In alternative implementation, the ImageInspector may estimate the size of the detected check image and divide it evenly based on heuristics 2F-66. For example, if the user has indicated three checks are aligned and scanned, but the ImageInspector only detects two checks on the virtual image at 2F-63, it is possible that two checks were aligned without sufficient space, or overlapped, such that the two checks may be considered to be "one check" at 2F-63. The ImageInspector may evaluate the heights of the detected checks. For example, if the height of one detected check is almost two times the height of a second detected check, the first detected check may comprise two checks consecutively aligned. In one implementation, the ImageInspector may divide the first detected check image in the middle.

In one implementation, the ImageInspector may present the cut images to a user to confirm whether the cutting based on heuristics is accurate 2F-67. Should the user approve the cutting based on check size heuristics, the ImageInspector may proceed to 2F-68.

In one embodiment, the ImageInspector may keep track of the top and bottom locations of the cut images 2F-70, wherein the top and bottom locations are a used to further crop the number of checks that get returned from the Swim Lane Crop 2F-75, e.g., as shown in FIG. 2G. For example, using a similar histogram and threshold procedure as in 2F-60, the ImageInspector may start at the middle of the image and look up to find the top edge of the image, and/or look down to find the bottom edge. The image is then rotated by 90 degrees and the same edge functions are used to determine the top and bottom edges. The image is then rotated back and the cropped images are stored in an image array. In one implementation, the ImageInspector may determine the orientation of the check image to make sure it is horizontally displayed. Upon locating the top and bottom locations of check edges, the ImageInspector may project the locations to generate a rectangular cropping box on the original unscaled image at 2F-55, and crop the original unscaled image accordingly, e.g., on the original 200 dpi scan bed image. Further implementations of check cropping are discussed in FIGS. 4A-4D.

In one implementation, the ImageInspector may validate that the images produced are Check21 compliant 2F-80. The validation may determine whether the auto-cropping procedure was performed successfully. If a failure is encountered, then the user may be prompted to fix their images via a manual cropping function, e.g., at 2C-15 of FIG. 2C.

ImageInspector Cropping Mechanisms

Figure 4A:
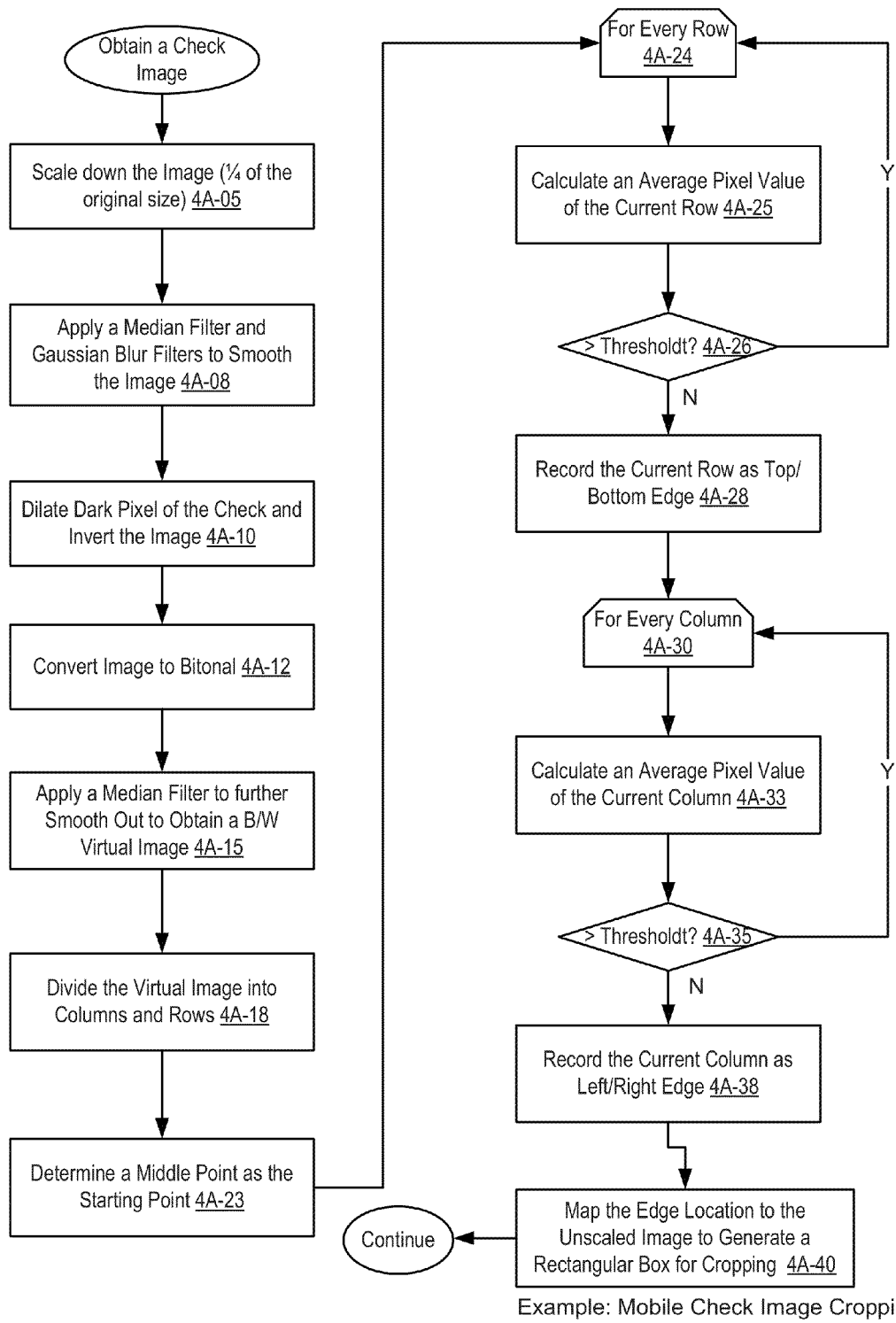

FIG. 4A provides a logic flow diagram illustrating an embodiment of check image cropping within embodiments of the ImageInspector. In one embodiment, the check image cropping procedure may be performed at a depositor device via a remote deposit component, after a check image is captured by the image capture a component. For example, a remote deposit application installed on the user's personal computer may facilitate check image cropping, as shown by the example user interfaces in FIGS. 3A-3F. For another example, the check image processing and cropping may be performed at a remote deposit server located at a financial institution, e.g., at 165 in FIG. 1, after the financial institution receives a check image for deposit from a depositor's device.

In one embodiment, the ImageInspector may prepare the obtained check image into a bitonal virtual image for edge detection, which comprises a white portion without details indicating the "check portion," and a black background, as illustrated at 4B-05 in FIG. 4B. The ImageInspector may then perform edge detection on the virtual image and project the locations of detected edges for cropping the original check image.

In one embodiment, the ImageInspector may obtain a check image, which may be an original color image captured by the image capture device, e.g., a 200 dpi scan bed image at a size of 2.5 megabytes. To facilitate faster processing, the ImageInspector may be down sampled to reduce the image size, e.g., a quarter of the original size 4A-05. The ImageInspector may then convert the scaled color image to a grayscale image, e.g., via the Java Advanced Image (JAI) v. 3.0, etc.

In one implementation, the ImageInspector may apply filters to smooth out the grayscale image to generate a black and white image 4A-08, which may comprises a white area indicating the check portion in contrast to a black background. In one implementation, the ImageInspector may apply a median filter to remove dust and noise on the check image, e.g., by averaging out the pixel values of adjacent pixels. In another implementation, the ImageInspector may apply a Gaussian Blur filter to further remove any inconspicuous noise on the image. For example, if there is a dark spot (e.g., an inadvertent ink spot, etc.) on the front side of the check, the Gaussian Blur filter may facilitate to smooth out the image and blur the dark spot. In one implementation, the media filter, Gaussian Blur filter may be applied via a Java image processing library, such as, but not limited to JAI, ImageJ, and/or the like.

In one implementation, the ImageInspector may dilate dark pixels 4A-10 of the check image by applying a dilation filter (e.g., via JAI packages), which may convert the check portions on the image to a dark blob. The dilated image may then be inverted so that the check portion would be a light blob on a relatively darker background.

In one implementation, the ImageInspector may convert the dilated image from 4A-10 to a bitonal image 4A-12. For example, in one implementation, the ImageInspector may generate a histogram of the dilated images, and calculate an average pixel value as a threshold for bitonal conversion. In one implementation, the ImageInspector may dynamically convert the check images, e.g., by calculating and setting a bitonal threshold per every image. In another implementation, the ImageInspector may adopt a heuristic threshold value to save processing time.

In one implementation, the ImageInspector may re-apply a media filter (e.g., a 11 by 11 media matrix with a plus mask generated by a JAI package, etc.) to further smooth the bitonal image 4A-15. Then the ImageInspector may obtain a virtual image with a light foreground as the check portion, and a dark background as the non-check portion, as shown at 4B-05 at FIG. 4B, as the counterpart of the original check image.

In one implementation, the ImageInspector may divide the virtual image into columns and rows 4A-18 for edge detection. For example, in one implementation, the width of each column/row may be 6 pixels, or 3% of the total width/height of the check image, and/or the like. In one implementation, if the ImageInspector receives an indication that the bitonal image may comprise more than one checks, e.g., the user indicated more than one checks are to be deposited during the image capturing, the ImageInspector may scan the bitonal check image from top row to the bottom row to locate the plurality of the checks, as discussed in FIG. 2F. For bitonal images that comprise a single check image, or the already separated swim lane images at 2F-30 of FIG. 2F, the ImageInspector may start row/column searching from a middle point. For example, the middle point may be estimated as the center of the rectangular bitonal image, as shown at 4B-08 in FIG. 4B.

In one implementation, the ImageInspector may start from the middle point and scan upward or downward to evaluate every row as shown at 4B-10 in FIG. 4B. For each row 4A-24, the ImageInspector may calculate an average pixel value of the current row 4A-25, and compare the average value to a threshold value 4A-26. For example, the threshold value may be the overall average pixel value of the bitonal image, e.g., 150. If the average pixel value is greater than the threshold value, which indicates the current row still traverses a light portion, e.g., the check portion, the ImageInspector may proceed to the next row. If the average pixel value is lower than the threshold value, which indicates the current row may be the boundary of the a light foreground portion and the dark background portion, the ImageInspector may record the current row as the top or bottom edge 4A-28. Thus the ImageInspector may start from the middle of the foreground check portion, and scan upward until it hits the top edge row, as shown at 4B-11 in FIG. 4B, or scan downward until it hits the bottom edge row, as shown at 4B-12 in FIG. 4B.

In one embodiment, the ImageInspector may start from the middle point to scan outwards for each column 4A-30 in a similar manner. In one implementation, the ImageInspector may calculate an average pixel value of the current column 4A-33, and compare the average value to a threshold value 4A-35. If the average pixel value is greater than the threshold value, which indicates the current column still traverses a light portion, e.g., the check portion, the ImageInspector may proceed to the next column. If the average pixel value is lower than the threshold value, which indicates the current column may be the boundary of the light foreground portion and the dark background portion, the ImageInspector may record the current column as the left or right edge 4A-38. Thus the ImageInspector may start from the middle of the foreground check portion, and scan to the left until it hits the left edge row 4B-16, as shown at 4B-15 in FIG. 4B, or scan to the right until it hits the right edge row, as shown at 4B-18 in FIG. 4B.

In one implementation, the ImageInspector may obtain four corners of the light foreground portion by calculating intersections of the top edge, bottom edge, left edge, and the right edge. The ImageInspector may then project the corner locations from the scaled bitonal virtual image to the original unscaled image, and generate a rectangular cropping box on the original unscaled image to crop the check 4A-40.

FIG. 4C provides an alternative implementation of check cropping a within embodiments of the ImageInspector. In one embodiment, upon receiving a check image, the ImageInspector may cut the check image based on heuristics 4B-05. For example, if past check image processing records indicate that the top 20% of a check image is usually the background portion, the ImageInspector may cut the top 20% of the received image, as shown at 4D-05 in FIG. 4D. The ImageInspector may then convert the remaining image into an enhanced virtual image 4C-08, e.g., via similar procedures as discussed in FIG. 4A. In one implementation, the ImageInspector may divide the virtual image into rows and columns for searching 4C-10, e.g., with width of 6 pixels or 3% of the total width/height of the virtual image, etc. In one implementation, the ImageInspector may designate the top row (e.g., as the top 20% of the original image has been removed) as the top edge 4C-12, as shown at 4D-06 in FIG. 4D, and start scanning downwards from the top row, until it hits the bottom edge row 4C-15. For example, the ImageInspector may perform a similar procedure as discussed in FIG. 4A: for each evaluated row, calculate the average pixel value of the row and compare it to a threshold value to determine whether the current row is located on the edge of a light foreground portion and a dark background portion. The ImageInspector may record the location of the bottom edge row, as shown in 4D-08 of FIG. 4D.

In one implementation, the ImageInspector may then scan columns from a middle point to detect left and right edges 4C-23, via a similar procedure as discussed in FIG. 4A.

In an alternative implementation, if the heuristics of past image processing suggests the left 20% of the image may be background portion, the ImageInspector may cut left 20% of the image 4C-35 upon receiving the image, e.g., as shown in 4D-15 in FIG. 4D. In one implementation, the ImageInspector may convert the remaining image into an enhanced virtual image 4C-38, divide it into rows and columns 4C-40. Then the ImageInspector may designate the left column as the left edge 4C-52, as shown at 4D-16 in FIG. 4D, and scan from left to right until it hits the right edge 4C-55, as shown at 4D-18 in FIG. 4D. In one implementation, the ImageInspector may in turn scan rows from a middle point to detect top/bottom edges 4C-53.

In one implementation, the ImageInspector may project the detected edge locations to the original image after the initial heuristics cut (e.g., at 4C-05, or 4C-35) to crop the check image 4C-25. It should be noted that the heuristic cut of the original check image may be any of a portion of the top, bottom, left, right portions of the original received check image, or a combination of one or two cuts at different portions.

Additional embodiments of check edge detection and cropping are further illustrated in FIGS. 15A-16D. For example, in FIG. 16C, the ImageInspector may start scanning a virtual image from inside a light foreground outwardly, and from outside a light foreground inwardly, and compare the detected edge points.

In a further embodiment, the ImageInspector may select a check image cropping method based on the quality of the check image. For example, for a check image with good contrast, the ImageInspect may adopt a fast cropping procedure, as discussed in FIG. 4C-4D. Otherwise, the ImageInspector may adopt other cropping procedures based on other image quality assessment factors, as further illustrated in FIGS. 5A-5D.

ImageInspector Scoring Tools

FIG. 5A provides a logic flow diagram illustrating image quality analysis within embodiments of the ImageInspector. In one embodiment, the ImageInspector may receive a remote deposit check image from a depositor device 5A-65 (e.g., a personal computer, a smart phone, a cellular phone, etc.), and prior to processing the received image to extract deposit information, the received image may be passed through an image quality analysis to determine how reliable the check image is. In one implementation, such image quality analysis may be performed at a remote deposit server located at a financial institution (e.g., the payee's bank, etc.). In another implementation, an image quality analysis component may be downloaded and installed at a depositor's device to determine and adjust image quality prior to image submission to a remote server. For example, in one implementation, when a depositor adopts a video camera for deposit and is requested to hold the physical check in front of a video camera for live video capture, an image analysis component installed at the depositor's computer may inspect the video frame grabs to analyze whether the obtained check image is acceptable and whether re In one implementation, the ImageInspector may generate one or more image quality scores 5A-66 to indicate the reliability of the received image. For example, if the received image is blurred, vague, disoriented, of low resolution, and/or the like, the image may not be reliable for deposit processing. In one implementation, the image quality score may be a general numeric score based on a plurality of sub-scores, e.g., a weighted sum of sub-scores. In another implementation, the ImageInspector may determine whether the image is acceptable based on a hierarchical algorithm which generates image scores at different stages of the algorithm. For example, in one implementation, upon receiving an image, the ImageInspector may perform a first order inspection of the image, e.g., to determine an image contrast score, or a source of the image, etc. If the first order inspector determines the received image is unacceptable, e.g., the image contrast score is lower than a minimum threshold, the image may be rejected without further inspection. Such hierarchical algorithm may be further discussed in FIG. 5C.

In one implementation, if the ImageInspector determines the image quality score is unacceptable 5A-67, the ImageInspector may reject the image by sending an image denial notice 5A-68 to the user. For example, the user may receive a message via a user interface displaying "Sorry! The check image can not be processed. Please re-scan." The user may then elect to re-capture an image to restart the remote deposit, or exit the process.

In another implementation, if the ImageInspector determines the image quality score is acceptable at 5A-67, e.g., a general image quality score is higher than a threshold, or the hierarchical image analysis determines the image satisfies all requirements, etc., the ImageInspector may proceed to process the image to extract deposit information.

In one embodiment, the ImageInspector may discern different edge detection and check image cropping procedure based on the image quality score 5A-70, wherein the score adopted may be a general image quality score, or one or more sub-scores. For example, in one implementation, the ImageInspector may determine edge detection procedures based on an image contrast score. The ImageInspector may a generate an image contrast score at 5A-66 indicative of the contrast level of the received image, wherein the image contrast score may be the contrast ratio of the image, e.g., the minimum pixel value divided by the maximum pixel value, wherein the greater the ratio is, the less contrast the image has. If contrast score indicates good contrast 5A-71 (e.g., contrast ratio <0.03), the ImageInspector may proceed with a bottom mask edge detection procedure and smart cropping 5A-75, as illustrated in FIGS. 4C-4D; if the contrast score is within a medium range (e.g., 0.03<contrast ratio<0.15), the ImageInspector may proceed with a four-sided edge detection and cropping 5A-73, as further illustrated in FIGS. 4A-4B. In another implementation, if the contrast score is below a minimum threshold (e.g., contrast ratio>0.15), the image may be rejected at 5A-67. In other implementations, the ImageInspector may adopt different contrast level thresholds, e.g., a good contrast range for contrast ratio<0.02, a medium range for contrast ratio between 0.02 and 0.2, and unacceptable if the contrast ratio>0.2, etc.

Figure 5B:
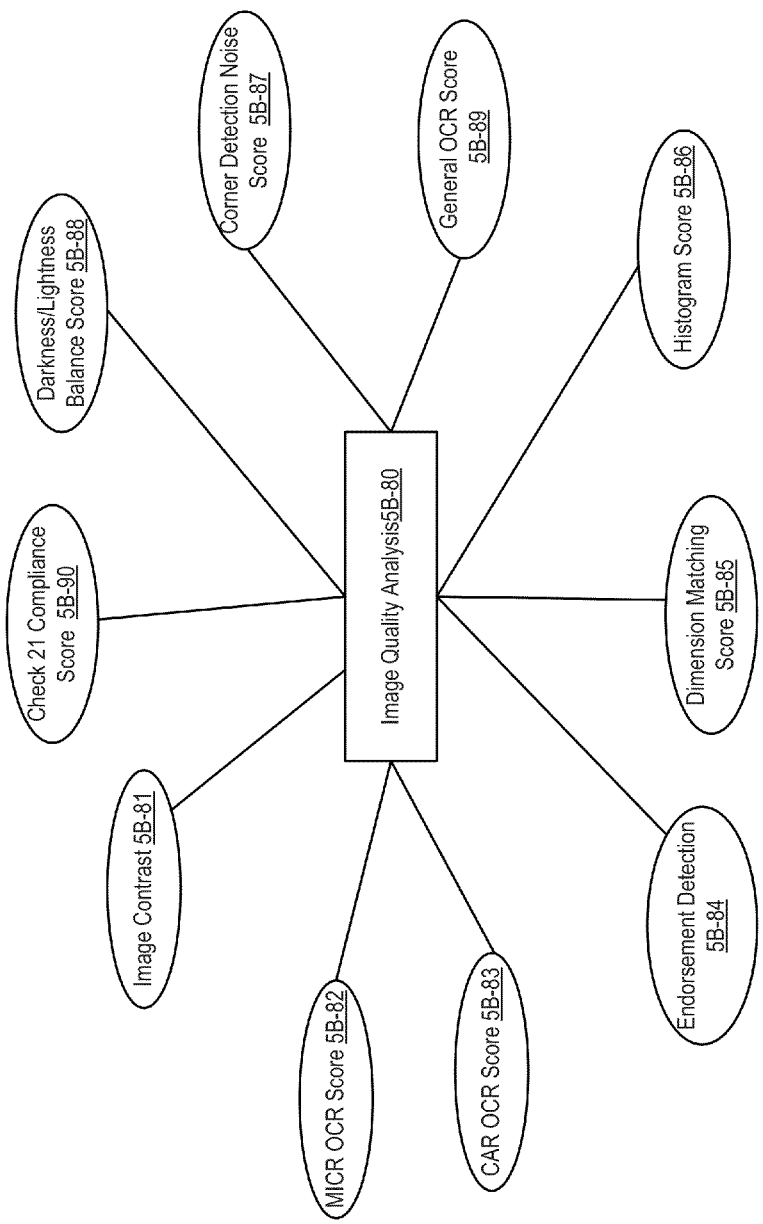

FIG. 5B provides a block diagram illustrating image quality analysis scores within one embodiment of the ImageInspector. In one implementation, the ImageInspector may evaluate a plurality of image quality scores. For example, the ImageInspector may calculate an image contrast score 5B-81, e.g., an image contrast ratio of the luminance of the brightest color of the image to that of the darkest color of the image, an image contrast ratio of the grayscale values of the lightest color to that of the darkest color, etc. In one implementation, the contrast ratio may be a numeric value between 0 and 1, and the closer the contrast ratio is to 1, which indicates the darkest pixel and the lightest pixel values are proximate, the poorer the contrast a performance the image has. For example, a contrast ratio greater than 0.15 may be considered to be poor image contrast, and may be rejected.

In another implementation, the ImageInspector may perform OCR on the image to calculate a MICR OCR score 5B-82 and/or a CAR OCR score 5B-83. For example, the OCR may be implemented via a Java OCR API library, e.g., Asprise OCR SKD v4.0, JavaOCR, and/or the like.

For example, the MICR OCR score 5B-82 may be generated by counting a is number of legible characters in the MICR line and calculating a percentage of the legible characters out of the total number of characters in the MICR line. For another example, the CAR OCR score 5B-83 may be generated by counting a number of legible digits in the deposit amount area and calculating a percentage of the legible digits out of the total number of digits of deposit amount on the check image. For example, the MICR OCR score may be a percentage value between 0 and 1, and the ImageInspector may request at lest 70% MICR OCR readability.

For anther example, the MICR OCR score and the CAR OCR score may be generated based on a confidence level during the OCR process. For example, as further illustrated in FIG. 5C, the MICR OCR readability thresholds may depend on the contrast level. In a further implementation, the ImageInspector may examine whether the CAR obtained through OCR is consistent with the deposit amount received from the metadata.

In another implementation, the ImageInspector may perform endorsement detection 5B-84 over the received image, and generate a score indicating whether an endorsement is successfully detected. For example, the endorsement score a may be a binary value, "Yes" or "No," to indicate whether there is an endorsement. For another example, the ImageInspector may perform a signature recognition procedure over the endorsement, and generate an endorsement score to indicate a confidence level of the endorsement. For example, if lines of the endorsement are blurred or vague, the endorsement score may be low; otherwise, if lines and boundaries of the endorsement characters are clearly discernible, the endorsement score may be high.

In another implementation, the ImageInspector may generate a dimension matching score 5B-85. For example, the ImageInspector may perform edge detection to obtain an estimate of the dimension of the check, and inspect whether it falls into a range of typical financial instrument sizes. For example, most legitimate 200 dpi checks fall within a certain maximum and minimum width and height, e.g., a typical personal check may have a ratio of width versus height as 24:11, and a typical business check may have a width versus height ratio 17:7. For example, the dimension matching score 5B-85 may be calculated as a numeric value indicating the ratio between the dimension of the check, and a standard check dimension. If the typical personal check size is 24:11, and the detected check size from the received check image is 23:11, the dimension matching score may be calculated as 24/11:23/11=24/23. When the score is close to 1, the check dimension may closely match a standard check. In one implementation, the ImageInspector may determine whether the check image's width to height ratio falls between a minimum ratio and a maximum ratio to ascertain whether the check image is in accordance with a standard size check. If the detected check image has a dimension of width versus height ratio 1:1 (e.g., a square shape), the check image may be accorded with a low dimension matching score, or may be rejected.

In one implementation, the ImageInspector may generate a histogram score 5B-86 of the received image. For example, the ImageInspector may convert the received check image into a grayscale image, and generate a histogram of the grayscale image, e.g., at 605-610 of FIG. 6A. The ImageInspector may then calculate an average value of the histogram and determine whether the image is "good" based on heuristics, e.g., the mean of the histogram should be about the same for most good checks; bad checks may either be too light or too dark so the mean value will be out of range to produce a lower score. In one implementation, the ImageInspector may calculate the histogram score as a deviation to the statistical average mean value of histogram of "good" check images.

In one implementation, the ImageInspector may calculate a corner detection noise score 5B-87, e.g., the corner reflection level, as further illustrated in FIGS. 6A-6H. For example, the ImageInspector may use a corner detection algorithm to count the number of nodal points. A sharp image with little noise may fall within a normal range. If the grayscale (e.g., tiff) image is too noisy or blurry then the corner detection procedure will return a very high or low value which may be used to generate the corner detection noise score.

In another implementation, the ImageInspector may calculate a general OCR score 5B-89, e.g., a percentage of legible characters on the check image of the total number of characters on the check image (e.g., an 80% minimum). In one implementation, heuristic value of the total number of characters on a check may be used. •The ImageInspector may OCR the entire front side of the check and see if there are any other words or phrases that get returned. For example, missing characters in a fields such as Name, Address, and/or numbers like check number, may lead to a low general OCR score.

In another implementation, the ImageInspector may calculate darkness/lightness balance scores 5B-88, Check 21 compliance score 5B-90, and/or the like.

In one implementation, the ImageInspector may calculate a general image quality score based on the sub-scores 5B-81-5B-90. For example, the general image quality score may take a weighted sum of the sub-scores, wherein the weights may be determined by a system operator. In an alternative implementation, the ImageInspector may not need to evaluate every sub-score, but adopt a hierarchical structure to save processing time. For example, different sub-scores may be prioritized, and the ImageInspector may evaluate each sub-score in a sequential order. At any step, if the ImageInspector determines the sub-score calculated at such step indicates the image is unacceptable, the ImageInspector may reject the received image without evaluating the remaining sub-scores.

In one implementation, the hierarchical algorithm structure may comprise layers of image quality scores. For example, the ImageInspector may categorize the sub-scores so that at each layer of evaluation, the ImageInspector may evaluate a category of sub-scores and determine whether the category of sub-scores exceed a minimum quality threshold. For example, the image contrast 5B-81, darkness/lightness and balance scores 5B-88 may be categorized as a first layer for initial quality check; MICR OCR score 5B-82, CAR OCR score 5B-83 and the general OCR score 5B-89 may be categorized as a layer for OCR check; dimension matching a score 5B-85, corner detection noise score 5B-87 may be categorized as a layer for edge detection check, and/or the like.

Within various implementations, scores 5B-81-5B-90 discussed in FIG. 4E may be compared with a related minimum image quality threshold to determine whether the received image meets with the minimum requirement. For example, the received image may need to meet a minimum contrast level 5B-81 to be performed with OCR to extract deposit information. Such thresholds may be pre-determined by an ImageInspector operator. In an alternative implementation, the image quality thresholds may be dynamically determined and updated based on heuristics of previous image assessment. For example, as further illustrated in FIG. 5D, the ImageInspector may determine different thresholds for images obtained via different image capture devices (e.g., scanner, camera, cellular phone, etc.).

Figure 5C:
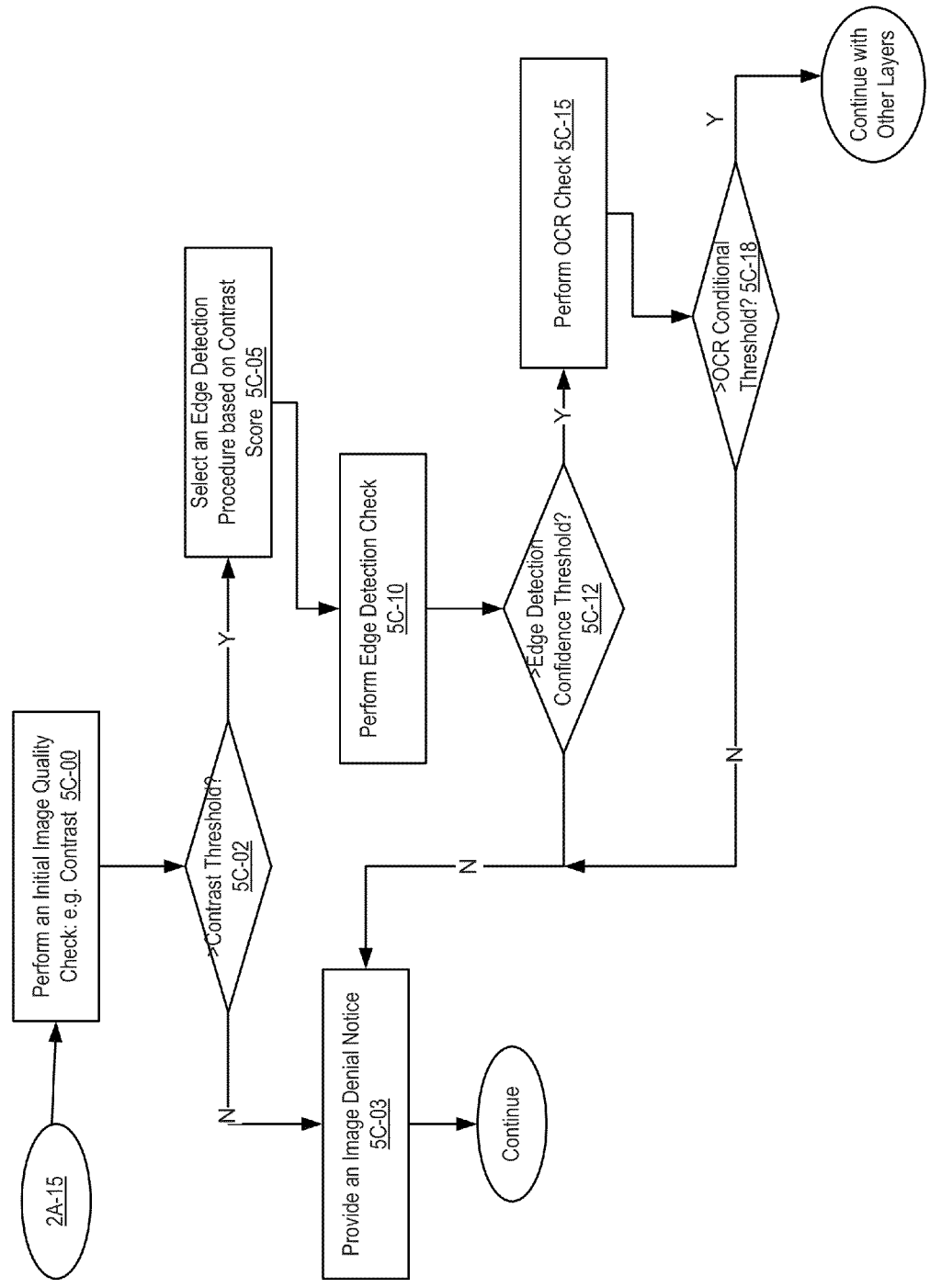

FIG. 5C provides a logic flow illustrating an exemplar hierarchical image quality analysis structure within one embodiment of the ImageInspector. In one embodiment, upon obtaining an image from a depositor device, the ImageInspector may perform an initial image quality check 5C-00. For example, contrast ratio may be generated of the received image by calculating the pixel value of the darkest color divided by that of the lightest color. If the contrast ratio is less than an acceptable contrast threshold 5C-02, e.g., 0.15, the ImageInspector may proceed to select an edge detection procedure as discussed in FIGS. 4A-4D. Otherwise, the ImageInspector may reject the image and provide an image denial notice 5C-03 to the user without proceeding to further inspection to save time.

In one implementation, an example Java implementation of the ImageInspector that determines whether the image has enough contrast to be able to accurately determine the edges of the check, may take a form similar to the following:

```
int goodContrast=0;
    //scores determine if the image has good contrast
    quadrantScore    scores=ImageAnalysis.getQuadScores
        (img, ImageProcessingConstants.minBinCount);
    scores.print( );
    if (scores.getTopLeftQuadrant( )>0.03){
        goodContrast++;
    }
    if (scores.getTopRightQuadrant( )>0.03){
        goodContrast++;
    }
    if (scores.getBottomLeftQuadrant( )>0.03){
        goodContrast++;
    }
    if (scores.getBottomRightQuadrant( )>0.03){
        goodContrast++;
    }
    if(goodContrast<-1 II scores.getAverageScore( )<0.03){
        //image doesn't have a good dark background
        System.out.println("Simple Crop: Image is too white.");
        img=ImageManipulation.simpleCrop(img,    virtim-
            age2);
        return img;
    }
    if (scores.getAverageScore( )<0.15)
    {
        //image doesn't have a good dark background but may
            be good enough to find bottom of image
        System.out.println("Simple Crop: Unable to detect corners.");
        img=ImageManipulation.smartSimpleCrop(img, virtimage2);
        return img;
    }
```

In one embodiment, the ImageInspector may perform edge detection check 5C-10. For example, the ImageInspector may inspect whether the dimension (e.g., width vs. height ratio) of the detected check image matches with a standard check. For another example, the ImageInspector may determine a reflection level during the corner detection. In one embodiment, the ImageInspector may determine a confidence level of the corner detection 5C-12. For example, if the detected edges do not conform a to a standard check shape, the confidence level of edge detection may be negatively impacted. For another example, if the reflection score of a corner is high, the confidence level may also be negatively impacted.

In one embodiment, if the received image passes the edge detection check at 5C-12, the Image Inspector may perform an OCR check 5C-15. For example, the ImageInspector may perform an OCR over the MICR line, the CAR filed, the whole check front image, and/or the like, to determine an OCR score based on the number of characters that could be correctly identified during OCR. In one implementation, if the OCR rate is lower than an OCR minimum threshold 5C-18 (e.g., less than 70% of the characters are illegible), the ImageInspector may reject the image. Otherwise, the ImageInspector may proceed with other layers of inspection, and/or extract deposit information from the OCR.

In a further implementation, the hierarchical image quality assessment procedure described in FIG. 5C may adopt conditional thresholds at different assessment stages. For example, at the first stage for contrast level evaluation, e.g., at 5C-02, the ImageInspector may determine whether the image has a good contrast (e.g., contrast ratio<0.03), or a medium range acceptable contrast (e.g., contrast ratio between 0.03 and 0.15). The thresholds at the next stage, e.g., the MICR OCR thresholds may be determined based on the different contrast levels. For example, if the image has good contrast, the ImageInspector may adopt a 70% MICR OCR pass rate; but if the image has medium range contrast, the ImageInspector may apply stricter MICR OCR pass rate to ensure readability, e.g., an 80% MICR OCR readability threshold, etc.

FIG. 5D provides a logic flow diagram illustrating heuristics-based a image quality analysis within embodiments of the ImageInspector. In one embodiment, upon receiving an image from a depositor device, the ImageInspector may analyze image properties of the received image 5D-20 and determine a type of the image source 5D-22. In one implementation, the ImageInspector may obtain metadata associated with the received digital image which may indicate the size, resolution of the image, and/or the image capture device which captured the image. For example, an image captured by a digital camera may comprise EXIF information indicating information such as, but not limited to a timestamp when the image is taken, the make and model of the camera, type of the lens, and/or the like. For example, an example XML record of the image metadata of a digital image captured by a digital camera may take a form similar to the following:

```
<Image>
<Name> DSC0000567</Name>
<Format> JPEG </Format>
<Size> 2,635,012 bytes </Size>
<TimeStamp> 19:33:23 06-03-2000 </TimeStamp>
<Dimension>
    <Width> 1024 </Width>
    <Height> 768 </Height>
</Dimension>
<Source> Canon EOS 500D </Source>
<ShootingMode> Aperture AE </ShootingMOde>
<ShutterSpeed> 1/500 </ShutterSpeed>
<ApertureValue> 6.3 </ApertureValue>
<ISOSpeed> 200 </ISOSpeed>
<Lens> EF-S55-250 mmf </Lens>
<ImageQuality> Fine </ImageQuality>
<Flash> off </Flash>
<WhiteBalance> Auto </WhiteBalance>
...
</Image>
```

In an alternative embodiment, if the metadata does not indicate the source a type of the image, the ImageInspector may determine the type of the image source 5D-22 based on heuristics. For example, a scanned image and an image taken by a cellular phone camera may differ in resolution, size, dimension, contrast, and/or the like. The ImageInspector may retrieve heuristics of different types of images 5D-25, and compare the properties of the received image with the heuristics. For example, if heuristics indicate the size of a mobile image is generally less than 1 megabyte, then a received image at 3 megabytes in size may not be a mobile image, but a scanner image and/or a camera photo instead. For another example, if the heuristics may indicate scanner images and mobile images may have different contrast level ranges, as the scanning bed may create a contrast background to the physical check, which may result in better contrast. In that case, the ImageInspector may determine the contrast of the received image, and if it falls in the range of a regular scanner image, the ImageInspector may proceed as if the image is a scanned image. For another example, images taken by a mobile phone may be less blurred than images generated by a video camera and/or a webcam, as a user who takes images by a mobile phone may place a paper check in a stationary position before capturing the image, but for video and/or webcam image capturing, the user may manually hold the paper check to the camera, which may incur blurred images due to shaking hands. For another example, images generated from video streaming frames, e.g., video camera, webcams, etc., may be more blurred due to the shake when a depositor hold a paper check up to a video camera.

In one embodiment, the ImageInspector may determine a hierarchical analysis for the determined image type 5D-26. In one implementation, the hierarchical image assessment as illustrated in FIG. 5C may be designed based on the type of the image. For example, if the image is a scanned image 5D-30, the ImageInspector may determine an image assessment procedure for scanned imaged 5D-31, which may depend on thresholds obtained from heuristics from previously processed scanned images 5D-40.

Figure 7A:
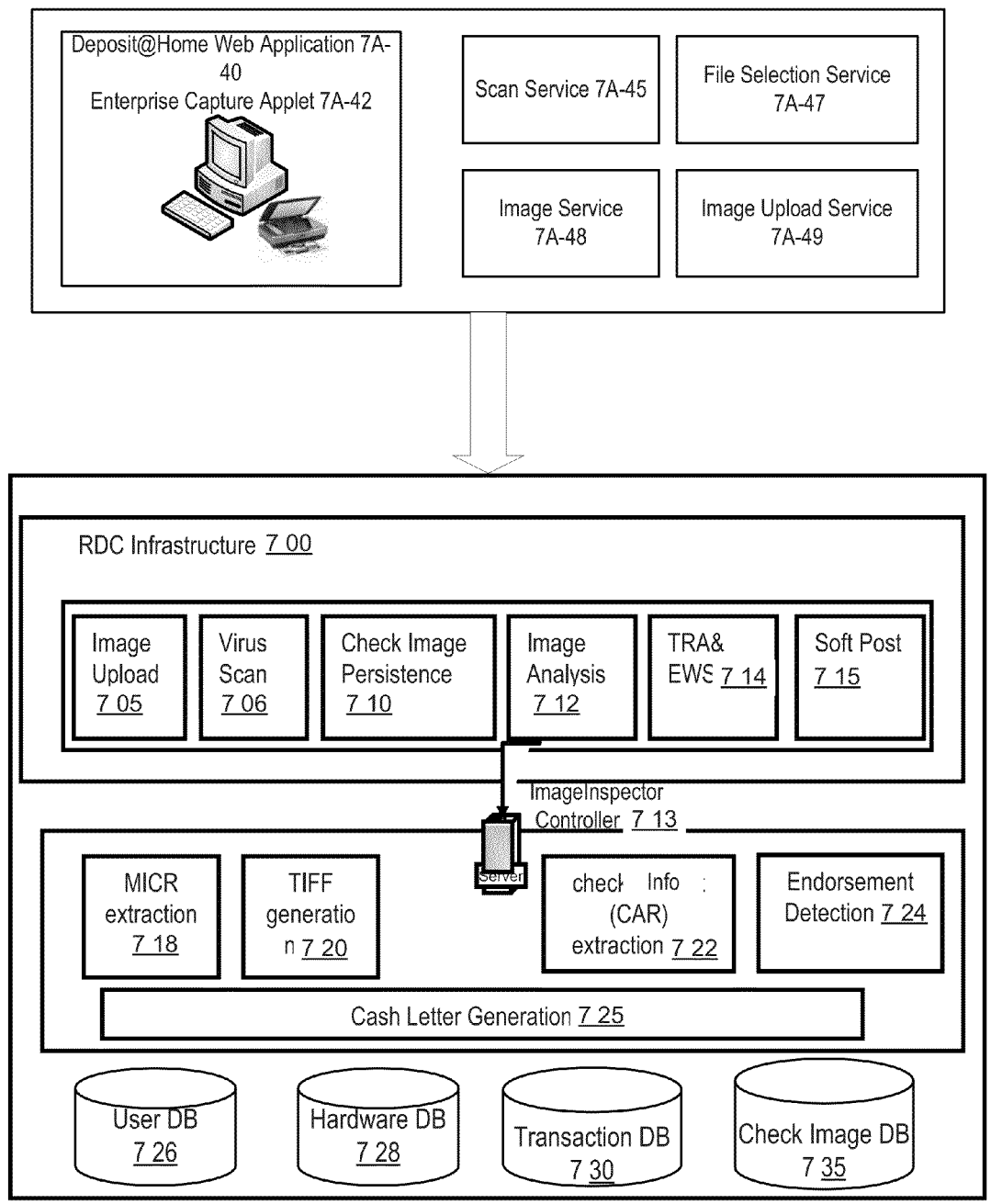
FIGS. 7A-7C provide diagrams of example infrastructures of the ImageInspector system for home deposit, mobile deposit, kiosk/ATM/Retail deposit in one embodiment of the ImageInspector.
Figure 7B:
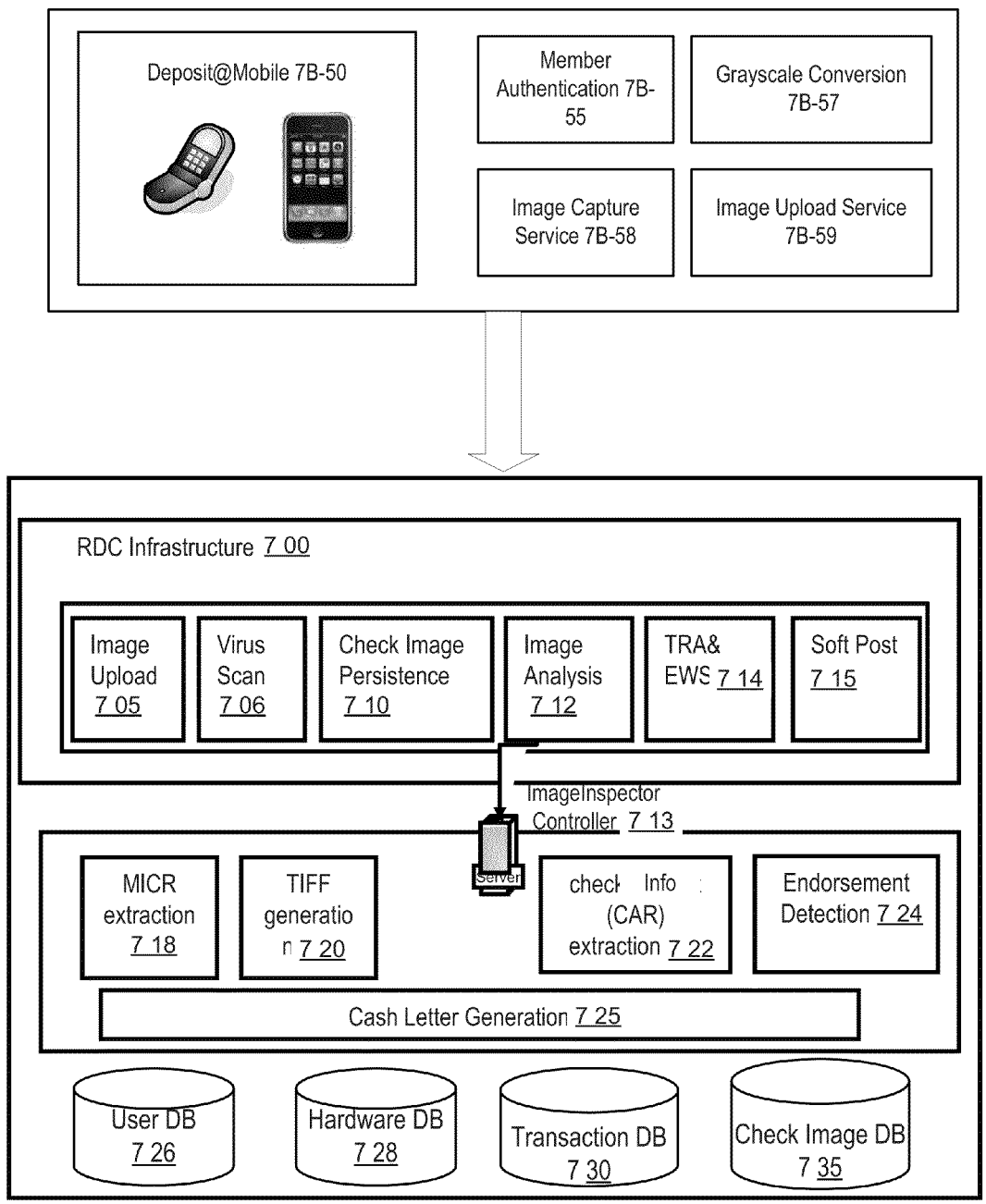

For another example, if the image is a mobile image 5D-32, the ImageInspector may determine an image assessment procedure for mobile images 5D-37, which may assess disorientations, skewness of the check image, as illustrated in FIGS. 7a-7B, as an image captured by a cellular phone, smart phone and/or the like may be disoriented, have a trapezoidal shape, and/or the like.

For another example, if the image is a photo taken by a camera 5D-36, the ImageInspector may determine an image assessment procedure for camera images 5D-37. Similar to mobile images, camera images may be assessed including its disorientations, skewness, and/or the like.

In another implementation, if the image is taken from a Video camera 5D-42, e.g., a frame grabbed from video streaming, the ImageInspector may determine an image assessment procedure for video grab images 5D-46. For example, an image generated from video streaming may have reduced resolution due to the constrained video streaming quality; and may be blurred due to the motion of the video camera. In one implementation, the ImageInspector may assess a blur level, skewness, resolution, contrast level, and/or the like of the check image.

In another implementation, if the image is taken from a Webcam 5D-43, the ImageInspector may determine an image assessment procedure for webcam images 5D-48. For example, an image taken by a webcam may be blurred, skewed, and/or the like, as a user may need to hold a check up to a webcam, which may result in a blurred image due to the user's shaking or unstable positions. In one implementation, the ImageInspector may assess a blur level, skewness, contrast level, and/or the like of the check image.

In one implementation, if the ImageInspector determines the received image is of a new type, e.g., an image captured by a webcam, wherein heuristic data of past processing may not exist, the ImageInspector may process the new image type 5D-40. For example, the ImageInspector may assess the received image via a default hierarchical structure, as illustrated in one example in FIG. 4F.

Additional Embodiments of ImageInspector

Further embodiments of the ImageInspector may be applied as described is below in compliance with those discussed in FIGS. 6A-22.

FIG. 6A is a block diagram further illustrating data flows within entities of the ImageInspector system. In various embodiments, a user 6A-33 may initiate a deposit request 6A-01a/6A-01b on a client device, such as a personal computer 6A-33a connected to a web camera, a digital camera, a scanner and/or the like, a mobile phone (e.g., an Apple iPhone) 6A-33b, and/or the like. In one embodiment, a deposit request message 6A-02a/6A-02b may be sent from the client device 6A-33a/6A-33b to the payee's bank 6A-65 via the communication network 6A-6A-3, and the bank server 6A-65 may deliver a RDC processing component 6A-03a/6A-03b to the client device 6A-33a/6A-33b. For example, the RDC processing component may be Java applets downloaded from a remote deposit web site hosted by the ImageInspector platform.

The client device 6A-33a/6A-33b may then generate a check capture image 6A-04a/6A-04b via camera, scanner, web camera, mobile phone, etc., under control of the RDC processing component 6A-03a/6A-03b running on the personal a computer 6A-33a and/or the mobile phone 6A-33b, and generate a check deposit message 6A-05a/6A-05b. For example, the check deposit message 6A-05a/6A-05b may comprise the captured check image 6A-04a/6A-04b, and any check deposit metadata, such as user entered deposit amount, user account number, and/or the like.

In one implementation, the payee's bank 6A-65 may process the received check message 6A-05a/6A-05b to generate a deposit check message 6A-06 for the clearinghouse 6A-66 and payor's bank 6A-67. Upon clearing the check, the payee's bank 6A-65 may receive deposit confirmation message 6A-03 from the payor's bank for amount withdrawal confirmation from the payor's account, and a confirmation message 6A-07 from the clearinghouse 6A-66 for check clearance confirmation.

ImageInspector Block View

FIG. 6B is of a block diagram illustrating an overview of an implementation of data flows between a ImageInspector system and affiliated entities in embodiments of the ImageInspector. In FIG. 6B, a user (or users) 6B-05 operating different depositing devices 6B-06-6B-09, a ImageInspector platform 6B-20, a ImageInspector database 6B-6B-9, a payer's bank 6B-65, a payee's bank 6B-60 and a system administrator 6B-40 are shown to interact via a communication network 6B-13.

In one embodiment, the user 6B-05 may be a payee who may deposit a check into an account at the payee's bank 6B-60 by converting the check into electronic data (e.g., digital check images, etc.) and sending the data to the bank via a communication network 6B-13. In one implementation, secured transport protocol such as SSL, and/or the like may be employed for the communication between the user a 6B-05 and the ImageInspector platform 6B-20. In one embodiment, the user 6B-05 may deposit the check on different occasions and through a variety of different devices and technologies of generating electronic check data. For example, in one implementation, the user 6B-05 may deposit the check at home 6B-06 by obtaining a check image via an image capture device (e.g., a camera, a scanner, etc.) controlled by a home computer. In another implementation, the user 6B-05 may use a mobile device with a built-in camera (e.g., iPhone, BlackBerry, etc.) to take a picture of the check. In another implementation, the user 6B-05 may deposit the check at a retail Point of Sale (POS) terminal 6B-08, a kiosk or a Check 26B-ATM 6B-09, etc. by submitting the paper check to the deposit facility to generate images of the check for deposit. In a further implementation, the user 6B-05 may take live video of the check via a device with built-in video camera (e.g., Apple iPhone, etc.) and send the video clip of the check to the ImageInspector platform 6B-20.

In one embodiment, the electronic data sent from the user 6B-05 may include extracted data information from the check. For example, in one implementation, the user 6B-05 may use a Magnetic Ink Character Recognition (MICR) device to scan and translate the MICR information (e.g., account number, routing number, check number, etc.) located on the check and transmit the data to the ImageInspector platform 6B-20 along with digital image files or video clip files of the check. In one implementation, the electronic data may include a user entered value indicating an amount to be deposited, and/or other user submitted information.

The ImageInspector facilitates connections through the communication network 6B-13 based on a broad range of protocols that include WiFi, Bluetooth, 3G cellular, Ethernet, ATM, and/or the like. In one embodiment, the communication network 6B-6B-3 may be the Internet, a Wide Area Network (WAN), a public switched telephone network (PSTN), a cellular network, a voice over internet protocol (VoIP) network, a Local Area Network (LAN), a Peer-to-Peer (P2P) connection, an ATM network and/or the like. In one implementation, the user 6B-05 may communicate with financial institutions 6B-25 by phone, email, instant messaging, facsimile, and/or the like.

In one embodiment, the financial institutions 6B-25 may be any type of entity capable of processing a transaction involving a check deposit. For example, the financial institution 6B-25 may be a retail bank, investment bank, investment company, regional branch of the Federal Reserve, clearinghouse bank, correspondent bank, and/or the like. In one embodiment, the financial institution 6B-25 may include a ImageInspector platform 6B-20, the payee's bank 6B-60 and the payer's bank 6B-65. In one implementation, the ImageInspector platform 6B-20 may be housed within the payee's bank 6B-60 as a built-in facility of the payee's bank for processing remote check deposits. In another implementation, the ImageInspector platform 6B-20 may be associated with an entity outside the payee's bank, as a remote deposit service provider.

In one embodiment, the ImageInspector platform 6B-20 may receive and process electronic data of deposit information from the user 6B-05 via the communication network. For example, in one implementation, the ImageInspector platform 6B-20 may generate check image in compliance with deposit formats (e.g., a Check 21 compliant check image file, a X9.37 cash letter check image, and/or the like), based on the received electronic data from the user 6B-05. In one implementation, the ImageInspector platform may analyze metadata associated with the received check image/video files such as GPS information, time stamp of image capture, IP address, MAC address, system identifier (for retail POS/kiosk deposits) and/or the like.

In one implementation, upon receipt and approval of the electronic deposit data, the payee's bank 6B-60 may credit the corresponding funds to the payee's account. In one implementation, the ImageInspector platform 6B-20 may clear the check by presenting the electronic check information to an intermediary bank 6B-70, is such as a regional branch of the Federal Reserve, a correspondent bank and/or a clearinghouse bank. In one embodiment, the payer's account at the payer's bank 6B-65 may be debited the corresponding funds.

In one embodiment, the ImageInspector entities such as the ImageInspector platform 6B-20, and/or the like, may also communicate with a ImageInspector database 6B-19. In some embodiments, distributed ImageInspector databases may be integrated in-house with the ImageInspector platform 6B-20, and/or the payee's bank 6B-60. In other embodiments, the ImageInspector entities may access a remote ImageInspector database 6B-6B-9 via the communication network 6B-6B-3. In one embodiment, the ImageInspector entities may send data to the database 6B-19 for storage, such as, but not limited to user account information, application data, transaction data, check image data, user device data, and/or the like.

In one embodiment, the ImageInspector database 6B-19 may be one or more online database connected to a variety of vendors and financial institutions, such as hardware vendors (e.g., Apple Inc., Nokia, Sony Ericsson, etc.), deposit banks (e.g., Bank of America, Wells Fargo, etc.), service vendors (e.g., clearinghouse banks, etc.) and/or the like, and obtain updated hardware driver information, software updates from such vendors. In one embodiment, the ImageInspector platform 6B-20 may constantly, intermittently, and/or periodically download updates, such as updated user profile, updated software programs, updated command instructions, and/or the like, from the ImageInspector database 6B-19 via a variety of connection protocols, such as Telnet FTP, HTITP transfer, P2P transmission and/or the like.

In one embodiment, a system administrator 6B-40 may communicate with the ImageInspector entities for regular maintenance, service failure, system updates, database renewal, security surveillance and/or the like via the communication network 6B-13. For example, in one implementation, the system administrator 6B-40 may be a system manager at the payee's bank, who may directly operate with the ImageInspector platform 6B-20 via a user interface to configure system settings, inspect system operations, and/or the like.

Figure 6C:
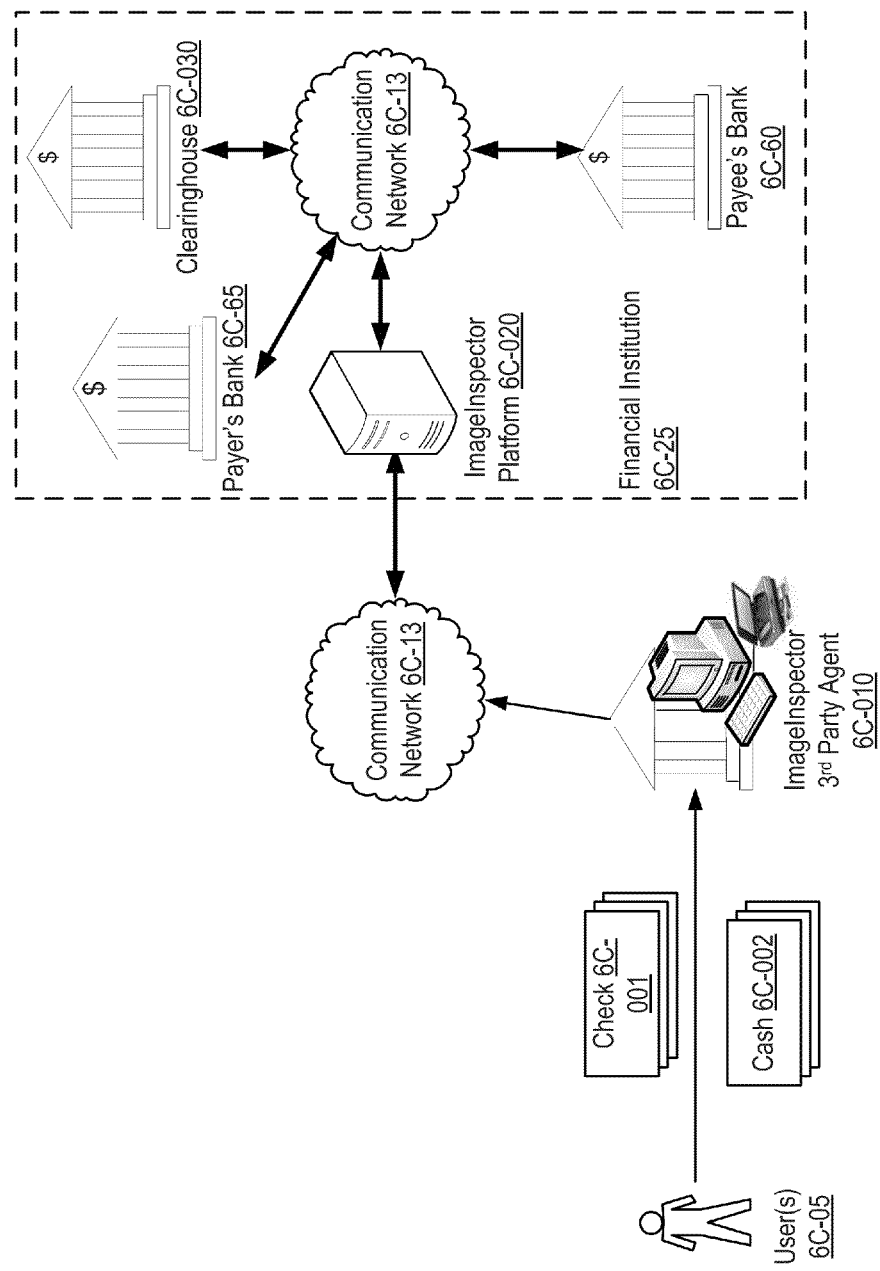

FIG. 6C is a block diagram illustrating ImageInspector data flows for third party deposit in an alternative embodiment of the ImageInspector. In one embodiment, a user 6C-05 may deposit a check tool or cash 6C-002 into his bank account at a third party agent 1010. For example, in one implementation, the user 6C-105 may deposit at a ImageInspector participating store, such as a convenience store, a book store, a grocery store, a gas station, and/or the like. In another example, the user 105 may present a check or cash to a mailing service agent for deposit, such as, but not limited to UPS®, Fedex® and/or the like. Also, the third party agent may be a remote deposit terminal such as an automatic teller machine, point of sale deposit service terminal, and/or the like.

In one implementation, the ImageInspector third party agent 6C-010 may be equipped with an ImageInspector facility, such as a card reader, check scanner, and/or the like, so that a user may swipe the check for scanning. In another implementation, the ImageInspector third party agent may generate check images for deposit with a general purpose computer and image capture device, such as a flatbed scanner, a camera, a facsimile machine, a webcam, and/or the like.

In one embodiment, the ImageInspector third party agent 6C-010 may send deposit requests and deposit information to the financial institution 6C-25 via the communication network 6C-13. An ImageInspector platform 6C-020 may communicate with the ImageInspector third party agent 6C-010 to process the deposit request. In one implementation, the ImageInspector platform 6C-020 may be housed within the payee's bank 6C-60. In an alternative implementation, the ImageInspector platform 6C-020 may be associated with an intermediate deposit service institute that is independent of the payee's bank, payer's bank and the clearinghouse bank 6C-030.

Figure 7C:
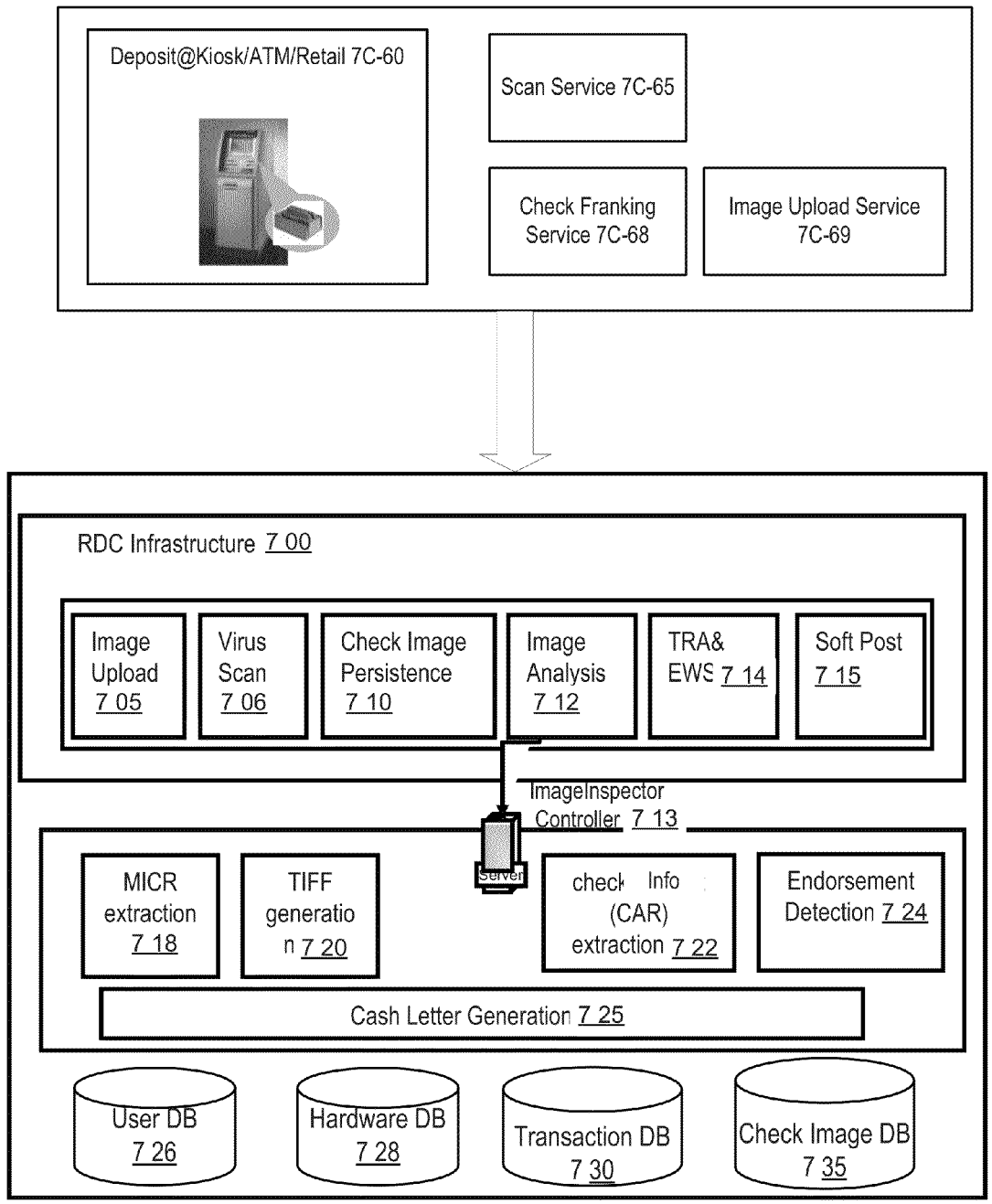

FIGS. 7A-C show diagrams of example infrastructures of the ImageInspector system for home deposit, mobile deposit, kiosk/ATM/Retail deposit in one embodiment of the ImageInspector. In some embodiments, as shown in FIGS. 2A-C, the ImageInspector infrastructure 700 may contain a number of functional modules and/or data stores. An ImageInspector controller 703 may serve a central role in some embodiments of ImageInspector operation, serving to orchestrate the reception, generation, modification, and distribution of data and/or instructions, to, from, and between ImageInspector modules and/or mediate communications with external entities and systems.

In one embodiment, the ImageInspector controller 703 may be housed separately from other modules and/or databases within the ImageInspector system, while in another embodiment, some or all of the other modules and/or databases may be housed within and/or configured as part of the ImageInspector controller. Further detail regarding implementations of ImageInspector controller operations, modules, and databases is provided below.

In the implementation illustrated in FIG. 7A, the ImageInspector controller 703 may be configured to couple to external entities via a user interface and a network interface. The user interface may, for example, receive and configure user control commands sent to/from the ImageInspector, secured user account information, user submitted configuration data, and/or the like. In one implementation, the user interface may include, but not limited to devices such as, keyboard(s), mouse, stylus(es), touch screen(s), digital display(s), and/or the like. In various implementations, the network interface may, for example, serve to configure data into application, transport, network, media access control, and/or physical layer formats in accordance with a network transmission protocol, such as, but is not limited to, FTP, TCP/IP, SMTP, Short Message Peer-to-Peer (SMPP) and/or the like. For example, the network interface 7100 may be configured for receipt and/or transmission of data to an external and/or network database. The network interface may further be configurable to implement and/or translate Wireless Application Protocol (WAP), VoIP and/or the like data formats and/or protocols. The network interface may further house one or more ports, jacks, antennas, and/or the like to facilitate wired and/or wireless communications with and/or within the ImageInspector system.

In one implementation, the ImageInspector controller 703 may further be coupled to a plurality of modules configured to implement ImageInspector functionality and/or services. The plurality of modules may, in one embodiment, be configurable to establish a secured communications channel with a remote image capture device and implement a remote deposit service application. In some embodiments, the remote deposit service application may obtain and analyze check images, and generate virtual checks (e.g., Check 21 X 9.37 cash letter files, etc.) for deposit. In one embodiment, the daemon application may comprise modules such as, but not limited to a Image Upload module 705, a Virus Scan module 206, a Check Image Persistence module 710, an Image Analysis module 712, a TRA & EWS Service module 714, a Soft Post module 715, a MICR Extraction module 718, a TIFF Generation module 720, a Check Information Extraction module 722, an Endorsement Detection 724, a Cash Letter Generation module 725, and/or the like.

In one embodiment, the Image Upload module 705 may establish a secured communications channel with a user image capture device and receive submitted check images. In one embodiment, the Image Upload module 705 may initialize an image upload application which may remotely control the image capture device to obtain and upload check images via the secured communications channel as will be further illustrated in FIGS. 4A-C. In one embodiment, the Image Upload module 705 may also receive streamed video and/or video files of checks. In one embodiment, the Virus Scan module 706 may inspect the received digital files to prevent, detect, and remove malware, including computer viruses, worms, trojan horses and/or the like. For example, in one implementation, the ImageInspector may a employ antivirus software such as, but not limited to McAfee VirusScan, Symantec AntiVirus Scan, and/or the like.

In one embodiment, the Check Image Persistence module 7100 may check the persistence of the received check image files. For example, in one implementation, the Check Image Persistence module 710 may check the image file format, file storage pattern, and/or the like. In one implementation, the Check Image Persistence module 710 may check the storage format of the metadata associated with the check image file.

In one embodiment, the Image Analysis module 712 may process the received check digital file, such as image usability and quality check, video frame image grab, and/or the like, as will be further illustrated in FIGS. 5 and 6A-H. In one embodiment, the TIFF Generation module 720 may convert a received color image to a grayscale image prior to image processing of module 712.

In one embodiment, the Magnetic Ink Character Recognition (MICR) Extraction module 718 may perform an optical character recognition (OCR) procedure on the processed check image and extract the MICR line on the check. Checks typically contain MICR information (e.g., routing number, account number and check number) on the bottom left-hand corner of the check. In one embodiment, the Check Information Extraction module 722 may perform an optical character recognition (OCR) procedure to extract information of the check, including the payee's name, the deposit amount, check number, and/or the like. In one embodiment, the Endorsement Detection module 724 may detect whether the check image contains a depositor's signature.

In another embodiment, the MICR information may consist of characters a written in a magnetic ink. The MICR information may be read electronically by passing the check through the MICR device, which may translate the characters by magnetizing the ink. If a user converts the check into electronic data by scanning the check using a MICR device, the MICR module may directly parse the information contained in the MICR data submitted by the user.

In one embodiment, the Soft Post module 715 may provisionally credit the payee's account with the deposit amount after processing the received check image. In one embodiment, the Cash Letter Generation module 725 may generate and submit an X9.37 cash letter check image file to a clearinghouse bank (e.g., a regional branch of the Federal Reserve Bank, etc.) to clear the transaction and/or implement representment check after the soft post, as will be further illustrated in FIGS. 8A-C.

In one implementation, the ImageInspector controller 703 may further be coupled to one or more databases configured to store and/or maintain ImageInspector data. A user database 726 may contain information pertaining to account information, contact information, profile information, identities of hardware devices, Customer Premise Equipments (CPEs), and/or the like associated with users, device configurations, system settings, and/or the like. A hardware database 728 may contain information pertaining to hardware devices with which the ImageInspector system may communicate, such as but not limited to Email servers, user telephony devices, CPEs, gateways, routers, user terminals, and/or the like. The hardware database 728 may specify transmission protocols, data formats, and/or the like suitable for communicating with hardware devices employed by any of a variety of ImageInspector affiliated entities. A transaction database 730 may contain data pertaining to check a deposit transactions. In one embodiment, the transaction database 730 may include fields such as, but not limited to: check deposit timestamp, payee's name, payee' bank name, account number, bank routing number, deposit amount, deposit method, deposit device, check image index, check clearance information, and/or the like. A check image database 735 may contain a repository of processed check images associated with a transaction.

The ImageInspector database may be implemented using various standard data-structures, such as an array, hash, (linked) list, struct, structured text file (e.g., XML), table, and/or the like. For example, in one embodiment, the XML for a transaction in the transaction database 725 may take a form similar to the following example:
<Transaction>
...
   <ID> MyTransaction1_0008 </ID>
   <Receive Time> 5/12/2009 11:30:00 </Receive Time>
   <Device_ID> iPhone 6HS8D </Device ID>
   <Payee_Name>
   Joe Dow
   </Payee_Name>
   <Payee_Bank> First Regional Bank </Payee_Bank>
<Deposit_amount> 1000.00 <Deposit_amount>
   <Post_Time> 5/12/2009 11:31:23 </Post_Time>
<Image_ID> MyImage3214232 </Image_ID>
   <Clearance_bank> Clearinghouse Bank </Clearance_bank>
<Deposit_status> confirmed </Deposit_status>
...
</Transaction>

In FIG. 7A, in one implementation, a home scanner or other home image capture device connected to a computer may be utilized for home deposit. In one embodiment, the home deposit may be implemented via a web application 7A-40 and/or an enterprise capture applet 7A-42 (if the depositor is an enterprise entity) embedded in a deposit website. For example, in one implementation, a user may visit a ImageInspector website to perform remote deposit. In one implementation, the deposit web service may include scan service 7A-45 to control the scanner to obtain images of a check, image service 7A-48 to allow a user to save and edit check image files, file selection service 7A-47 and image upload service 7A-49 to facilitate a user to select and upload a check image file and/or the like, as will be further illustrated in FIGS. 11A-11C.

In another embodiment, for mobile deposit 7B-50, as shown in FIG. 7B, a pre-installed RDC application on the mobile device, or the embedded RDC component of a website may control the mobile device to perform member authentication 7B-55, image capturing 7B-58, grayscale conversion 7B-57 of the check image, and image upload 7B-59. For example, in one implementation, the ImageInspector may prompt the mobile device user to login at the RDC website with a username and password. For another example, the ImageInspector may identify the user mobile device to authenticate the user as a member if the mobile device is registered for the RDC service.

In another embodiment, as shown in FIG. 7C, for kiosk/ATM/retail deposit 7C-60, the facility may provide scan service 7C-65, image upload service 7C-69 and check franking service 7C-68. For example, in one implementation, the deposit facility at the kiosk/ATM/retail may print "ELECTRONICALLY PRESENTED" across the front of the original check when the check is scanned to avoid representment of the check, and endorse the back of the check with deposit confirmation.

ImageInspector User-Server Flow Overview

Figure 8A:
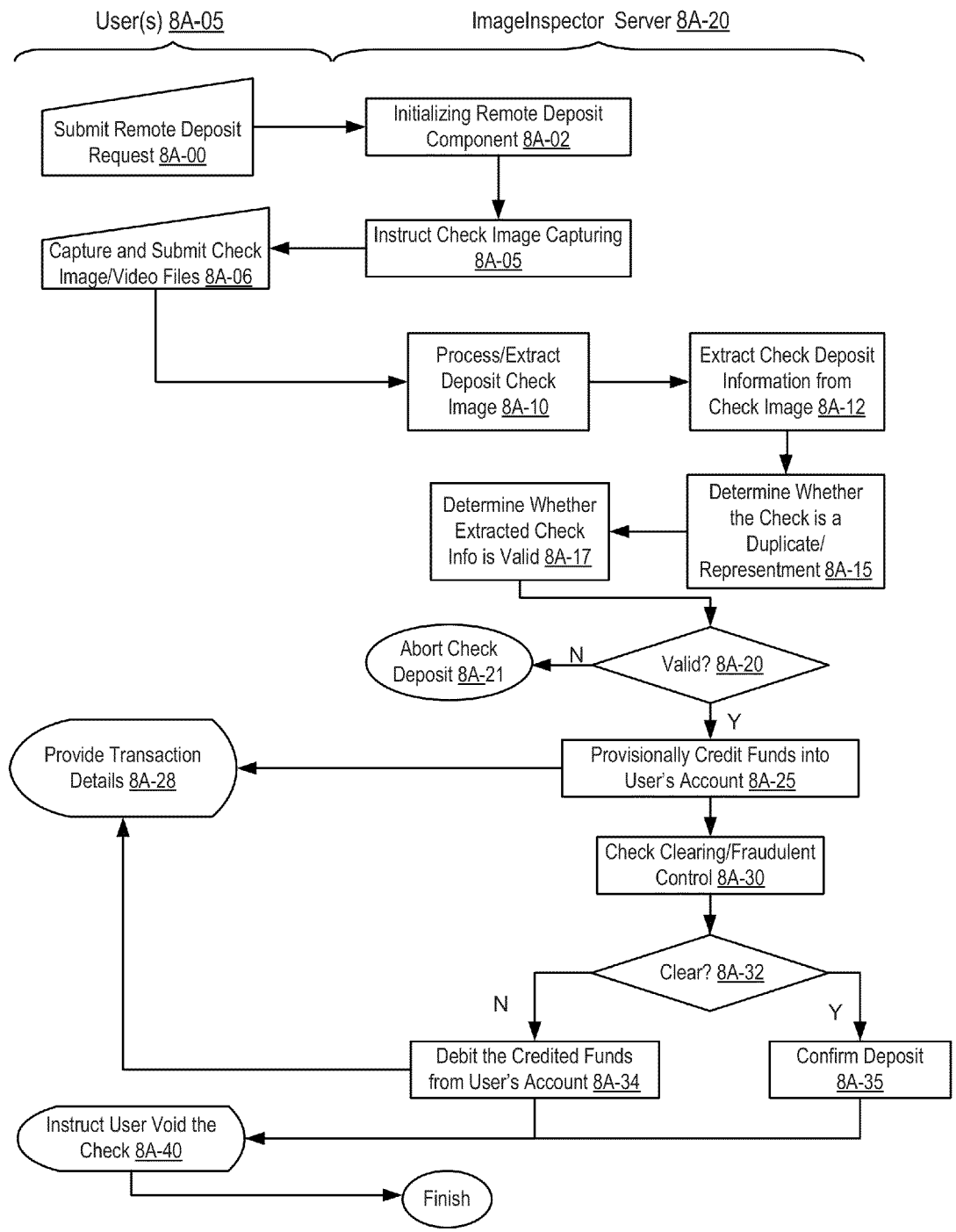
FIG. 8A-8D provide logic flow diagrams illustrating aspects of remote deposit of checks in one embodiment of the ImageInspector.

FIG. 8A is of a logic flow diagram illustrating aspects of remote a deposit of checks in one embodiment of the ImageInspector. In FIG. 8A, a user may submit a remote deposit request 8A-00. For example, in one embodiment, the ImageInspector may operate a web site which guides a user through the process of collecting images of a check to be deposited. In some implementations, the web site may facilitate a browser-executable component (e.g., applets, scripts, etc.), that drives the process of collecting images. In one implementation, a user may visit a website controlled by the ImageInspector via a web browser on the user's home computer and is submit a request for remote deposit via the user interface of the webpage.

In another embodiment, for kiosk/ATM/retail deposit, a user may be instructed from an ATM/kiosk screen to place or insert the check into a check deposit slip for scanning, and/or the like.

In another embodiment, for mobile deposit, a user operating a mobile device may access the ImageInspector website via the mobile device, or may launch a ImageInspector component pre-installed on the mobile device and connect to the ImageInspector platform to submit deposit requests via the ImageInspector component.

In one embodiment, in response to the user request, the ImageInspector platform may initialize a remote deposit component 8A-02. For example, in one implementation, the ImageInspector may retrieve and load a user interface page for remote deposit. In one embodiment, the ImageInspector may instruct the user to capture and submit an image or video streaming of the check 8A-05-8A-06, as will be further illustrated in FIGS. 4A-C and 5B-C. In one implementation, the initialized remote deposit component may authenticate the user by prompting the user to login a remote deposit system with a user name and password if the user is an existing member of the ImageInspector. For example, in one implementation, a remote depositor may access a remote deposit service website, and submit a request by clicking on a "deposit" button on the webpage. The ImageInspector may then lead to a login webpage, prompting the depositor to login to the remote deposit service with a user name and password.

For another example, for mobile deposit via a mobile device, the user may is launch a "remote deposit" application on a menu of the mobile device to send a request for mobile deposit (e.g., via SMS, etc.), and the ImageInspector may determine whether the mobile device has been registered based on its physical address (MAC address). In a further implementation, the ImageInspector may instruct the user to submit biometrics information for authentication. For example, if the user is operating a video camera, video files and/or live video streaming of the user may be transmitted to the ImageInspector to authenticate the user by face recognition procedures.

In one embodiment, the ImageInspector may process the received check image or video file 8A-10 (as will be further illustrated in FIGS. 6A-H). For example, in one implementation, the ImageInspector may process the received check image or video file to generate an enhanced digital check image in order to extract deposit information, and convert the check image to an image file format in compliance of virtual check standard (e.g., X9.37 cash letter image files, etc.). In one embodiment, the ImageInspector may extract check deposit information from the processed check image 8A-12. For example, in one implementation, an Optical Character Recognition (OCR) procedure may be applied to the enhanced check image and extract information such as the amount of deposit, the account number, banking routing number, payee's name, deposit date, endorsement, the magnetic ink character recognition (MICR) line which contains information of the account number of bank routing number, and/or the like. In another implementation, the ImageInspector may analyze any metadata and additional submitted information associated with the check image, such as GPS information if image is submitted by a GPS enabled mobile device, time stamp of image capture, IP address of the image capture device, MAC address, system identifier (for retail POS/kiosk deposits), manually entered deposit amount, user identification (such as account name and password) and/or the like.

In one implementation, the ImageInspector may determine the check is a duplicate or representment 8A-15, (as will be further illustrated in FIG. 8). In one implementation, the ImageInspector may perform the representment inspection at a payee's bank prior to provisional deposit 8A-25. In another implementation, the ImageInspector may send deposit data to an external agency for representment service In one embodiment, the ImageInspector may verify the check image based on the extracted information, e.g., determining whether the extracted check information is valid 8A-17. For example, in one implementation, the extracted information from the check image may be compared with the user submitted deposit information, e.g., payee's name, deposit amount, etc. For another example, the ImageInspector may check if a proper endorsement is contained on the back side of the check image.

In one embodiment, if the check is not valid 8A-20, the bank may reject the check image and abort check deposit 8A-21. In another embodiment, if the check is a valid, the ImageInspector may provisionally credit the indicated amount of funds into the user's amount 8A-25. For example, in one implementation, the ImageInspector may post the deposit to the payee's bank, and the payee's bank may provisionally credit the deposit amount to the payee's account.

Figure 8B:
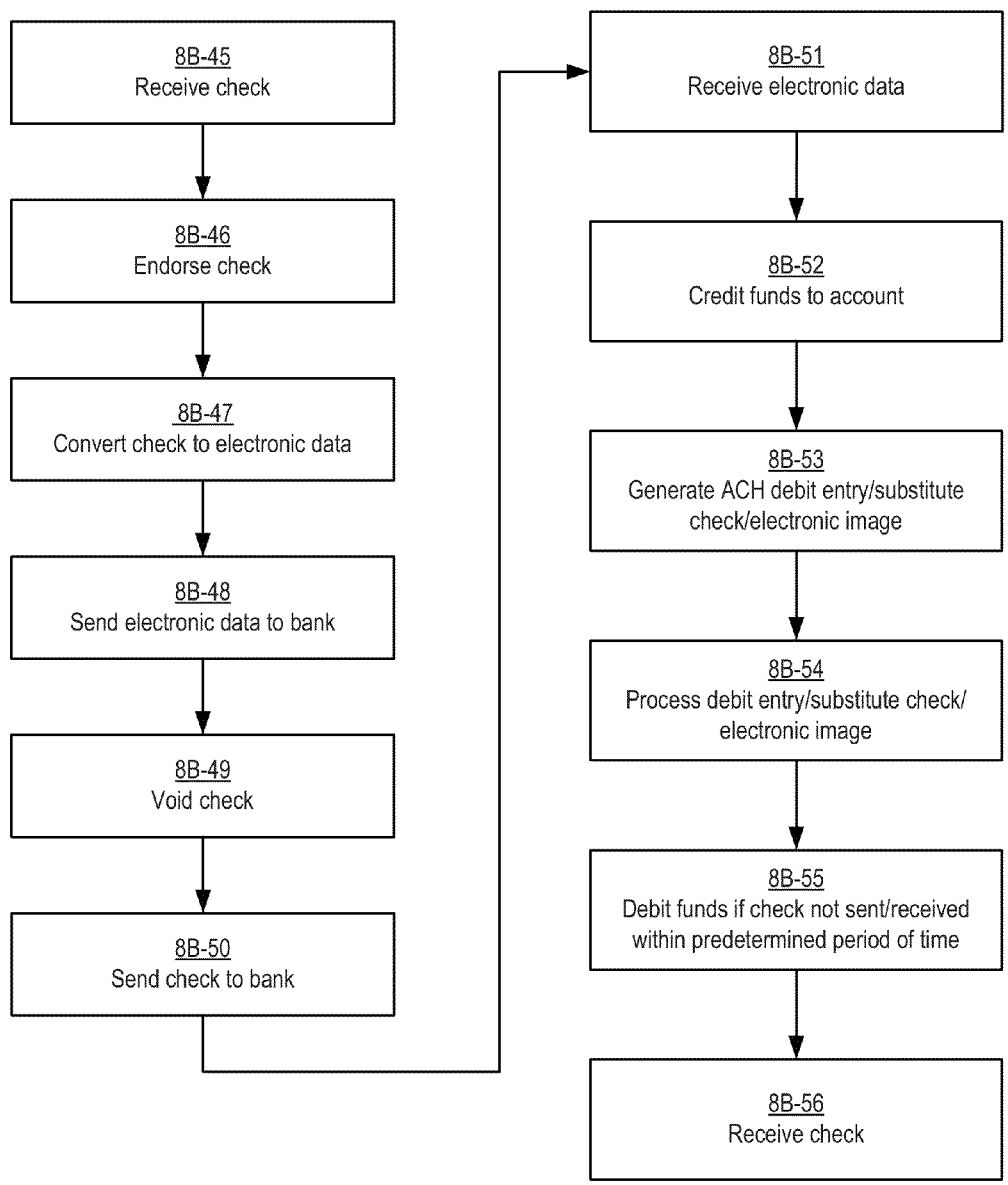

In one embodiment, the ImageInspector may perform a check clearing procedure to control fraudulent items 8A-30, as will be further illustrated in FIG. 8B. For example, the ImageInspector may send x9-37 cash letter check images to a regional branch of the Federal Reserve, a correspondent bank, a clearinghouse bank and/or the like to clear the check. If the ImageInspector receives a positive result of the check clearing 8A-32, the deposited credit may be confirmed 8A-35. Otherwise, the provisionally credited funds may be deducted from the payee's account 8A-34, and the transaction details may be provided to the user 8A-28.

In an alternative embodiment, the bank may process the ACH debit entry, substitute check, and/or electronic image. As noted above, the bank may present the ACH debit entry to an ACH service provider (e.g., EPN), which may be responsible for settling the transaction between the payee's bank and the payer's bank. The bank also may convert the digital image into a substitute check and present the substitute check to an intermediary bank (e.g., a regional branch of the Federal Reserve) to complete the check clearing process. In one implementation, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the a financial institution may void the provisional credit (e.g., withdraw funds from the account).

In one embodiment, upon completion of the deposit, the ImageInspector may further instruct the user to void the physical check 8A-40 to avoid representment. For example, in one embodiment, the ImageInspector may instruct the user to place the physical check to certain equipment such that a stimulus may be applied to the physical check to permanently modify the check as "void". For another example, if the deposit takes place at a kiosk or ATM, the deposit facility may print "ELECTRONICALLY PRESENTED" across the front of the original check when the check is scanned by equipment designed to convert the check to an electronic image for further processing. For another example, the physical check may contain a radio frequency identification (RFID) tag. When the RFID tag receives a particular radio signal, the RFID tag may be modified as "void". For further examples, if the physical checks contain tags sensitive to heat, the check may be voided by the heat generated by the application of a bright light source, such as one that may be found in a scanner.

In another implementation, the ImageInspector may void the physical check by MICR line destruction. For example, the ImageInspector may punch holes on the MICR line printed on the paper check. In one implementation, the punch mechanism may comprise a roller placed with the image capture device, e.g., inside a scanner, etc., and may be positioned to coincide with the placement to the MICR characters on the check item inserted into the scanner. The roller may comprise a spindle with several sharp protrusions (e.g., conical) on its sides, wherein the height of the spindle may be equal to or around the height of the MICR characters. In one implementation, the remote processing component running on the depositor device, e.g., the depositor's computer, Apple iPhone, and/or the like, may control the roller to enable or disable it against the paper check inserted in the scanner, e.g., to punch holes on the check. In one implementation, when the roller is enabled by the remote processing component, the roller may rotate around its central axis to progressively punch holes along the MICR line of the paper check fed into the scanner, which may permanently distort or destroy the MICR characters. In a further implementation, the sharp protrusions on the side of the roller may be shaped to form a specific punch character, such as an "X" shape, a "#" shape, and/or the like. The design of the punch character may adopt standardized E13B fonts and/or other international MICR fonts so that it will be recognized by a financial institution as a MICR destruction symbol.

For another example, the ImageInspector may utilize a magnetic ink spray to chemically destroy the MICR line, which may be printed using on the paper check in a magnetic ink or toner containing iron oxide. In one implementation, a magnetic ink sprayer may be placed in the scanner used to capture images of the check. For example, the sprayer may be included in a printer cartridge with a rectangular slit, wherein the slit has the length to at least cover the height of the MICR characters. When the sprayer is enabled, the magnetic ink sprays out of the slit which generates a magnetic rectangle of the height of MICR line characters. Thus when the paper check is fed into the scanner, the magnetic sprayer may generate a line of magnetic rectangles to cover the original MICR characters. In a further implementation, similar to the punch characters as previously discussed, the split of the sprayer may be designed to form a specific magnetic character, which may represent a 'MICR disabled character' instead of being a rectangle slit, and standardized E13B fonts and other international MICR fonts may be adopted.

In one embodiment, the ImageInspector may allow the user to manually start the MICR destruction mechanism. For example, a user may press a button to initiate the roller puncher, or the magnetic sprayer, after confirming a soft post status notification is received to ensure the check deposit has been processed. For another example, the ImageInspector may remotely control the image capture device (e.g., the scanner) via the remote processing component to automatically start the MICR destruction when the check deposit has been processed. In one implementation, once the MICR destruction is launched, instructions programmed and stored with the MICR destruction mechanism (e.g., stored in an EPROM memory of the scanner, etc.) may execute commands including, placing the coordinates of the starting punch or spray, performing the punching or spraying within the pre-programmed time frame, stopping the punching or spraying when the pre-programmed time frame is reached. In a further implementation, the length of the punching or spraying time frame may be programmable, and configurable by a user via the remote processing component.

In an alternative implementation, the ImageInspector may instruct the user to physically destroy the check and submit digital evidence of check detriment. For example, the user may tear the check, capture an image of the torn check pieces, and submit the captured image to the ImageInspector for verification, as shown in FIG. 11H. For another example, if the user operates a video camera, the user may submit live video streaming, and/or a video file, showing the deposited paper check being destroyed.

In one embodiment, the ImageInspector may create a record of the a deposited check and store the deposited check record in a repository to prevent check re-presentment. For example, in one implementation, the ImageInspector may store an image of the check associated with extracted information, such as payee's name, deposit date, bank name, MICR information including the bank routing number and account number, and/or the like. In another implementation, the ImageInspector may create a record of the check based on a portion of the check image which may be unique to represent the check. For example, in one implementation, the created check record may only include an image of the front side of a check.

Alternative Embodiments of ImageInspector
User-Server Flow Overview

Figure 8C:
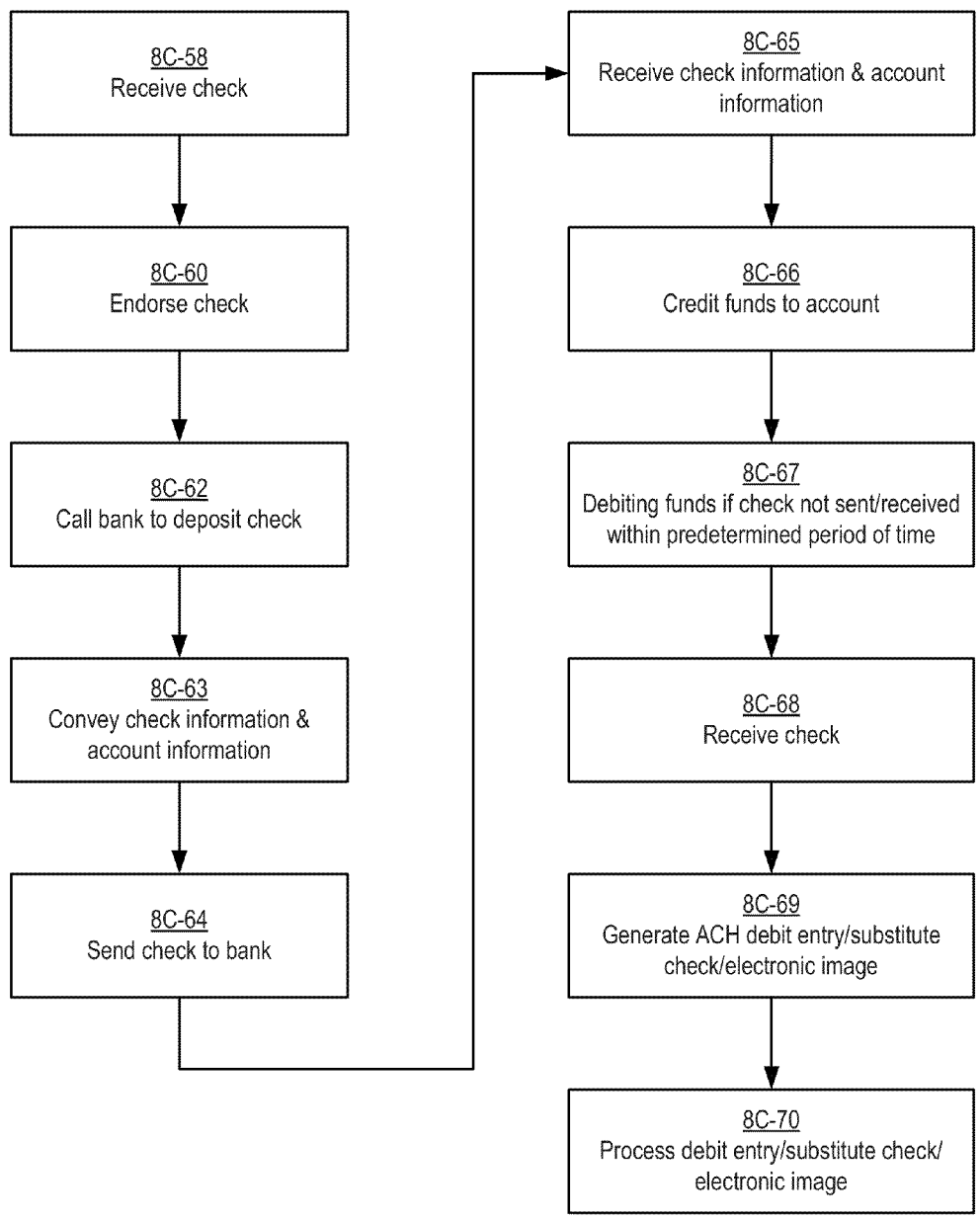

FIGS. 8B-8C provide logic flow diagrams illustrating aspects of remote deposit of checks in alternative embodiments of the ImageInspector.

FIG. 8B is a flow diagram illustrating an example method of remotely depositing checks. As shown in FIG. 8B, at 8B-45, an account owner (i.e., the payee) may receive a check from a third party (i.e., the payer). At 8B-46, the payee may endorse the check by signing the back of the check in the designated field. If the payee wishes to deposit the check into an account, such as a savings and/or checking account, the payee also may write an account number below the signature.

At 8B-47, the payee may convert the check into electronic data. This may be accomplished in any number of ways. For example, the payee may create a digital image of the first side of the check, the second side of the check, or both. The digital image may be created using a general purpose flatbed scanner, digital camera, photocopier, fax machine, and the like.

The payee also may convert the check into electronic data by scanning the a check using a Magnetic Ink Character Recognition (MICR) device. Checks typically contain MICR information (e.g., routing number, account number and check number) on the bottom left-hand corner of the check. The MICR information usually consists of characters written in a magnetic ink. The MICR information may be read electronically by passing the check through the MICR device, which may translate the characters by magnetizing the ink As shown in FIG. 8B, at 8B-48, the payee may send the electronic data to a bank that is associated with an account for depositing funds. Any means for transmitting electronic data over a communications network is consistent with an embodiment. For example, if the payee creates a digital image of the check, the image may be sent to the bank by attaching the image to an email. If the electronic data is in the form of MICR information captured by a MICR device, the device may have an output component for transmitting the electronic data to the bank over the communications network. In addition, the electronic data may include information pertaining to the account for depositing funds, such as the account number and/or the name on the account. The account number may appear on the check itself, below the signature endorsing the check. The account number and/or name on the account also may appear in an email, either with or without the digital image, for example.

At 8B-49, the payee may void the check. For example, the payee may write and/or stamp "void" on the check. At 8B-50, the payee may send the check to the financial institution associated with the account for depositing funds. The check may be sent via a common carrier, such as the United States Post Office, FedEx®, United Parcel Service®, and the like. The process may then proceed to 8B-50. It will appreciated that 8B-49 and 8B-50 may be performed to provide additional security features. For example, by removing the check from circulation, it may be less likely that the check will be deposited more than once.

At 8B-51, the bank may receive the electronic data representative of the check along with information pertaining to the account for depositing funds. At 8B-52, the bank may credit funds to the account. The credit may be a provisional credit, enabling the payee to access the funds while the check is being cleared. A provisional credit may be voided if the bank determines that the transaction is erroneous and/or fraudulent.

At 8B-53, the bank may generate an Automated Clearinghouse (ACH) debit entry, substitute check, and/or electronic image. ACH transactions typically include payment instructions to debit and/or credit an account. Banks often employ ACH service providers to settle ACH transactions. Examples of ACH service providers include regional branches of the Federal Reserve and the Electronic Payments Network (EPN). In an embodiment, a payee may receive a check in return for the sale of goods, such as a used car, for example. The payee may endorse the check and/or send electronic data representative of the check to the payee's bank, which may be referred to as the originating depository financial institution (ODFI). As noted above, the electronic data may be generated in any number of ways. For example, the payee may use a MICR device to scan and translate the MICR information (e.g., account number, routing number, check number, etc.)

located on the check and transmit the data to the payee's bank along with information pertaining to the account for depositing funds. Upon receipt of the MICR information and account information, the payee's bank may a credit funds to the payee's account and generate an ACH debit entry to the payer's account, which may be presented to the ACH service provider for processing.

The ACH service provider may process the debit entry by identifying the account and bank from which the check is drawn. The bank from which the check is drawn (i.e., the payer's bank) may be referred to as a receiving depository financial institution (RDFI). If the payer's bank verifies the transaction, the ACH service provider may settle the transaction by debiting the payer's bank and crediting the is payee's bank. The payer's bank may then debit the payer's account.

A substitute check is typically a paper reproduction of an original check and may be the legal equivalent of the original check. Substitute checks were authorized under The Check Clearing for the 21st Century Act, commonly known as Check 21. The Act was enacted to facilitate the check clearing process by allowing banks to transmit electronic images of checks (e.g., substitute checks) to other banks rather than physically sending the original paper checks. Check 21 does not require that banks use substitute checks. In fact, many banks may have voluntary agreements to accept certain electronic images of checks even though the images may not qualify as substitute checks under Check 21. If a bank does not have a voluntary agreement and/or refuses to accept an electronic image, the financial institution is required under Check 21 to accept a substitute check in lieu of the original check.

In an embodiment, a payee may receive a check as a birthday gift, for example. The payee may endorse the check and/or send electronic data representative of the check to the payee's bank. As noted above, the electronic data may be generated in any number of ways. For example, the payee may use a general purpose flatbed a scanner and/or digital camera to create a digital image of the front and back of the check. The payee may then attach the digital images to an email and send the digital image to the payee's bank along with information pertaining to the account for depositing funds. Upon receipt of the digital images and/or account information, the payee's bank may credit funds to the payee's account. If the payee's bank and the payer's bank have a voluntary agreement for accepting electronic images of checks, the payee's bank may generate an electronic image of the check and/or simply forward the digital images received from the payee to the payer's bank. If there is no agreement between the banks, the payee's bank may convert the digital images into a substitute check and present the substitute check to the payer's bank and/or a check clearing service provider (e.g., a regional branch of the Federal Reserve) to clear the check.

Returning to FIG. 8B, at 8B-54, the bank may process the ACH debit entry, substitute check, and/or electronic image. As noted above, the bank may present the ACH debit entry to an ACH service provider (e.g., EPN), which may be responsible for settling the transaction between the payee's bank and the payer's bank. The bank also may convert the digital image into a substitute check and present the substitute check to an intermediary bank (e.g., a regional branch of the Federal Reserve) to complete the check clearing process. At 8B-55, the bank may debit the payee's account if the original check is not received and/or sent within a predetermined period of time. For example, the bank may require that the payee send the check and have it postmarked within five business days of sending the electronic data representative of the check. If the check is not postmarked within the predetermined period of time, the financial institution may void the provisional credit (e.g., withdraw funds from the account). At 8B-56, the financial institution may receive the check from the payee. It will appreciated that 8B-55 and 8B-56 may be performed to provide additional security features by removing the check from circulation.

FIG. 8C is a flow diagram illustrating an alternative embodiment of an example method of remotely depositing checks. As shown in FIG. 8C, at 8C-58, a payee may receive a check from a third party payer. At 8C-60, the payee may endorse the check by signing the back of the check in the designated field. If the payee wishes to deposit the check into an account, such as a savings and/or checking account, the payee also may write an account number below the signature. At 8C-62, the payee may call a bank associated with an account for depositing funds and request that the check be deposited into the account. Any method of contacting the bank is consistent with an embodiment. For example, the payee may use a phone, email, instant messaging, and/or a fax machine to make the request.

At 8C-63, the payee may convey the check information and/or information pertaining to the account for depositing funds. For example, the payee may convey the MICR information (e.g., account number, routing number, check number, etc.) on the check. In addition, the payee may convey the account number of the account where the funds are to be deposited. Any method of conveying the information is consistent with an embodiment. For example, as noted above, the payee may use a phone, email, instant messaging, and/or fax machine. At 8C-64, the payee may void the check and/or send the check to the bank. The process may then proceed to 8C-65.

It will be appreciated that 8C-64 may be performed to provide additional security features. For example, by removing the check from circulation, it may be less a likely that the check will be (willfully or accidentally) deposited more than once. In addition, by requiring the payee to produce the check, the financial institution may prevent the deposit of fraudulent checks.

At 8C-65, the bank may receive the check information and account information. At 8C-66, the bank may credit funds to the account. As noted above, the credit may be a provisional credit, enabling the payee to access the funds while the transaction is being processed. At 8C-67, the bank may void the provisional credit if the original check is not sent and/or received within a predetermined period of time. At 8C-68, the bank may receive the check. At 8C-69, the bank may generate an ACH debit entry, substitute check, and/or electronic image. At 8C-70, the bank may process the ACH debit entry, substitute check, and/or electronic image. It will appreciated that 8C-69 and 8C-70 may be performed to provide additional security features.

Other security features may be consistent with an embodiment. For example, the bank may only permit certain payees to remotely deposit checks. By way of example, and not limitation, the bank may accept electronic data representative of a check and/or accept a request to deposit a check if the payee's account is in good standing. The payee's account may be considered in good standing if the payee has a positive account balance, has a predetermined amount of funds in the account, and/or is not delinquent on any payments to the bank. The bank also may receive the electronic data and/or request but credit funds to the account if the account is in good standing as of the time the electronic data and/or request was received. In addition, the bank may impose additional requirements on a payee remotely depositing a check into an account that is not in good standing. For example, as noted above, the bank a may provisionally credit the payee's account upon receipt of the electronic data and/or request but may require the payee to send the check to the bank. Thus, the account may be debited if the check is not sent and/or received within a predetermined amount of time.

In some embodiments, the ImageInspector may impose limitations on the deposit amount and/or the availability of the deposit. For example, the ImageInspector may place a daily, weekly, and/or other periodic limit for the total amount of remote deposits for a given period. The ImageInspector may additionally or alternatively limit the number of periodic transactions for a given user. Depending on the implementation, such limits may be pre-specified for users (such as a default of limiting users to three remote deposits per day, and limiting total daily deposits to $10,000) and/or determined based on risks associated with a use and/or a transaction. For example, a user may have a pre-specified deposit limit of $10,000 per day, but if the user requests and/or attempts to deposit an amount greater than that (e.g., a check for $15,000), rather than simply rejecting the deposit, the ImageInspector may notify the user that the amount is greater than there specified deposit limit. In some such embodiments, the ImageInspector may allow the user to request that the deposit limit be raised for this transaction, in some embodiments for an associated fee, and the ImageInspector may notify a pre-specified bank or financial institution administrator to approve or reject the request.

In some embodiments, the ImageInspector may include user and/or transaction information in the notification to assist the administrator in making the decision, such information including the location of the user requesting the deposit, the bank on which the deposited information is drawn, the amount of time the user has been associated with the institution, prior deposit/banking history, etc. The ImageInspector may additionally or alternatively limit the availability of some or all of the funds of deposit(s) that exceed the pre-specified amount.

Similarly, the ImageInspector may limit the availability of deposited funds according to similar defaults and/or determinations. For example, if the user is depositing funds from a location (e.g., as determined by GPS metadata associated with a deposit from a mobile device) that is outside the user's normal geographic region (e.g., the user's mailing address and surrounding area), the amount of funds made immediately available may be less than if the user is making the deposit from his or her home. Similarly, the amount of the deposit, the account(s) to which the deposit is applied, user account balance(s), user tenure with the financial institution, and/or other information may be utilized by the ImageInspector in determining the amount(s) and timeline for availability.

In one implementation, the ImageInspector utilizes a risk matrix, with various weighted risk factors corresponding to risk information, to determine account limitations. In another implementation, the ImageInspector may utilize risk information in a risk calculation, in which each piece of risk information is assigned a value and the amount available is determined based on the total risk value of the collected information. For example, a deposit of over $5000 may have a higher risk value than a smaller deposit amount, and, as such, may have more restrictions on availability of the full amount. Similarly, a deposit by a user that had been with a bank for to years may be determined to have a lower risk value than a user who had just become a member of the bank. In some implementations, the amounts available and/or the deposit limits may be determined by the ImageInspector utilizing determined risk scores and thresholds such that a user who is determined to have a very low risk value has very few limitations imposed on his or her account, a user that has a determined risk value that exceeds a first threshold but is less than a second threshold may have moderate restrictions associated with his or her account, and a user that has a determined risk value that exceeds the second threshold may have even more restrictions applied to his or her account. In some embodiments, the ImageInspector may utilize local and/or national regulations in determining and/or applying limitations to accounts and/or deposits.

ImageInspector Third-Party Deposit

Figure 8D:
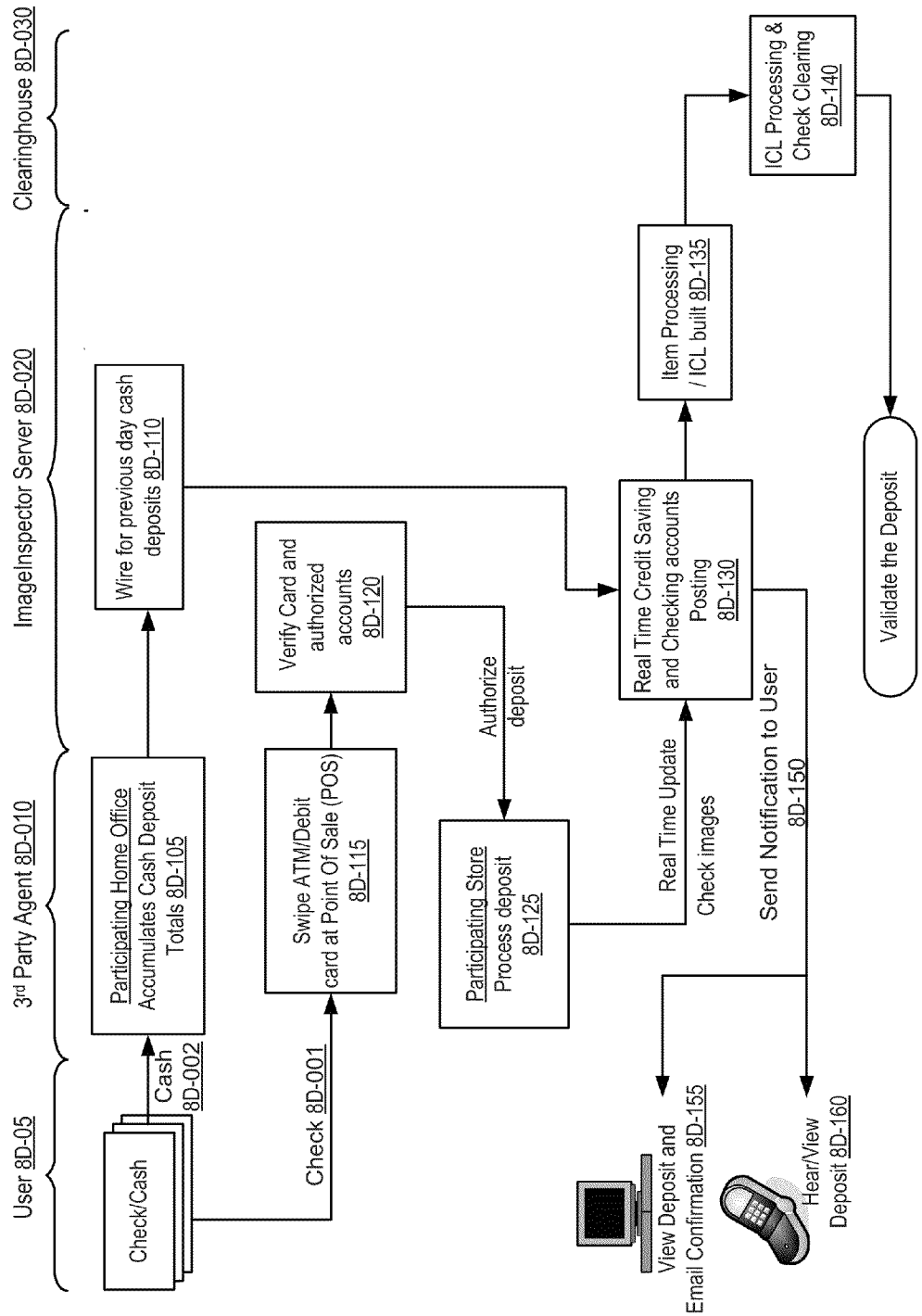

FIG. 8D is of a logic flow diagram illustrating an overview of ImageInspector workflow in one embodiment of the ImageInspector. In one embodiment, a ImageInspector user may present a check 8D-001 or cash 8D-002 for deposit to a third party agent, such as an authorized ImageInspector storefront deposit site, or a participating store or home/office equipped with ImageInspector facility.

In one implementation, for cash deposit 1002, the third party agent may receive and calculate cash bills from the user and accumulate cash deposit totals 8D-105 associated with the user, and send deposit information to the ImageInspector platform 8D-020. The ImageInspector platform 1020 may wire the deposit amount to the user's bank account periodically. For example, in one implementation, the ImageInspector platform 1020 may wire the received cash amount for deposit during the previous day 8D-110 to the payee's bank for posting 8D-130 on a daily basis.

In another implementation, for check deposit 8D-001, the user may a provide a bank card as deposit authorization to the third party agent. For example, the user may have his ATM debit card swiped at a card reader equipped at a ImageInspector participating store 8D-115 (e.g., a Point of Sale (POS) terminal), via which the third party agent may obtain and forward the user's bank account information to the ImageInspector platform 8D-020.

In one implementation, deposit information may be sent to the ImageInspector platform via a secure and dedicated communication channel established between the third party agent 1010 and the ImageInspector platform 8D-020. For example, the ImageInspector platform may remotely communicate with and control the deposit facility, e.g., the card reader, the check scanner, etc. installed at the POS terminal or a participating store, an ATM machine, and/or the like. In another implementation, the third party agent who operates a general purpose home/office device, such as a smart phone, a computer, and/or the like, may communicate with the ImageInspector platform and submit deposit information in a similar manner as discussed in FIGS. 7A-7C.

In one embodiment, the ImageInspector platform 1020 may verify the user's card information and determine whether the user's bank account is eligible for ImageInspector service 8D-120. Upon authorization, the third party agent 1010 may process the check deposit 8D-125, including generating one or more images of the check and sending the check images to the ImageInspector platform 1020, as further illustrated in FIG. 9C.

Figure 9A:
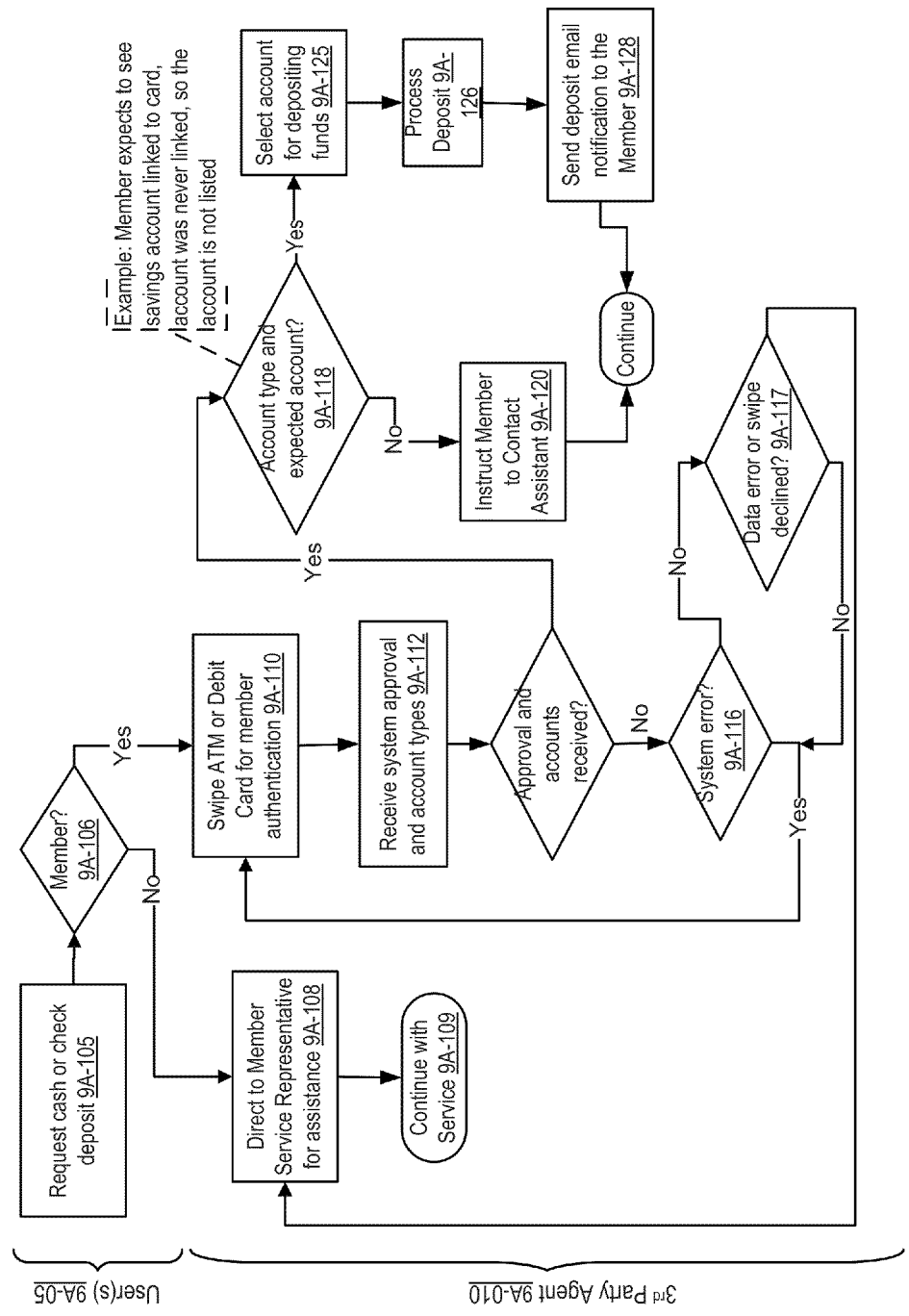
Figure 9C:
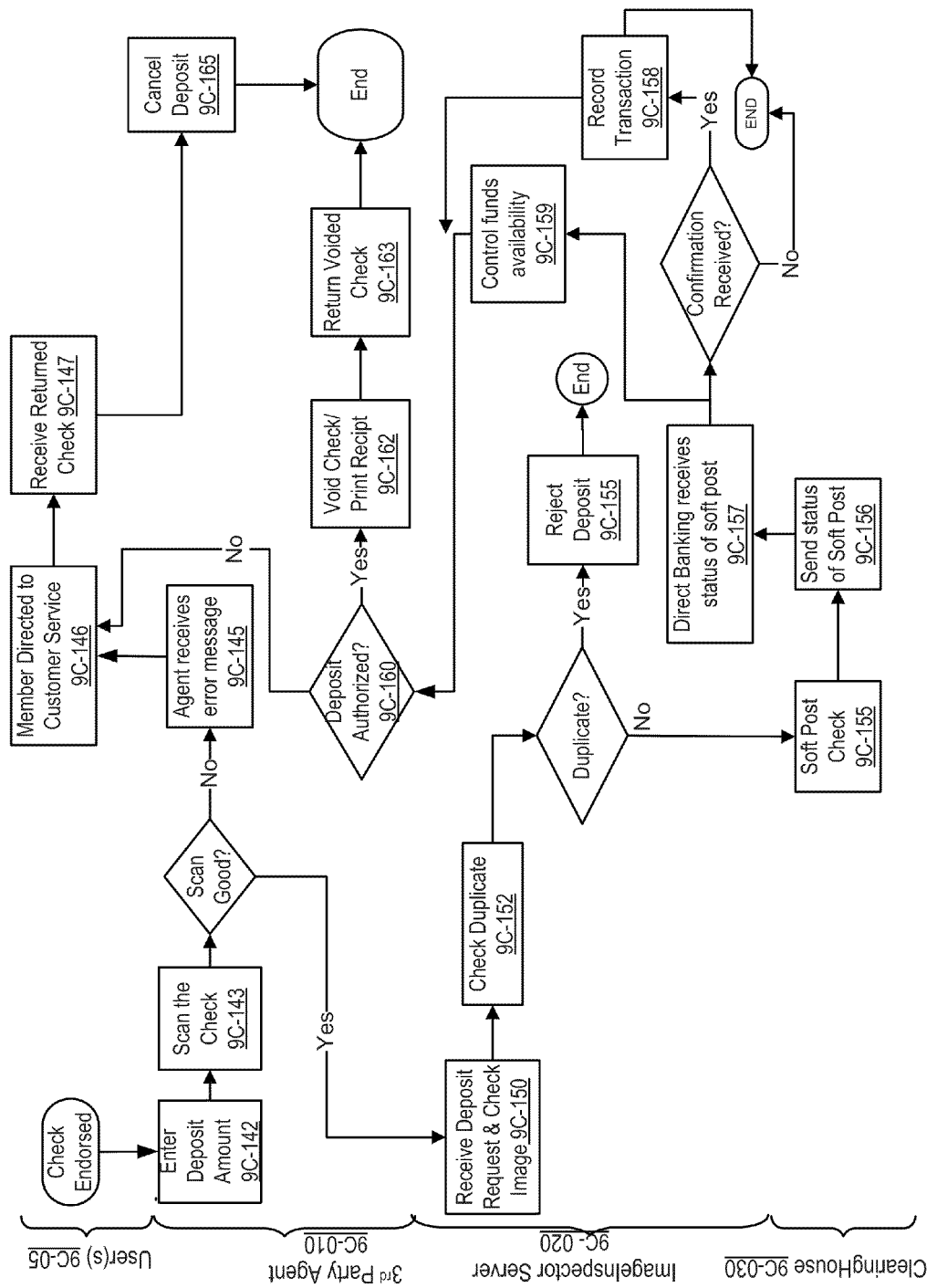

In one implementation, the check images may be sent to and updated at the ImageInspector platform 1020 in real time, and real time credit may be posted to a the user's bank account 8D-130, as further FIG. 9C.

In one embodiment, upon soft posting the deposit amount to the user's bank account, the ImageInspector platform 1020 may clear the transaction. In one implementation, an Image Cash Letter (ICL) complying with the Check 21 Act, may be generated based on the received check images and deposit data 8D-135 at the ImageInspector platform and sent to a clearinghouse bank 8D-030 for clearing 8D-140. For example, in one implementation, the check clearing 8D-135 and 8D-140 may take a similar procedure as further illustrated in FIGS. 17A-17C.

In one implementation, upon soft posting of the deposit funds, the RDC-Detection server may send notification to the user 8D-150 to the user 105, so that the user may view the conformation message. For example, in one implementation, the user may receive a confirmation via email 8D-155. For another example, the user may receive a text message of confirmation via his cellular phone, or receive an automatic confirmation call 8D-160.

FIG. 9A provides a logic flow diagram illustrating work flows between a user and the ImageInspector third party agent within embodiments of the ImageInspector. As discussed in FIG. 9A, a user 9A-05 may present cash or a check to the third party agent 1010 to request deposit 9A-105. The third party agent 9A-010 may verify whether the user is an East-Deposit service member 9A-106. For example, in one implementation, a ImageInspector service representative may ask for membership information from the user. For another example, if the user possesses a membership card (e.g., a bank ATM/debit card authorized for ImageInspector service, a ImageInspector membership verification card, etc.), he may swipe the card at a card a reader to provide membership authentication 9A-110.

If the user is not a member of ImageInspector, or the card reader fails to recognize the user's bank card, the user may be directed to a ImageInspector service representative (e.g., a store clerk, an express mailman, etc.) for further assistance 9A-108. The ImageInspector service may be continued with the service representative 9A-109.

In one embodiment, upon sending member card information to a ImageInspector platform, system approval may be received at the third party agent, and the user may be presented with a list of available accounts for deposit for selection 9A-112 vi a user interface, and determine whether an expected account 9A-118 is presented. For example, a user may have a number of accounts available for deposit, but a user preferred account may not be associated, or registered for ImageInspector service, and thus such an account may not be presented to the user during ImageInspector service. In such case, ImageInspector may instruct the user to contact a service assistant 9A-120, e.g., by displaying instructions and contact information of ImageInspector customer service via a user interface.

In another implementation, if the user selects an account from the presented list for depositing funds 9A-125, the third party agent may proceed to process the deposit request 9A-126, as further illustrated FIG. 9C. After receiving a notice of soft posting from the ImageInspector platform, the third party agent may send a deposit notification to the user 9A-128, e.g. via emails, text messages, or displaying a deposit receipt on a user interface.

FIG. 9B provides a logic flow diagram illustrating work flows for cash a deposit between a user and the ImageInspector third party agent in an alternative embodiment of the ImageInspector. In one embodiment, after user swiping membership card at the third party agent, the third party agent may collect deposit items from the user 9B-130. In one implementation, if a cash deposit request is received at 9B-130, the third party agent may proceed to process the received cash 9B-132, as further illustrated in FIG. 9D.

If it a check is presented for deposit 9B-131, the third party agent may inspect the check 9B-133 to verify the check is qualified 9B-135. For example, in one implementation, a service representative at the ImageInspector participating store may manually inspect the presented paper check to see whether it is a proper check, and whether it has been endorsed. For another example, the user may insert and scan the check at the check deposit facility equipped at the ImageInspector participating store, and the ImageInspector may perform an initial optical character recognition (OCR) upon the captured check image to inspect check formalities. If the check is qualified for deposit 9B-135, the third party agent may proceed with process the check for deposit 9B-136. Otherwise, the third party agent may return the check to the user 9B-139, and inform the user of the ineligibility of the check and suggest the user mail the check to a ImageInspector enabled bank branch for deposit 9B-138.

In one implementation, the check processing may include courtesy amount recognition 9B-137. For example, in one implementation, the third party agent may capture images of the paper check for OCR and extract deposit information from the check images. The ImageInspector may compare the extract deposit amount from the check image and an amount entered by the user to confirm consistency, as further a illustrated in FIG. 9E.

In one implementation, the third party agent may inquire the user for additional deposit requests 9B-140 until the agent ends the deposit service.

FIG. 9C provides a logic flow diagram illustrating work flows of processing check deposit between the user, the third party agent, the ImageInspector platform and the clearinghouse within embodiments of the ImageInspector. Within embodiments, upon the receipt of an endorsed check from the user, the third party agent may enter a deposit amount 9C-142 and generate an image of the check 9C-143. For example, in one implementation, an ImageInspector representative or the user may be prompted to manually enter a deposit amount at a ImageInspector terminal. The third party agent may also generate images of the check via an image capture device within similar embodiments discussed in FIGS. 7A-7C.

In one implementation, the third party agent 1010 may determine whether the generated check images are eligible for further processing. In one implementation, a service representative may view the check image on screen to determine whether the image is disoriented, blurred or skewed. In another implementation, the third party agent may send the check images to the ImageInspector platform where an initial OCR may be performed on the check image to inspect whether the check is readable. If the check image fails to pass the initial formality inspection, the third party agent may receive an error message 9C-145, and the user may be directed to customer service 9C-146 with returned check 9C-147 for further assistance in ImageInspector service. In one implementation, the user may cancel the deposit 9C-165 and close the transaction.

When the third party agent determines the check image is eligible for a deposit processing, a deposit request may be forwarded to the ImageInspector platform 1020. For example, in one implementation, a data package including the captured check images and user entered check metadata, such as a deposit amount, a selected deposit account, and/or the like, may be send to the ImageInspector platform. In one implementation, the ImageInspector platform may conduct duplicate detection 9C-152, as discussed in similar embodiments in FIGS. 17A-17C. If the check is a duplicate, the ImageInspector platform may reject the deposit 9C-155 and end the transaction. Otherwise, if not, the ImageInspector platform may provisionally post the deposit amount to the user's selected deposit account, and send the deposit information to the clearinghouse 1030 for soft post check 9C-155. For example, the soft post check may be performed within similar embodiments discussed in FIG. 8C.

In one implementation, upon receiving verification of the soft post status from the clearinghouse 9C-156, the ImageInspector platform may forward the soft post status to direct banking 9C-157, e.g., the payee's bank. If the payee's bank confirms the deposit, the ImageInspector platform may generate a data record of the transaction and store it in the ImageInspector database 9C-158. For example, in one implementation, the ImageInspector platform may keep a deposit record repository for duplicate check, as discussed in one implementation in FIGS. 17A-17C.

In a further implementation, the ImageInspector platform may communicate with the payee's bank to control funds availability 9C-159. For example, in one implementation, the ImageInspector service may apply a deposit constraint to the deposit, allowing an available deposit amount to be deposited based on the existing amount in the user's bank account, as discussed in one implementation in FIG. 10A.

In one implementation, after the funds availability control, if there remains an unauthorized deposit amount 9C-160, the user may be directed to customer service 9C-146. If not, the third party agent may void the paper check 9C-162. For example, the paper check may be permanently modified by a "PAID" stamp printed thereon. For another example, the ImageInspector facility at the third party agent may destroy the paper check by an electronic MICR spray to mark the check as deposited. The voided check may then be returned to the user 9C-163 and the deposit transaction is closed.

Figure 9D:
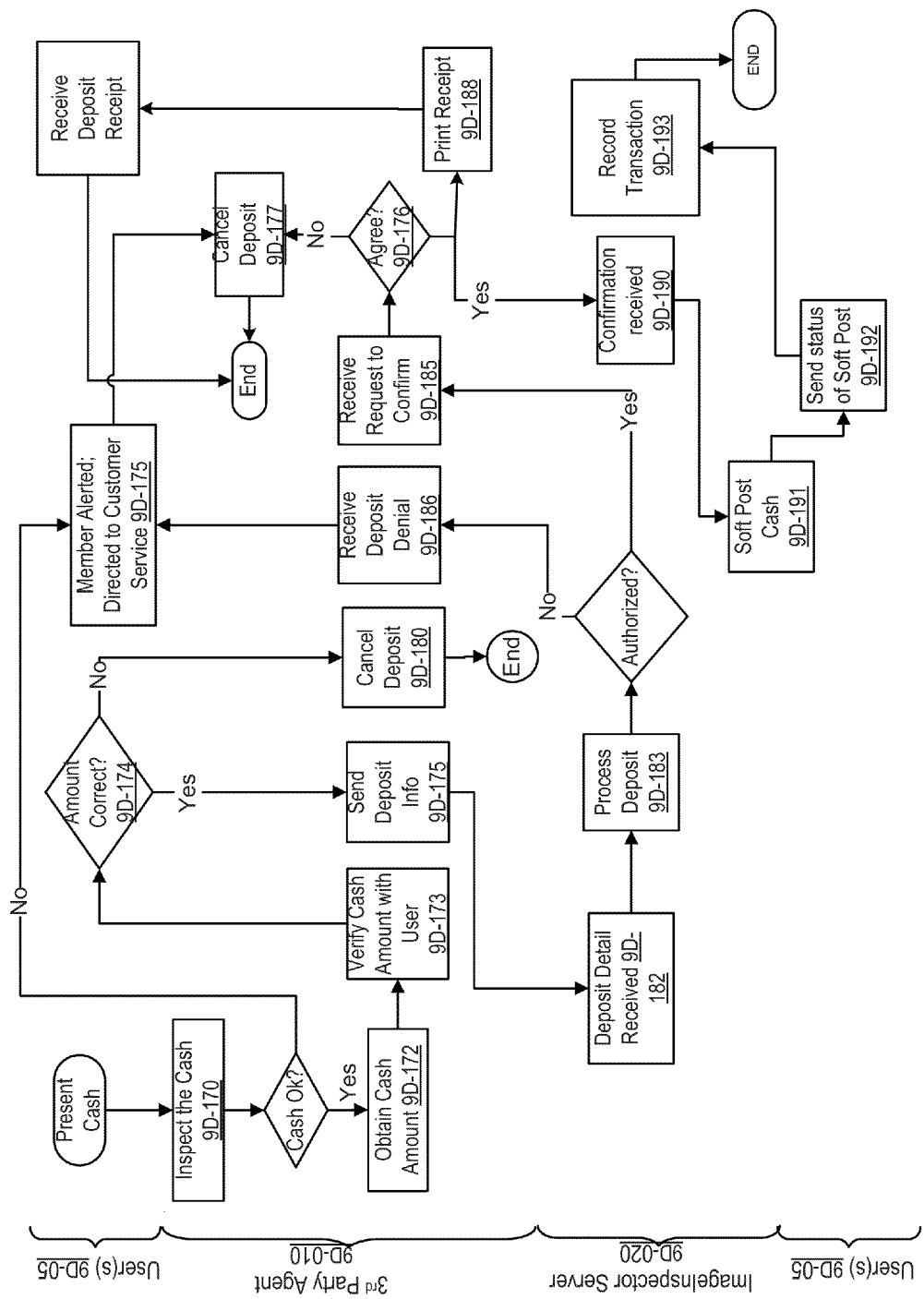

FIG. 9D provides a logic flow diagram illustrating work flows of processing cash deposit between the user, the third party agent and the ImageInspector platform within embodiments of the ImageInspector. In one embodiment, the user 105 may present cash at the third party agent 1010, wherein the third party agent may inspect the cash 9D-170. For example, in one implementation, the third party agent may be equipped with a bill/coin counter to calculate the cash amount 9D-172 and detect any counterfeit. If the presented cash does not pass the initial inspection, e.g., counterfeit detected, etc., the user may be alerted and directed to ImageInspector customer service 9D-175. In one implementation, the user may choose to cancel the deposit 9D-176 and exit the transaction with the third party agent.

In one implementation, if the cash is qualified, the third party agent may verify the calculated cash amount with the user 9D-173 to confirm the consistency in deposit amount. If the user agrees the deposit amount is correct 9D-174, the third party agent may send deposit information 9D-175 to the ImageInspector platform. For example, the deposit information may include, but not limited to the user's ImageInspector membership information, deposit account information, deposit amount, and/or the like. In one implementation, the user may be prompted to select an available account for cash deposit in a similar way to that in check deposit as discussed in one implementation in FIG. 3G. In another implementation, if the calculated amount is inconsistent with the user specified amount, the third party agent may cancel the deposit 9D-180.

In one embodiment, upon receiving deposit details from the third party agent 9D-182, the ImageInspector platform may process the deposit 9D-183. For example, in one implementation, the ImageInspector may control the funds availability of the user selected account in a similar manner as discussed in one implementation in FIG. 3E. If the ImageInspector platform authorizes the deposit into the user specified account, the third party agent may receive a request to confirm the deposit 9D-185 from the ImageInspector platform, and prompt the user to accept the deposit status. If the user or the third party agent does not agree with the deposit status at 9D-176, e.g., the deposit amount may be capped by fund availability control, etc., the third party agent may cancel the deposit 9D-177 upon user approval.

In an alternative implementation, if the user agrees with the deposit at 9D-176, the third party agent may print a deposit receipt 9D-188 for the user to conclude the transaction. In one implementation, after receiving a deposit confirmation from the third party agent 9D-190, the cash deposit amount may be soft posted to the user's account 9D-191 and a notification of the soft post may be sent to the user. In a further implementation, the ImageInspector platform may create a transaction record of the cash deposit 9D-193, which may include a time stamp of the a transaction, the deposit amount, the deposit account, and/or the like.

Figure 9E:
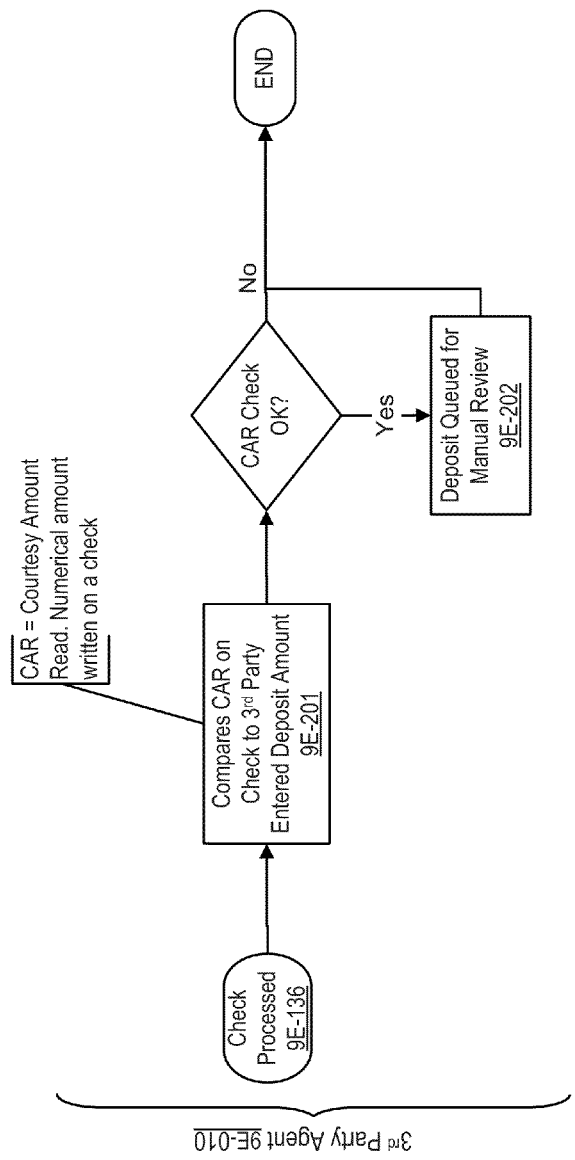

FIG. 9E provides a logic flow diagram illustrating check deposit processing at the third party agent within embodiments of the ImageInspector. For example, in one implementation, after receiving deposit information and processing the check 9E-136, the third party may capture an image of the check, via which the courtesy amount written on the check may be extracted to compare with a user entered deposit amount 9E-201. If the extracted courtesy amount from the check matches the manually entered amount, the third party may proceed with the check deposit processing, e.g., the deposit may be queued for a manual review 9E-202, as further illustrated in one implementation in FIG. 9I. Otherwise, if inconsistency occurs, the third party agent may choose to close the transaction.

Figure 9F:
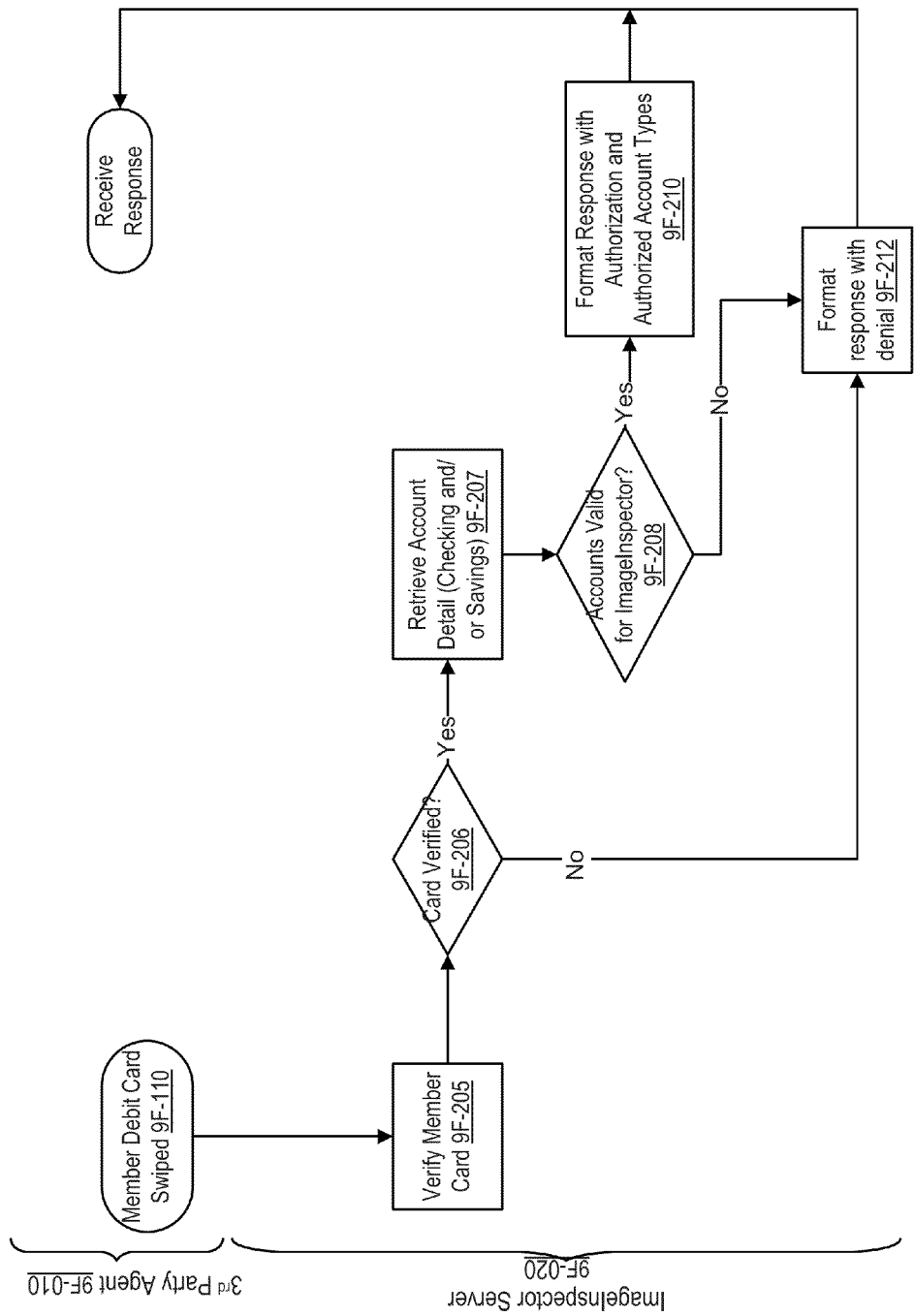

FIG. 9F provides a logic flow diagram illustrating membership verification between the third party agent and the ImageInspector platform in one embodiment of the ImageInspector. In one embodiment, the third party agent may receive membership information from the user when the user swipes his membership card at a card reader 9F-110. For example, the membership card may include, but not limited to an ATM debit card, a membership identification card, and/or the like. In one implementation, the card reader at the third party agent may forward the membership information, such as, but not limited to user name, user account, user's bank information to the ImageInspector platform 9F-020, and the ImageInspector platform may then verify the member information 9F-205. If the user has been verified to be an eligible ImageInspector member 9F-206, the ImageInspector platform may retrieve account details associated with the user 9F-207, and determine whether the retrieved a bank accounts are a are available for ImageInspector service 9F-208. If yes, a response may be formatted and sent to the third party agent via a user interface, presenting a list of authorized user bank accounts 9F-210. Otherwise, if the user is not a valid ImageInspector member 9F-206, or if the user has not validated any of his bank accounts for ImageInspector 9F-208, a denial may be sent to the third party agent 9F-212.

Figure 9G:
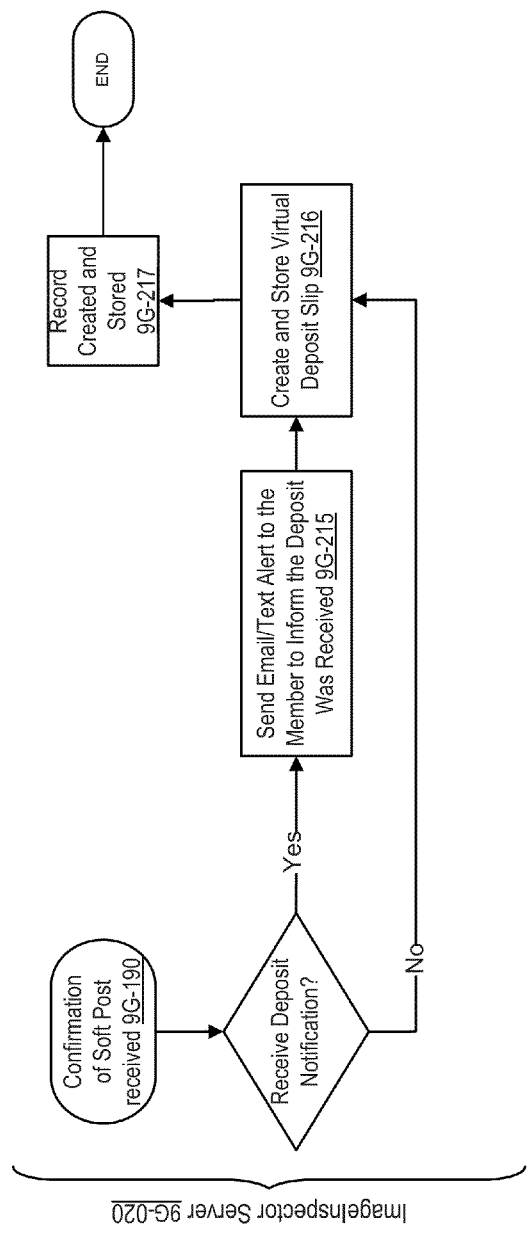

FIG. 9G provides a logic flow illustrating deposit notification at the ImageInspector platform within embodiments of the ImageInspector. In one embodiment, the after receiving a confirmation of soft post 9G-190 (e.g., from a payee's bank if the ImageInspector platform is independent of the payee's bank, etc.), the ImageInspector platform may determine whether the deposit is successful. If yes, the ImageInspector platform may notify the user by sending an email or text message to inform the deposit is received 9G-215. In an alternative implementation, the ImageInspector platform may send the deposit confirmation to a third party agent terminal. They ImageInspector platform may then create a virtual deposit slip 9G-216, 23 and store the record 9G-217. For example, the virtual deposit slip may include images of the check and check metadata, such as, but not limited to the time and place of the deposit, user account, user name, deposit amount, and/or the like. Other implementations of storing deposit record may be discussed in FIG. 17A.

In one implementation, if the deposit notification indicates the soft post is not completed, the ImageInspector platform may also generate a deposit slip for the check as "presented but not deposited" and store it in the ImageInspector database.

Figure 9H:
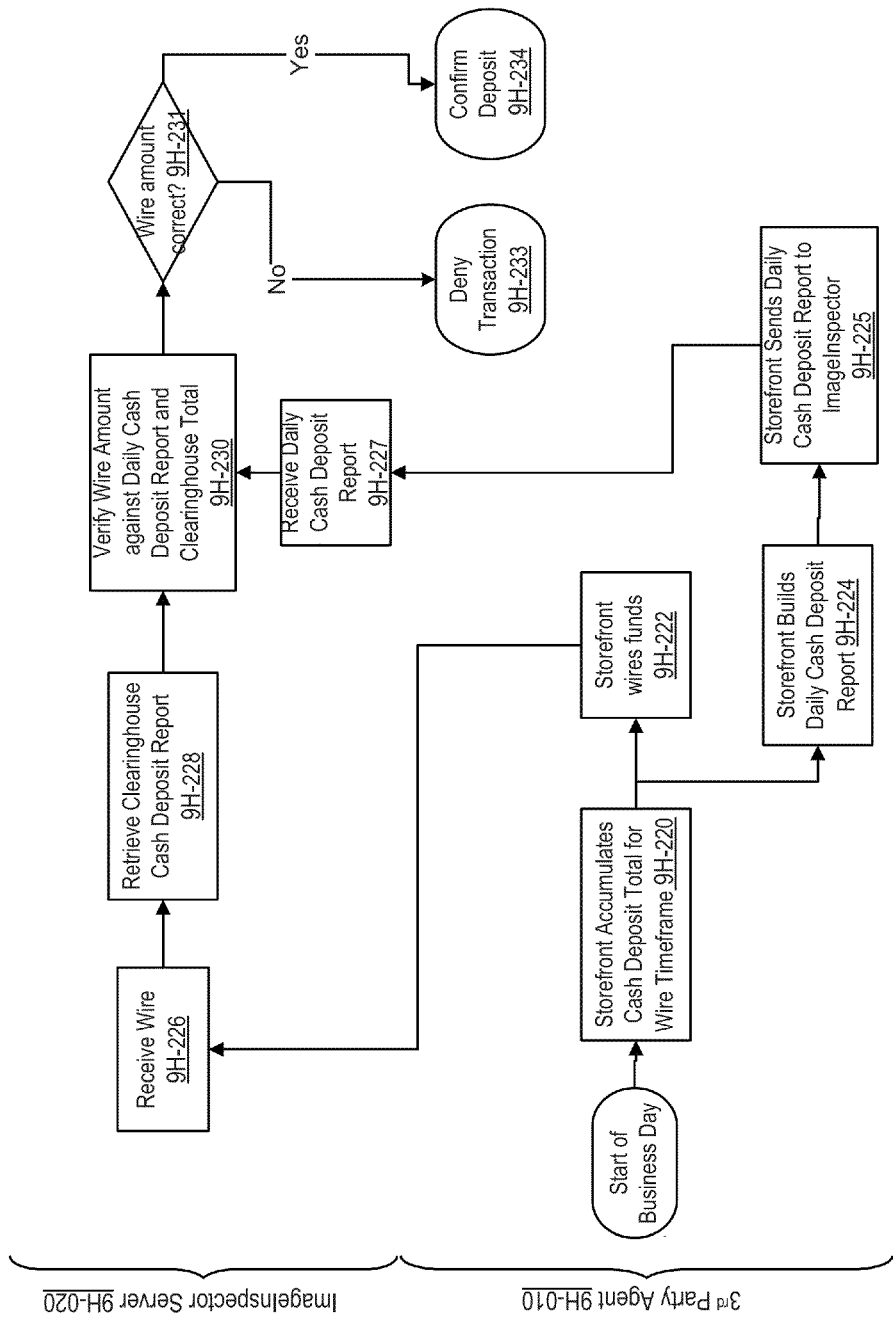

FIG. 9H provides a logic flow illustrating fund wiring from the third party agent to the ImageInspector platform within embodiments of the ImageInspector. In one embodiment, the third party agent may process the cash deposit in a batch. For example, in one implementation, at the start of a business day, the third party agent may accumulate cash deposit total from the wire timeframe 9H-220, e.g., the total cash deposit from the previous day. In one implementation, the third party agent may wire the accumulated funds 9H-222 to the ImageInspector platform. In another implementation, the third party agent may build a daily cash deposit report 9H-224 and send the report to the ImageInspector platform 9H-225.

At the ImageInspector platform 9H-020, upon receipt of the wired funds 9H-226, the ImageInspector platform may retrieve a clearinghouse cash deposit report 9H-228. In another implementation, the ImageInspector platform may also receive the daily cash deposit report 9H-227 and compare it with the retrieved clearinghouse cash total to verify the wired amount 9H-230. If the received wired amount is correct 9H-231, the ImageInspector may confirm the cash deposit 9H-234. Otherwise, the wire transaction may be denied 9H-233 and a denial notification may be sent back to the third party agent.

Figure 9I:
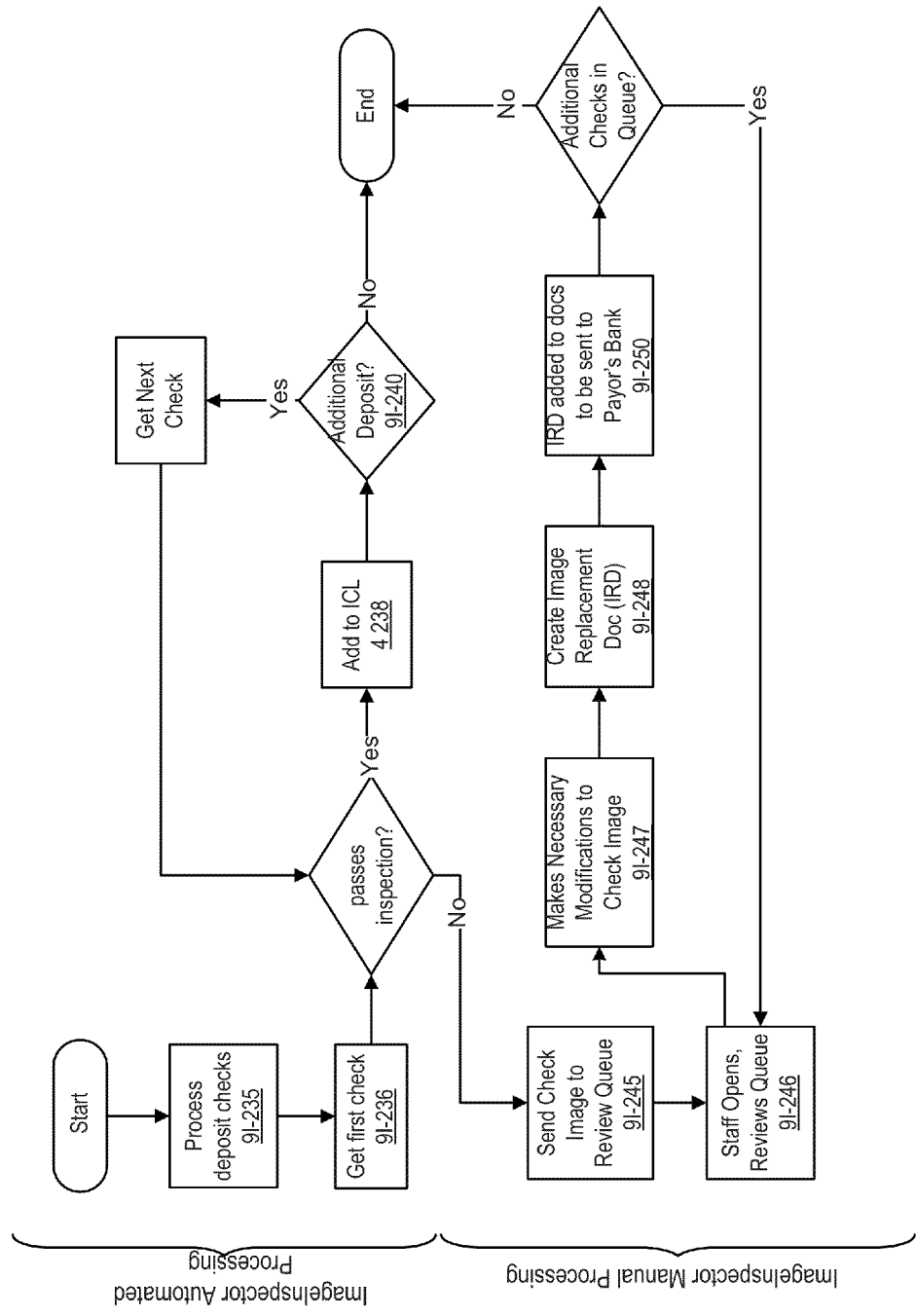

FIG. 9I provides a logic flow illustrating an alternative embodiment of check deposit within embodiments of the ImageInspector. In one embodiment, the ImageInspector may process a plurality of checks in a batch. For example, in one implementation, the ImageInspector platform may start with processing a plurality of received images of checks 9I-235. For the first check image 9I-236, the ImageInspector platform may inspect the quality of the check image. If the image is qualified, the ImageInspector platform may add it to ICL 9I-238. The process may be repeated until there is no additional deposit 9I-240. Otherwise, if the first check image fails to pass a the initial inspection, the ImageInspector may direct the check image to ImageInspector manual processing.

For example, in one implementation, the disqualified check image may be sent to a review queue for manual review 9I-245. In one implementation, the ImageInspector may prompt ImageInspector staff to open and review the queued check images via a user interface terminal. In one implementation, the ImageInspector staff may make modify the check image. For example, the ImageInspector staff may improve the check image by proper cropping, deskewing, dewarping and format changes. After enhancement, an image replacement document (IRD) may be generated 9I-248 based on the check image and added to the documents to go to the payor's bank 9I-250. The ImageInspector staff may continue reviewing the check images in the queue until the queue is completed.

ImageInspector Exemplary User Interface for Deposit Limit

FIG. 10A shows a schematic user interface illustrating In some embodiments, the ImageInspector may impose limitations on the deposit amount and/or the availability of the deposit. For example, the ImageInspector may place a daily, weekly, and/or other periodic limit for the total amount of remote deposits for a given period. The ImageInspector may additionally or alternatively limit the number of periodic transactions for a given user. Depending on the implementation, such limits may be pre-specified for users (such as a default of limiting users to 3 remote deposits per day, and limiting total daily deposits to $10,000) and/or determined based on risks associated with a use and/or a transaction. For example, a user may have a pre-specified deposit limit of $10,000 per day, but if the user requests and/or attempts to a deposit an amount greater than that (e.g., a check for $15,000), rather than simply rejecting the deposit, the ImageInspector may notify the user that the amount is greater than there specified deposit limit as shown in FIG. 10A. In some such embodiments, the ImageInspector may allow the user to request that the deposit limit be raised for this transaction 10A-71, in some embodiments for an associated fee, and the ImageInspector may notify a pre-specified bank or financial institution administrator to approve or reject the request.

In some embodiments, the ImageInspector may include user and/or transaction information in the notification to assist the administrator in making the decision, such information including the location of the user requesting the deposit, the bank on which the deposited information is drawn, the amount of time the user has been associated with the institution, prior deposit/banking history, etc. The ImageInspector may additionally or alternatively limit the availability of some or all of the funds of deposit(s) that exceed the pre-specified amount.

Similarly, the ImageInspector may limit the availability of deposited funds according to similar defaults and/or determinations. For example, if the user is depositing funds from a location (e.g., as determined by GPS metadata associated with a deposit from a mobile device) that is outside the user's normal geographic region (e.g., the user's mailing address and surrounding area), the amount of funds made immediately available may be less than if the user is making the deposit from his or her home. Similarly, the amount of the deposit, the account(s) to which the deposit is applied, user account balance(s), user tenure with the financial institution, and/or other information may be utilized by the ImageInspector in determining the amount(s) and a timeline for availability.

In one implementation, the ImageInspector utilizes a risk matrix, with various weighted risk factors corresponding to risk information, to determine account limitations. In another implementation, the ImageInspector may utilize risk information in a risk calculation, in which each piece of risk information is assigned a value and the amount available is determined based on the total risk value of the collected information. For example, a deposit of over $5000 may have a higher risk is value than a smaller deposit amount, and, as such, may have more restrictions on availability of the full amount. Similarly, a deposit by a user that had been with a bank for to years may be determined to have a lower risk value than a user who had just become a member of the bank. In some implementations, the amounts available and/or the deposit limits may be determined by the ImageInspector utilizing determined risk scores and thresholds such that a user who is determined to have a very low risk value has very few limitations imposed on his or her account, a user that has a determined risk value that exceeds a first threshold but is less than a second threshold may have moderate restrictions associated with his or her account, and a user that has a determined risk value that exceeds the second threshold may have even more restrictions applied to his or her account. In some embodiments, the ImageInspector may utilize local and/or national regulations in determining and/or applying limitations to accounts and/or deposits.

In one implementation, if the ImageInspector determines the deposit amount has exceeded a maximum one-time remote deposit amount defined by the payee's bank. If yes, the ImageInspector may notify the user via a user interface and provide options for the user to proceed. For example, the user may select to submit q request to raise the deposit limit 10A-71, cancel the remote deposit and exit 10A-72, or to only deposit the maximum available amount for next business day availability and send the deposit information to a closest branch for in-person deposit service 10A-73.

ImageInspector Account Selection

FIG. 10B provides a logic flow diagram illustrating aspects of remote deposit with account selection in one embodiment of the ImageInspector. To reduce the processing necessary to deposit a check remotely into an account other than a is primary financial account, such as a checking account, the ImageInspector may provide the depositor the ability to select from a list of accounts an account in which to deposit the check. In one embodiment, upon initializing the ImageInspector component 10B-10, the ImageInspector platform may prompt the user to login the ImageInspector system. For example, in one implementation, the ImageInspector may display a user interface for login 10B-81 at the RDC website, and instruct the user to submit user login information 10B-82, such as a username and a password etc. In another implementation, the ImageInspector may directly recognize the user device by its hardware tag, e.g., the mobile device MAC address, and/or the like, if the user has registered the user device with the ImageInspector.

In one embodiment, the ImageInspector platform may authenticate the user login, and then retrieve user profile 10B-83. In one implementation, the user profile may record information including the user name, user contact information, user credit history, user account information, and/or the like. In one implementation, to assist the depositor in determining which accounts may be available for deposit, the ImageInspector may determine a list of available accounts associated with the user for a deposit 10B-84. For example, the ImageInspector may retrieve a list of user authorized accounts for remote deposits. For another example, if the ImageInspector is affiliated with a payee's bank, the ImageInspector may only retrieve a list of user accounts associated with the payee's bank. For another example, the ImageInspector may determine that, based upon the types of the accounts, checking, savings, and investment accounts, may be available for deposit of the negotiable instrument.

In an alternative implementation, if an indication of deposit amount is available at 10B-84, for example, the user has submitted an amount of deposit to is ImageInspector, or the account selection 10B-81-10B-91 take place after the user has submitted a check image and the ImageInspector has processed the check image to obtain deposit data, the ImageInspector may determine a list of available accounts for deposit based on the requirement of each account. For example, the ImageInspector may filter accounts that have a maximum allowable deposit amount lower than the deposit amount. For another example, to assist the depositor in determining which accounts may be available for deposit, a financial institution may display a list of financial accounts to the depositor. In a further implementation, if the ImageInspector is affiliated with a financial institution, the ImageInspector may generate a list of accounts, wherein the ImageInspector is granted access to the account by the account owner even if the account is at a different financial institution. For example, a user may submit a remote deposit request to the ImageInspector platform at Bank A but Bank A may provide an option for the user to directly deposit the check into his/her account at Bank B, if Bank A is authorized by the user to access his/her account at Bank B.

In one embodiment, the ImageInspector may display a user interface for account selection 10B-85, e.g., a dropdown list, a click-and-choose list, etc., and the user may submit a selection of account 10B-86. The ImageInspector may then determine whether the ImageInspector is granted permission to access the selected account 10B-87. For example, in one implementation, as discussed above, if the ImageInspector is associated with a first payee's bank, but the selected account is associated with a different payee's bank, then the first bank needs to be granted permission by the account owner to access the account at the different bank in order to proceed with check deposit. For another example, if the ImageInspector is a remote deposit service agency, then the ImageInspector may only access an account at a payee's bank only with authorization of the account owner.

In one embodiment, if the permission is granted 10B-90, the ImageInspector may proceed to determine whether the submitted selection of accounts include more than one account 10B-92; and otherwise, the ImageInspector may notify the user that the selected account is unavailable 10B-91. In one embodiment, if there are multiple accounts selected 10B-92, the ImageInspector may display a user interface for amount allocation 10B-93 the user and request the user submit amount allocations 10B-94 for each selected account. For example, in one implementation, if the user selected to deposit into both a checking account and a savings account, the user may then split the deposit amount and enter the portions of amount associated with each account for deposit processing.

FIG. 10C provides an example of a schematic screen shot illustrating a user interface presenting a list of selectable accounts within one embodiment of a ImageInspector. A financial institution may determine that, based upon some criteria as discussed above, checking account, saving account, and investment account, may be available for deposit of the negotiable instrument. A depositor may then select from a list of selection boxes which account to deposit the negotiable instrument. As shown in FIG. 10C, the depositor has selected the checking account and the investment account. Thus, the depositor may be further requested to enter a first amount to be deposited into the checking account and a second amount to be deposited into the investment account, respectively.

ImageInspector Image Submission

Figure 11A:
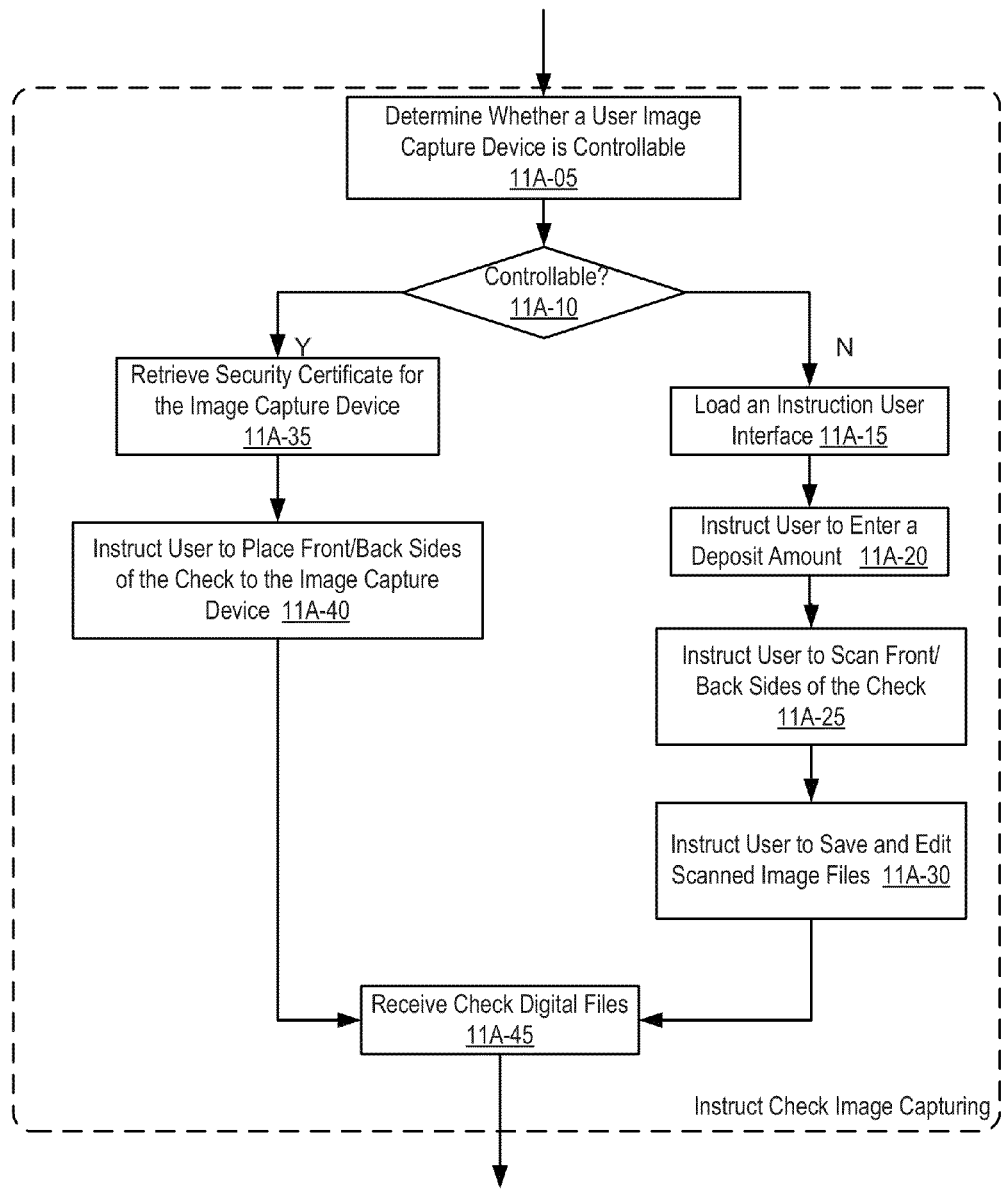
FIGS. 11A-11C provide logic flow diagrams and schematic screen shots illustrating aspects of remote deposit capture image submission in one embodiment of the ImageInspector.
Figure 11B:
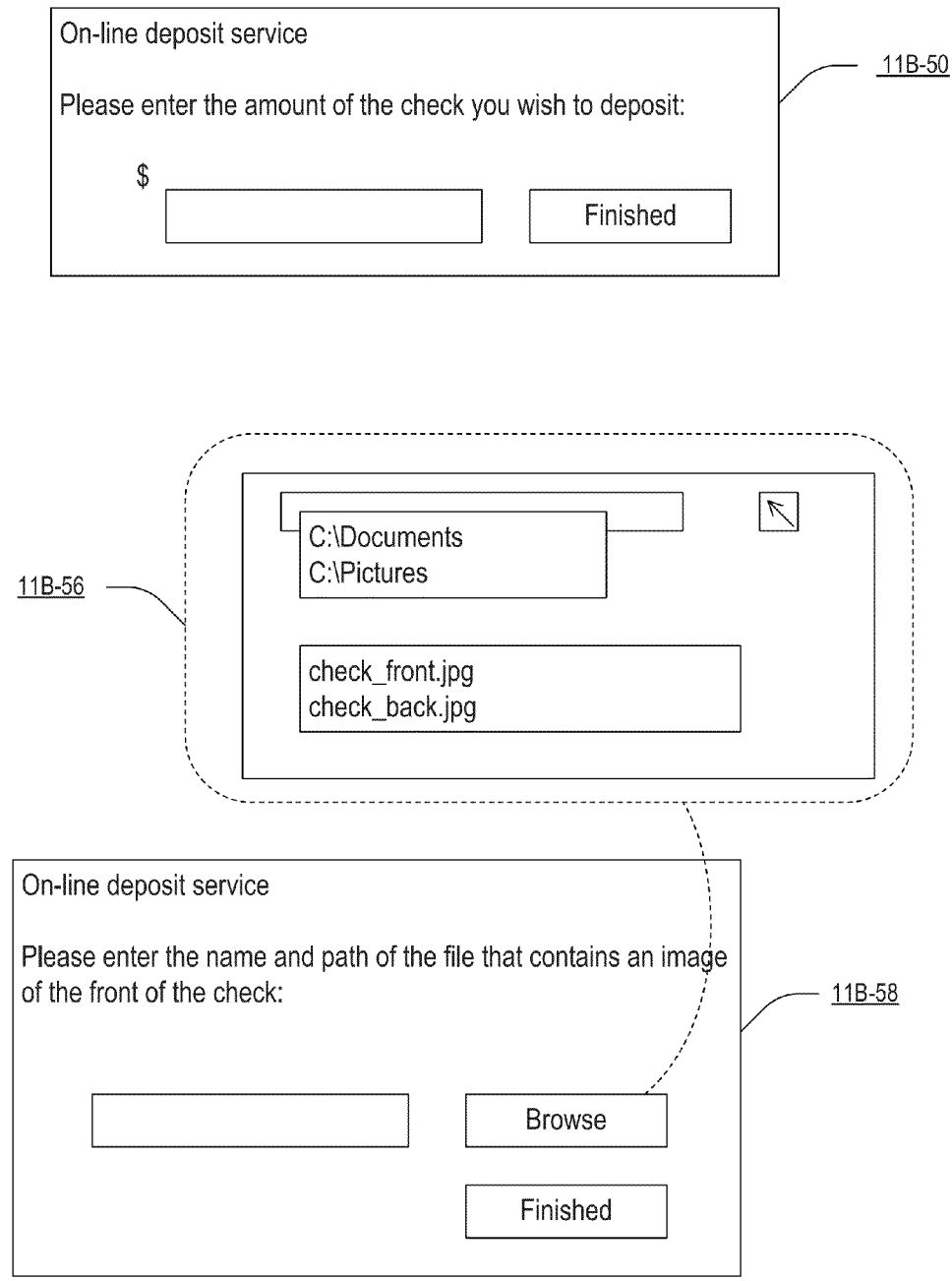
Figure 11C:
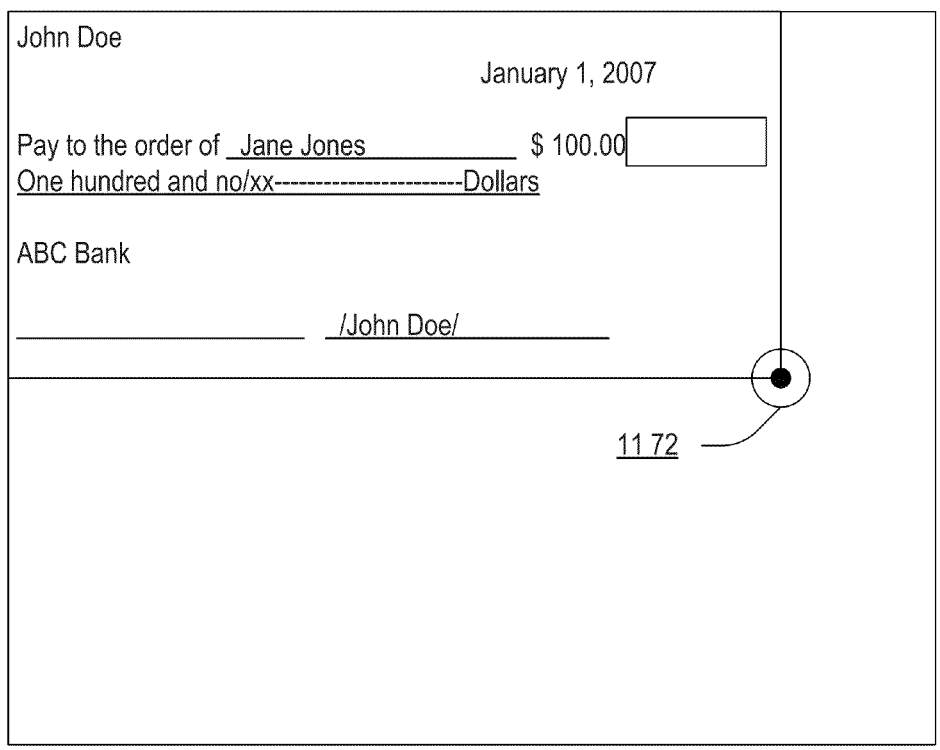

FIG. 11A provides a logic flow diagram illustrating aspects of instructing check image capturing and uploading in one embodiment of the ImageInspector. In one embodiment, upon receiving a remote deposit request from a user, the ImageInspector may determine whether a user image capture device is controllable 11A-05. In one implementation, the ImageInspector platform may remotely control a scanner connected to a home computer, a built-in camera of a mobile device, an ATM/kiosk machine, and/or the like. For example, in one implementation, if a user visits a ImageInspector website via a home computer, a mobile device and/or the like, an embedded browser component running on the website, such as JAVA applets, Flash scripts, etc., may determine whether the ImageInspector platform can control a user image device via the user terminal device. For another example, in one implementation, the ImageInspector platform may establish a secure communications channel with a user mobile device, and directly control the built-in camera of the mobile device via hardware interfaces. For another example, in one implementation, the ImageInspector platform may directly control an ATM/kiosk machine via a specialized deposit communications channel.

In one embodiment, for different devices (e.g., scanners, digital camera, mobile devices, etc.), certain permissions may be used in order to allow the browser component to remotely control the image capture device. For example, in one implementation, a user image device may require certificate authentication to allow secure remote control from the ImageInspector platform. Such certificates may be digital signatures interfacing an image capture device driver, a Secure Socket Layer (SSL) encrypted certificate, and/or the like.

In one embodiment, if the image capture device is a scanner, the drivers of the scanner may be different for different operating environments—e.g., the same scanner may use a different driver depending on whether it is being operated from an environment based on one of the WINDOWS operating systems, an environment based on one of the operating systems used in APPLE computers, an environment based on a version of the LINUX operating system, etc. For example, a Canon imageFORMULA DR-7580 Production Scanner requires a DR-7580 ISIS/Twain Driver version 1.7 for Windows 2000 SP4, XP 32 bit SP3, XP 64 bit SP3, Vista 32 bit SP2, Vista 64 bit SP2, Windows 7 32 bit and Windows 7 64 bit, and Canon LiDE 50 drivers for Mac OS X. In that case, each driver may use different certificates, and different environments may use various different environment-specific technologies to allow the scanner to be controlled from a remote web server. In such cases, the ImageInspector may obtain a the large number of certificates, and may interface with a large number of different technologies, to support a large number of scanner-environment combinations and/or a other image capture device environment, in order to allow its software to control scanners for a variety of customers.

As such, in one embodiment, if the user image capture device is remotely controllable by the ImageInspector platform via 11A-10, the ImageInspector may retrieve security certificate for the corresponding image capture device 11A-35, and control the image capture device to obtain the check images. For example, in one implementation, the browser component, which may be a security JavaScript running on the web browser application, may create a device digital certificate to enable HTTPS on the image capture device. In one implementation, the JavaScript may download a certificate from the remote ImageInspector if available to interface with the driver of the image capture device, and create a public key for the certificate to be used in SSL encryption to establish an encrypted channel between the ImageInspector platform and the image capture device.

In one implementation, the ImageInspector may instruct a user to place the front/back sides of the check in front of the image capture device to create images of the check 11A-40. For example, in one implementation, if a scanner connected to a computer is used, the browser component running on a home computer connected to a scanner may control the home scanner to start upon user request and automatically collect the images in an appropriate format and resolution, and can then upload the image for deposit. In such cases, the user may place the physical check in the scanner bed and to click "start" on the browser interface. In one implementation, the browser component may instruct the user to flip the physical check and repeat the process for both sides of the check via a web page interface, in order to obtain images of the front and the back.

For another example, in one implementation, a mobile device, such as an Apple iPhone may initiate a pre-installed program, or download and install a software package instantly from the ImageInspector platform, which may facilitate the ImageInspector controlling the mobile device (e.g., the iPhone) to obtain and upload check images. In such cases, a user may position the mobile device and take pictures or videos of both sides of the check, as illustrated in FIG. 13B. In a further implementation, if the mobile device is an Apple iPhone, the ImageInspector may further instruct the user to configure the system settings of the built-in camera to obtain images in compliance with quality standards, such as grayscale requirement, resolution requirement, image file size requirement, and/or the like.

For another example, in one implementation, for kiosk/ATM deposit, a user may be instructed from the screen of a kiosk/ATM machine to place or insert the check into a check deposit slip for scanning, and/or the like.

In one implementation, the ImageInspector may also instruct the user to enter an amount of the check to be deposited. For example, in one implementation, the user may enter a deposit amount on an ImageInspector website, on a kiosk/ATM machine, or send an amount number to the ImageInspector platform from a mobile device, and/or the like.

In an alternative implementation, the ImageInspector may implement an "atomic deposit" without requesting the user to input deposit information in addition to the check image submission. In this case, the user device (e.g., the mobile device, the home scanner, etc.) may be decoupled from the transaction once the submission of the a digital image file for deposit of the check is made. The transaction is thereafter managed by the ImageInspector platform. In this manner, incomplete transactions are avoided by moving the transaction processing to the ImageInspector platform side at a financial institution (e.g., payee's bank, etc.) after the user submits the digital image file. Any loss or severing of a communications connection between the user computing device and the ImageInspector platform, such as due to browser navigation away from the ImageInspector web page, communication failures, user logouts, etc. on the user side, will not affect the processing and the deposit of the check in the digital image file. Thus, the transaction will not be left in an orphaned state.

In another embodiment, if the image capture device is not controllable by the browser application component, the ImageInspector may load an instruction user interface page 11A-15, and instruct the user manually upload the check images. For example, in one implementation, the ImageInspector platform may not have certificates for scanner drivers for a Macintosh computer. In one implementation, the ImageInspector may instruct the user to enter a deposit amount 11A-20 (as illustrated in a schematic user interface 11B-50 shown in FIG. 11C), and to scan front/back side of the check and save the scanned image files 11A-25. In one implementation, the ImageInspector may instruct the user to save the scanned image files in a specified format (e.g., tiff, JPEG etc.) 11A-30, as illustrated in the schematic user interface 11B-56 and 11B-58 of FIG. 11B. In one implementation, the ImageInspector may instruct the user to edit the check image file prior to uploading 11A-30. For example, in one implementation, as shown in FIG. 11C, the ImageInspector may instruct the user to crop the check image via an image editing component, during which the user may a submit a selection of check image corner 11C-72 via a user interface. In a further implementation, the ImageInspector may instruct the user to convert the obtained check image into a grayscale image prior to uploading the image file. In one implementation, the user may send the obtained check images to ImageInspector platform via email, mobile MMS, ImageInspector browser uploading, and/or the like.

In one embodiment, the ImageInspector may receive check digital files 445 from the remote user device. In one implementation, the user may send the obtained check images to ImageInspector platform via email, mobile MMS, ImageInspector browser uploading, and/or the like. In one embodiment, if the user image capture device is video-enabled, the ImageInspector may receive video clips of the check. In one implementation, video files may be saved in a series of compliant formats (e.g., AVI, MPEG4, RM, DIVX, etc.) and submitted to the ImageInspector platform in similar manners with those of submitting check image files as discussed above. In one implementation, the ImageInspector may instruct or assist the user to compress one or more video files into a package (e.g., WinZip package, etc.) and submit the pack to the ImageInspector.

ImageInspector Image Capturing Facility

Figure 12A:
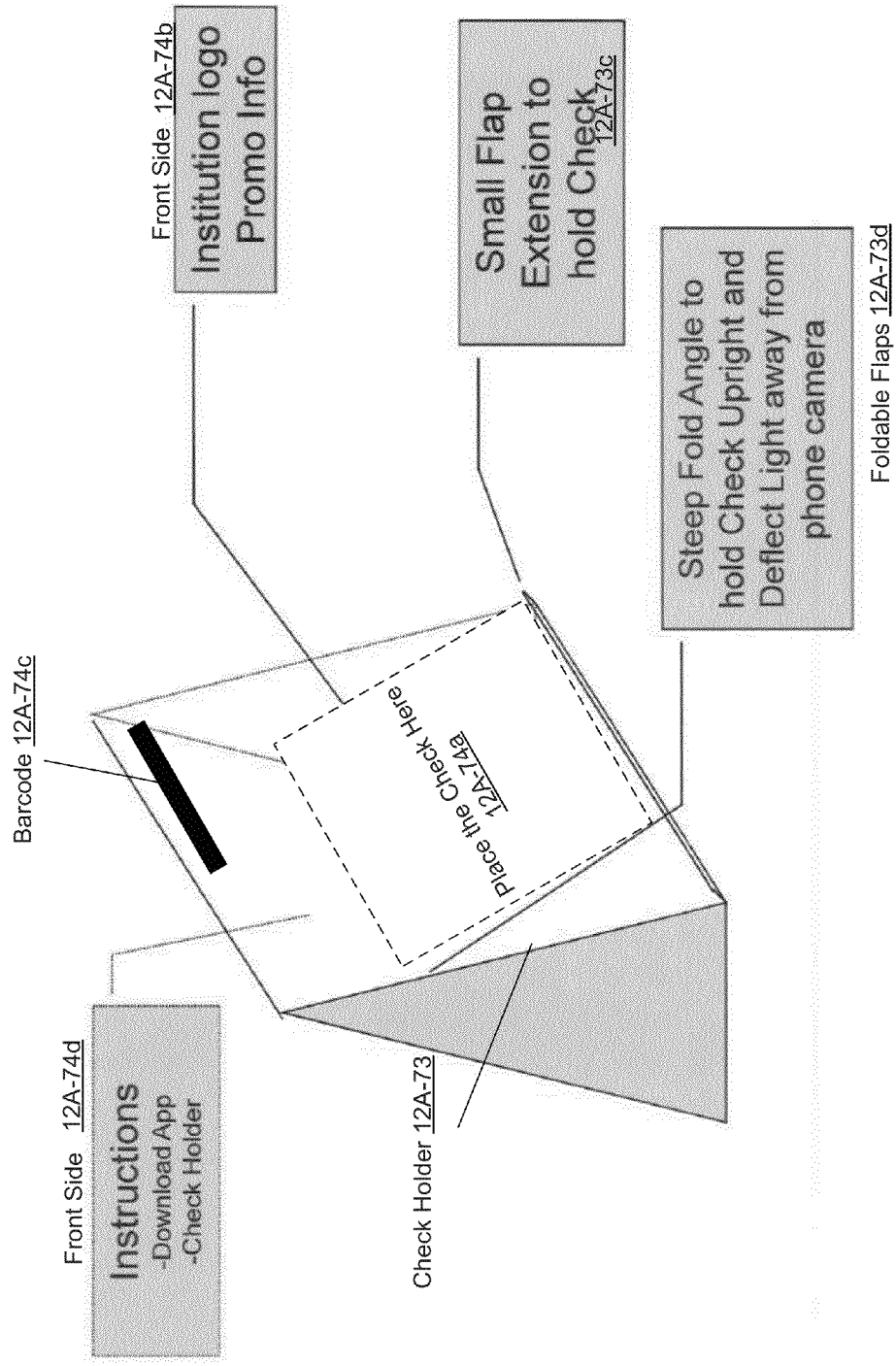
FIGS. 12A-12B provide diagrams illustrating aspects of a remote deposit capture accessory in one embodiment of the ImageInspector.

FIG. 12A shows an exemplary apparatus for obtaining an image of the check in one embodiment of ImageInspector. In one embodiment, a check sleeve or a check holder, with space to hold one or more checks, may be used to capture an image of a check. The checks sleeve may, for example, be made of a flexible material, such as plastic, and may have mechanisms to hold one or more checks in place in one or more designated spaces. For example, the check sleeve may have a flap or corners that hold a check in place a during scanning. The type of flap or corners that are used may be chosen to hold the check in a place, while also allowing certain parts of the image to be captured without optical interference—e.g., by having cutouts that directly expose the check in portions that are expected to undergo optical character recognition. The mechanism may also be configured to allow optical detection of the presence or absence of a check within the sleeve.

Within various embodiments, Markings or other features may be incorporated into the check sleeve to assist in orienting an image of the check to the proper angle, or in distinguishing portions of the image that represent the check from non-check portions. For example, horizontal and vertical lines may be printed on the check whose position on an image can be detected allow the skew angle of the image to be determined and offset. Also, the background of the sleeve may be printed in a color or opacity that is expected to contrast with the checks that are to be placed in the sleeve, thereby providing contrast that can be used to distinguish check portions of the image from non-check portions. Additionally, one or more barcodes can be printed on the sleeve that can encode information such as the type of sleeve, the account number to which the checks are to be deposited, or a digital signature.

In further embodiments, a sleeve can be constructed that holds a plurality of checks—e.g., two or more checks— thereby allowing plural checks to be deposited at the same time.

As shown in FIG. 12A, a check holder may take a form similar to a foldable, self-locking stand 12A-73, which may be made of flexible and bendable material, such as plastic, paper, and/or the like, and may have mechanisms to hold one or more checks in place in one or more designated spaces. In one embodiment, the a check holder 12A-73 may have a front side 12A-73a on which the check to be scanned or taken a picture of will be placed. To reduce reflection, the front side of the check may provide dark background in contrast to the color of the paper check. The front side may be made of light absorbing materials to reduce reflection. In one implementation, the front side 12A-73a may comprise a rectangular area with printed information "place the check here" 12A-74a to instruct the user to place the check. In another implementation, instructions of how to position the check may be included, e.g., the user may be instructed to place the check in a horizontal or vertical position.

In another implementation, the front side of the check holder may comprise printed information with regard to instructions 12A-74d of remote deposit, such as instructions as to how to initiate the remote deposit capture application, download an application package from a remote server, place the paper check in the check holder, capture an image of the check holder containing the check and send the captured image to the remote server using the downloaded application package. In another implementation, the frond side of the check holder may comprise an institution trademark logo and promotion information for the ImageInspector.

In a further implementation, to facilitate the remote deposit, the check holder may be customized for an individual depositor. For example, in one implementation, the front side of the check holder may comprise a barcode printed thereon 12A-74c, which includes information with regard to the depositor, such as, but not limited to depositor name, depositor account number, depositor bank routing number, and/or the like. In a further implementation, a user may capture an image of the check placed on the check holder, creating a visualization of the check associated a with the barcode so that the ImageInspector may process the received image and obtain depositor information from the barcode. In another implementation, other information may be printed on the front side of the check holder, such as, but not limited to, the depositor's ImageInspector membership name, the payee's bank name, and/or the like.

For another example, the barcode 12A-74c may be a code that enables a given financial institution to recognize its own check holder, and verify that the customer is using a holder provided by that particular financial institution as opposed to a holder provided by a different financial institution. In one implementation, a financial institution may provide various different check holders (e.g., check holders for different sized checks, holders with different types of line markings, holders with different luminescence properties, etc.), and the barcode may be used to assist the processing of the image that results from scanning checks positioned in the sleeve. For example, if one check holder has particular line markings or particular luminescence properties, the barcode may comprise information indicative of those properties so that the image processing techniques can be tuned for use with the particular check holder being used. As another example, each customer of a financial institution can be provide with one or more check holders that are customized for that customer, and the barcode may encode the customer's account number, customer number, or other identifying information. If the barcode encodes the customer's account number or customer number, that information may be used to determine the account to which a check is to be deposited. For another example, the barcode may also encode certain security techniques, such as digital signatures, to deter against counterfeit sleeves and/or counterfeit barcodes.

Within various implementations, the barcode 12A-74c may use a variety of a formats. For example, the barcode may be a line format, such as a alphanumeric code, or a two-dimensional code, such as data matrix. As another example, the barcode can be used to orient the angle of an image of the check—e.g., by detecting the skew of the lines or boundaries of the code, and correcting for the detected angle. As another example, the front side of the check holder may comprise more than one rectangular areas to place the check, and there may be multiple barcodes associated therewith, e.g., one barcode next to each area into which a check may be inserted.

In one embodiment, the check holder 12A-73 may comprise a small flap extension 12A-73c at the bottom of the front side to hold the check be placed within the area 12A-74a, and the small flap may hold the check at a slight angle so as to deflect glare-light which may be incurred by a camera lens. In a further implementation, the front side of the check may comprise a transparent layer affixed thereon, so that the check may be inserted between the transparent layer and the front side of the check, wherein the transparent layer may assist to hold the check within the rectangular area 12A-74a and to reduce reflection on the surface of the check.

Figure 12B:
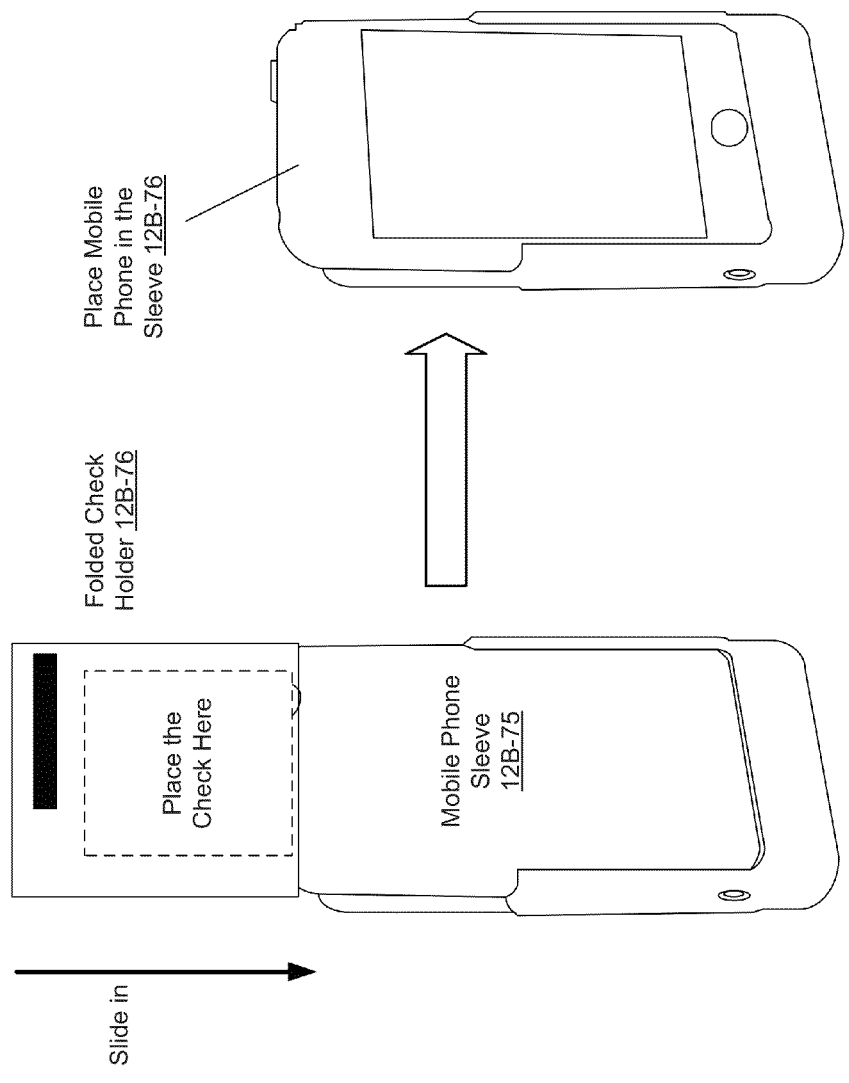

In one embodiment, the check holder is supported by foldable flaps 12A-73d on the left and the right side of the front side. The foldable flaps may be adjusted to create a steep fold angle to hold the check upright and deflect light away from the camera. In an alternative embodiment, as shown in FIG. 12B, the foldable flaps may be folded to the back of the front side of the check holder, so that the folded check holder 12B-76 may be inserted in to a mobile phone sleeve 12B-75. A depositor may carry the folded check holder 12B-76 which is conveniently placed in his mobile phone sleeve 12B-75 together with the mobile phone 12B-76, and may capture images of a check with the check holder and the camera built in the mobile phone for remote deposit conveniently.

In one implementation, the user may capture an image of the check placed on the check holder and submit the image to the ImageInspector. In one implementation, the captured images may be processed to identify which portion(s) of the images represent the check. The process of determining which portions of the check represent the image may include image enhancement, check corner detection, dewarping, cropping and/or the like, as further illustrated in FIGS. 15A-16D.

In further implementations, the ImageInspector may process the received image of the check holder comprising the check. The ImageInspector may detect the barcode on the received image, and obtain information embedded in the barcode. For example, a barcode reader may be adopted to obtain information encoded in the barcode, such as, but not limited to the depositor's name, depositor account number, payee's bank information, etc. In one implementation, upon performing OCR on the check image to extract deposit information, the ImageInspector may compare the extracted deposit information with the relevant information obtained from barcode reading. If any inconsistency is detected, the ImageInspector may send a notification to the user, e.g., by displaying a message to the smart phone or the home computer, to reject the image and request re-submission of the check image.

For example, for security concerns, a payee's bank may provide individualized check holder for a user to engage in remote deposit service, e.g., the individualized check holder may comprise a barcode with embedded information of the user's account information and the payee's bank's routing number. If the user uses the a check holder, attempting to capture an image of a check belonging to his spouse, child, friends, and/or the like, the payee's bank may reject the remote deposit.

In an alternative implementation, if the ImageInspector determines the extracted deposit information from OCR matches the barcode information, the ImageInspector may proceed with processing the deposit.

ImageInspector mobile deposits via MMS

Figure 13A:
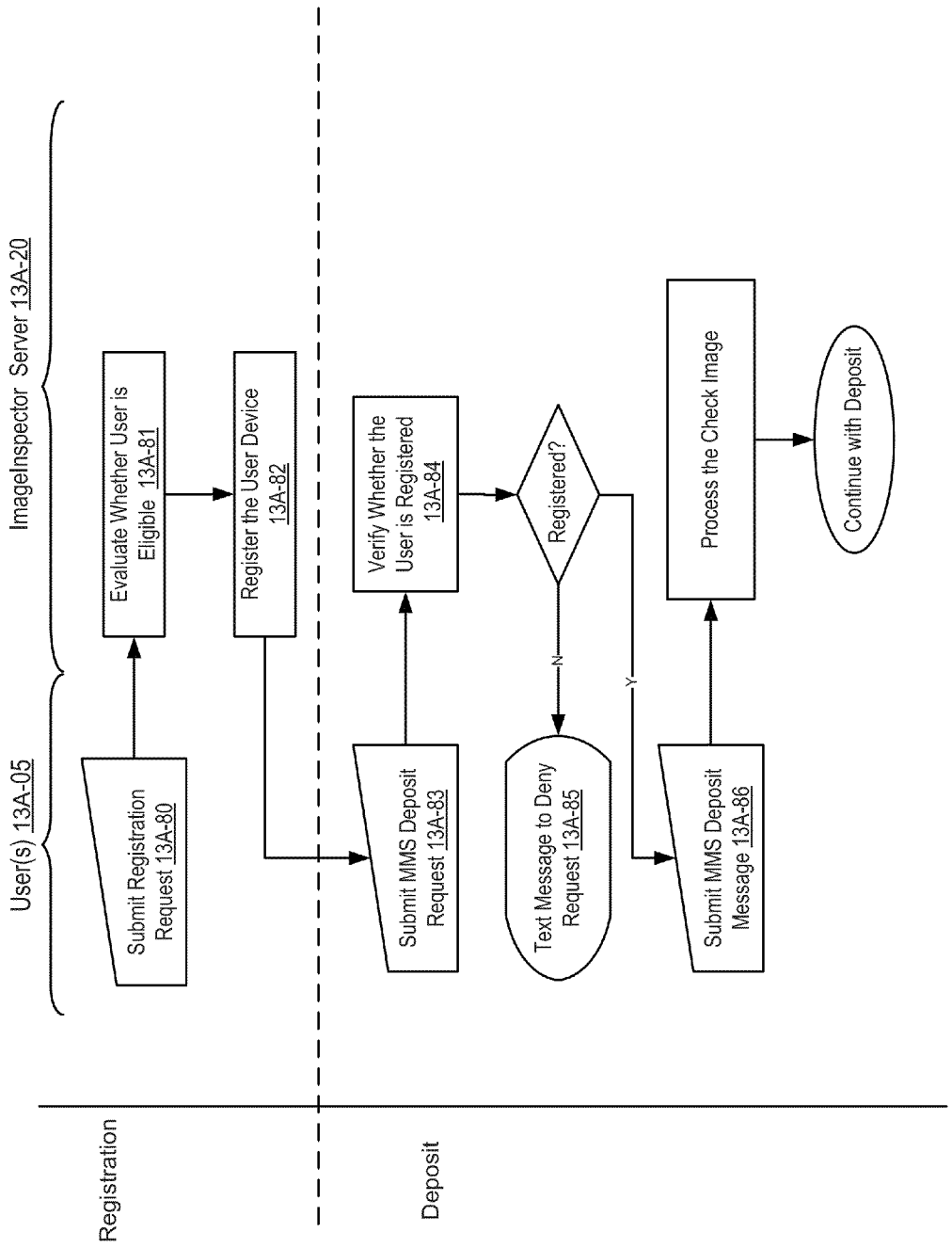
FIGS. 13A-13B provide diagrams illustrating aspects of a remote deposit capture via electronic messages in one embodiment of the ImageInspector.
Figure 13B:
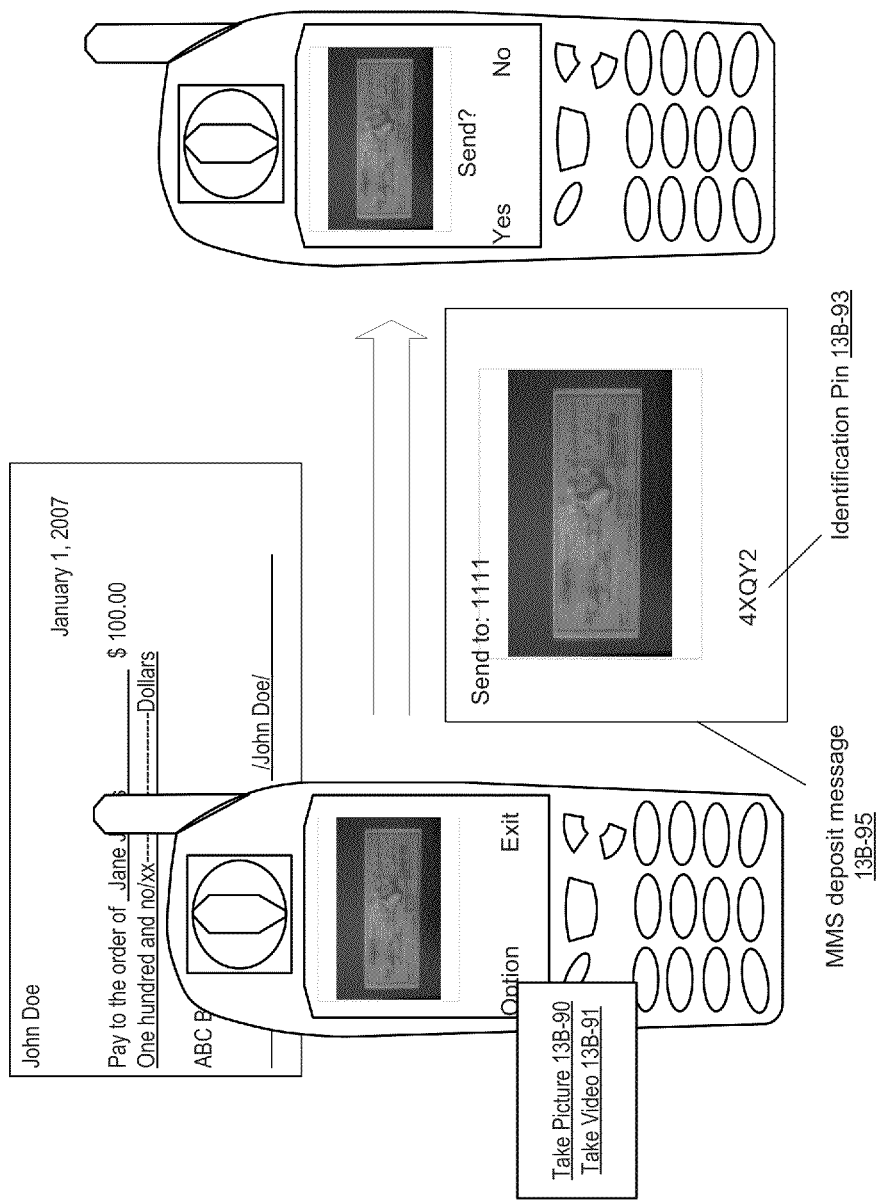

FIG. 13A shows a logic flow illustrating deposit via multimedia message service (MMS) in one embodiment of ImageInspector. In one embodiment, a user may be requested to register for the MMS deposit service prior to deposit processing. For example, a user may submit registration request 13A-80, via a text message, a call to customer service, mails to the ImageInspector service/payee's bank, and/or the like. The ImageInspector platform may then evaluate the user eligibility for the MMS deposit service 13A-81. For example, the ImageInspector platform may obtain information related to the user's credit history, income information, crime history, and/or the like. In another implementation, the ImageInspector platform may also impose an automatic registration procedure, wherein a user having an amount more than a minimum required amount in his deposit account is automatically considered for MMS deposit service. The ImageInspector platform may register the user for MMS service by recording the user submitted cellular phone number as "eligible" 13A-82. In another implementation, the ImageInspector platform may register the hardware identification of the user mobile device, such as the MAC address.

In one embodiment, a user may submit a remote deposit request 483 by a sending a MMS message to the ImageInspector platform 13A-20. In one implementation, a cellular messaging application server may be equipped at the ImageInspector platform associated with a MMS identification number. For example, FIG. 13B shows an exemplary diagram of ImageInspector remote deposit via multimedia messaging service (MMS) within embodiments of the ImageInspector, wherein the user may send a message to phone number "1111," which represents the MMS deposit service. A user may elect to take a picture 13B-90 or take video 13B-91 of a physical check.

In one implementation, upon verification at the ImageInspector platform 13A-84, if the user is not registered, a text message may be sent to deny deposit request 13A-85. Otherwise, if yes, the user may generate and send a remote deposit message, 13A-86 by taking a picture 13A-80 of the check and attach the captured image in a MMS message 13A-95. For example, the MMS message may comprise an image of the front side of the check and an image of the back side of the check. In one implementation, the user may enter deposit information in the MMS body such as, deposit amount, deposit account number, and/or the like.

Within various embodiments, deposit via MMS may require registration with the ImageInspector platform as discussed above. For example, the ImageInspector platform may verify whether the user is a qualified member for MMS deposit service. In one implementation, the user may register his cellular phone number with the ImageInspector platform as a member qualified for MMS service, and ImageInspector may verify whether the cellular phone number associated with a MMS message is registered. If not, the ImageInspector platform may send a message back to a the user indicating transaction has been denied.

In another implementation, the user may include a personal identifying pin 13B-93 in the MMS body for verification. For example, in one implementation, a qualified MMS deposit user may first send a text message to ImageInspector (e.g., number "1111" as in FIG. 13B) to request deposit, and may receive a verification pin from the ImageInspector platform. The user may then send the MMS deposit message including the identification pin as an authorization of the deposit.

In another implementation, as shown at 13A-81, live video streaming of a check may be captured and transmitted to the ImageInspector platform. For example, a user may request to establish a real-time video streaming link with the ImageInspector platform when submitting the remote deposit request. In such cases, the user device and the ImageInspector platform may employ streaming video streaming software packages such as Apple Quicktime Streaming Servers, Marcromedia Communication Server, and/or the like. In one implementation, the user may create a video in a common streaming media format such as MPEG4, 3GPP and/or the like, and upload an encrypted HTTP streaming video on the ImageInspector web server. For example, in one implementation, a user may employ an Apple iPhone may establish HTTP live streaming to the ImageInspector platform via Quicktime Software systems.

In one embodiment, upon receiving the MMS message from a user mobile phone, the ImageInspector system may process the check image attached in the MMS message to extract deposit information. For example, the check image may be enhanced, deskewed, dewarpped and cropped to generate a Check-21 image, as further illustrated in FIGS. 15A-16D.

Imageinspector Video Deposit

Figure 14:
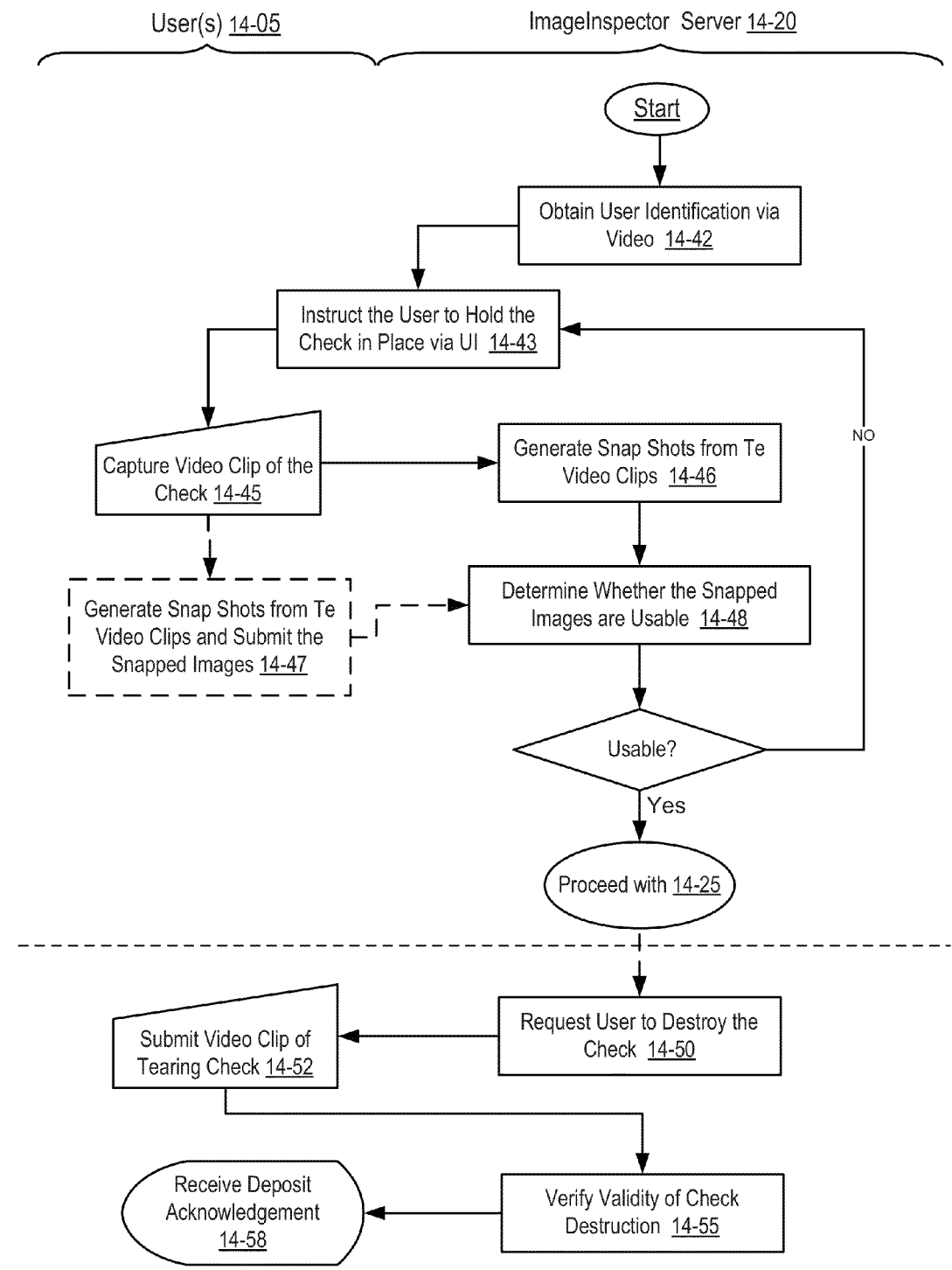
FIG. 14 provides a logic flow diagram illustrating aspects of video remote deposit capture in one embodiment of the ImageInspector.

FIG. 14 provides a logic flow diagram illustrating video deposit within embodiments of the ImageInspector system. In one embodiment, a user operating a personal computer (e.g., a desktop, a laptop, etc.) connected with a web camera, a cellular phone with built-in camera, a smartphone with built-in camera, and/or the like, may use the camera to capture video of the check for remote deposit.

Within various embodiments, upon receiving a deposit request from a user, the ImageInspector platform may deliver a remote deposit processing component to the user device as discussed in FIGS. 6A-6B. In a further implementation, the user may select to submit identification information 14-42 for the deposit via the camera. For example, the ImageInspector platform may receive and process biometrics data from the user 14-05, e.g., a payee may be instructed to submit an image or video clip of himself by posing his face in front of the web camera, or the cellular phone camera. In one implementation, the remote deposit processing component running on the user's device may provide a user interface which instructs the user to position his face within a specified area in order to produce a quality front side view.

In one implementation, the ImageInspector platform may take a snap picture of the video of the user to perform face recognition procedures for user authentication, obtaining payee information for check clearance, and/or the like. In one implementation, in order to obtain quality images of the user, the ImageInspector platform may automatically take multiple snap images from the video. If none of the obtained photos is qualified during the facial recognition, for example, the photo is too blurred, the user submitting a profile view of his face, and/or the like, the ImageInspector platform may request the user to re-submit identifying information. In one implementation, the user may select re-producing facial recognition video, or switch to other identifying methods, such as submitting login information, and/or the like.

Upon identifying the user, the ImageInspector platform may instruct the user to hold the check in front of the camera to produce video capture 14-45. For example, the ImageInspector platform may display a message "please hold your check up to your web camera" via the user interface of the remote deposit application running on the user's computer, and display another message "you may remove the check now" after a short period of time (e.g., 3 seconds, etc.), during which the remote deposit application has captured a video clip of the check holding in front of the camera.

In one implementation, the user may send the whole video clip file to the ImageInspector platform to generate snap images from the video clips 14-46. In an alternative implementation, as a video file is usually large, to achieve efficiency, the remote processing component may generate images from the video clip 14-47. For example, in one implementation, the ImageInspector system may utilize video screen capture software packages to generate screen frame grabs and save the grabbed image files. In one implementation, software such as Apple QuickTime, WM Capture, CamStudio, and/or the like, may be employed to obtain frame grabs of the check video streaming.

In another implementation, the remote deposit application at the user's a computer may automatically take consecutive snap pictures of the check when the user holds the check in front of the camera. For example, the user may be requested to hold the check in position for 3 seconds, during which the remote deposit application may capture snap pictures every too ms to generate 30 frames of the check, and submit the 10 images to the ImageInspector platform.

In one implementation, the ImageInspector system may determine whether the snapped images are usable 14-48. For example, the resolution and file format of the check images may be checked. For another example, the ImageInspector system may perform an initial OCR on the images to examine whether the texts in the image are legible. If the ImageInspector system obtains multiple images of the check, then the image with the best quality may be used to optimize performance. For example, the ImageInspector system may select the image with the highest solution, with the least corner reflection as discussed in FIG. 15H, with the least skewness or distortion as discussed in FIG. 16A, and/or the like. In one embodiment, if none of the images is qualified, the ImageInspector may request the user to re-produce check images via the camera at 14-43. In one implementation, the user device may transmit the grabbed frames of check to the ImageInspector platform in real-time, so that the ImageInspector may examine the received images in real-time to select an optimal shot, and/or notify the user whether re-capture is required due to poor image quality.

In one embodiment, upon obtaining check images, the ImageInspector system may proceed 14-25 to extract deposit information and complete the deposit. The ImageInspector may further utilize the user camera for check destruction. In one implementation, the ImageInspector may request the user to destroy the physical check 14-50 after successful deposit. For example, in one implementation, the ImageInspector system may display a message "Please tear the check to your camera." The user may then submit a video clip of tearing the check 14-52, while the deposit application may take snap shots. In one implementation, the ImageInspector system may verify validity of the check destruction 14-55, e.g., verifying the check shown in the received snap pictures is the same as the deposited one, and then send a deposit acknowledgement message to the user to confirm the deposit 14-58.

In one implementation, the ImageInspector system may implement user face recognition, capturing snap pictures of the check and capturing destruction of the check in real-time. In another implementation, the ImageInspector system may process the video deposits in a batch. For example, the ImageInspector system may request the user to submit snap shots of the check, and then soft posts the fund. The ImageInspector system may then request the user to destroy the check after check clearance in batch time as discussed in FIGS. 17B-17C.

ImageInspector Check Image Enhancement

Figure 15A:
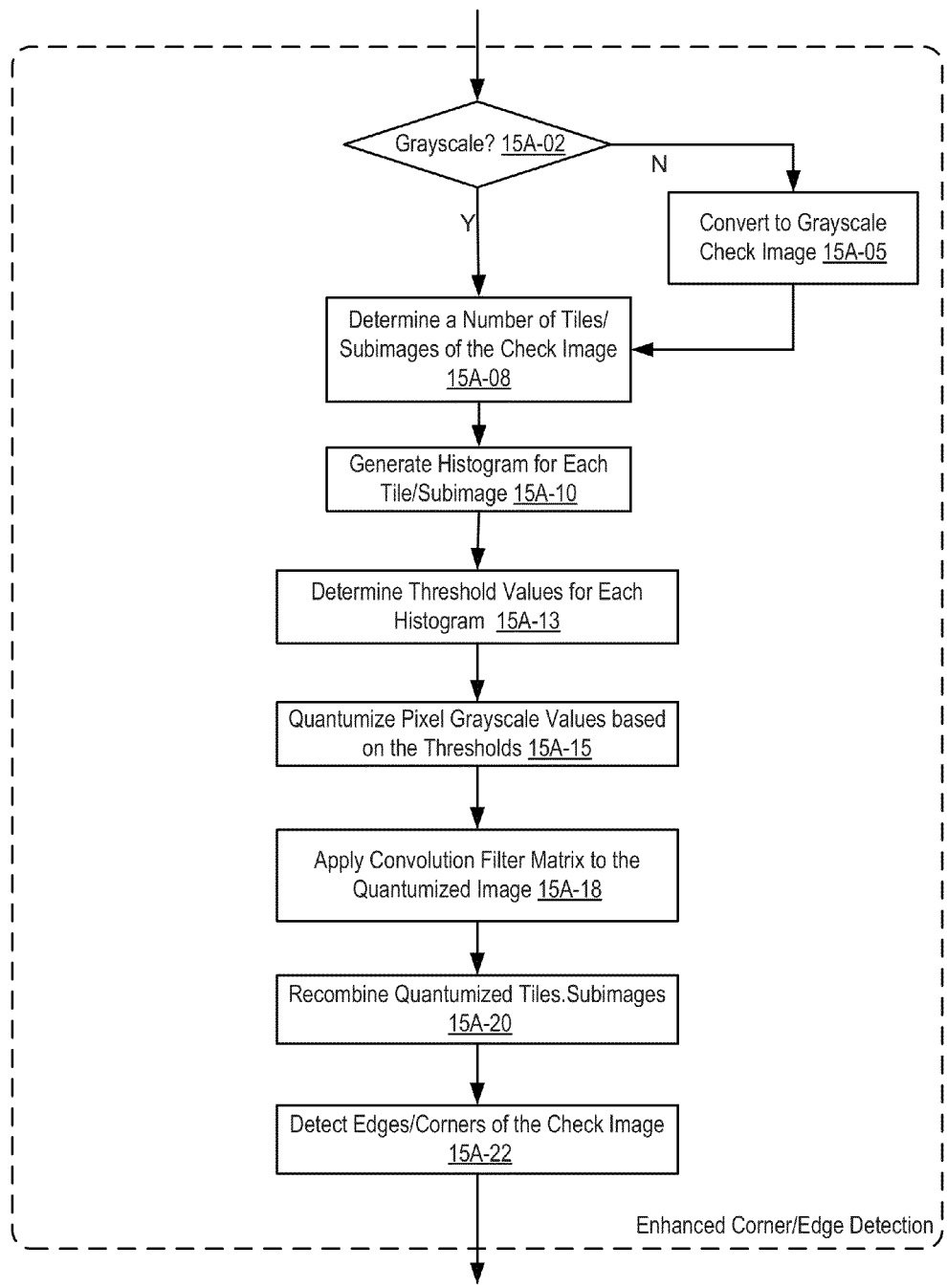
FIGS. 15A-16D provides logic flow diagrams and examples illustrating aspects of an enhanced corner/edge detection in one embodiment of the ImageInspector.

FIG. 15A is of a logic flow diagram illustrating aspects of processing and extracting deposit check images in one embodiment of the ImageInspector. In one embodiment, the ImageInspector may determine a type of the received digital deposit file 15A-05, e.g., whether it is streaming video, a video file, or an image file. For example, in one implementation, the ImageInspector may rely on the file extension of the received digital file to determine its type, i.e., "wmv," "avi," "rm", "3GPP" are video a files, and "jpg," "tiff," "bmp" are image files.

In one embodiment, if a video file is received or live video streaming is detected 15A-06, the ImageInspector may generate still check images from the video streaming 15A-10. For example, in one implementation, the ImageInspector may utilize video screen capture software packages to generate screen frame grabs and save the grabbed image files. In one implementation, software such as Apple QuickTime, VM Capture, CamStudio, and/or the like, may be employed to obtain frame grabs of the check video streaming.

In one embodiment, if the received digital deposit file is an image file, or at least one check image file has been grabbed from the received video clip, the ImageInspector may determine whether the check image is valid 15A-15. In one implementation, the ImageInspector may determine the usability and quality of the check image. For example, in one implementation, the ImageInspector may check whether the check image is in compliance with the image format requirement, the resolution requirement (e.g., at least 200 dpi), and/or the like.

In a further implementation, the ImageInspector may perform an Optical Character Recognition (OCR) procedure on the generated check image to determine whether the characters on the check image is legible, and/or whether an endorsement is contained on the back side image of the check. Depending upon the standards imposed by the Check 21 Act and the payee's bank's own internal image standards, the verification of the digital image may vary. For example, the Check 21 Act may require that the image be of a certain image quality. Although there are several ways in which image quality may be determined, one manner in which it may be done is to perform an OCR operation on the check to determine if at least a portion of the information in the image is determinable. The bank may first attempt to extract and recognize characters within the digital image. Any extracted characters may then be compared to previously known information or information submitted by the account owner in the deposit request. For example, the bank may attempt to find and OCR the MICR line at the bottom of the digital image. If the MICR line is unreadable or the characters identified do not correspond to known and verifiable information, the bank may reject the image.

In one implementation, if the check image fails to meet the system requirements 15A-20, the ImageInspector may send a request to the user for resubmission of a check image 15A-22. In another implementation, if the check image is determined to be valid 15A-20, the ImageInspector may proceed to process the check deposit image 15A-25, including large image file compression 15A-30, image quantumization and enhanced edge/corner detection 15A-32, and dewarping/cropping the check image 15A-34 for presentment, as will be further illustrated in FIGS. 6B-F. For example, in one implementation, the ImageInspector may compress the image file in order to save storage space (e.g., 2 megabytes per image).

In one embodiment, the ImageInspector may convert the processed check image for presentment and deposit 15A-40. For example, in one implementation, the ImageInspector may save the check image in compliance with the requirements of the payee's bank for substitute checks, such as a Check 21 X9.37 cash letter file, and/or the like.

Figure 15B:
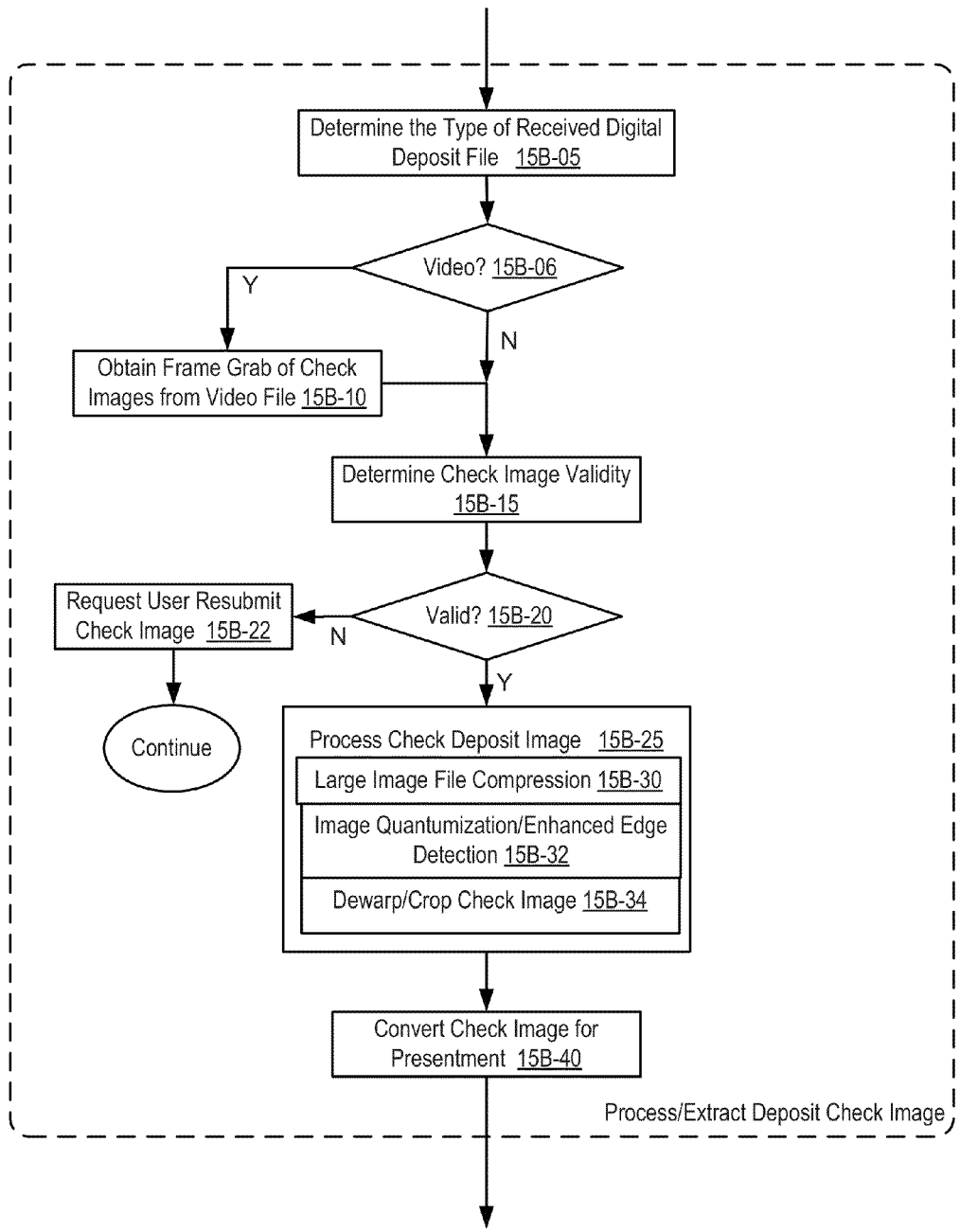

FIG. 15B provides a logic flow diagram illustrating aspects of an enhanced corner/edge detection using image quantumization 532 in one embodiment a of the ImageInspector. In one implementation, the image enhancement and corner detection described herein within embodiments may be performed at the ImageInspector platform. In another implementation, the image enhancement and corner detection may be performed at the client device. For example, the RDC processing component 103a/103b delivered to and instantiated on the client device may comprise an image processing package to enhance, crop and prepare the captured check image.

As shown in FIG. 15B, the ImageInspector may determine whether the is check image is a grayscale image 15B-02. If not, the ImageInspector may convert the color image into a grayscale check image 15B-05. For example, in one implementation, the ImageInspector may turn the luminance value of every pixel of the color check image into a grayscale pixel luminance value, and a C#implementation may take a form similar to:

```
public Bitmap ConvertToGrayscale(Bitmap source)
{
   Bitmap bm=new Bitmap(source.Width,source.Height);
   for(int y=0;y<bm.Height;y++)
   {
      for(int x=0;x<bm.Width;x++)
      {
         Color c=source.GetPixel(x,y);
         int luma=(int)(c.R*0.3+c.G*0.59+c.B*0.11);
         bm.SetPixel(x,y,Color.FromArgb(luma,luma,
            luma));
      }
   }
   return bm;
}
```

In one embodiment, the ImageInspector may determine and divide the check image into a number of tiles/sub-images 15B-08. For example, a sub-image may be parsed from the original check image at pixel (100,350) with a width of 100 pixels and height of 50 pixels. In one implementation, the number of tiles/subimages may be pre-determined by a system operator as a constant. In another implementation, the number may be determined by a formula in proportion to the size of the image. In one embodiment, for each tile/sub-image, a histogram may be generated 15B-10. FIG. 15E shows an example histogram chart, wherein the X axis denotes the gray value and the Y axis denotes the number of counts of gray.

In one embodiment, grayscale threshold values for each histogram may be determined 15B-13, using a variety of algorithm such as, but not limited to statistical analysis (as will be further illustrated in FIG. 15F), minimum fuzziness algorithm (as will be further illustrated in FIG. 15G), Otsu algorithm, and/or the like. In one embodiment, grayscale threshold values may be determined by image binarization are then determined using statistical analysis of the histogram. In one embodiment, the grayscale check image may be quantumized 15B-15 based the determined threshold values for each tile/sub-image. For example, in one implementation, the background of the check in a relatively dark color may be converted to black. For another example, the grayscale check image may be binarized into black and white only, i.e., if the gray value of a pixel is greater than the determined threshold value, it is determined as "white"; otherwise it is determined as "black".

In one embodiment, the ImageInspector may apply image filters to the quantumized image 15B-18 to generate a virtual image for corner detection. For example, in one implementation, each tiled image may be blurred by convolving the tiled grayscale thresholded image with an array of ones, which causes dilation effect to the image, whereby the dilation array may be a square matrix of ones of size 3×3 or 5×5 depending on the virtual image size.

In an alternative implementation, a convolution filter matrix may be applied, which is designed to sharpen and enhance edges of the quantumized check image. For example, in one implementation, the ImageInspector may employ a Java Advanced Image (JAI) package for one implementation of applying a sample edge-enhancing convolution filter matrix, which may take a form similar to:

```
float data [ ] =
{     0f,    0f,    0f,   -1f,   -1f,   -1f,    0f,    0f,
      0f,    0f,   -1f,   -1f,   -3f,   -3f,   -1f,   -1f,
      0f,    0f,   -1f,   -3f,   -3f,   -1f,   -3f,   -3f,
     -1f,    0f,   -1f,   -3f,   -3f,   -6f,   20f,   -6f,
     -3f,   -3f,   -1f,   -1f,   -3f,   -1f,   40f,   20f,
     40f,   -1f,   -3f,   -1f,   -3f,   -3f,   -3f,   -6f,
     20f,   -6f,   -3f,   -3f,   -1f,    -f,   -1f,   -3f,
     -3f,   -1f,   -3f,   -3f,   -1f,    0f,    0f,   -1f,
     -1f,   -3f,   -3f,   -3f,   -1f,   -1f,    0f,    0f,
      0f,    0f,   -1f,   -1f,   -1f,    0f,    0f,    0f  };

KernelJAI kernel = new KernelJAI (new Kernel (9, 9, data) );
PlamarImage temp = JAI.create ("convolve", img, kernel);
```

In alternative embodiment, a black and white virtual image may be obtained via a 3×3 kernel, which may take a form similar to the following:
float data [ ]={
 −6f, 20f, −6f,
 40f, 20f, 40f,
 −6f, 20f, −6f,
};

In one embodiment, upon generating the virtual image, the ImageInspector may recombine the quantumized and enhanced tiles/subimages into a single check image 15B-20, and then proceed to detect edges/corners of the check image 15B-22 (as will be further illustrated in FIG. 15G) based on the enhanced image.

Figure 15C:
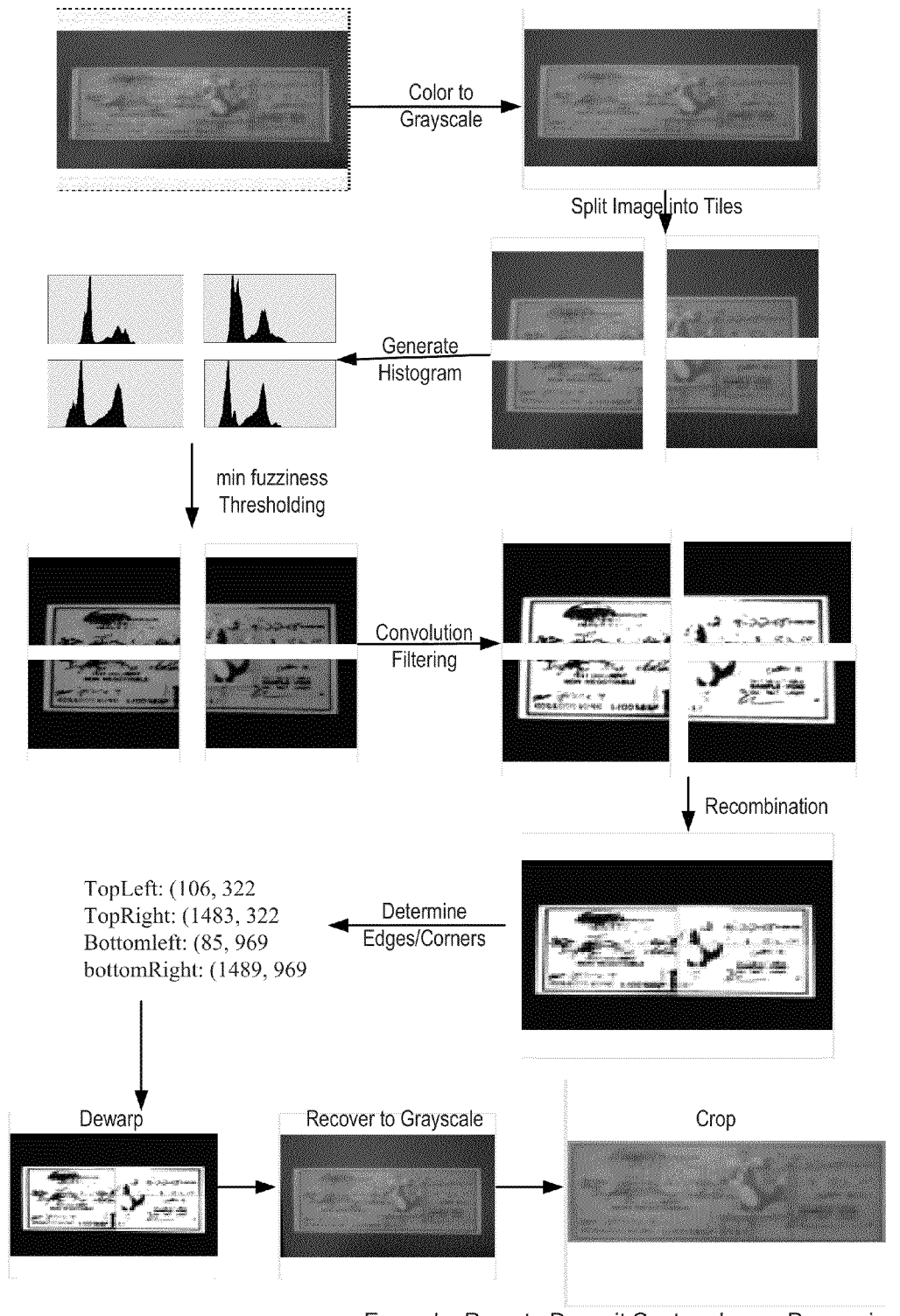
Figure 15D:
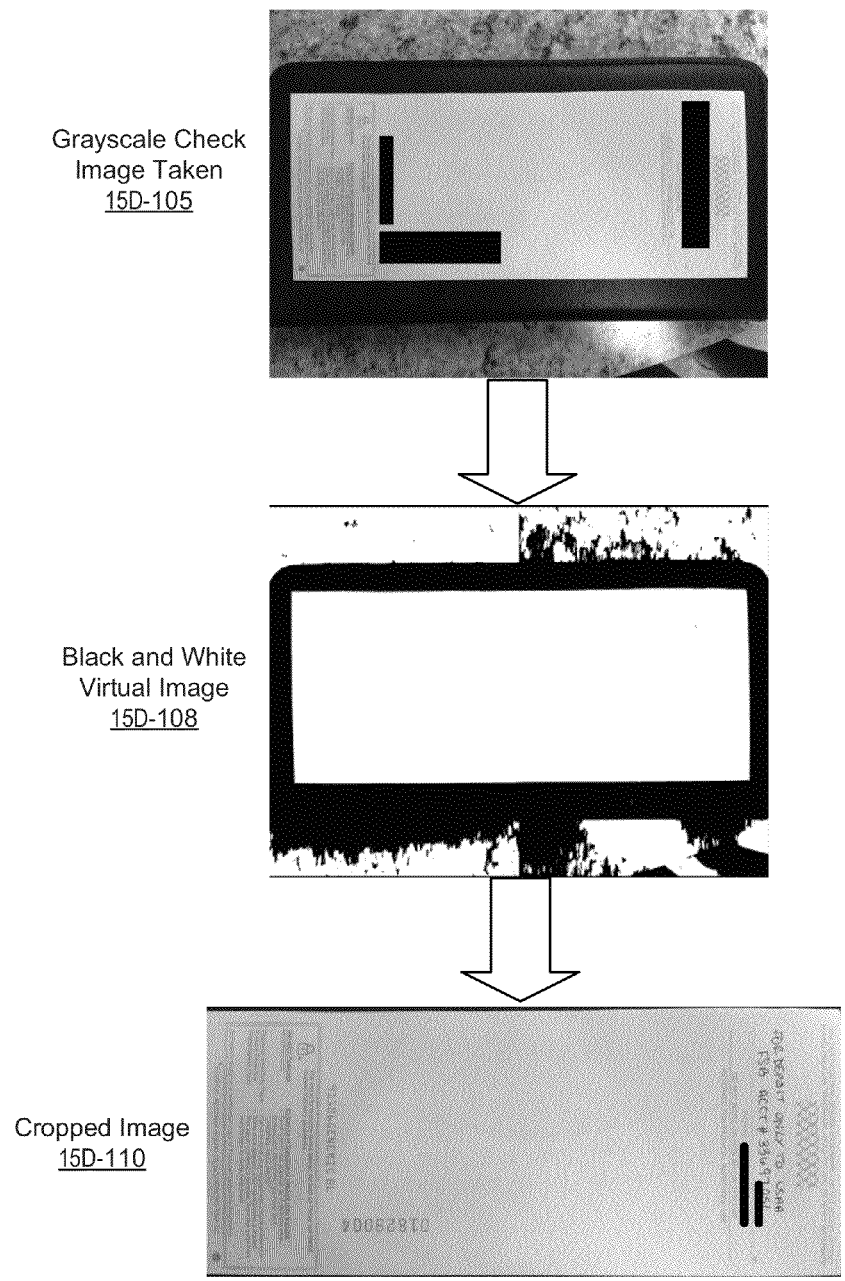
Figure 15E:
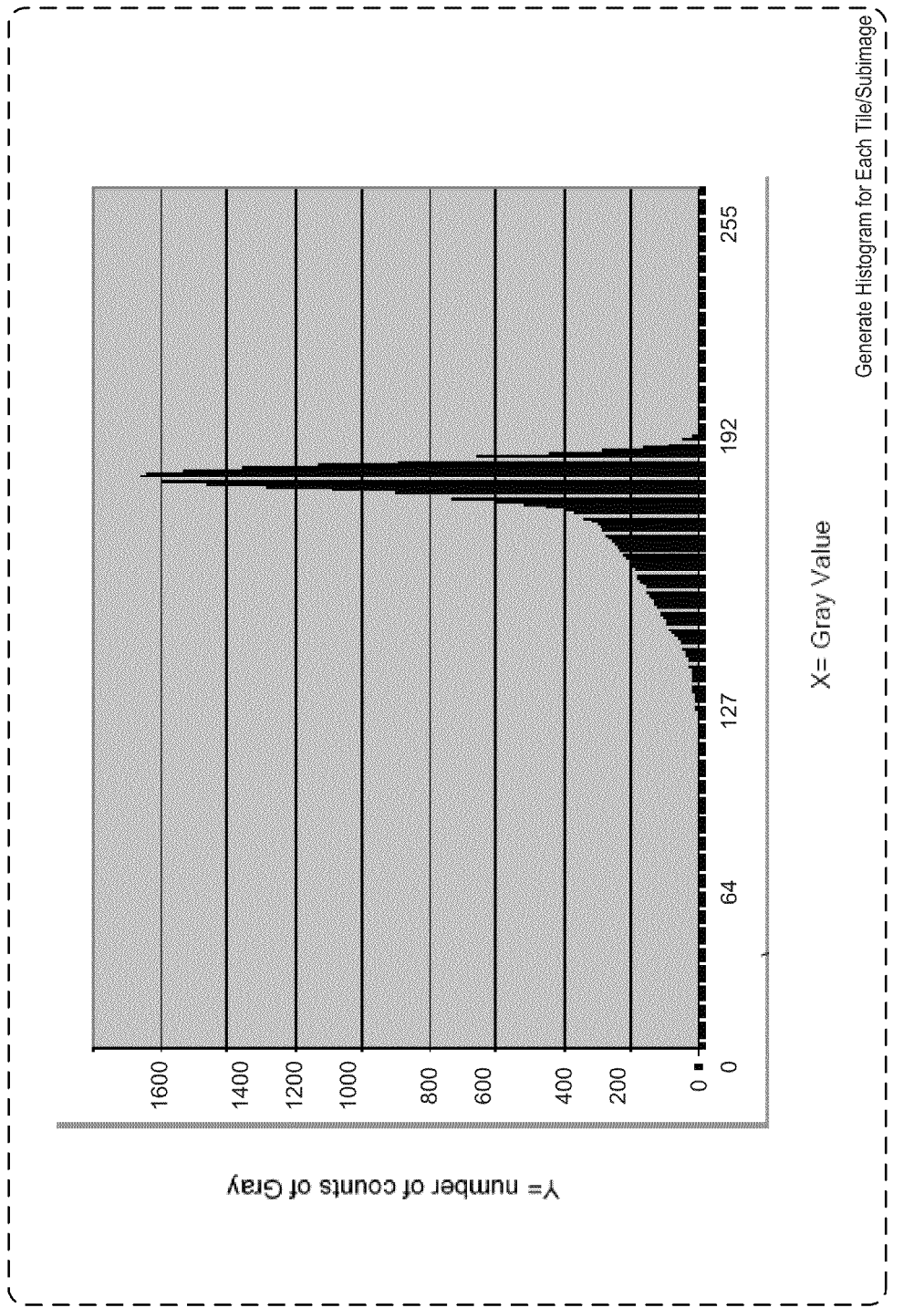

FIGS. 15C and 15D provide examples of check image processing illustrating changes in the check image during the process of FIG. 15A in one embodiment of the ImageInspector. In one implementation, after determining corners of the check image 15A-22, the ImageInspector may dewarp the check image 15B-25, and recover the virtual image to a grayscale image, and then crop the extracted image, as further discussed in FIGS. 16A-16C. In FIG. 15D, an exemplary check image captured by a mobile device (e.g., an Apple iPhone, etc.) in one implementation of the ImageInspector. For example, a user may take a grayscale check image 15D-105 via the ImageInspector application launched at his Apple iPhone, as further illustrated in FIGS. 20C-20D. In one implementation, the grayscale check image may be converted to a black and white virtual image 15D-108 for corner detection. After determining the corners and edges of the check, the check image may be cropped 15D-110 to remove the unnecessary parts from the original grayscale image.

Figure 15F:
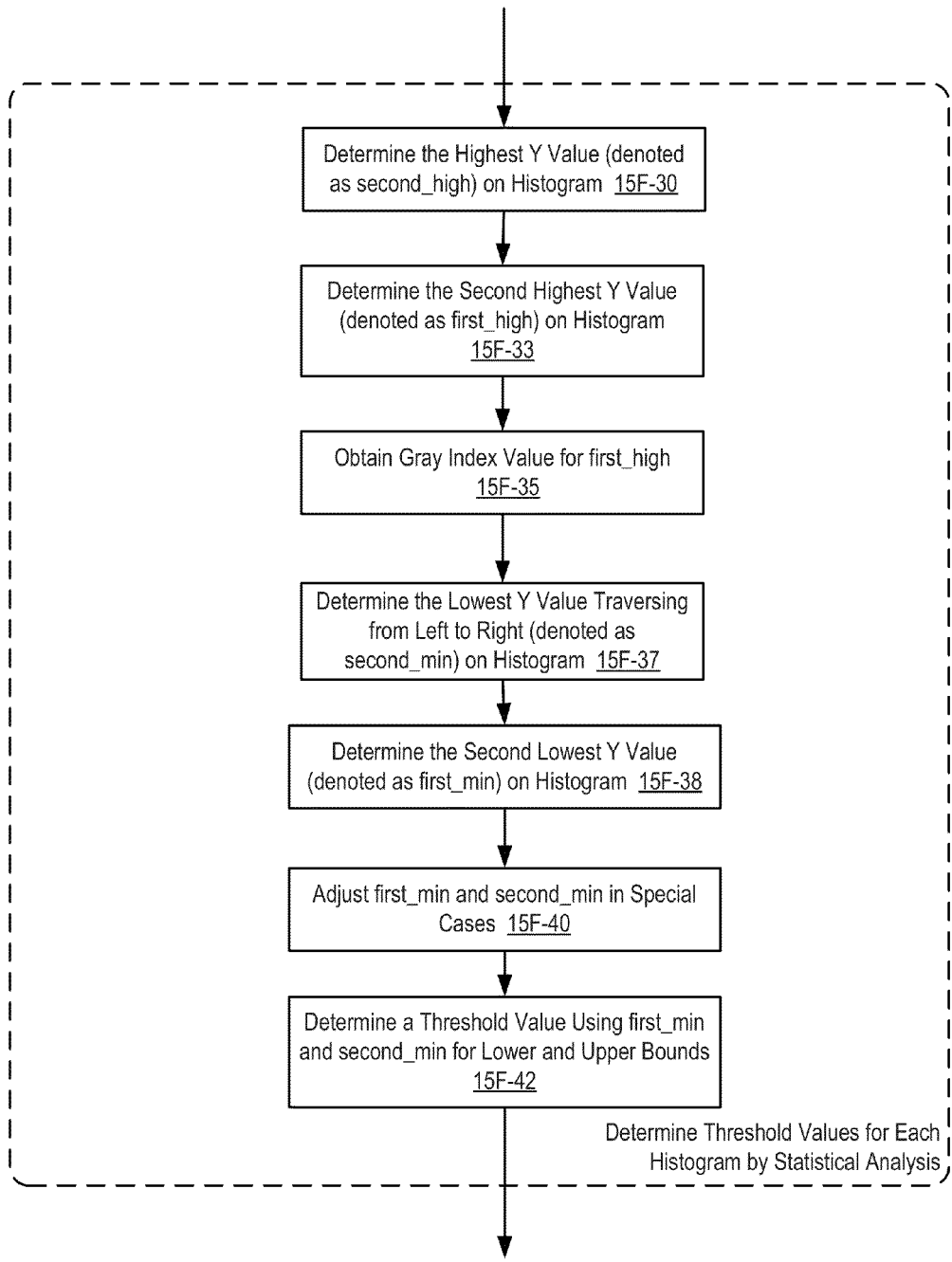

FIG. 15F provides a logic flow diagram illustrating aspects of determining threshold values for the example histogram shown in FIG. 15E by statistical analysis in one implementation of the ImageInspector. In one embodiment, the point having the highest Y value (counts of gray) on the histogram may be located 15F-30. This point may be denoted as "second_high" for the example histogram shown in FIG. 15E since there are two peaks of Y values. Then the point on the histogram having the second highest Y value is located, denoted as "first_high" 15F-33. The indexed gray value is also tracked for these Y values "first_high" and "second_high".

In one implementation, "first_high" may be located by going from left to right on the histogram and comparing the number of counts (Y) of each indexed value (X) to the previous value until the reaching a right X limit. This may be started with a maximum value number of gray level counts being the gray level count Y at point [o][o] of the histogram. The right X limit going from left to right is set to a mode value unless a the "second_high" X value is less than the mode value. In that case, the right traversing limit becomes "second_high". The "first_high" gray index X value is then obtained 15F-35. For discrete distributions, in one implementation, the mode is the value with the greatest frequency; and for continuous distributions, it is the point where the probability density is at a maximum. It is possible for a distribution to have two or more modes.

In one embodiment, the lowest Y value traversing from left to right on the histogram may be located, denoted as "first_min" 15F-37. Also, the lowest Y value traversing from right to left on the histogram may be located, denoted as "second_min" 15F-38. In one implementation, the procedures for locating "first_min" and "second_min" may be similar with that of finding "first_high" and "second_high" on the histogram within the interval bounded by "first_high" and the mode value. The resulting point found is denoted as "first_min". In one implementation, "first_min" may be set to o by default. If nothing is found, the index gray value is at point [o][o] or the gray value count for gray value zero(black). In one implementation, the ImageInspector may then locate "second_min" by traversing from right to left on the histogram within the interval bounded by "first_min" and "second_high." The resulting minimum value located is denoted as "second_min."

In one embodiment, "first_min" and "second_min" may be adjusted 15F-40 in special cases. In one implementation, if "first_min" and "second_min" are the same, then the ImageInspector may check whether "second_min" is greater than a boundary value "B1," wherein boundary values "B1" and "B2" are defined such that B1 is the upper bound of gray value encompassing significant magnitudes of order in gray a value counts and B2 is the lower bound of the gray value on the histogram such that magnitudes of order in gray value counts converge to sufficiently small count value or zero from the histogram. For example, in one implementation, the image boundaries may be 0 and 255 if there exists a full gray value usage for a given image. In one implementation, if the "second_min" is greater than "B1," then "second_min" is reset to be the resulting value of "second_min" minus the standard deviation times a scaling factor "k", e.g., a suggested scaling factor in such cases is k=0.3. In that case, the adjusted "second_min" would be (second_min−(standard deviation*0.3)), the "first_min" may then be set to B1.

In another implementation, if the determined "first_min" as of 15F-38 is greater than zero but the determined "second_min" as of 15F-37 returns empty or by default is 0, then the "second_min" may be reset to be "first_min" subtracted by the standard deviation multiplied by a scaling constant k. In this case, a suggested scaling constant is k=1.

For example, in one implementation, a Java implementation of the algorithm of locating "first_min," "second_min" on a given histogram by statistical analysis 15F-30~15F-40, may take a form similar to:

```
...
private static int[ ] findHistExtremaLows(Histogram histogram,
int numberBins)
{
        int histoBins=histogram.getBins( );
        int max=0;
        int low=0;
        int i=0;
        int flag=0;
        int[ ] highs= new int[2];
        int[ ] lows= new int[2];
        int numb=histoBins[0][i];
        int holder;
        int q=0;
        int first_min =
        0;
    low=numb;
    int j=-1;
        do{
                numb=histoBins[0][i+1];
                if(numb>histoBins[0][i]&&numb>max)
                {
                        max=numb;
                        j=i;
                        j++;
                }
                //q=i;
                while (numb==histoBins[0][i]&&numb==
                max&& (i+1)<histoBins.length)
                {
                        numb=histoBins[0][i+1];
                        i++;
                        q++;
                }
                if(j>0)
                {
                        j+=(q/2);
                        q=0;
                }
                i++;
        }while(i<numberBins-1);
highs[0]=j;
int second_high=j;
//System.out.println("\n\n second high:"+second_high);
numb=histoBins[0][i];
//System.out.print("\nMode: "+histogram.getModeThreshold(2)[0] );
max=histoBins[0][0];
j=0;
int limit=(int) histogram.getModeThreshold(2)[0];
if(second_high<histogram.getModeThreshold(2)[0])
{
        limit=second_high;
}
for(i=0;i<limit;i++)
{
        numb=histoBins[0][i+1];
        if(numb>=histoBins[0][i]&&numb>max)
        {
                max=numb;
                j=i;
                j++;
        }
        while(numb==histoBins[0][i]&&numb==max)
        {
                numb=histoBins[0][i+1];
                i++;
                q++;
        }
        if (j>0)
        {
                j+=(q/2);
                q=0;
        }
        /// i++;
}
int first_high=j;
//System.out.println("\n\n first high:"+(first_high));
if(first_high>=histogram.getModeThreshold(2)[0])
{
        first_high=(int) histogram.getModeThreshold(2)[0];
}
int min=histoBins[0][first_high];
int empty_flag=0;
if(second_high<0)
{
        second_high=100;
        empty_flag=1;
}
        for (i=first_high;i<second_high&&i<numberBins-1;i++)
        {
                numb=histoBins [0] [i+1];
                if(numb<=histoBins[0] [i] &&numb<min)
                {
                        min=numb;
                        j=i;
                        j++;
                }
                while (numb==histoBins [0][i]&&numb==
                min&&numb<min)
                {
                        numb=histoBins [0][i+1];
                        i++;
                        q++;
                }
                if (j>0)
                {
                        j+=(q/2);
                        q=0;
                }
        }
if(empty_flag==1)
{
        second_high=0;
}
first min=j;
//System.out.println("\n\n first min:"+(first_min));
j=0;
min=histoBins[0][second_high];
for(i=second_high;i>first_min;i--)
{
        numb=histoBins[0][i-1];
        if(numb<histoBins[0][i]&&numb<min)
        {
                min=numb;
                j=i;
                j--;
        }
        while (numb==histoBins [0][i]&&numb==
        min&&numb<min)
        {
                numb=histoBins [0][i-1];
                i--;
                q--;
        }
        if (j>0)
        {
                j+=(q/2);
                q=0;
        }
}
int second_min=j;
//System.out.println("\n\n second min:"+(second_min));
lows[0]=first_min;
lows[1]=second_min;
        //i will be first boundary
    return lows;
}
...
```

In one embodiment, threshold values may then be determined using the determined and adjusted "first_min" and "second_min" as lower and upper bounds 15F-42. In one implementation, an image processing clamp method may be adopted which requires input parameters such as the boundary gray level values "first_min" and "second_min", and returns the threshold value. For example, in one implementation, a Java implementation of a clamp function may take a form similar to:
    int clamp(int x, int low, int high) {
        return (x<low) ? low:((x>high)? high:x);
    }

Figure 15G:
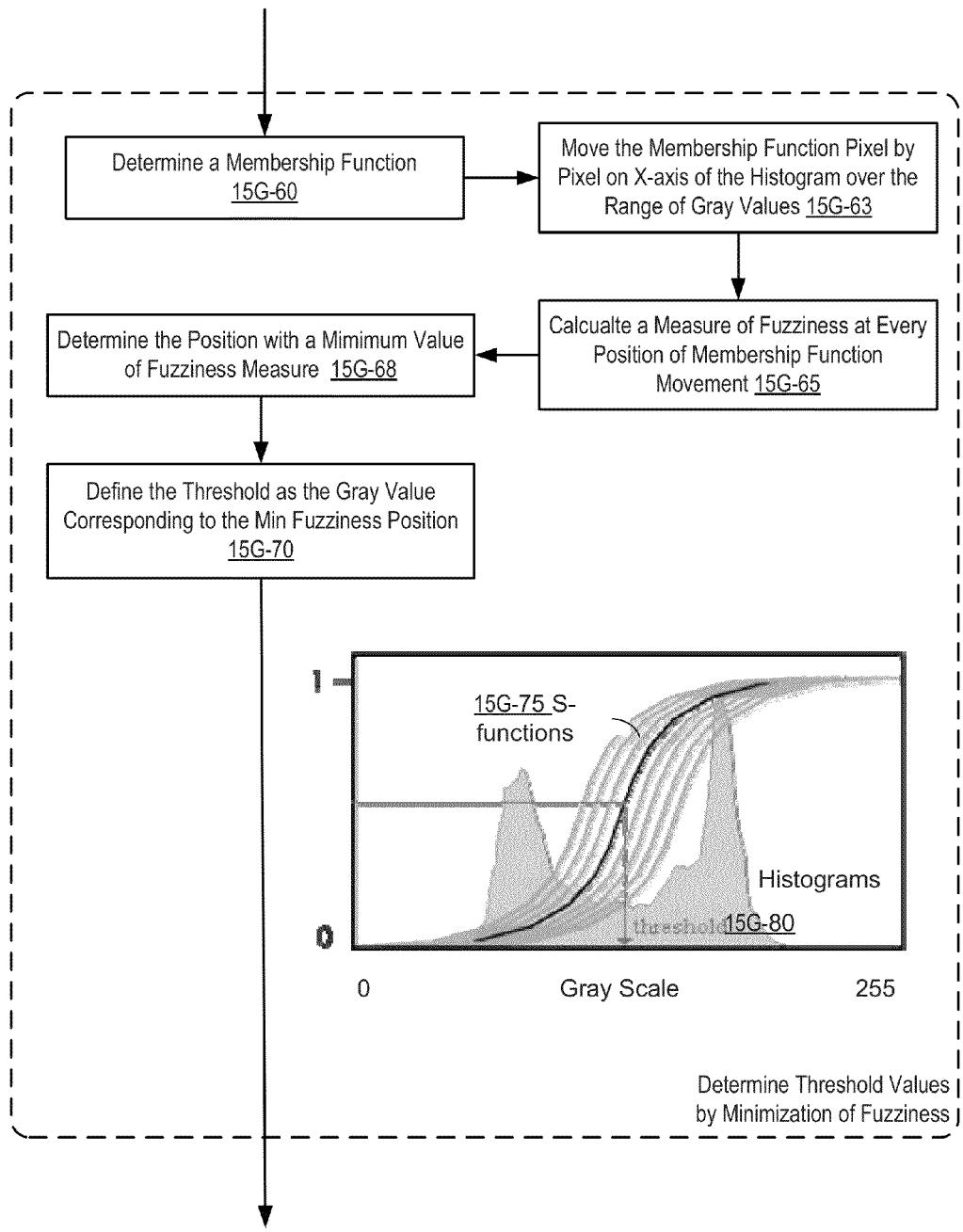
Figure 15H:
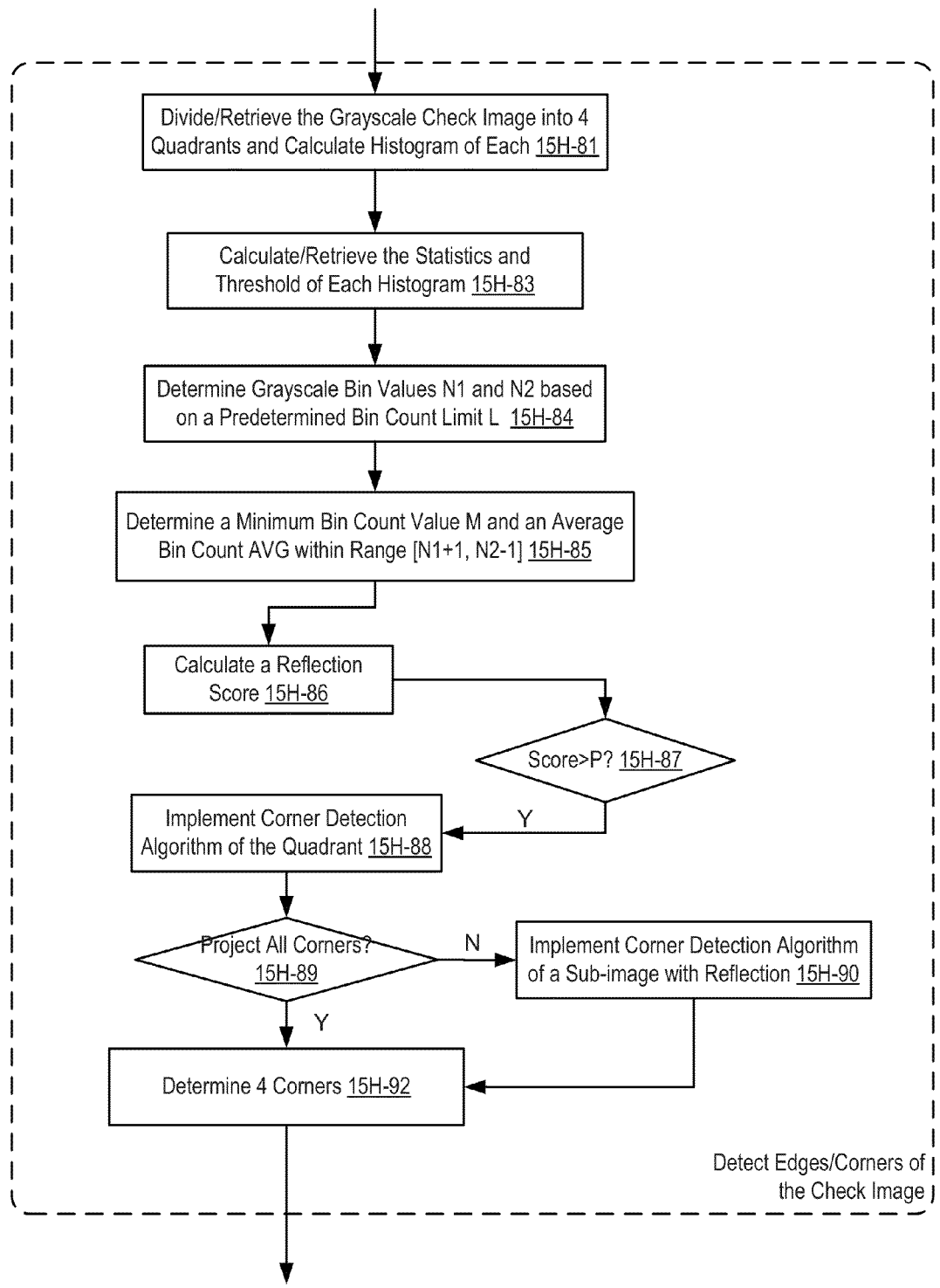

FIG. 15G is of a logic diagram illustrating aspects of determining grayscale threshold values by minimization of fuzziness in an alternative embodiment of the ImageInspector. In one embodiment, the ImageInspector may determine a member function 15G-60 for, e.g., a standard S function which may be defined as:

$$S(x) = \frac{1}{2}\left[erf\left(\frac{x}{\sqrt{2}}\right) + 1\right],$$

and move the membership function pixel by pixel on the X-axis of the histogram over the range of gray values 15G-63 (as shown in 15G-75). At every position of the membership movement, a measure of fuzziness may be calculated 15G-65 based on the a variety of measure definitions, such as but not limited to linear index of fuzziness, quadratic index of fuzziness, logarithmic fuzzy entropy, fuzzy correlation, fuzzy expected value, weighted fuzzy expected value, fuzzy divergence, hybrid entropy, and/or the like. For example, in one implementation, the measure of fuzziness may be calculated via the logarithmic fuzzy entropy, which may be defined as:

$$H(S) = \frac{1}{MN\ln 2}\sum_m\sum_n G_n(S_{mn}),$$

where $G_n(S_{mn}) = -S_{mn}\ln S_{mn} - (1-S)\ln(1-S_{mn})$, and $S_{mn}$ is the membership function value at pixel (m,n) for an image of size M×N.

In one embodiment, the ImageInspector may determine the position with a minimum value of the calculated fuzziness measure 15G-68, and then define the grayscale threshold as the gray value corresponding to the minimum fuzziness position 15G-70, as shown in 15G-80.

In one embodiment, if the grayscale check image has vague corners or edges, the enhanced quantumized image may contain reflection at the edge/corners, as shown in 15I-93~15I-94 of FIG. 15I. In one embodiment, a reflection detection algorithm may be implemented to avoid false corner detection.

FIG. 15H provides a logic flow diagram illustrating aspects of edge/corner detection of the check image based on reflection in one embodiment of a ImageInspector. In one embodiment, for a given check image, the ImageInspector may divide the grayscale check image into four quadrants and calculate the histogram of each quadrant 15H-81, or retrieve the generated histogram of four quadrants if available, and calculate/retrieve the statistics and the determined threshold of each histogram 15H-83. For example, in one implementation, statistical information such as the histogram entropy, maximum entropy threshold, mean grayscale count, maximum variance of grayscale count, mode threshold, moment, deviation, and/or the like, may be calculated.

In one embodiment, grayscale bin values N1 and N2 may be determined based on a predetermined bin count limit L 15H-84 satisfying: (i) N1 and N2 are greater than or equal to the corresponding gray value of the bin count limit L; (ii) N1 is less than the minimum fuzziness threshold T of the histogram; and (iii) N2 is greater than the minimum fuzziness threshold T of the histogram. FIG. 6F shows an example of determining N1 and N2 on a given histogram in one embodiment of the ImageInspector.

In one embodiment, the ImageInspector may determine a minimum bin count value M and an average bin count value AVG within the histogram window defined by the range [N1+1, N2−1] 15H-85 (as illustrated by the red circle 15I-95 in FIG. 15I). The ImageInspector may then proceed to calculate a reflection score of the histogram 15H-86. For example, in one implementation, the reflection score may be calculated based on the following formula: Score=(AVG−M)/(AVG+M), where the score is normalized to [0,1].

Figure 16B:
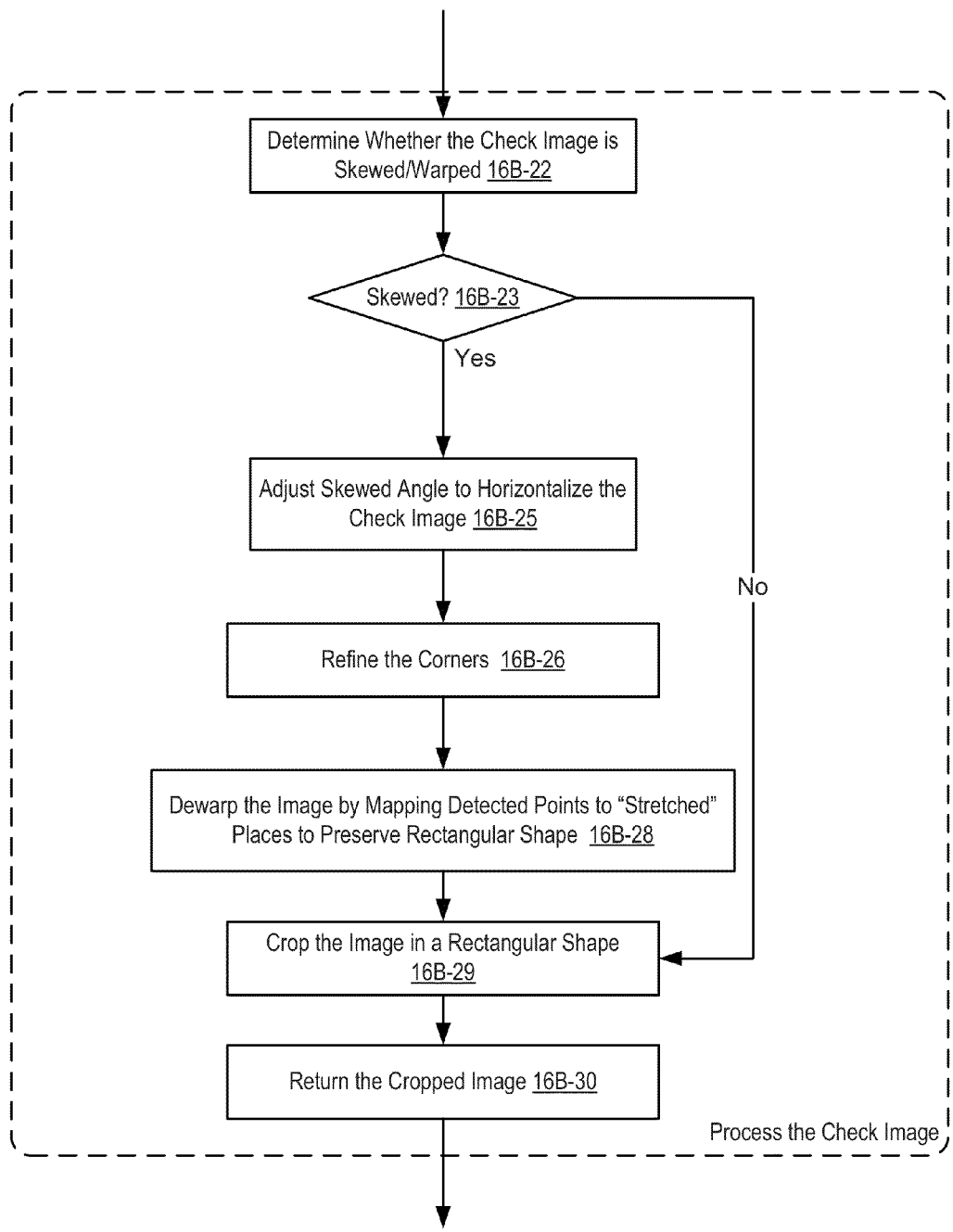
Figure 16D:
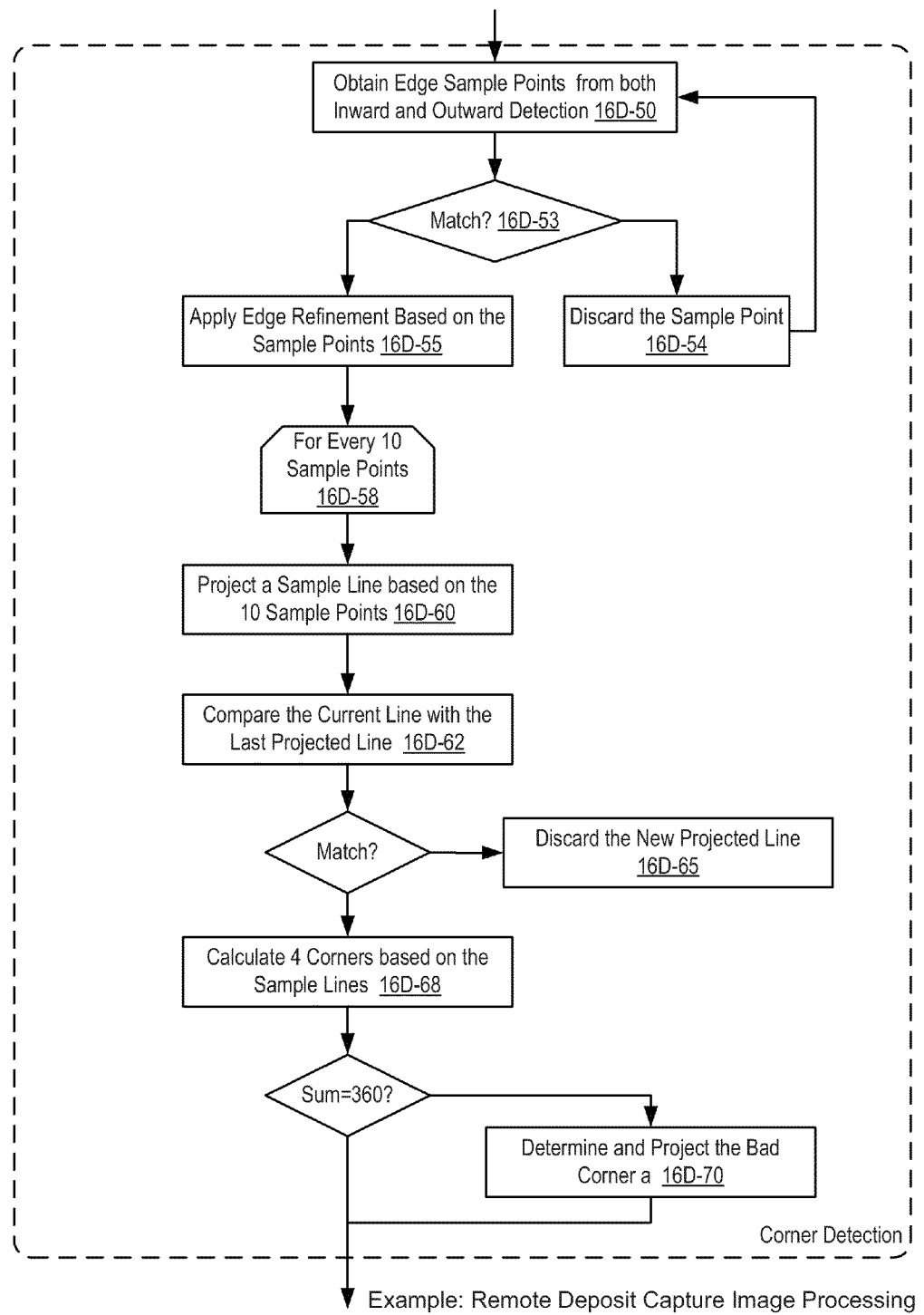

In one embodiment, if the calculated reflection score is less than a predetermined minimum score P 15H-87 (e.g., P=0.4), then it may indicate a corner sub-image without reflection. The ImageInspector may proceed to implement corner detection algorithm of the quadrant 15H-88. In one implementation, the corner detection may be performed on the generated virtual image of the check. For example, a JAI application of corner detection may take a form similar to the following:
    int minSamples=(int) (1.0*150/ImageProcessingConstants.virtualImageScaleFactor);
    int sampleSpace=(int) (1.0*5/ImageProcessingConstants.virtualImageScaleFactor)+1;

Within implementations, the ImageInspector may detect edges of the check on the virtual image both inwardly and outwardly, and when the inward and outward edge detection for a given spot matches, the detected spot may be considered as a successfully detected point on the edge of the check image, as further illustrated in FIG. 16C-16D.

In one embodiment, if the reflection score is less than P, then the corner sub-image is considered to be with reflection, and the corner detection implementation may be skipped to avoid a false or misleading corner. In this case, the determined corners may be less than four. In one embodiment, the ImageInspector may determine whether the determined corners are sufficient to project all four corners by symmetry 15H-89. For example, in one implementation, if there are three corners with tolerable reflection levels and one corner with reflection, or two diagonal corners without reflections, then the position(s) of the corner(s) with reflection may be determined by symmetric projection 15H-92. In another implementation, if there is only one corner with tolerable reflection, or two corners with tolerable reflection on a horizontal/vertical line, the ImageInspector may determine that there is not sufficient information to project all four corners. In that case, the ImageInspector may a implement corner detection algorithm of a quadrant with reflection 15H-90 (e.g., a corner with relatively higher reflection score), and provide additional information to determine all four corners of the check image 15H-92.

Within alternative implementations, the corner/edges detection may also be applied to check images with other anomalies. For example, in addition to reflections, a check image may be captured under undesirable lighting conditions (e.g., with poor room light, with a dark background, etc.), interfered by reflective objects (e.g., a coffee cup placed close to the check, etc.), with other objects (e.g., miscellaneous items placed around the check, etc.), resulting in an image with shadows. In one implementation, the ImageInspector may apply corner detection to remove such anomalies based on similar scoring procedure described in FIG. 15I.

Figure 15J:
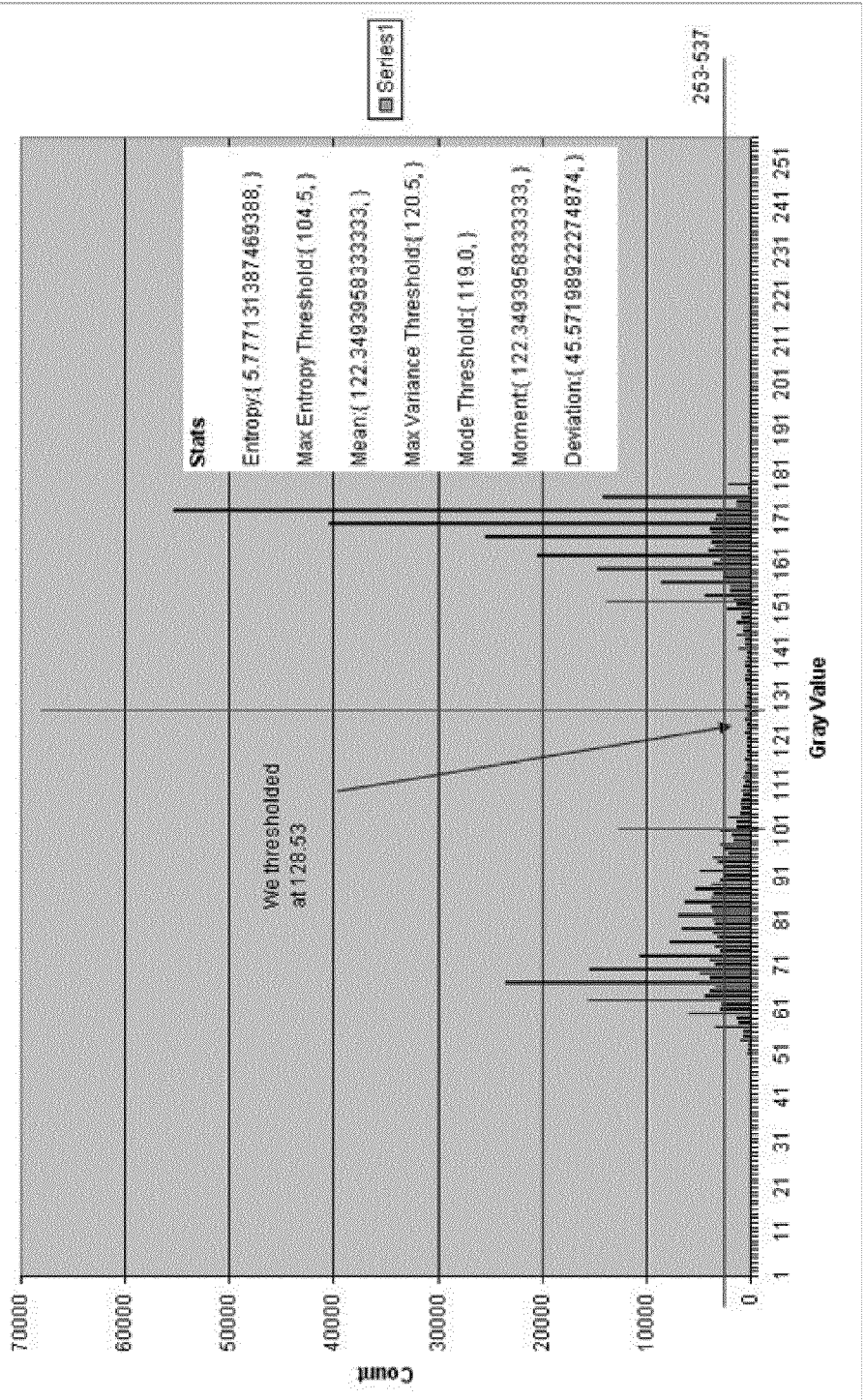
Figure 15K:
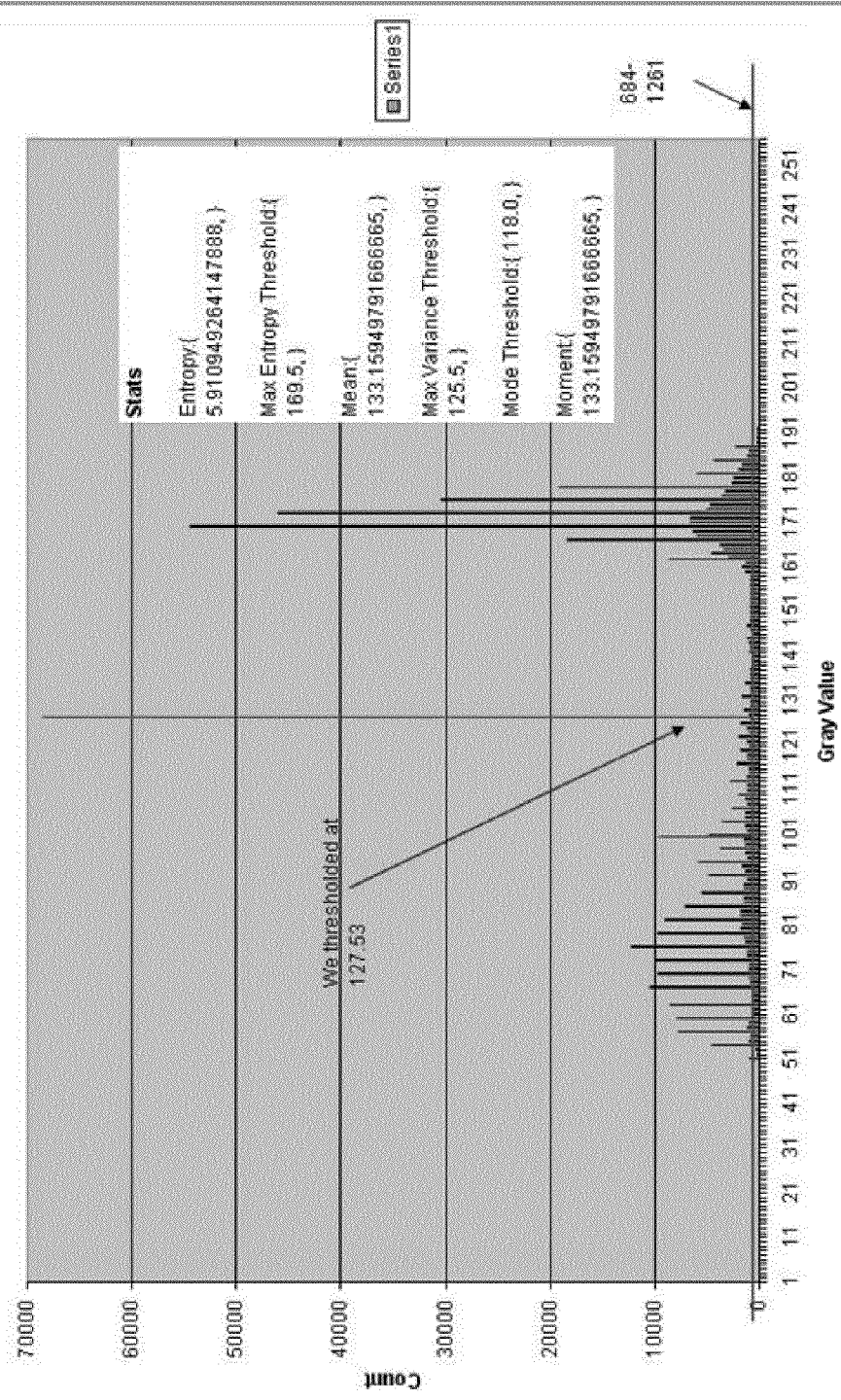
Figure 15L:
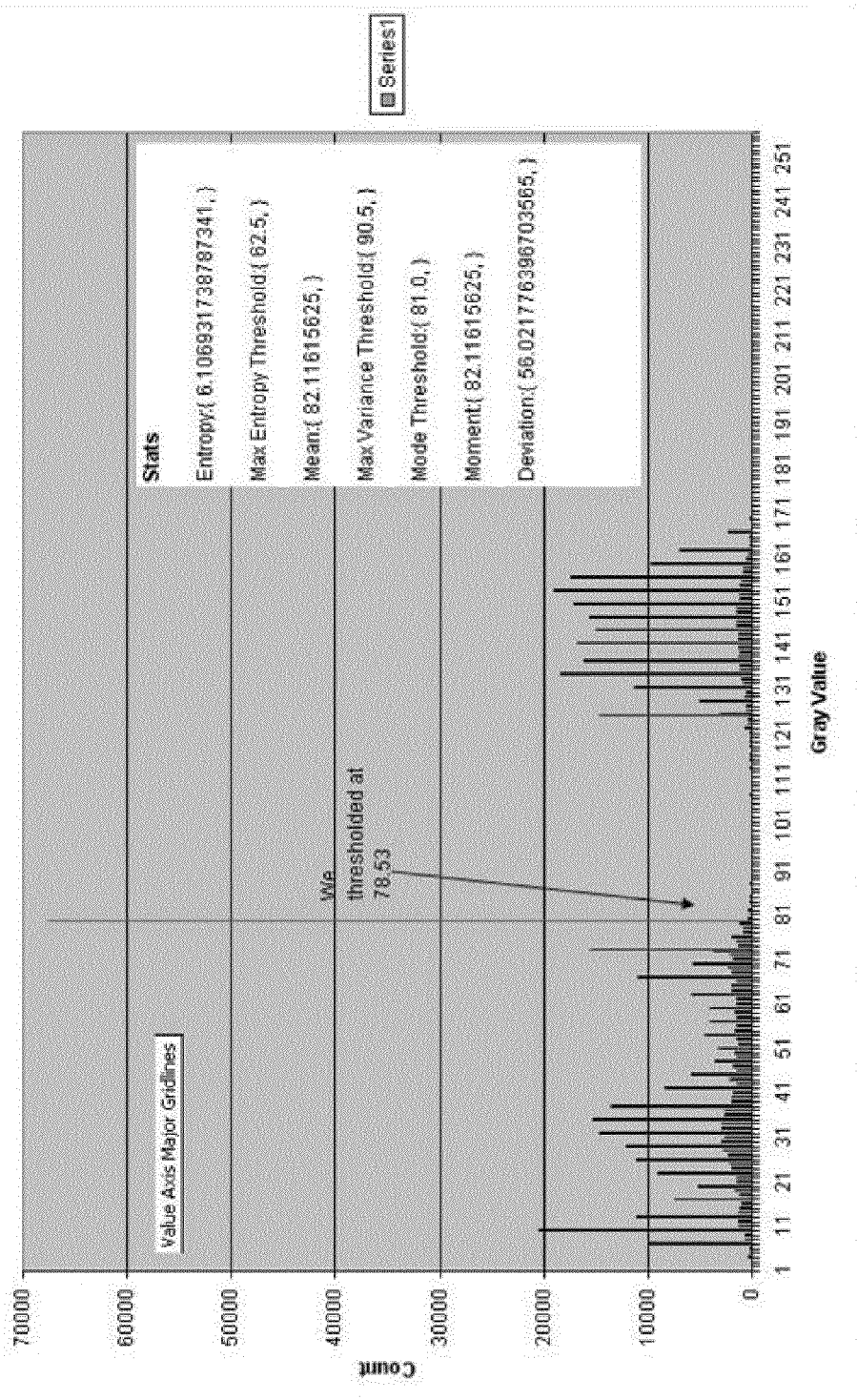
Figure 15M:
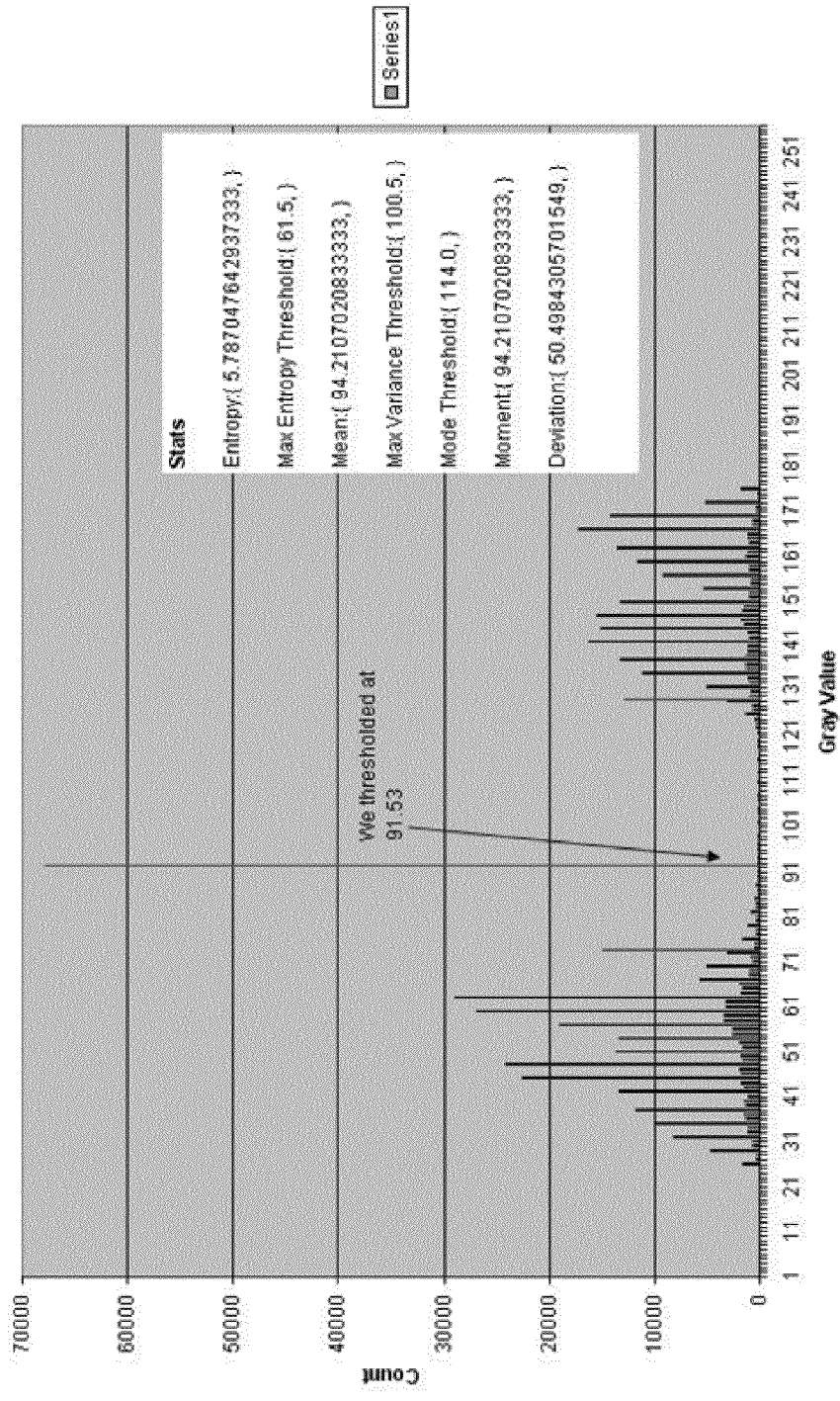

FIGS. 15J-15M provide an example of the histogram analysis of the four quadrants of the grayscale image 15I-93 of FIG. 15I in one embodiment of the ImageInspector. In FIG. 15J, the histogram analysis shows that the bottom two quadrants are with no reflection, but the top two are with reflection. In that case, the determined bottom corners may not provide sufficient information to project the other two corners. In one implementation, the ImageInspector may determine the corner of the top left quadrant with some reflection, and determine the top right corner with large reflection by symmetry.

In one embodiment a received check image may contain a skewed, distorted or warped image of a check. In such cases, the check image needs to be "dewarped" prior to information extraction. For example, skew is the difference in rotation off an axis between a feature in the digital image and the same feature in the a physical embodiment of the digital image. The determination of skew of digital images captured using handheld digital cameras typically are computed in 3-dimensions. For exemplary purposes only, the following deskew process uses an x and y axis, though it should be understood that the principles and methods for determining skew in three (3) dimensions use the same principles and are considered to be incorporated into the present subject matter.

FIG. 16A illustrates examples of digital images of check 16A-00 which are skewed, warped or distorted. In one embodiment, the original check 16A-00 has a box 16A-08 which has character "+" 16A-10 within the box. As shown in the figure, if the check was not properly positioned when the check image was captured, there may be a significant skew of the check image, for Example, character "+"16A-10 may be interpreted as an "X" rather than a "+". In order to determine the identification of characters in check 16A-00, the skew of the digital image may need to be determined and compensated for prior to character extraction and recognition, as described below.

In another embodiment, the digital image may be distorted to a degree so that the shape of the check image is not rectangular, but rather, trapezoidal, as shown in the figure. The image may be distorted in other manners, and thus, the present subject matter is not limited to a trapezoidal distortion. It should be appreciated that an image may be distorted in ways other than the non-limiting and exemplary trapezoidal distortion. The present disclosure is not limited to any one type of distortion.

For example, in one implementation, check 16A-00 has sides 16A-04a-d and corners 16A-05a-d. The check image may have a trapezoidal shape instead of a rectangle as sides 16A-04a and 16A-04b do not parallel; parallel sides 16A-04c and 16A-04d do not have equal lengths; be equal in length; and the inner angles 16A-06a and 16A-06b are not 90 degrees. In such cases, the ImageInspector may process the skewed image to recover the check image in a rectangular shape.

FIG. 16B provides a logic flow embodiment illustrating processing check images with combined corner detection and check image dewarping in an alternative embodiment of the ImageInspector. In one implementation, the ImageInspector may obtain a grayscale image 16B20 and divide the grayscale image into four quadrants and calculate a reflection score for each quadrant 16B-22, as discussed in one implementation in FIGS. 15A-15D. In one implementation, if at least three quadrants have reflection scores above the minimum threshold as discussed in FIG. 15H, the ImageInspector may proceed with deskewing and dewarping. Otherwise, the ImageInspector may reject the check image and request the user resubmit another image.

Within embodiments, the deskewing/dewarping process may be implemented for each quadrant of the check image. In an alternative embodiment, the ImageInspector may perform dewarping/deskewing after recombining the quadrants to generate an enhanced black and white virtual image 622.

In one implementation, based on the detected four corners of the check image, the ImageInspector may determine whether the check image is skewed, warped or distorted 16B-22. For example, in one implementation, the slope of a line between two corners may be used to determine the amount of distortion. If the line is strictly horizontal or vertical, then the image is considered to be without distortion. Otherwise, a the image may be modified to remove the distortion.

In one implementation, the ImageInspector may adjust skewed angles of the virtual image 16B-25. For example, to deskew the image, the ImageInspector may determine the angle(s) of one or more reference line(s) within the check image. In one implementation, the angle of the line or lines may be determined using a coordinate system as a reference. For example, the angle of the line may be determined in reference to a set of horizontal and vertical axes 16B-03 established within the check image, as shown in FIG. 16A. The image may then be digitally rotated towards the direction that the check image may be horizontally positioned, e.g., the angle may be zero.

In one implementation, the ImageInspector may use reference points in the check to facilitate the proper rotation of the image. In one implementation, a check may have several horizontal lines near the bottom of the check, used by the check writer to sign the check and to note the use of the check. In such cases, the ImageInspector may rely on the two long edges of the digital image and/or the printed lines within the check as reference points/lines. If the image is rotated so that the long lines and/or the lines within the check are horizontal (e.g., the angle between the reference line and the established horizontal axis 16B-03 is zero), then the check image may be properly deskewed. In one implementation, after the deskewing procedure, the ImageInspector may then perform a test OCR to determine whether proper deposit information printed on the check may be extracted, recognized and verified based on the check image.

In an alternative implementation, the ImageInspector may take sample a points from the check image to perform deskewing. For example, four points at the upper edge and four points at the lower edge may be sampled; an angle between the line connecting an upper and/or lower corner point and the sampled point may be calculated to evaluate the level of skew; and the check image within the detected edges may be rotated at the smallest angle to horizontalize the check image.

In one implementation, after adjusting the skewed angle of the check image, the ImageInspector may refine the corners/edges 16B-26, by repeating the corner detection procedure.

In one implementation, the ImageInspector may dewarp the image 16B-28. For example, the ImageInspector may stretch, or flatten the check image if it is not in a rectangular shape based on the detected corner points. In one implementation, the ImageInspector may implement techniques such as spatial transformation (also known as image warping) and/or the like based on the determined four corners of the check image to remove distortion and skew. For example, a Java implementation using the JAI packages of dewarping a check image may take a form similar to:

```
...
ParameterBlockJAI    pb=new    ParameterBlockJAI
    ("Warp");
pb.addSource(image);
pb.setParameter("warp", new WarpPerspective(pt));
pb.setParameter ("interpolation",
    new InterpolationBilinear( ));
RenderedOp rop=null;
rop=new RenderedOp("Warp", pb, null);
```

The ImageInspector may then crop the check image in a rectangular shape B-29 and return the cropped image 16B-30 for further deposit processing.

FIGS. 16C-16D provide flow diagrams illustrating corner detection in another embodiment of the ImageInspector. For example, based on the obtained black and white virtual image at 16C-22, the ImageInspector may obtain edge sample points 16D-50 by starting from the middle in width and height on the left side and move from outside to inside, until it hits a white blob, and repeat the procedure moving inside to outside 16C-38. The procedure may be repeated on the left, right, upper and lower edges of the check image to obtain samples points on the edge, as shown in one example by the red "X" at 16C-40 in FIG. 16C. In one implementation, the ImageInspector may filter the sample points to keep those where both the inner detection and outer detection match 16D-53 by a minimal distance constraint, and points that do not satisfy the minimal distance constraint may be discarded 16D-54. For example, the minimal distance constraint may be dynamically configured based on a variety of parameters of the image, such as the image size, image resolution, and/or the like. In one example, the minimal distance constraint may be configured as, but not limited to 3 pixels.

In one embodiment, the ImageInspector may apply edge refinement 16D-55 based on the sample points. In one implementation, the ImageInspector may take the "X mode," e.g. finding the most recurrent X-coordinate value of the vertical top left samples, vertical top right samples, vertical bottom left samples, vertical bottom right samples, and the "Y Mode" to find the most recurrent Y-coordinate value the horizontal top left, horizontal top right, horizontal bottom left, horizontal bottom right samples. Differences between the X-coordinate and Y-coordinate values to determine whether the upper or lower edges are horizontal, or the left or right edges are vertical. For example, if the difference between the Y-coordinate values between horizontal bottom left samples and the horizontal bottom right samples is smaller than an acceptable a constraint, such as, but not limited to 3 pixels, then the horizontal bottom edge is considered to be strictly horizontal without skew.

In one implementation, false samples due to noise or other unnecessary samples may be removed. For example, vertical bottom samples whose Y-coordinate values exceed the Y-coordinate range defined by the horizontal samples as discussed above, may be discarded.

In one implementation, the ImageInspector may apply similar procedures on the top samples of the horizontal top left and right and see if the difference is smaller than the minimum constraint. If yes, the vertical top left and right samples that exceeds the range defined by the horizontal Top Left and Top right may be discarded. In this way, the ImageInspector may eliminate points that have reflection that hugged the top and bottom edges.

In one embodiment, line projections may be performed based on the sample points in a progressive manner. For example, in one implementation, for every 10 sample points 16D-58, the ImageInspector may apply least squares to project a line 16D-60; and for every projected line base on the to sample points, the angle of the current line with the last projected line 16D-62. For another example, the ImageInspector may project the sample line based on a different number of sample points, e.g., determined based on the quality of the check image, and/or the like. If the angle is greater than a predetermined constraint, denoted by "AngleMax," the current line may be discarded 16D-65, but may be kept track in place of the newly detected line. In one embodiment, the entire array of sample points may be exhausted to search for the best line, which may be the last available line that is within the constraint of a AngleMax.

In one implementation, if the Y-coordinate values of sample points for detecting a horizontal line have a maximum variance less than the minimal distance constraint, e.g., 3 pixels, the average Y-coordinate values of these samples may be calculated as the Y-coordinate value of the horizontal line applying. Similarly, for vertical line projections, such average line calculation may be adopted if the X-coordinate values of the sample points are sufficiently close.

In an alternative implementation, for projected horizontal lines, a Y-coordinate value may be extracted from the currently projected line and the old projected line at the same X-coordinate value. If the difference in the Y-coordinate values is significantly large, the currently projected line may be discarded, to counter noise and reflection around the check image that may not be filtered out.

After detecting projected lines, the ImageInspector may locate the four corners by calculating intersections of the four lines 16D-68. For example, in one implementation, the Kramers Rule may be applied to use determinants to calculate the intersections for each line. In one implementation, the ImageInspector may keep four lines (two horizontal and two vertical) to calculate the corners. In alternative implementations, the ImageInspector may obtain at eight lines: vertical left top, vertical left bottom, vertical right top, vertical right bottom, horizontal top left, horizontal top right, horizontal bottom left, and horizontal bottom right, to locate the corners. For example, the intersection of the vertical top left line and horizontal top left line may be located as the top left corner.

In one implementation, the ImageInspector may determine whether an intersection is a good corner by calculating the inner angles 16C-43. For example, in one implementation, the four inner angles may be calculated and summed up. If the sum is equal to, or within a sufficiently small difference to 360 degrees, the corners are considered to be good. Otherwise, in one implementation, the ImageInspector may assume three out of the four corners are good, and may detect the bad corner 16D-70.

In one implementation, the ImageInspector may calculate the differences between the angles to detect the bad corner. For example, if the difference between the bottom left and bottom right angles, the difference between the top right and bottom right angles are sufficiently small, but the difference between the top left and top right angles is greater than a maximum tolerance level, e.g., AngleMax, the ImageInspector may determine the top left corner is a bad corner. In such cases, the ImageInspector is may re-calculate the top left corner by rectangular projection based on the other three corners.

In an alternative implementation, the ImageInspector may utilize the projected lines to re-calculate the detected bad corner 16C-45. In the above example, if the top left corner is detected as bad, which may imply the projected vertical left top line and the horizontal top left line are not accurate, then the last available vertical left bottom sample line 16C-46 and the last available horizontal top right sample line 16C-47 may be extended so that there intersection may be re-calculate as the top left corner 16C-48.

In one implementation, in the dewarping and cropping 16B-28, the virtual images may be oriented to make the bottom horizontal based on the lines from the horizontal bottom projections. In one implementation, if multiple bad corners exist, a the ImageInspector may apply a large median filter to the virtual image to remove noise, and reapply the line projection to refine corners 16B-26.

In another example, the ImageInspector may implement detection algorithm such as the Moravec corner detection algorithm, the multi-scale Harris operator, the Shi and Tomasi corner detection algorithm, the level curve curvature approach, LoG, DoG, and DoH feature detection, the Wang and Brady corner detection algorithm, the SUSAN corner detector, the Trajkovic and Hedley corner detector, the FAST feature detector, automatic synthesis of point detectors with Genetic Programming, affine-adapted interest point operators, and/or the like.

ImageInspector Representment Detection/Clearance

Figure 17A:
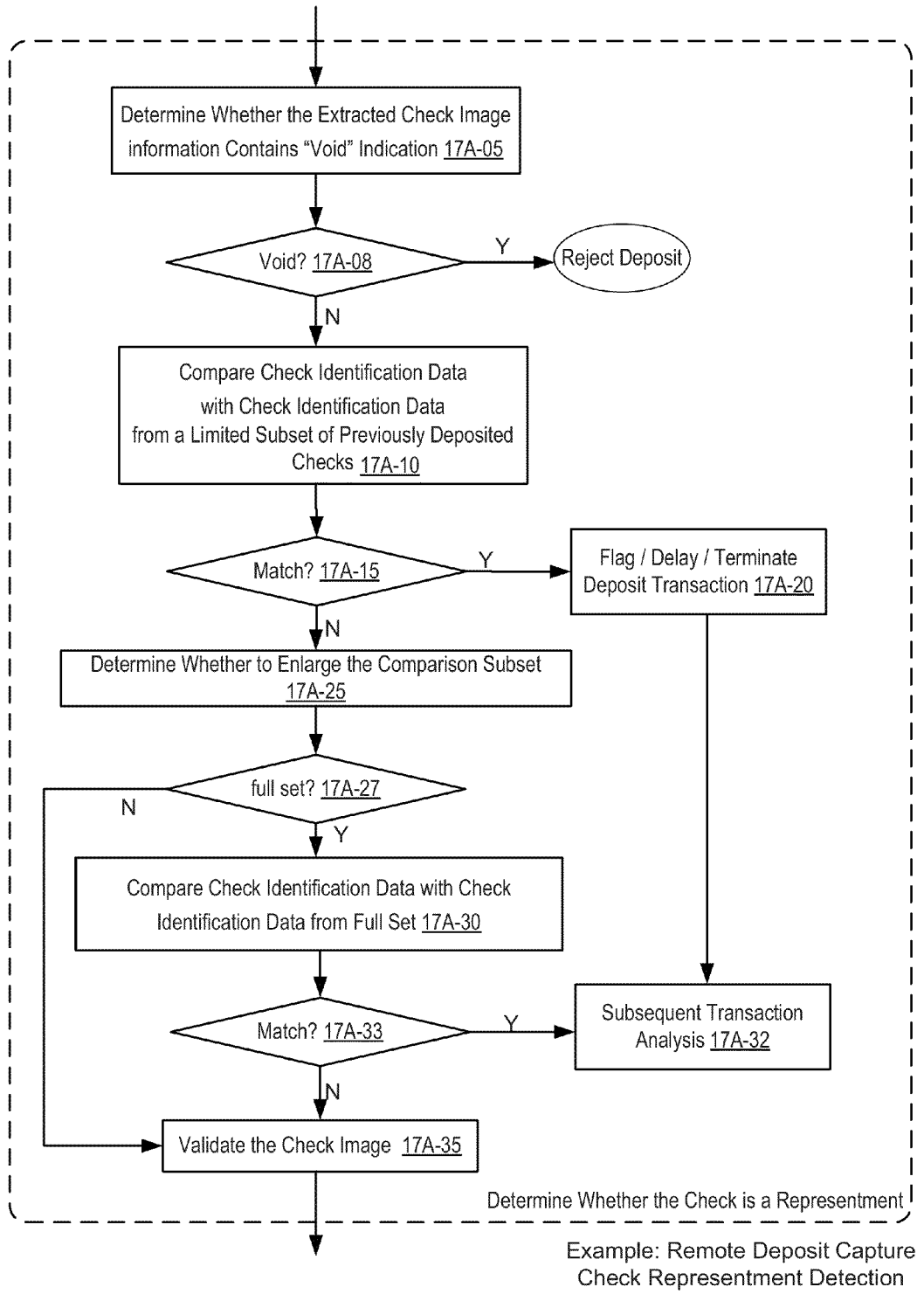
FIGS. 17A-18C provides logic flow diagrams illustrating embodiments of check representment detection in one embodiment of the ImageInspector.

FIG. 17A provides a logic flow diagram illustrating aspects of check representment detection in one embodiment of the ImageInspector. In one embodiment, based on the extracted information of the check image, the ImageInspector may determine whether the extracted information contains a "void" check indication 17A-05. For example, in one implementation, the check may have been voided by a punched hole and/or a written "VOID" on the physical check, or have a modified section, such as a modified RFID tag, and/or the like. In one embodiment, if the check is a void check 17A-08, the ImageInspector may reject deposit.

In another embodiment, if no such "void check" indication is found, the ImageInspector may compare check identification data with the check identification data within a limited subset of previously deposited checks 17A-10, e.g., checks deposited to the same payee's account within the past ten months, the last one hundred a deposits to the same payee's account, etc. For example, in one implementation, check identification data may comprise Check identification data is any data that identifies the financial instrument in a relatively unique fashion. For example, check identification data may comprise MICR data such as payer account number, payer bank routing number, and check number, payer information such as payer name and address, the deposit amount of the check and or the like. In one implementation, check image characteristics such as a combination of characteristics from a payer signature line may also be used as check identification data. In one implementation, log files containing check identification data may be kept for all deposits. Transaction logs may be maintained for customer accounts, or for the financial institution as a whole.

In one implementation, if there is a match 17A-15 with any previously deposited check, the ImageInspector may flag, delay or terminate the deposit transaction 17A-20. For example, in one implementation, flagging the transaction may indicate to setting a flag that will cause some further scrutiny 17A-32 of the transaction at a later time. The subsequent transaction analysis 17A-32 may automatically analyze further aspects of the check and comparing it to a suspected duplicate check, or may report to a system operator (e.g., bank clerks, etc.). For another example, the ImageInspector may delay transaction by causing the transaction to be delayed and processed at a later time. In one implementation, delaying and flagging may be used together to provide adequate time for additional scrutiny required by the flag. In a further implementation, the ImageInspector may terminate and abort the transaction.

In one embodiment, when the transaction is flagged, delayed, or terminated, a notification may be sent to a customer advising them of the action and a optionally of the reason for the action as well. In one embodiment, the customer may a be notified that the check has been identified as a possible duplicate and may be instructed to provide additional check identification data, such as re-capturing and submission of a new check image.

In one embodiment, if there is no match detected in the comparison of 17A-10, the ImageInspector may determine whether to enlarge the comparison range of previously deposited checks 17A-25. If so 17A-27, the ImageInspector may enlarge the comparison range to compare check identification data within a full set of previously deposited checks 17A-30. For example, in one implementation, the ImageInspector may further search and compare the check identification data with all the stored deposit information in the database.

In one implementation, the limited subset comparison may be performed in real time, and the remainder of the comparison may be conducted at a later time. For example, in one implementation, the ImageInspector may perform a multiple representment check within a 6-month database in real time on all ImageInspector channels and records. In another implementation, the ImageInspector may call a service to handle bulk transactions at batch time and to obtain a consolidated re-presentment report response, as will be further illustrated in FIG. 8B.

After a full set comparison, if a match is located 17A-33, the ImageInspector may perform subsequent transaction analysis 17A-32 of the check deposit. Otherwise, the check is considered to be valid 17A-35, and the ImageInspector may proceed to deposit funds to the payee's account.

Figure 17B:
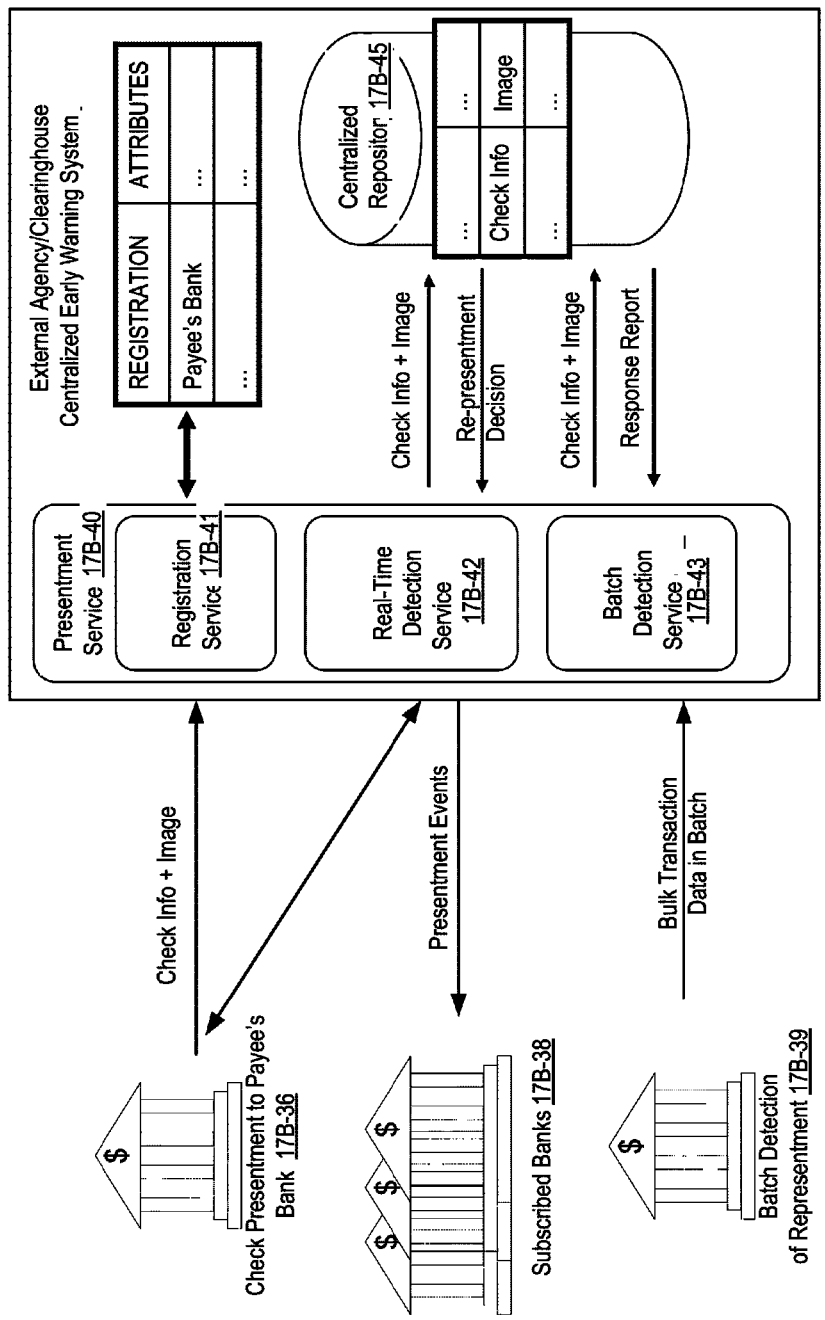

In one embodiment, the representment detection in one embodiment of a the ImageInspector as shown in FIG. 17A may be implemented in a real-time manner at the ImageInspector platform and/or the payee's bank prior to soft posting. In another embodiment, the ImageInspector and/or the payee's bank may send deposit data to a centralized warning system, such as an external agency, a clearinghouse bank, and/or the like, to detect check representment. In one implementation, the centralized warning system may inspect deposit data with financial institutions other than the payee's bank to identify checks that have already been presented. In a further embodiment, the centralized warning system may provide representment service both in real time and at batch time and subscribe a payee's bank for check presentment notification. FIG. 17B provides a combined logic and block diagram illustrating an example implementation of representment service at a centralized warning system in one embodiment of the ImageInspector.

In one embodiment, when the ImageInspector receives a check presentment to a payee's bank 17B-36, the ImageInspector may process the request and send extracted deposit information and check images to a centralized warning system for presentment services 17B-40. In one embodiment, the presentment services 17B-40 may include registration service 17B-41, real-time detection service 17B-42 and batch detection service 17B-43. In one implementation, the payee's bank may subscribe via the registration service 17B-41 in order to receive presentment notification published by the warning system. In one implementation, attributes associated with the payee's bank may be maintained in a registration repository, such as a list of the transit routing numbers the payee's bank owns, callback service URL for presentment notification, callback credentials, and/or the like. For example, in one implementation, when a payee's bank sent check information and check images to the centralized warning system for representment check, the system may send check presentment notifications to a variety of subscribed banks 17B-38.

In one embodiment, the real-time detection service 17B-42 may implement a representment search within a centralized repository 17B-45 of previously deposits. In one implementation, the real-time detection service may take a form similar to the process shown in FIG. 17A.

In one embodiment, the batch detection service 17B-43 may process representment detection for bulk transactions in an "off-line" manner. For example, in one implementation, a payee's bank may use this service to send all remote-deposit transactions at the end of each day for re-presentment validation and expects a next-day response. In one implementation, an X9.37 image cash letter containing the remote deposit transactions may be submitted to the centralized warning system and a response report containing presentment/re-presentment information may be published to the payee's bank.

Figure 17C:
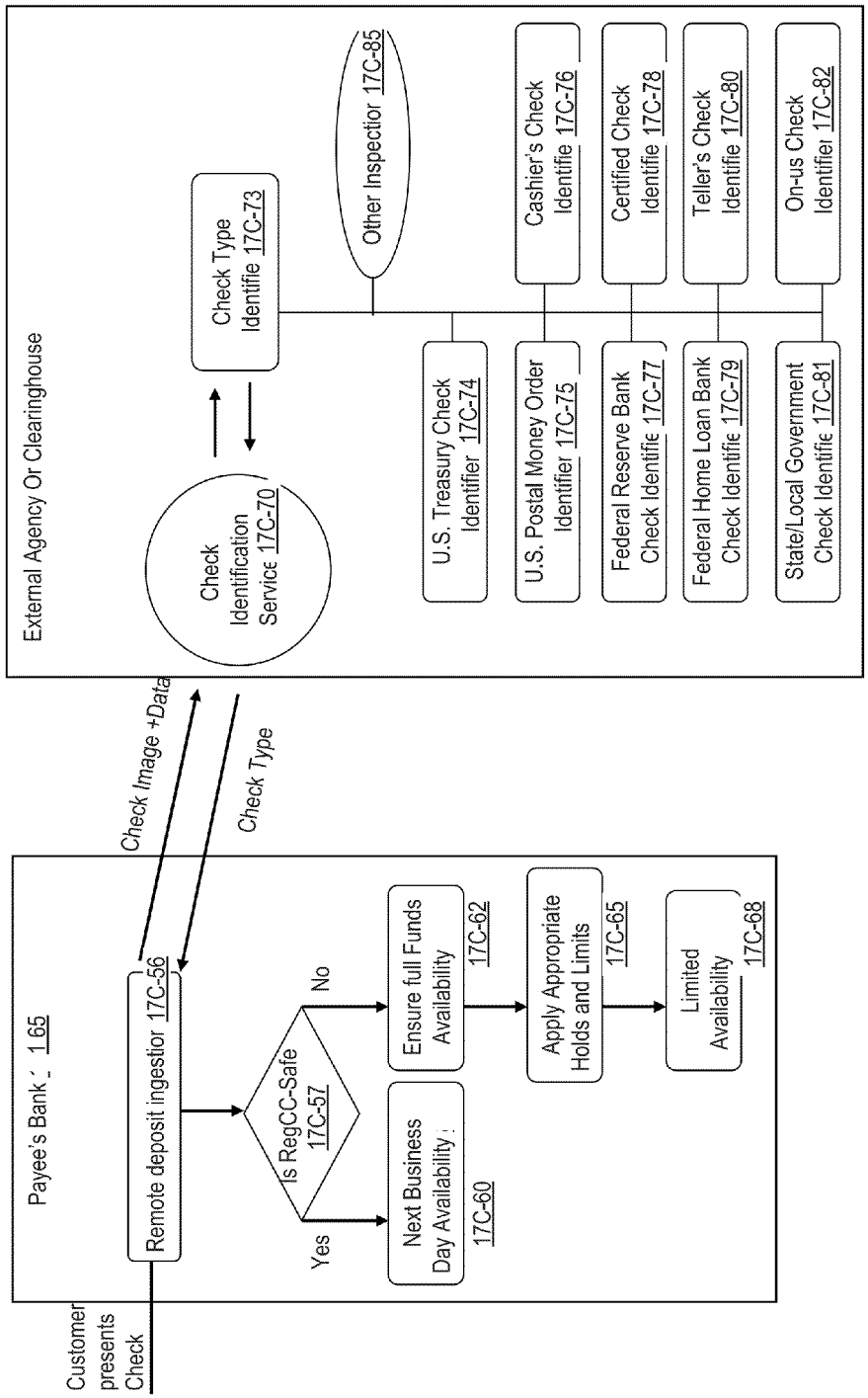

FIG. 17C provides a combined logic and block diagram illustrating check clearance and fraudulent control in one embodiment of the ImageInspector. In FIG. 17B, in one embodiment, the payee's bank may ingest and process remote deposit data 17C-56. For example, as discussed in FIG. 1, an ImageInspector platform may be housed at the payee's bank to receive and process remote deposit. In one embodiment, the payee's bank may establish a secure communications connection with an external agency or clearinghouse bank (e.g., a local branch of the Federal Reserve Bank, etc.), for example, via encrypted FTP, and/or the like. In one implementation, the payee's bank 160 may send deposit data, such as a Check 21 X9.37 check image file, and the extracted check identification data, to the external agency to perform a clearinghouse check.

In one embodiment, the clearinghouse bank may provide check identification service 17C-70 to identity a type of the check 17C-73. For example, in one implementation, a check type identifier 17C-73 at the clearinghouse bank may determine whether the deposited check is s U.S. Treasury check 17C-74, a U.S. Postal money order 17C-75, a cashier's check 17C-76, a Federal Reserve Bank check 17C-77, a certified check 17C-78, a Federal Home Loan Bank check 17C-79, a teller's check 17C-80, a state/local government check 17C-81, an on-us check 17C-82, and/or the like, based on the received check information. In one implementation, the check type identifier 17C-73 may inspect the MICR information on the check to determine its type. In one embodiment, if the check type identifier 17C-73 is unable to determine the type of the check, the identification service 17C-70 may proceed to other inspection procedures 17C-85 to determine whether the deposited check is a fraudulent. For example, in one implementation, the identification service 17C-70 may send alerts and present the check data to fraudulence experts.

In one embodiment, the external agency or clearinghouse bank may return an indication of the check type to the payee's bank. In one implementation, the payee's bank may determine whether the check is a Regulation CC compliant based on the received check deposit data and the check type indication from the clearinghouse. For example, in one implementation, U.S. treasury checks, certified checks and/or the like, may be considered as Regulation CC safe and eligible for next business day availability of deposit confirmation 17C-60. In another implementation, if the check is not a Regulation CC safe, the payee's bank may inspect the payee's account to ensure ensures a full funds availability in account to cover the deposited amount upon fraud 17C-62, and apply appropriate holds and limits on the deposit amount 17C-65. The deposit may render limited fund availability 17C-68 from the payee's bank.

For example, in one implementation, a user may request to deposit a $1000.00 non-Regulation CC safe check, but only has $500.00 existing amount in the account. In such cases, the ImageInspector may receive and verify remote deposit data from the user and the payee's bank may provisionally credit $1000.00 to the user's account. In one implementation, the payee's bank may generate a substitute check and send the substitute check for clearinghouse check. In one implementation, if the payee's bank receives a clearinghouse result indicating that the deposited check is not Regulation CC compliant, the payee's bank/ImageInspector may notify the user via a user interface to provide a variety of options of deposit, e.g., display messages on the RDC Deposit website, send emails/instant messages to the user device, and/or the like. For example, the user may choose to deposit the maximum allowable funds at the moment, or to cancel the deposit, or to provisionally post the check but mail the physical check to the bank for clearance, and/or the like.

Alternative Embodiments of ImageInspector Representment Detection

In an alternative embodiment, a dead-check repository may be employed to store records of negotiable instruments, such as checks, that have been processed by a network of financial institutions. The records, accessible when preparing to deposit, either remotely or physically, a negotiable instrument, serve as an indication to a financial institution as to whether the negotiable instrument has been previously a presented. Thus, accessing the record before confirming the deposit secures deposits by preventing re-presentment of negotiable instruments.

Figure 18A:
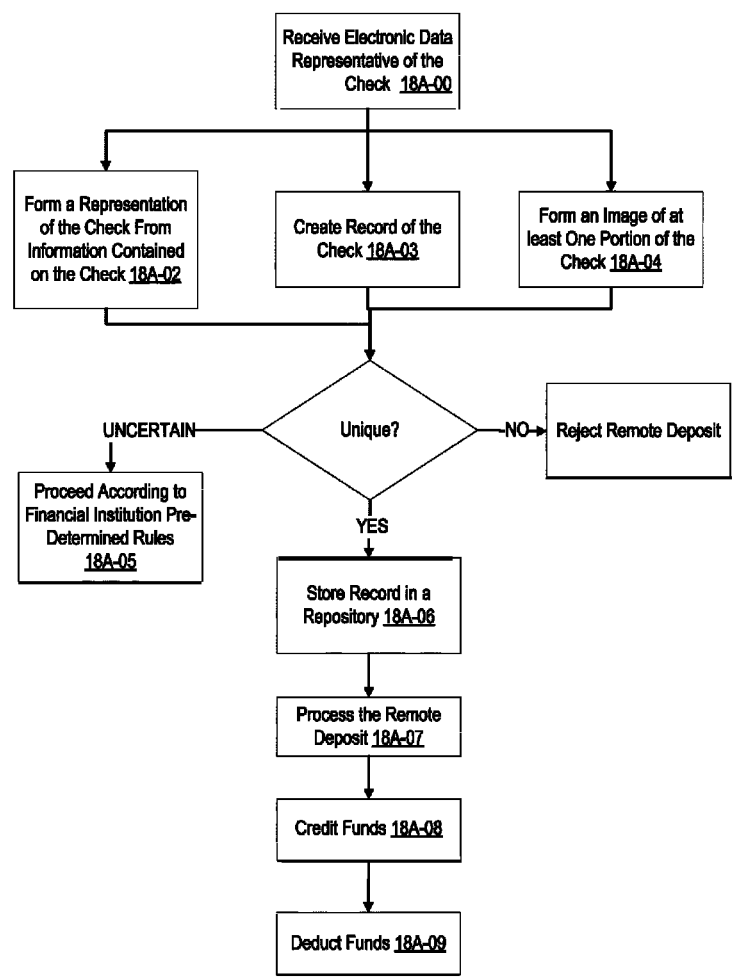

FIG. 18A is a flow chart illustrating an example method of securing a deposit of a negotiable instrument, such as, for example, a check from payer to payee. At 18A-00, electronic data representative of the check to be deposited, remotely or physically, is received at a financial institution. At 18A-03, a record of the check may be created to, for example, assist in securing the remote deposit of the check by preventing re-presentment of the check. The unique front portion of the check, containing information unique to the check and available through the electronic data representative of the check, may be used to create the record.

Alternately, at 18A-04, the record of the check may be created by financial institution and may include forming a representation of the check from information contained on the check. The representation may be an image. For example, if the electronic data representative of the check is in the form of a digital image, the digital image may be used as the record of the check. Alternatively, the representation may be a data string including one or more identifying characteristics of the check organized in a predefined order.

Alternate to 18A-03 or 18A-04, at 18A-02, if the electronic data representative of the check is a digital image of the check, the record of the check may be created by financial institution and may include forming an image of one or more portions of the electronic data representative of the check. In this manner, one or more portions of the check deemed to include identifying characteristics may be used as the record of the check. If more than one portion is used to create the record, the portions may be subsequent portions, with each portion containing one or more identifying a characteristics. Or the image may comprise non-subsequent portions of the check. For example, the portion of the check containing the date and check number may be placed next to the portion of the check containing the signature of the payer to form the record of the check.

Other means of creating a record of the check may be employed. Furthermore, financial institution may not be responsible for creating the record of the check and may instead provide, by way of network for example, the electronic data representative of the check to an outside source (not shown) or to another financial institution capable of creating the record. The outside source or other financial institution may create the record by forming a representation of the check from information contained on the check, by forming an image of one or more portions of the check, or by other means. The record may then be sent to financial institution through network for example.

An analysis may be performed to determine whether the record of the check, created by one of financial institution or an outside source, is unique or has already been created and stored in the repository. The analysis may include comparing the created record to a plurality of records stored in dead-check repository.

If the record of the check has not already been stored in the repository, the record may serve as an indication that the check attempted to be deposited by payee has not previously been deposited. Accordingly, financial institution may proceed with the remote deposit as desired by payee. Additionally, financial institution may perform actions to assist in subsequent record assessments used to determine if subsequent remote and/or physical deposits may be processed.

At 888, the unique record of the check is stored in dead-check repository. At 18A-07, following the storing of the check in a dead-check repository 18A-06, the remote deposit is processed. At 18A-08, funds associated with the check are credited to account held with financial institution. At 18A-09 the funds identified by the check are deducted from the account of payer, for example, account associated with the check.

If it is determined that the record of the check already exists in dead-check repository, then the remote deposit is desirably rejected and/or other predetermined actions may be taken (e.g., notify the payer, the payee, the financial institution, other financial institutions). Alternatively, the dead-check repository may detect similarities but not an exact match between the record being verified and a record stored in dead-check repository. For example, one inconsistency between the record being verified and a stored record may exist, while multiple portions of the record being verified may match the stored record. If such an inconsistency leads to an uncertainty in the unique record determination, at 18A-05, financial institution may proceed depending upon predetermined rules developed by financial institution.

Figure 18B:
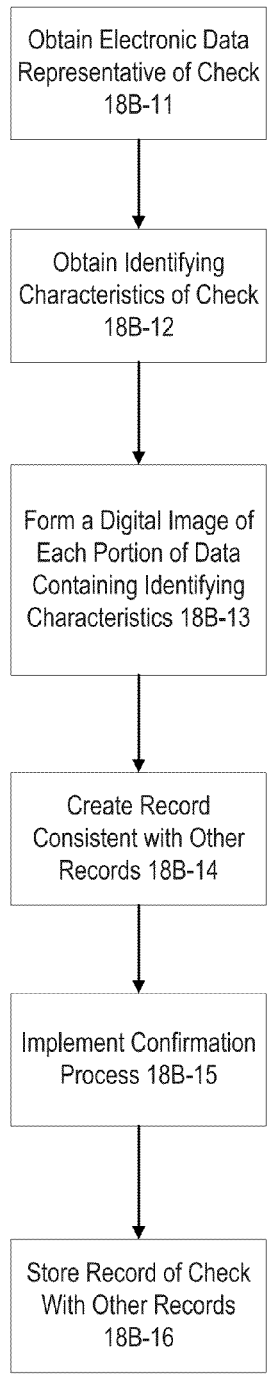

FIG. 18B is a flow chart illustrating an example method of verifying a negotiable instrument, such as, for example, a check At 18B-11, electronic data representative of the check is received at, for example, one of financial institutions, for example, financial institution. The electronic data representative of the check may be received as a digital image of the check from payee or from one of financial institutions.

At 18B-12, financial institution, upon receipt of the check, obtains identifying characteristics of the check. Several identifying characteristics may include, but are not limited to, the signature of payer, the date as indicated by payer, and the account number associated with account from which the funds identified on the check will be deducted. At 18B-13, a digital image comprising some or all the portions of the electronic data representative of the check and/or the identifying characteristics may be formed. The digital image may be a smaller sized image than the electronic data representation of the check, for example.

At 18B-14, a record of the check in a format consistent with the format of the records stored in dead-check repository is created. The creation of the record in a format consistent with the stored records may include, for example, forming a composite digital image comprising each digital image of each portion. Each digital image may be arranged in a predefined manner to form the composite digital image consistent with the plurality of records stored in the dead-check repository.

At 18B-16, a confirmation process is implemented to determine if the record of the check is unique or has already been stored in the repository. As the record has been formed to be consistent with the format of the other records stored in dead-check repository, the confirmation process may include a direct comparison between the created record and the stored records. Optionally at 18B-16, the record of the check is stored with the plurality of records currently stored in the database. If the record matches a record already stored in the repository, the record may be stored with the previously stored record to serve as an indication that the check associated with the record was presented for re-presentment, for example.

Figure 18C:
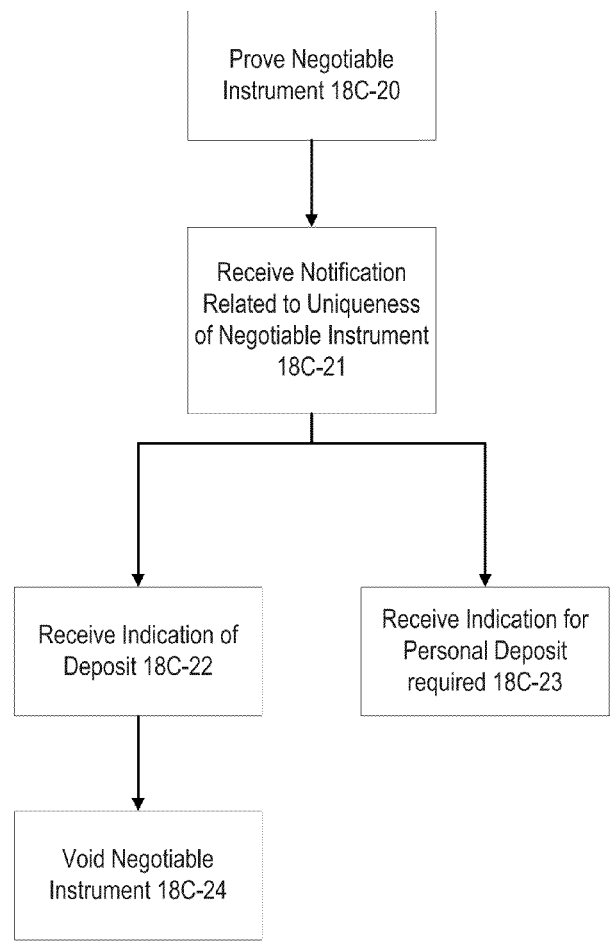

FIG. 18C is a flow chart illustrating a method of remotely depositing a negotiable instrument. At 18C-20, a negotiable instrument is provided by, for example, payee, to, for example, financial institution for providing funds indicated by the a negotiable instrument into account. Providing the negotiable instrument may include creating a digital image of the negotiable instrument by, for example, scanning the negotiable instrument with a scanner or copy machine. The digital image may then be sent in an email attachment, for example, from the payee's or other user's remote location to financial institution.

At 18C-21, payee is provided with a notification related to the uniqueness or verification of the negotiable instrument, based on a comparison of a record created based on the negotiable instrument and previously generated records stored in a repository, for example. The notification may be provided electronically though email or text message over network, for example. If the notification is that the negotiable instrument is unique or does not already exist in the repository, then at 18C-22, payee receives indication that the appropriate funds have been deposited into account owned by payee. If, on the other hand, the notification indicates that the negotiable instrument is not unique or already exists in the repository, at 18C-23 payee receives an indication and e.g., a notification to visit or otherwise contact financial institution 120*a* in order to attempt to deposit the negotiable instrument.

At 18C-24, payee may be required by, for example financial institution, to void the negotiable instrument. This may include sending a copy of the negotiable instrument to financial institution or to an entity as indicated by financial institution. Payee may be required to perform the void process within a predetermined period of time.

Alternative Embodiments of ImageInspector:
Voiding a Check

When a negotiable instrument is deposited using electronic means, there a may arise the situation when the physical negotiable instrument "transforms" to exist in essentially two forms: the original physical negotiable instrument and the newly generated digital form. While the newly generated digital form may undergo processing through the federal check clearinghouse, the physical form is typically left in possession of the bearer of the negotiable instrument, e.g. the person that deposited the check. Although a financial institution may send instructions to the depositor to destroy or transfer possession of the physical negotiable instrument upon transmission of the digital form, the financial institution may have little to no way to force the depositor to actually destroy the negotiable instrument without limiting access to the funds. Unless the depositor destroys the negotiable instrument, the duality described above may continue to propagate, i.e. both the physical negotiable instrument and the digital form may continue to exist contemporaneously.

Thus, a financial institution may wish to cause the alteration of the physical negotiable instrument with or without the assistance of the depositor to render the physical form of the negotiable instrument non-negotiable. In other words, the financial institution may cause the alteration of the appearance of the physical negotiable instrument to a point that makes it difficult or impossible to present the physical negotiable instrument in another transaction, thus effectively destroying the negotiable instrument, with or without the participation of the depositor. For example, the appearance of the negotiable instrument may be changed to show the term, "VOID". Thus, if the negotiable instrument is presented again, the term may indicate that the holder negotiable instrument has previously deposited or attempted to deposit the negotiable instrument. The negotiable instrument may be altered in other ways and is a not limited to the term used above.

Figure 19A:
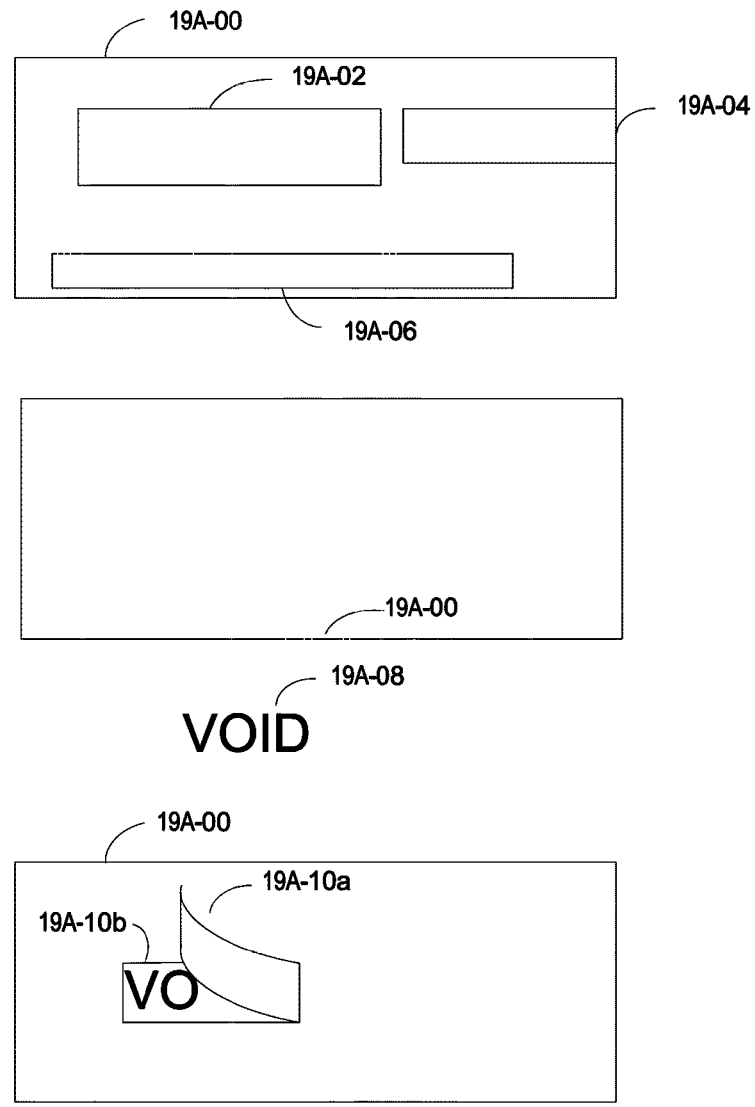
FIGS. 19A-19C provide diagrams illustrating aspects of post-deposit check destruction in one embodiment of the ImageInspector.

FIG. 19A is illustrative of the modification of a negotiable instrument. Shown in FIG. 10A is check 19A-00 having redemption amount section 19A-04, which indicates the amount of funds to be deposited into an account, and magnetic ink character recognition (MICR) section 19A-06. The MICR section typically includes account information of the negotiable instrument, namely the routing number of the bank that holds the account and the account number the negotiable instrument is to be drawn against, e.g. the bank and the account from which the funds are to be withdrawn. The MICR information is typically printed using a magnetic ink or toner containing iron oxide. In a deposit process, the image of check 19A-00 may be a first electronic data of the check as well as other information, such as sections 19A-06 or 19A-04, which may be second electronic data.

In one embodiment, check 19A-00 also has unmodified modifiable section 19A-02. Unmodified modifiable section 19A-02 may use various types of modifiable inks or other mechanisms so that when a stimulus is applied to unmodified modifiable section 19A-02, the ink or mechanism changes in appearance or structure to indicate a deposit process may have occurred. The change may be permanent or temporary. There are various types of ink that may be used, the present disclosure not being limited to any one particular type. Some examples of modifiable inks are inks sensitive to light, heat or sound. An ink that is sensitive to light may be configured to modify based upon exposure to a certain magnitude of light for a certain period of time. For example, a light sensitive ink may change its appearance based upon a bright light, such as a light from a scanner, being applied for a long period of time. The time may be a determined based upon various scan speeds of a typical scanner. For example, the scan speed of a scanner at a high resolution may be slower than the scan speed of a scanner at a low resolution.

If the ink is sensitive to heat, the ink may be configured to modify its appearance based upon the heat generated by the application of a bright light source, such as one that may be found in a scanner. If the light source is applied for a long period of time, the ink may be configured such that the heat generated by the absorption of the light by the ink will create a certain amount of heat within the ink, thus causing the change in the ink. Unmodified modifiable section 19A-02 may also have a mechanism sensitive to other types of stimuli, such as a radio frequency identification (RFID) tag. When the RFID tag receives a particular radio signal, the RFID tag may be modified. When the RFID tag is read at a later time, the modification may indicate that the deposit of the negotiable instrument may have occurred. The RFID tag may also, among other uses, be used to track the location of check 19A-00.

In an alternative embodiment, check 19A-00 has modified modifiable section 19A-08, which was unmodified modifiable section 19A-02. After the application of a stimulus to unmodified modifiable section 19A-02, the ink or mechanism within unmodified modifiable section 19A-02 may be changed to show modified modifiable section 19A-08. Check 19A-00 now shows the term, "VOID" within modified modifiable section 19A-08. The change may be used to provide information to prevent a second or subsequent presentment of check 19A-00 for deposit.

In an alternative embodiment, an ink sensitive to various stimuli that a modifies after removal of a protective cover may be employed. Check 19A-00 has removable coating 19A-10a which seals modifiable ink section 19A-10b from exposure to stimuli. The stimuli may be of various types, including, but not limited to, air or light. For example, prior to deposit of the negotiable instrument, there may be a requirement to remove coating 19A-10a to indicate the underlying code, which is shown as "VO". Upon removal of coating 19A-10a, ink section 19A-10b is exposed to light, causing the ink to modify to show "VO". Thus, coating 19A-10a may be of a range of materials that blocks the exposure of section 19A-10b to a stimulus.

Once exposed, ink section 19A-10b may be permanently or temporarily modified. Ink section 19A-10b indicia may also be encoded to increase the difficulty of defeating the void process. For example, ink section 19A-10b may be a bar code unique to check 19A-00 itself and may be designed in a manner that is difficult to determine what the bar code will be. In order to deposit check 19A-00, coating 19A-10a may be removed to show the encoded indicia. If the indicia is encoded, the user may be forced to remove coating 19A-10a because of the difficulty of determining the code without exposing the indicia by removing coating 19A-10a.

Figure 19B:
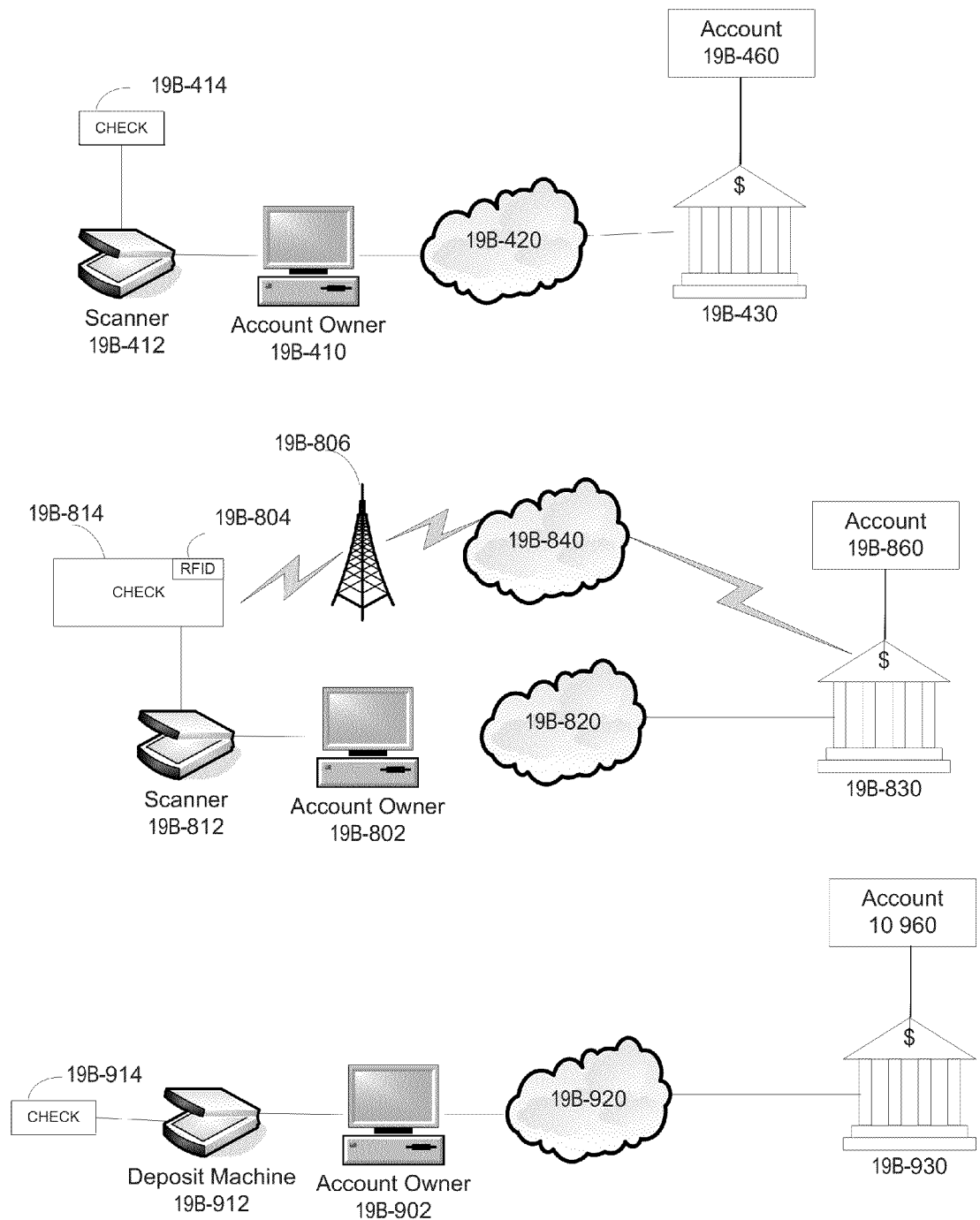

FIG. 19B illustrate example systems to deposit a check into an account within embodiments of ImageInspector. In one exemplary and non-limiting embodiment, account owner 19B-410 has account 19B-460 with bank 19B-430. Account owner 19B-410 opens a communication pathway with bank 19B-430 via Internet connection 19B-420 to send a deposit request to deposit check 19B-414 into account 19B-460. Account owner 19B-410 scans at least one surface of check 19B-414 using scanner 19B-412. Scanner 19B-412 creates a digital image of the surface of check 19B-414 that was scanned and saves that digital image as a digital image file. The digital image file may also contain other information about check 19B-414, including MICR information, account information, or deposit amount. Account owner 19B-410 transmits the digital image file to bank 19B-430, which processes the deposit.

After the deposit is processed, bank 19B-430 may wish to prevent the use of check 19B-414 in another deposit operation. In one exemplary and non-limiting embodiment, bank 19B-430 may cause the modification of check 19B-414 to prevent a subsequent presentment of check 19B-414. Bank 19B-430 may send a communication to account owner 19B-410 to void the check. The communication may be directed at scanner 19B-412 with or without the knowledge of account owner 19B-410. In other words, bank 19B-430 may not complete the deposit operation if account owner 19B-410 intercedes in the void operation. Bank 19B-430 may send a signal to scanner 19B-412 to scan a surface of check 19B-414 at a speed to cause the modification of an ink section on check 19B-414, as described above. Once the scan operation is completed, bank 19B-430 may wait to complete the deposit operation until a communication or notice is received that check 19B-414 was voided. The notice may include the slow scanned image showing the modification of check 19B-414.

Figure 19C:
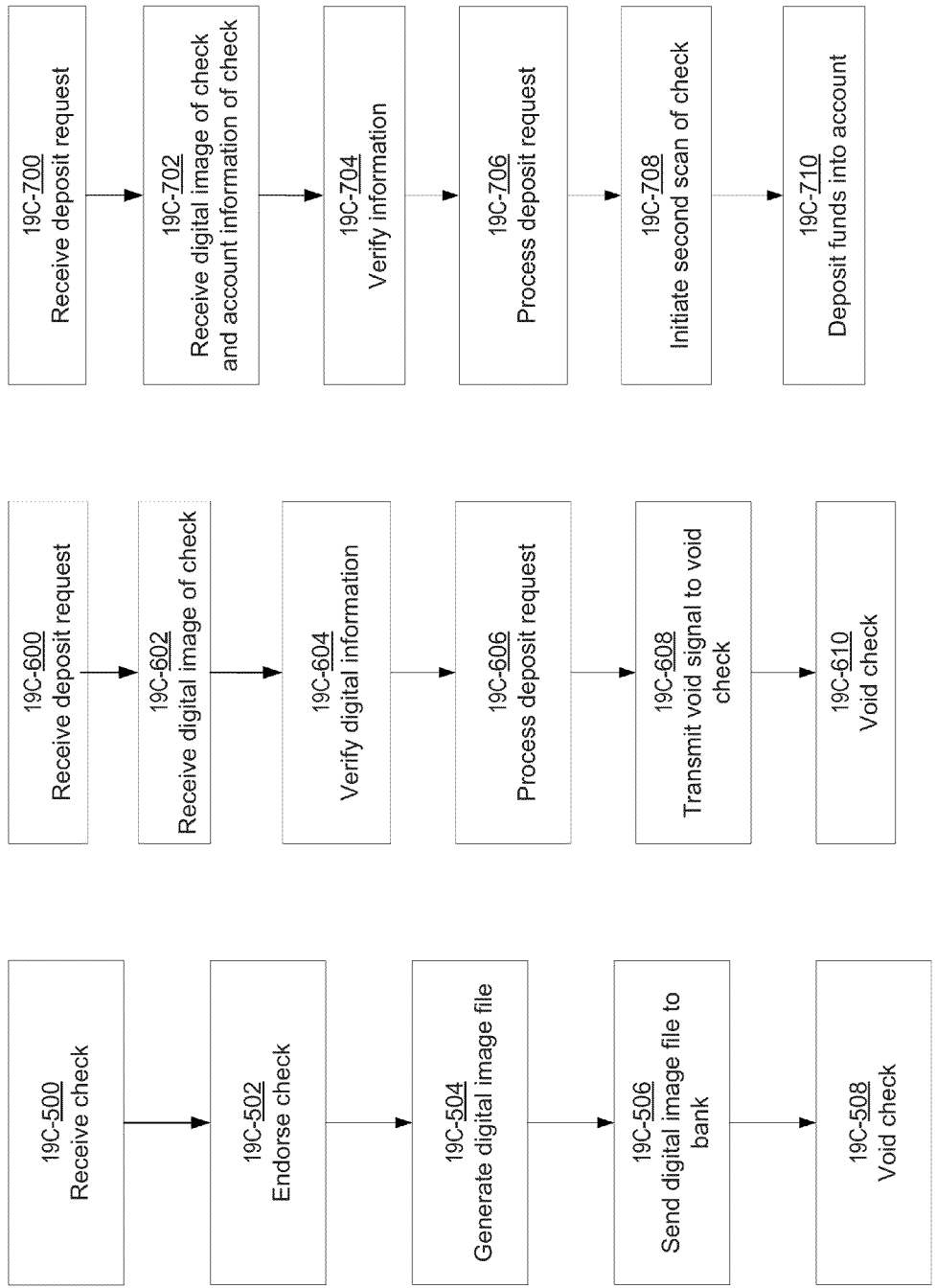

In an alternative embodiment, a shown in FIG. 19C, a user receives 19C-500 a check from another individual, for example, if the user is owed money or the check is used as payment for a good or service. The user endorses 19C-502 the check by signing the check, thus indicating the intent to deposit the check into an account. The user generates 19C-504 a digital image file by scanning at least one surface of the check using a scanner. The user sends 19C-506 the digital image file to the bank which controls the user's account. After processing the deposit request, a communication is a generated and transmitted to void 19C-508 the check. The communication may be directed to the user and/or may be directed to another mechanism. For example, the communication may be directed to the user's scanner with or without the knowledge of the user. The communication may contain instructions to re-scan the check at a certain speed to cause the application of a stimulus to modify the check.

In an alternative embodiment, the bank receives 19C-600 a deposit request from a user. After acknowledging the deposit request, the bank then receives 19C-602 a digital image of the check. The digital image may be used by the bank to process the deposit request. The digital image may be used alone or in conjunction with additional information such as MICR information. After verifying 19C-604 the digital information, the bank processes 19C-606 the deposit request. The verification may include, but is not limited to, the verification of the quality of the digital image, the verification of any data retrieved from the digital image, the verification of additional information received along with the digital image, and/or the verification that the check has not been deposited before. After the bank verifies 19C-604 the digital information received and processes 19C-606 the deposit request, the bank then may transmit 19C-608 a void signal to void the check. As described earlier, there may be various manners in which to void the check, including, but not limited to, the application of a stimulus such as light, heat or sound. Upon application of the stimulus, the check is voided 19C-610.

In an alternative embodiment, a scanner is used to apply the stimulus. A bank receives 19C-700 a deposit request. The bank then receives 19C-702 a digital image of the check and account information. The bank verifies 704 the information and processes 19C-706 the deposit request. After the deposit is in process, to complete a the process, the bank transmits 19C-708 a void signal to the user's scanner. The void signal may contain instructions to rescan a surface of the check at a certain speed to cause the application of a stimulus. The ink may be modified based upon the application of a certain magnitude or brightness of light, or heat may be generated by that brightness of light, for a certain amount of time, which may correspond to a scan speed. After the stimulus is applied, the bank deposits 19C-710 the funds into the user's account.

The present disclosure may incorporate a check modifiable by various stimuli. In an alternative embodiment, a system may use radio waves to modify a check. Check 19B-814 has embedded RFID tag 19B-804. RFID tag 19B-804 is an object that is sensitive to radio signals and can be incorporated into check 19B-814. RFID tag 19B-804 can be read and modified at various distances. Typically, an RFID tag, such as RFID tag 19B-804, has two parts: an integrated circuit for storing and processing information as well as receiving instructions via radio waves and an antenna for receiving and transmitting a signal. Some RFID tags do not have the integrated circuit, thus reducing cost and bulk of using an RFID tag.

The RFID tag may be programmed to initially indicate that check 19B-814 has not been deposited. Account owner 19B-802 may use scanner 19B-812 to deposit check 19B-814 into account 19B-860 of bank 19B-830 using communication pathway 19B-820. After check 19B-814 is deposited into account 19B-860, bank 19B-830 may wish to modify RFID tag 19B-804 to indicate that check 19B-814 has been deposited. Thus, when the information contained by RFID tag 19B-804 is subsequently read, RFID tag 19B-804 may indicate that check 19B-814 has previously been deposited. Bank 19B-830 may cause radio transmitter 19B-806 to transmit a radio communication, through communication connection 19B-840, to RFID tag 19B-804 of check 19B-814. The radio signal may cause RFID tag 19B-804 to modify its information to indicate that check 19B-814 has been previously deposited. Communication connection 19B-840 may be of various types, including, but not limited to, a wireless cellular connection or an internet connection. Additionally, radio transmitter 19B-806 may be of various types, including, but not limited to, a local internet access point and a cellular transceiver.

The type of scanner used may also be of various types. In an alternative embodiment, a scanner designed for the deposit and voiding of checks through remote means may be employed. Deposit machine 19B-912 is configured to provide deposit services. Deposit machine 19B-912 may be an integrated machine or a system having various parts, including a scanner to create a digital image of a check, such as check 19B-914 and a stimulus generator to cause the application of a stimulus to check 19B-914. Account owner 19B-902 initiates deposit machine 19B-912 to generate a digital image of check 19B-914, the image being transmitted to bank 19B-930 via communication connection 19B-920 for deposit into account 19B-960. After the bank processes the deposit of check 19B-914, bank 19B-930 may transmit a void signal to deposit machine 19B-912 to initiate a void process.

The void signal may be transmitted using various communication methods, including, but not limited to, an internet connection, a telephone connection such as a wireless telephone, or a facsimile transmission if deposit machine 19B-912 is configured to receive facsimile messages. Deposit machine 19B-912 may void check 19B-914 according to the configuration of deposit machine 19B-912 and/or the void a message received. For example, deposit machine 19B-912 may be configured to apply an ultraviolet light in response to a void signal. Deposit machine 19B-912 may also be configured to rescan check 19B-914 and send the rescanned digital image to bank 19B-930 to show that the void stimulus has been applied and that check 19B-914 has been voided.

ImageInspector Example User Interfaces

Figure 20A:
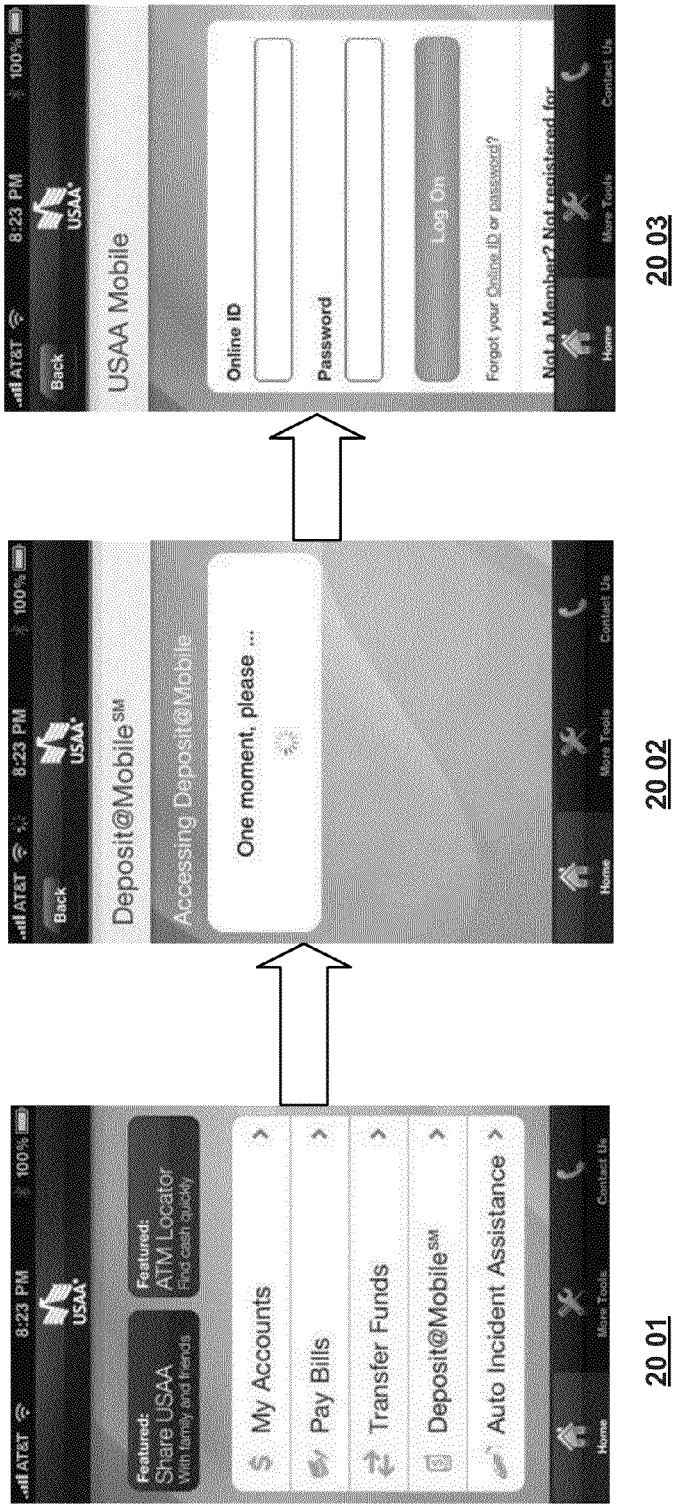

FIGS. 20A-H provide a flow diagram of example screen shots of user interfaces illustrating aspects of remote deposit via a mobile device within one embodiment of the ImageInspector. As shown in FIG. 20A, in one embodiment, a user operating a mobile device (e.g., an Apple iPhone, etc.), may select to access ImageInspector feature from the mobile device menu 2001, and the mobile device may then send to deposit request to a remote ImageInspector platform to establish a secured communications connection between the user device and the server 2002. Upon establishing the connection, the ImageInspector may prompt the user to login to the ImageInspector system via a login page 2003.

Figure 20B:
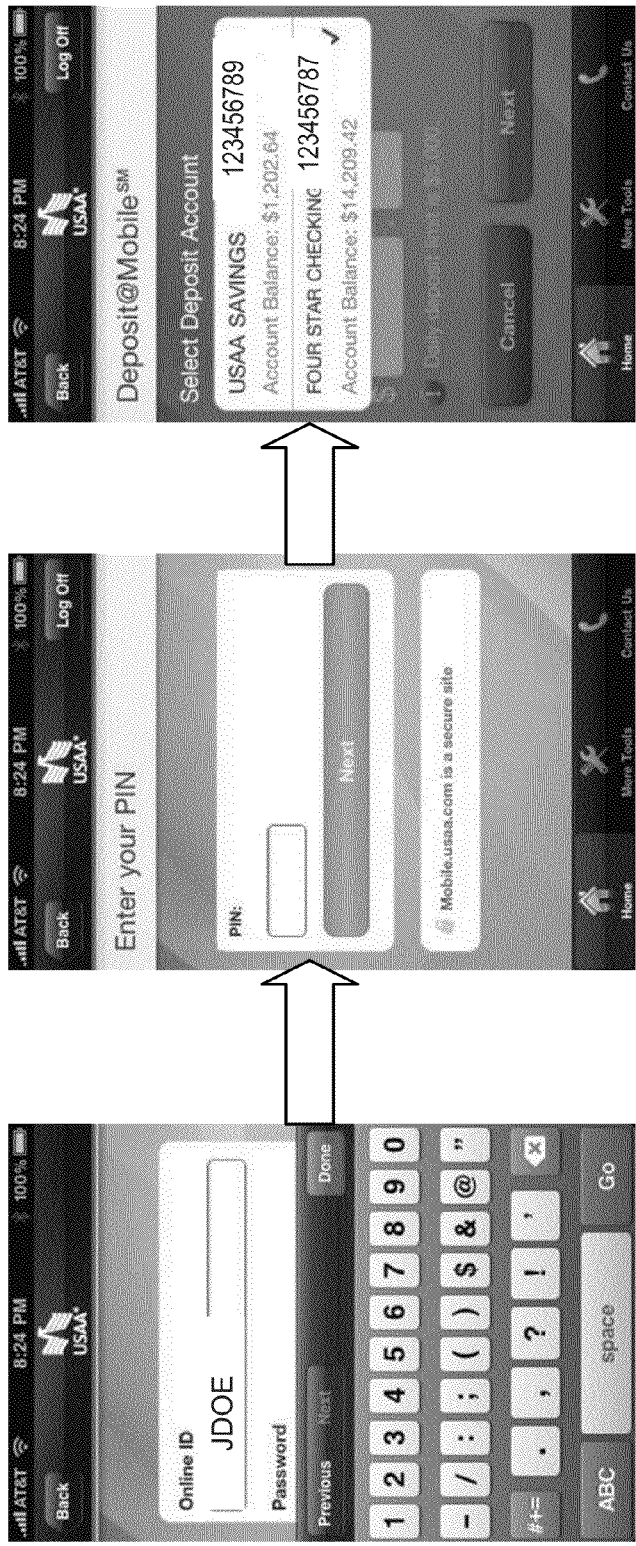
Figure 20C:
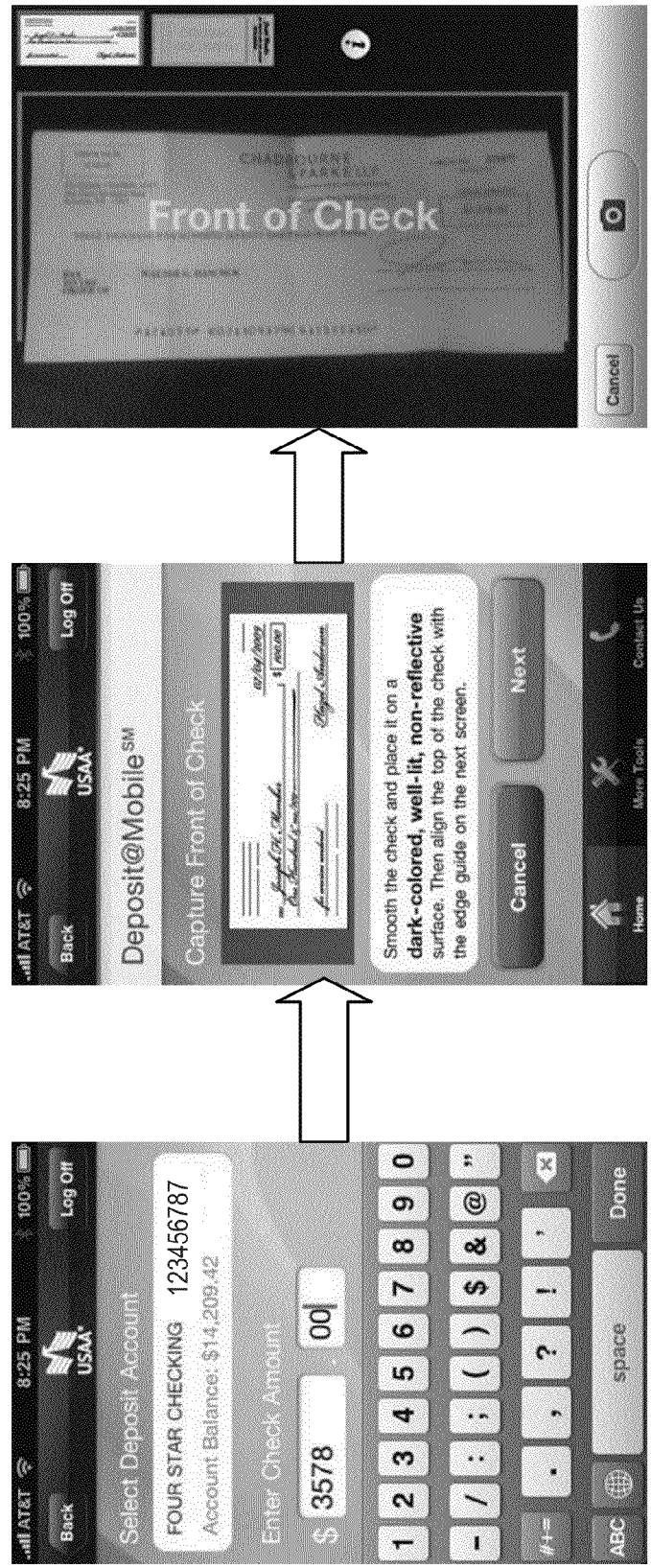
Figure 20D:
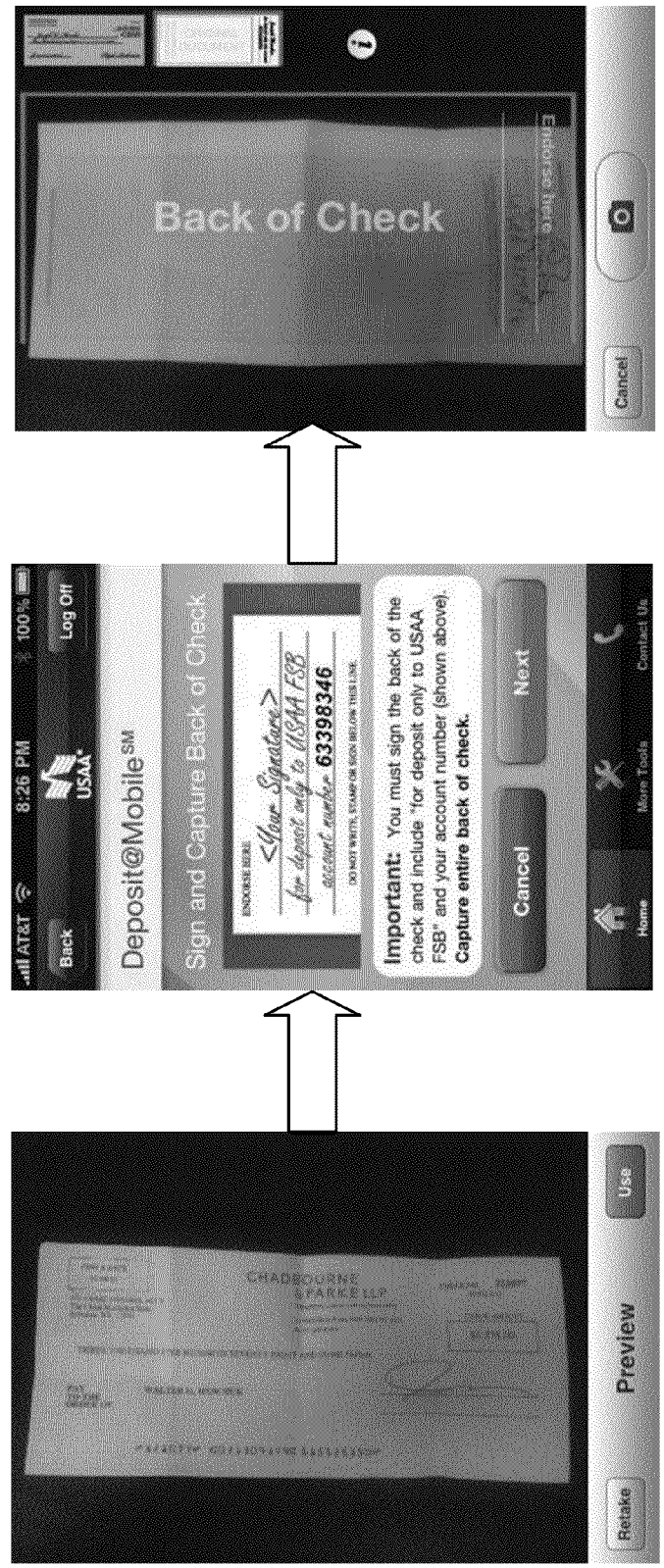

In one embodiment, as shown in FIG. 20B, the user may type the "Online ID" 2005 and the "PIN" 2007 via the user interface. Upon authentication, the ImageInspector may display a list of available accounts associated with the user 2009, 4 and the user may select to deposit into the account "Four Star Checking" 2015. As shown in FIG. 20C, upon selection, the user may enter a deposit amount $3578.00. In one implementation, the ImageInspector may request the user "capture front of check" and provide specific instructions 2018. For example, in one implementation, a the ImageInspector may request the user to smooth the check and place it on a dark-colored, well-lit and non-reflective surface. 2020 shows the user may place the check in front of the built-in camera of the mobile device to fit in the indicated area displayed on screen. Upon taking a picture of front side of the check 2022, the ImageInspector may instruct the user to sign and capture back of the check in a similar manner 2023-2024.

Figure 20E:
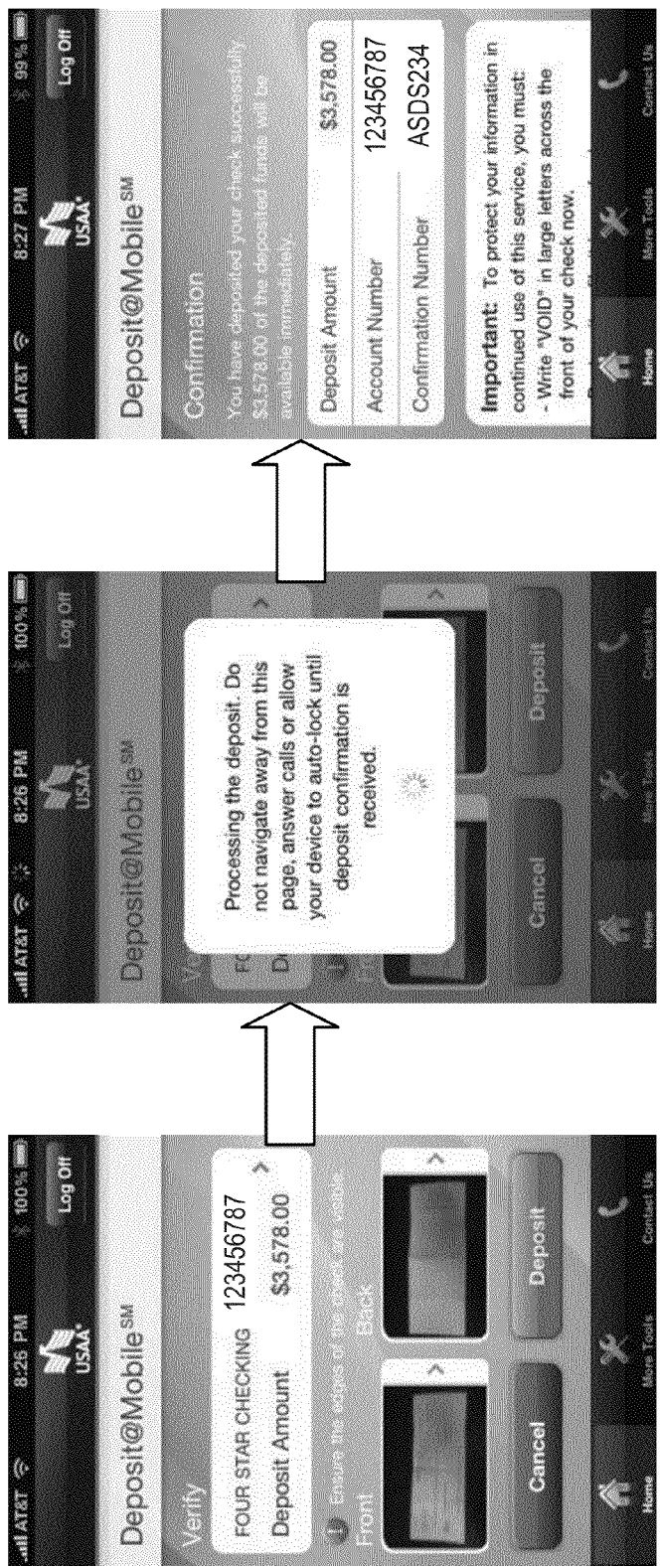

In one embodiment, as shown in FIG. 20E, the ImageInspector may present the captured images of the check (both front and back sides) to the user for confirmation 2027, and then process the deposit 2030. In one implementation, the ImageInspector may send a notice of successful deposit to the user 2032 showing deposit amount, account number and a confirmation number.

Figure 20F:
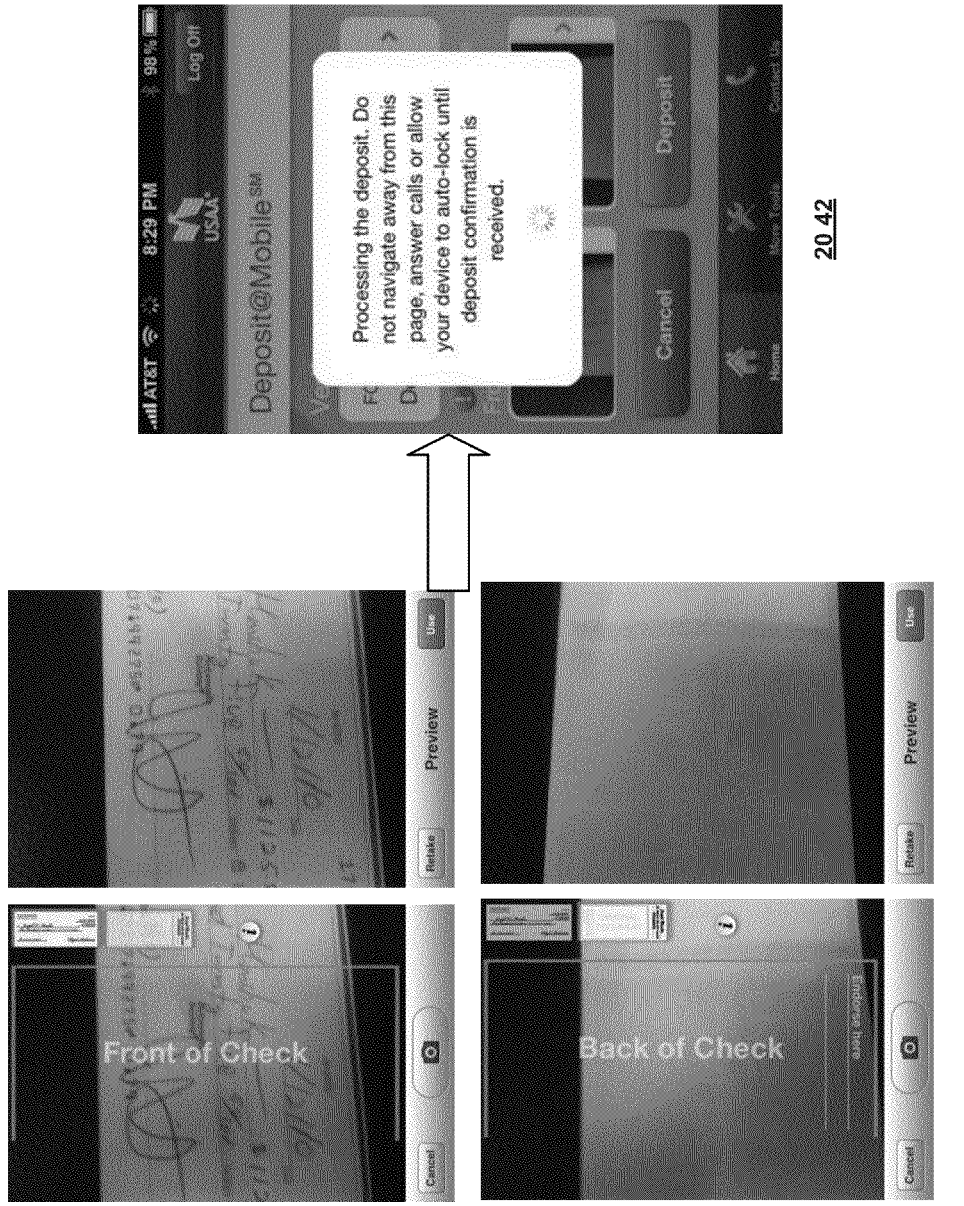

In one embodiment, as shown in FIGS. 20F-G, if the images of the checks are not properly taken, e.g., the check is misaligned and the resulting images are incomplete 2040, submission of such unusable check images 2042 may lead to error messages. In one implementation, as shown in FIG. 20G, the ImageInspector may inform the user the deposit can not be performed 2045 and provide additional information 2048 such as a customer assistance phone number. In an alternative implementation, the ImageInspector may request the user to re-take and re-submit images of the check.

Figure 20H:
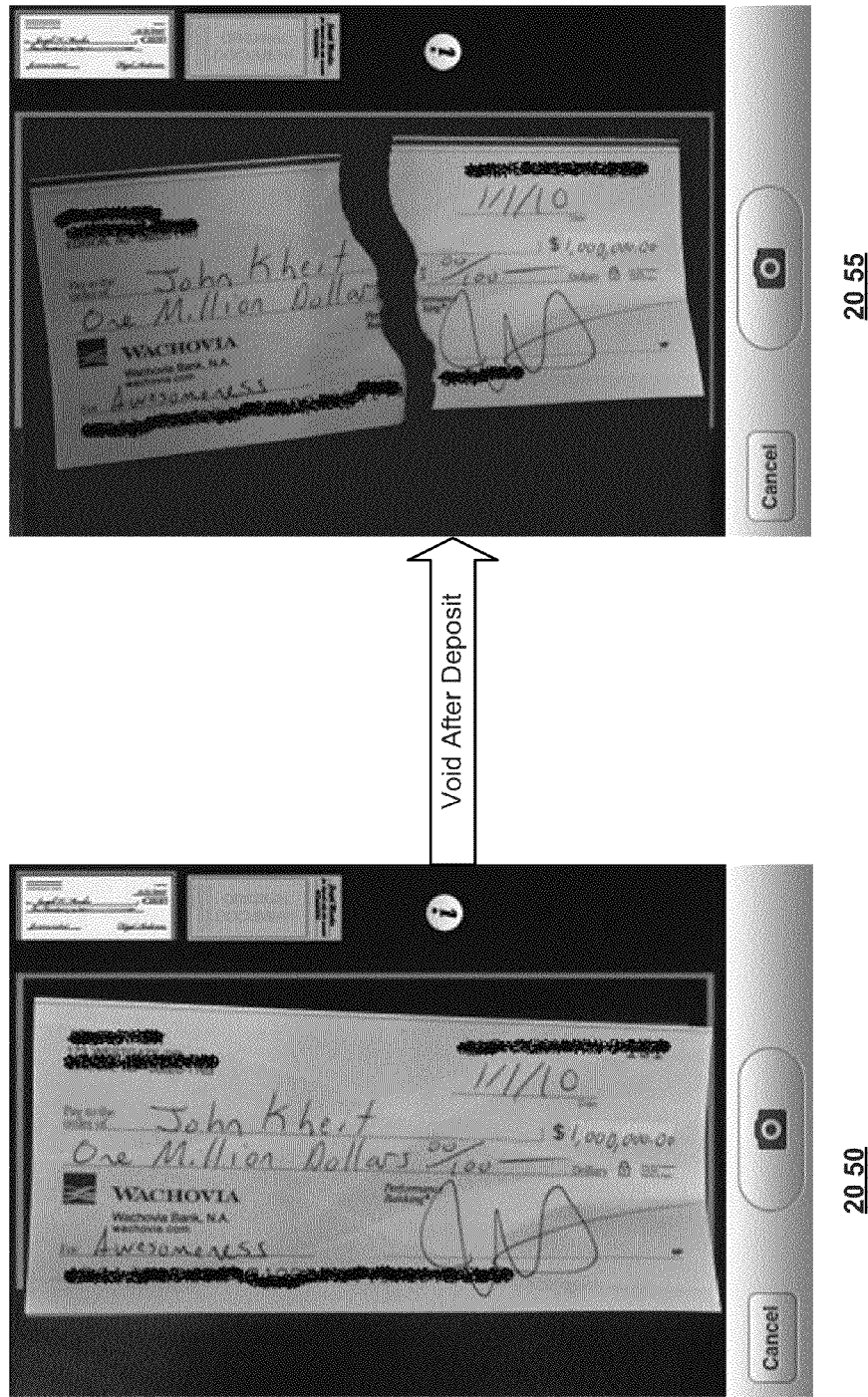

FIG. 20H illustrates aspects of submitting a ripped paper check for verification after deposit in one embodiment of the ImageInspector. As shown in FIG. 20H, a depositor may capture and submit an image of a check 2050, and after deposit the depositor may submit an image of ripped check to verify that the check has a been voided 2055.

Figure 21A:
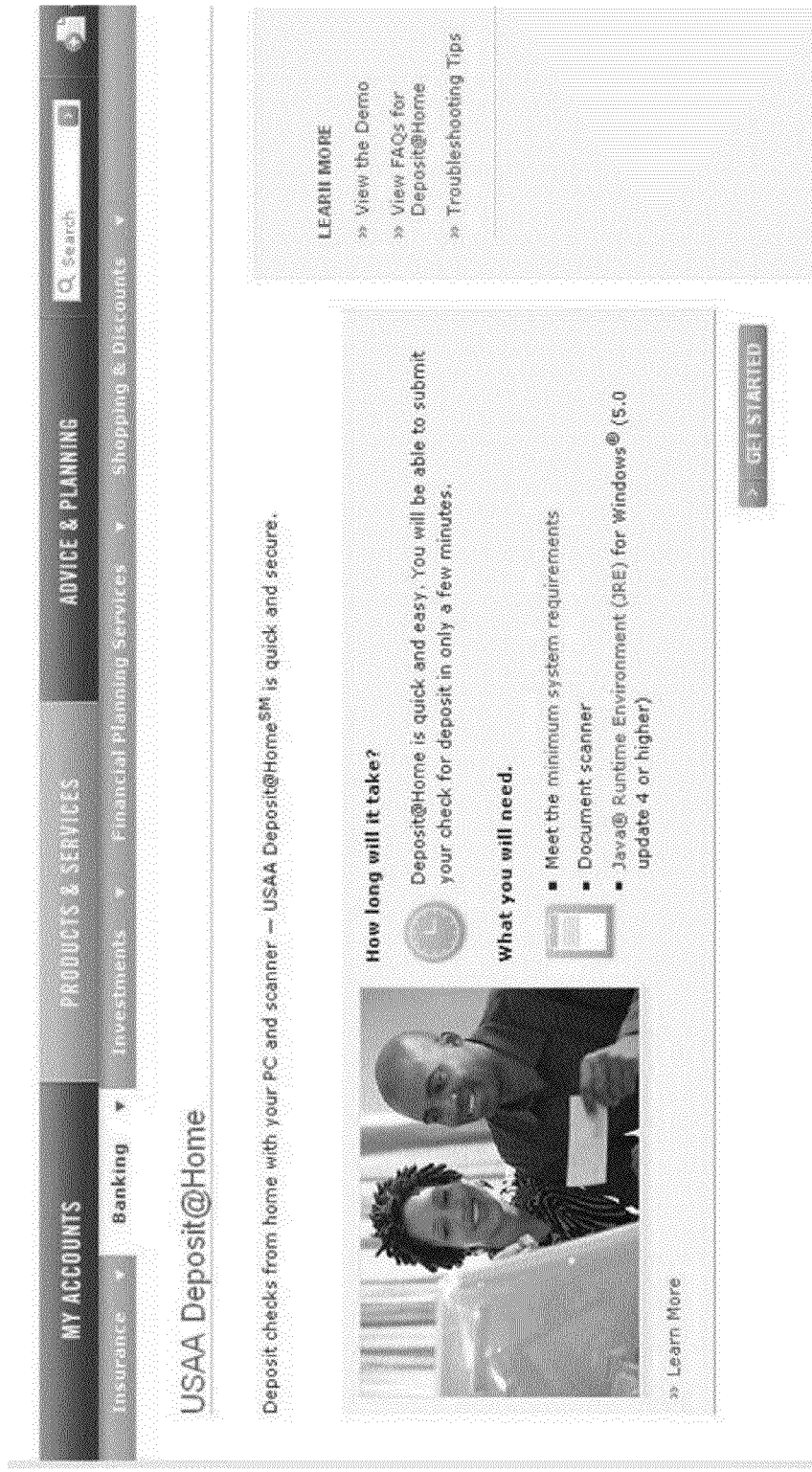
FIGS. 21A-O provide example screen shots of user interfaces illustrating aspects of remote deposit via a personal computer within one embodiment of the ImageInspector.
Figure 21B:
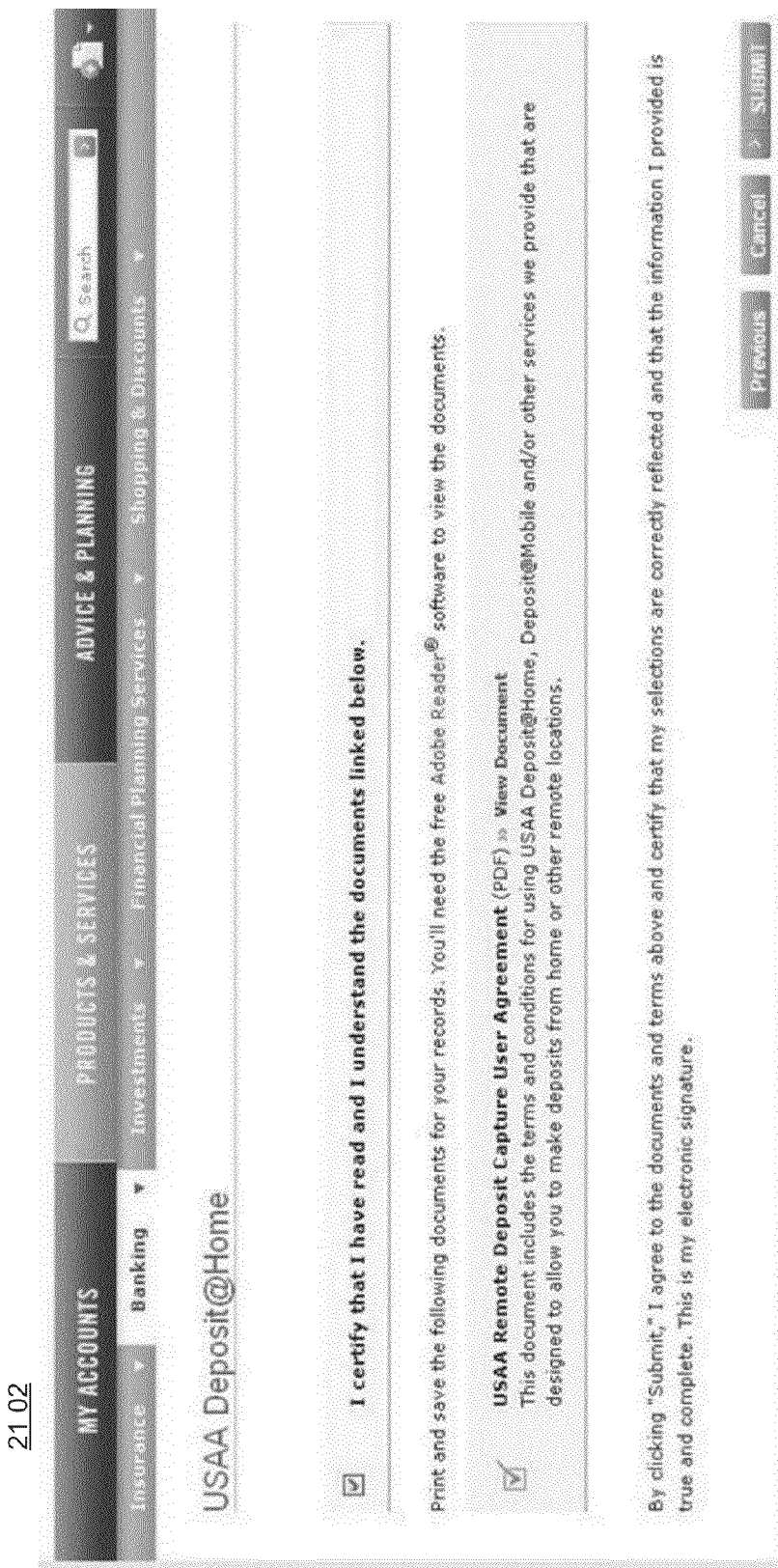
Figure 21C:
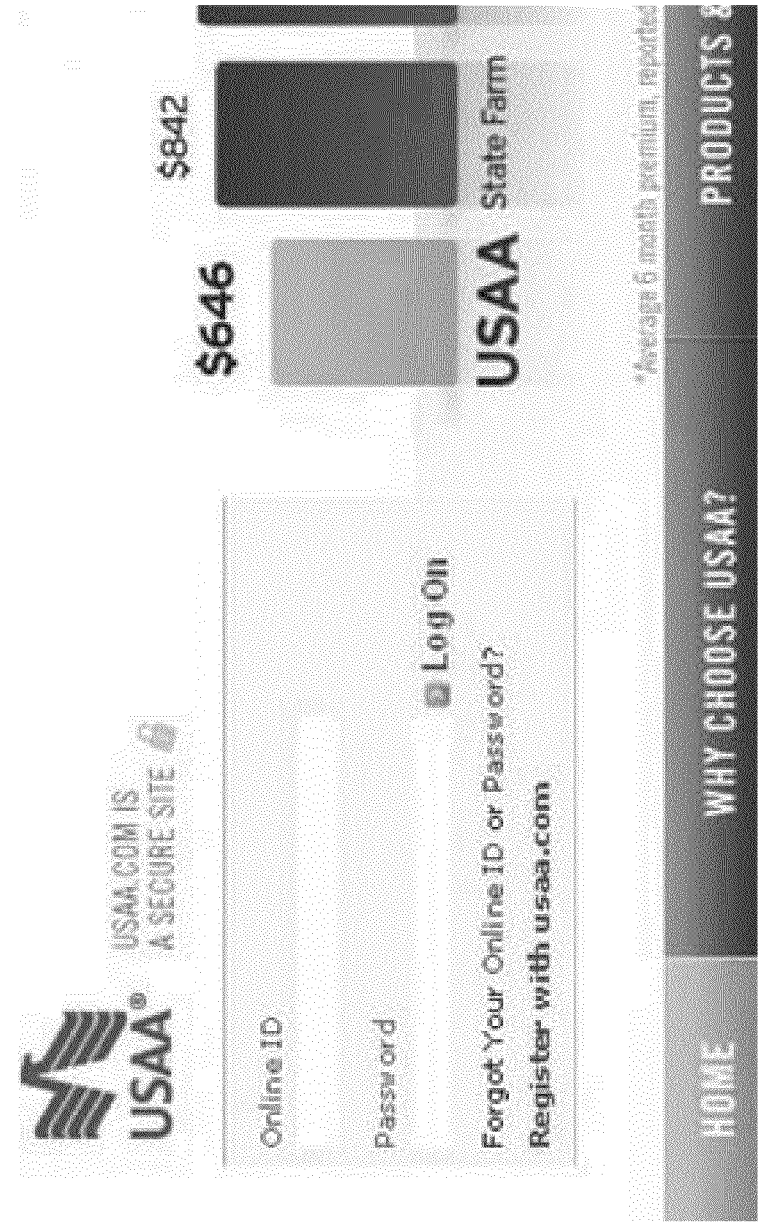
Figure 21E:
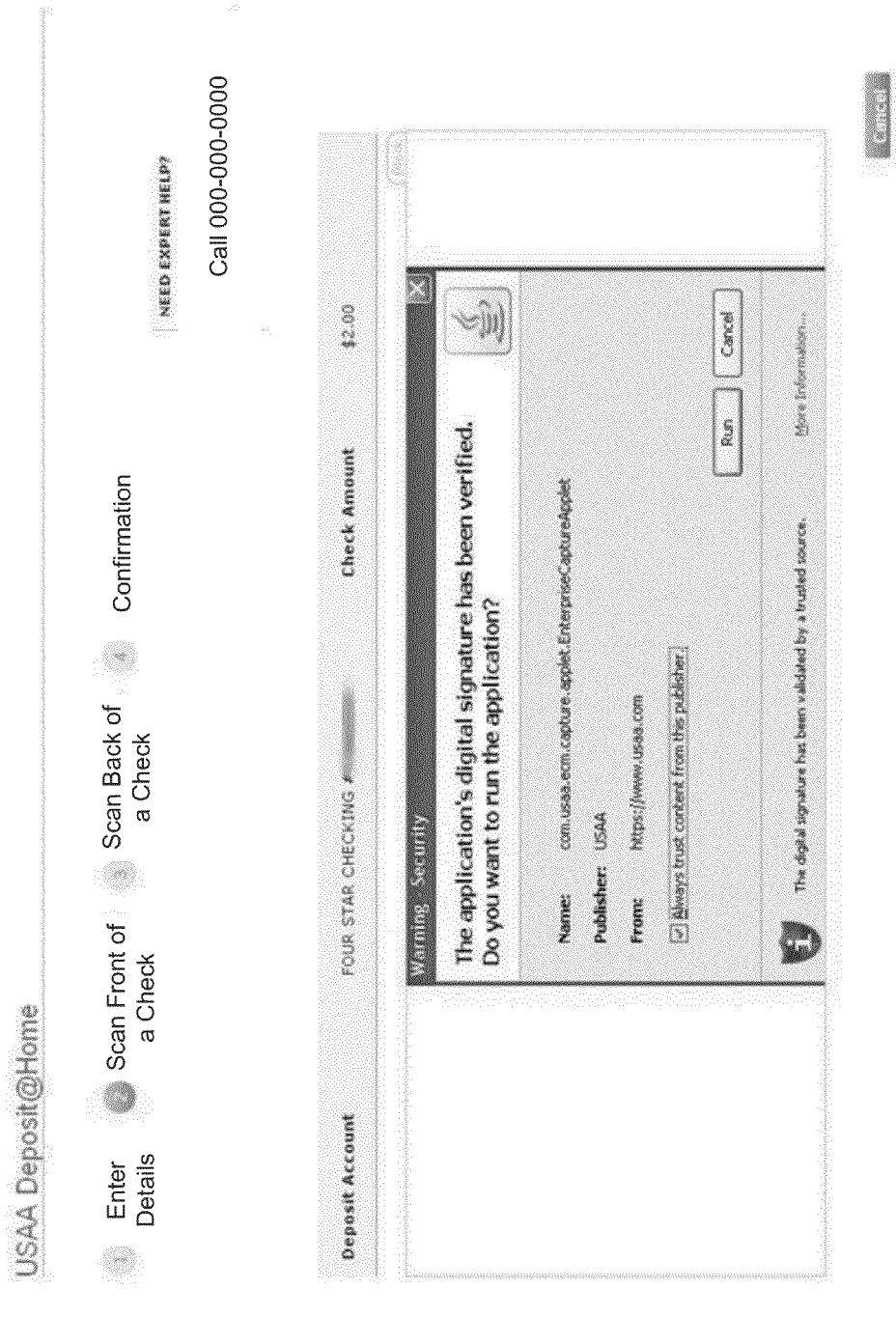
Figure 21F:
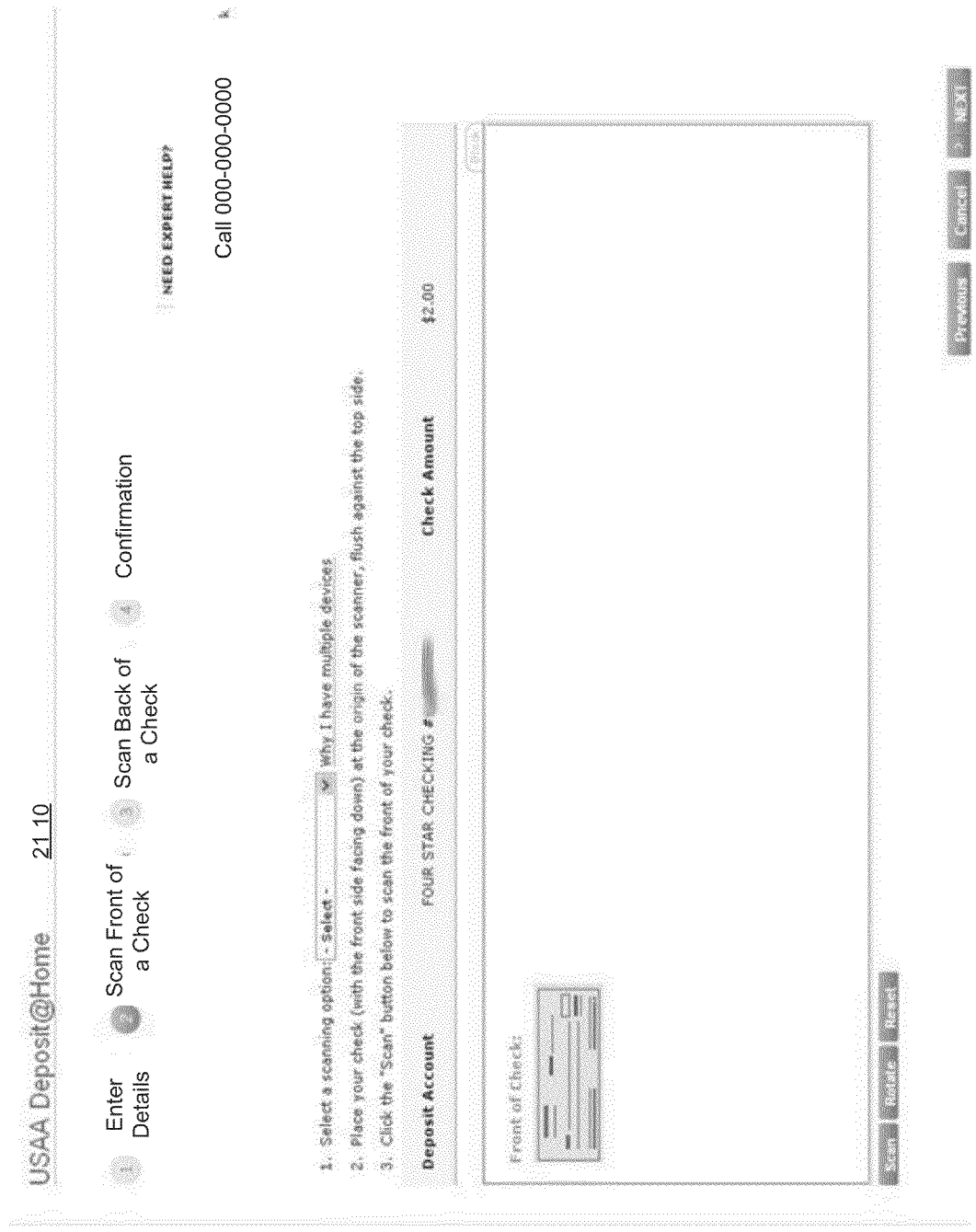
Figure 21G:
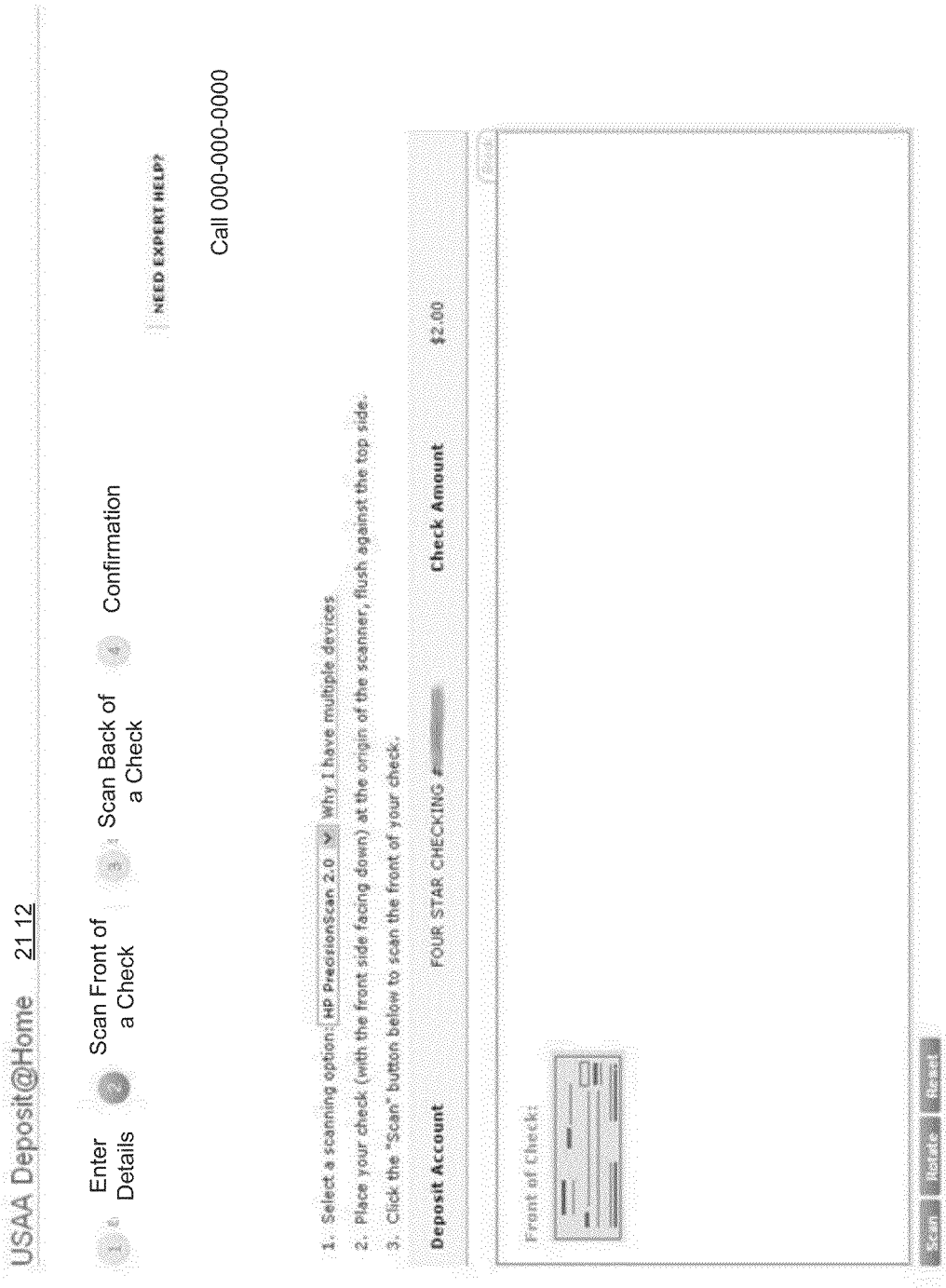
Figure 21J:
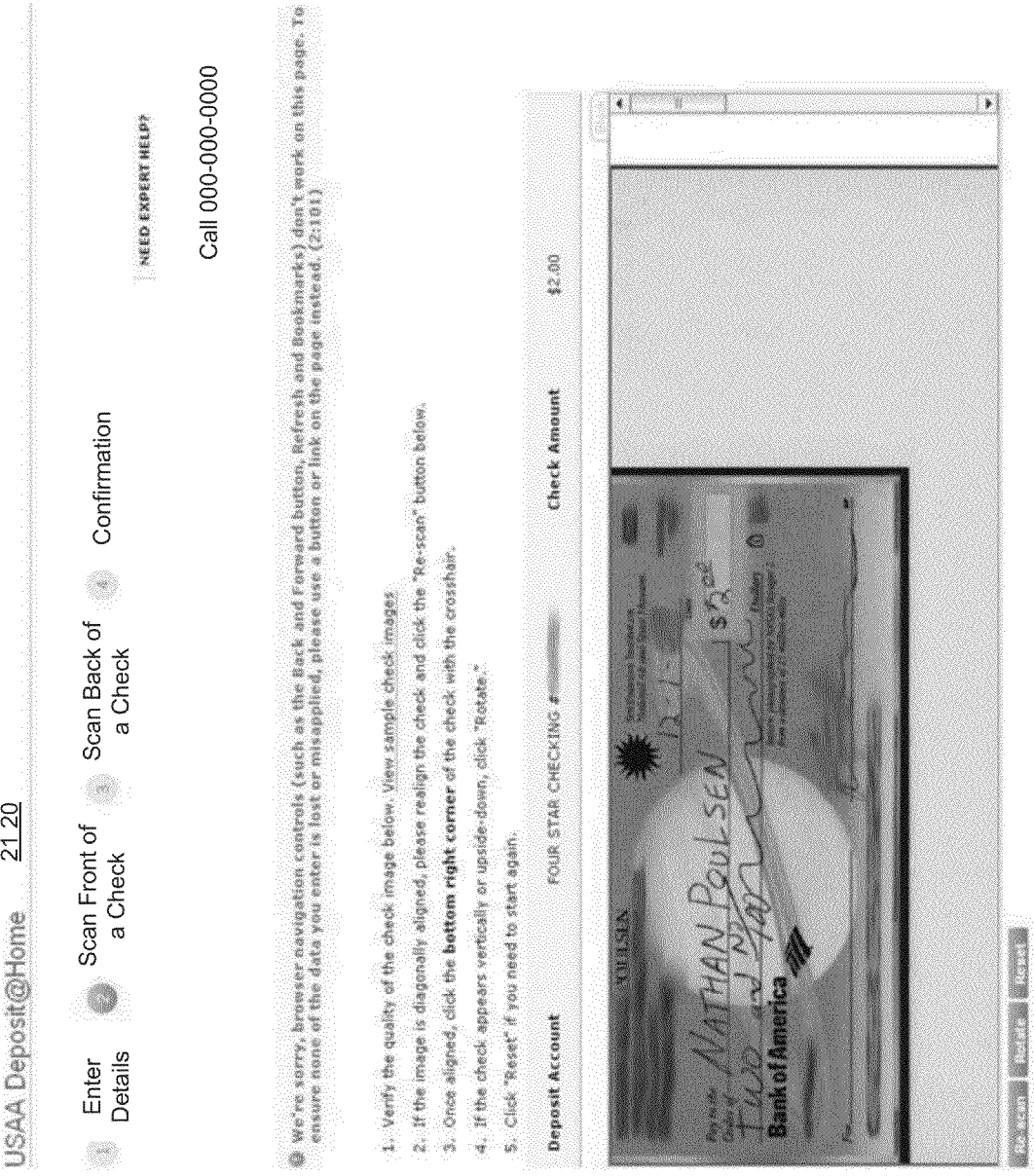
Figure 21L:
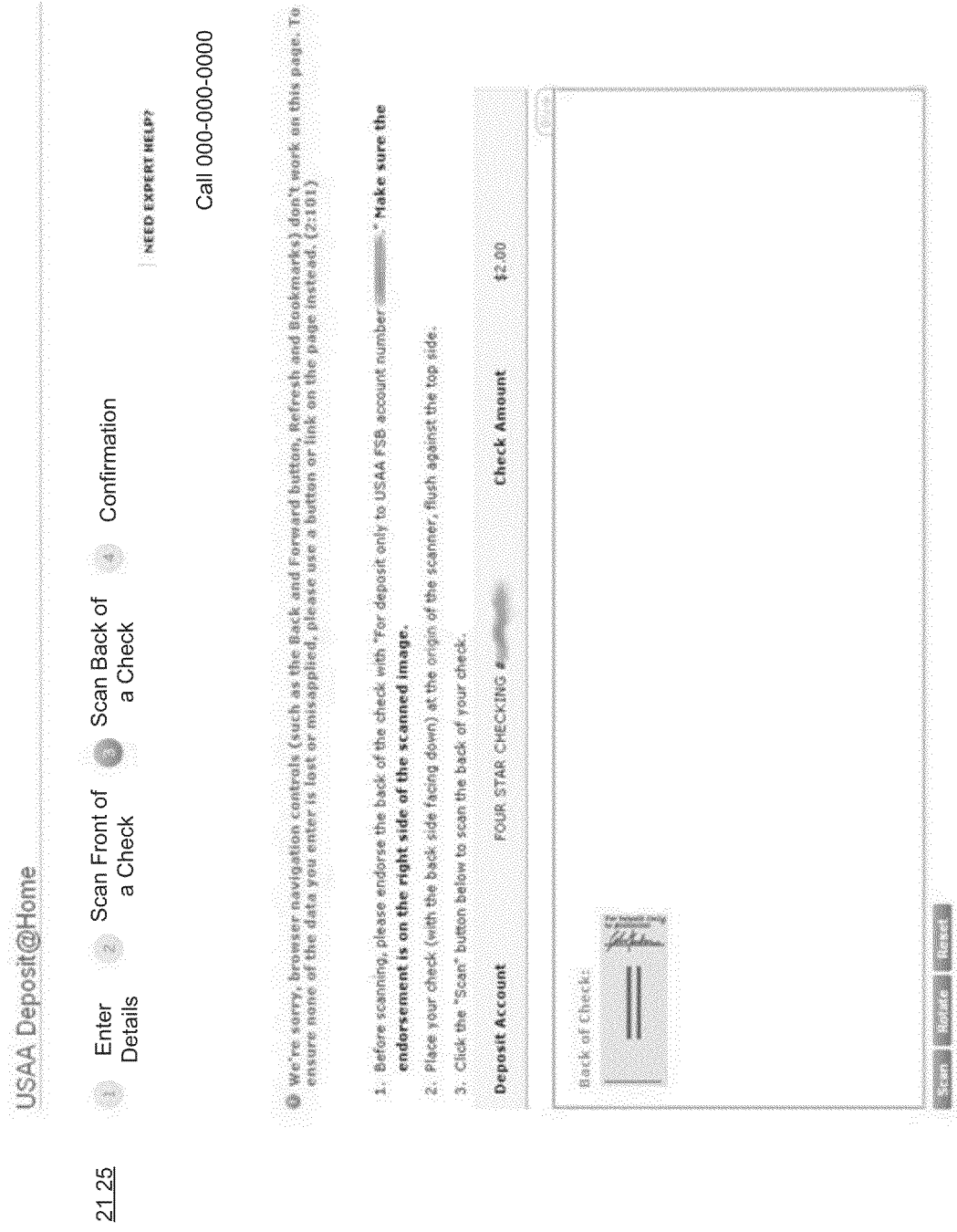
Figure 21M:
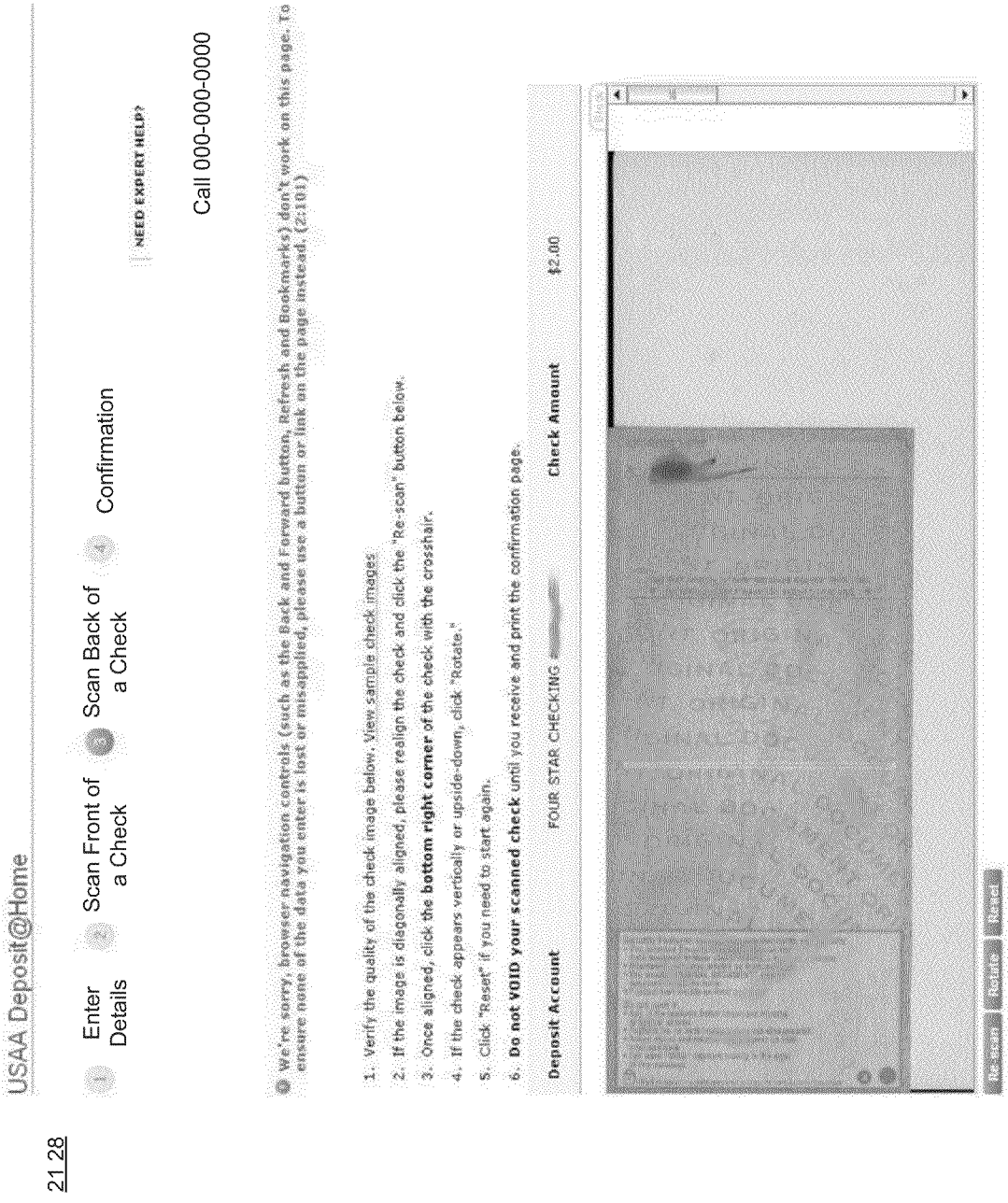
Figure 21O:
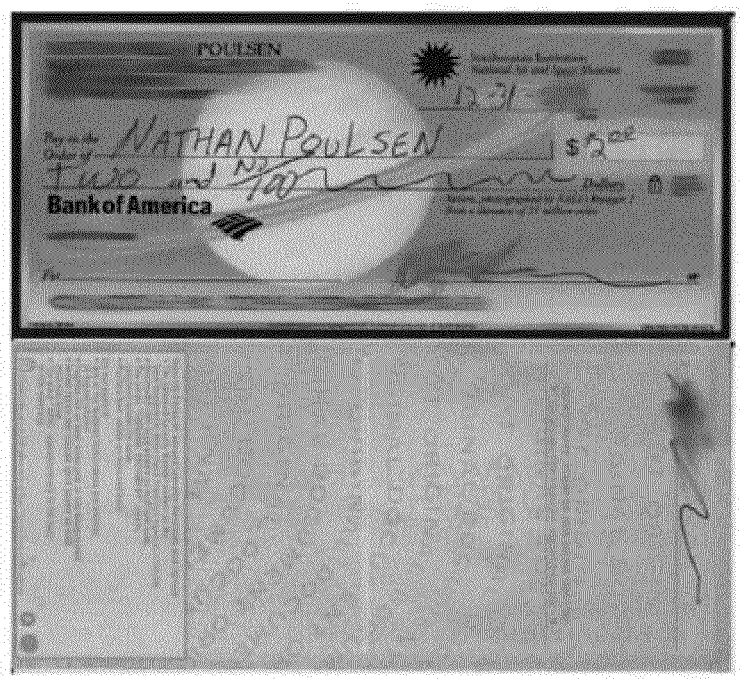

FIGS. 21A-21O provide example screen shots of user interfaces illustrating aspects of remote deposit via a website within one embodiment of the ImageInspector. In one embodiment, a user may access a ImageInspector website at a personal computer 2101, and the ImageInspector may provide a user interface for user certification 2102. For example, a user has to review and agree with terms and conditions of ImageInspector in order to proceed with remote deposit.

In one embodiment, the ImageInspector may prompt the user to login with an online ID and password 2104. Upon successful login, the ImageInspector may provide deposit account information to the user, and allow the user to input a deposit amount 2105. In one embodiment, the ImageInspector may provide details for the user on digital signature verification of the website 2108, and instruct the user to scan a paper check 2110. In one implementation, the ImageInspector may remotely control a scanner connected to the personal computer of the user, and let the user choose the scanner from a drop-down list 2112.

In one embodiment, the ImageInspector may then instruct the user to place the paper check in the scanner bed. If the paper check is not properly positioned as shown, the ImageInspector may display an incomplete, skewed or improperly positioned check image to the user 2115 and 2118 such that the user may choose to rescan. In one implementation, if the user has properly positioned the paper check in a rectangle area as instructed via the ImageInspector interface 2120, the ImageInspector may request the user to select a bottom right corner of the scanned check image and then detect an area of the image of the check from its background 2122. In one embodiment, the ImageInspector system may instruct the user to endorse the check and scan the back side of the check 2125. If the ImageInspector system detects that the check is not endorsed 2128, the image may be denied and an error message may be displayed 2130.

In one embodiment, if both sides of the check have been successfully scanned and the ImageInspector system verifies the uploaded images, the ImageInspector may deposit the funds into the user account and provide deposit details to the user including the scanned check images. In one implementation, the ImageInspector system may instruct the user to void and dispose the deposited paper check 2135.

In one embodiment, an image of ripped check may be submitted to verify the check has been voided in a similar manner as shown in FIG. 20H.

ImageInspector Controller

Figure 22:
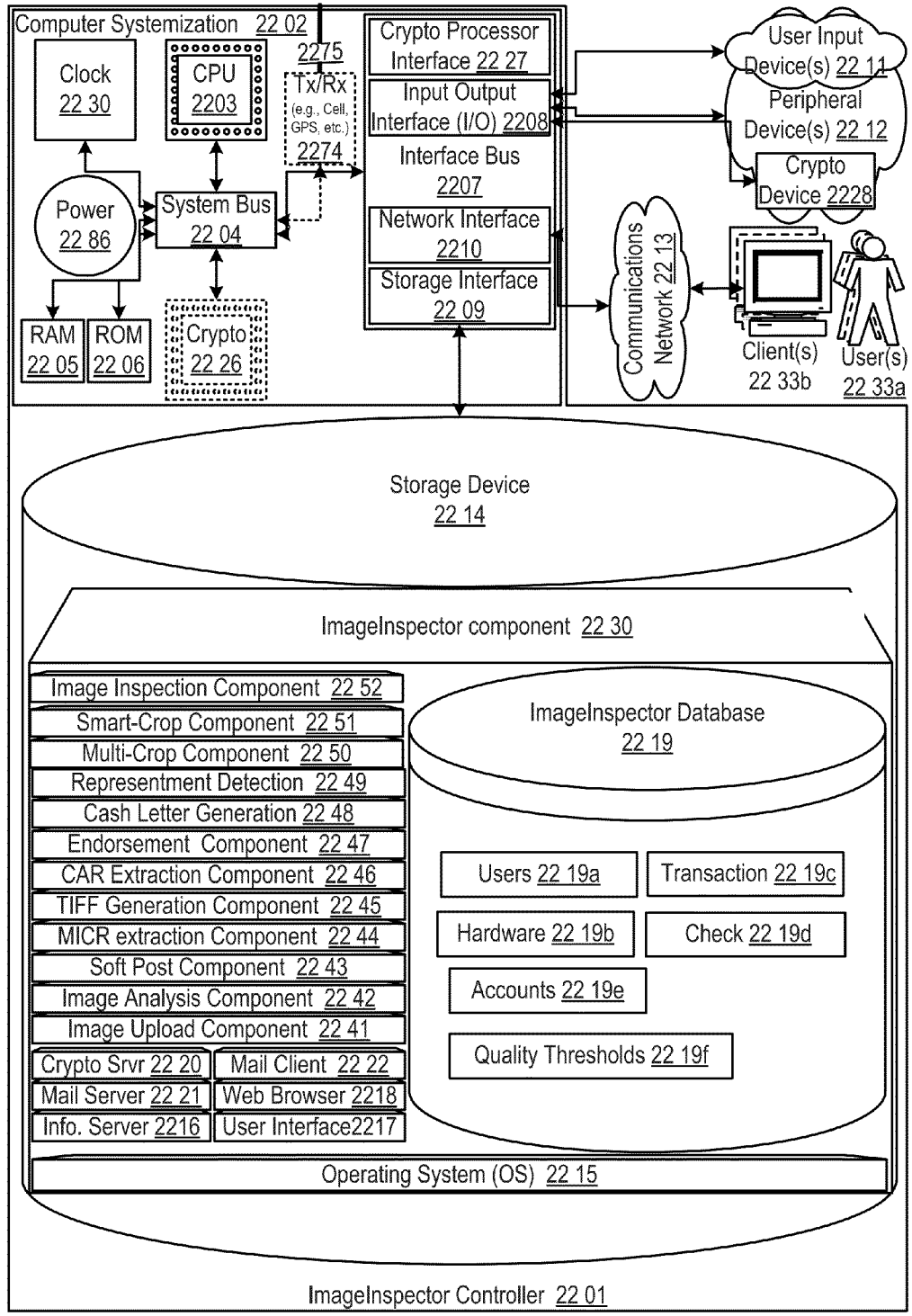
FIG. 22 is of a block diagram illustrating embodiments of the ImageInspector controller.

FIG. 22 shows a block diagram illustrating embodiments of a ImageInspector controller. In this embodiment, the ImageInspector controller 2201 may serve to aggregate, process, store, search, serve, identify, instruct, generate, match, and/or facilitate interactions with a computer through secured data transmission and image analysis technologies, and/or other related data technologies, and/or other related data.

Typically, users, which may be people and/or other systems, may engage information technology systems (e.g., computers) to facilitate information processing. In turn, computers employ processors to process information; such processors 2203 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2229 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the ImageInspector controller 2201 may be connected to and/or communicate with entities such as, but not limited to: one or more users from user input devices 2211; peripheral devices 2212; an optional cryptographic processor device 2228; and/or a communications network 2213.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The ImageInspector controller 2201 may be based on computer systems that may comprise, but are not limited to, components such as: a computer systemization 2202 connected to memory 2229.

Computer Systemization

A computer systemization 2202 may comprise a clock 2230, central processing unit ("CPU(s)" and/or "processor(s)" (these terms are used interchangeable throughout the disclosure unless noted to the contrary)) 2203, a memory 2229 (e.g., a read only memory (ROM) 2206, a random access memory (RAM) 2205, etc.), and/or an interface bus 2207, and most frequently, although not necessarily, are all interconnected and/or communicating through a system bus 2204 on one or more (mother)board(s) 2202 having conductive and/or otherwise transportive circuit pathways through which instructions (e.g., binary encoded signals) may travel to effectuate communications, operations, storage, etc. The computer systemization may be connected to a power source 2286; e.g., optionally the power source may be internal. Optionally, a cryptographic processor 2226 and/or transceivers (e.g., ICs) 2274 may be connected to the system bus. In another embodiment, the cryptographic processor and/or transceivers may be connected as either internal and/or external peripheral devices 2212 via the interface bus I/O. In turn, the transceivers may be connected to antenna(s) 2275, thereby effectuating wireless transmission and reception of various communication and/or sensor protocols; for example the antenna(s) may connect to: a Texas Instruments WiLink WL1283 transceiver chip (e.g., providing 802.11n, Bluetooth 3.0, FM, global positioning system (GPS) (thereby allowing ImageInspector controller to determine its location)); Broadcom BCM4329FKUBG transceiver chip (e.g., providing 802.11n, Bluetooth 2.1+EDR, FM, etc.); a Broadcom BCM4750IUB8 receiver chip (e.g., GPS); an Infineon Technologies X-Gold 618-PMB9800 (e.g., providing 2G/3G HSDPA/HSUPA communications); and/or the like. The system clock typically has a crystal oscillator and generates a base signal through the computer a systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2229 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor a can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the ImageInspector controller and beyond through various interfaces. Should processing requirements dictate a greater amount speed and/or capacity, distributed processors (e.g., Distributed ImageInspector), mainframe, multi-core, parallel, and/or super-computer architectures may similarly be employed. Alternatively, should deployment requirements dictate greater portability, smaller Personal Digital Assistants (PDAs) may be employed.

Depending on the particular implementation, features of the ImageInspector may be achieved by implementing a microcontroller such as CAST's R8051XC2 microcontroller; Intel's MCS 51 (i.e., 8051 microcontroller); and/or the like. Also, to implement certain features of the ImageInspector, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the ImageInspector component collection (distributed or otherwise) and/or features may be implemented via the microprocessor and/or via embedded components; e.g., via ASIC, coprocessor, DSP, FPGA, and/or the like. Alternately, some implementations of the ImageInspector may be implemented with embedded components that are configured and used to achieve a variety of features or signal processing.

Depending on the particular implementation, the embedded components may include software solutions, hardware solutions, and/or some combination of both hardware/software solutions. For example, ImageInspector features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the ImageInspector features. A hierarchy of programmable interconnects allow logic blocks to be interconnected as needed by the ImageInspector system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the ImageInspector may be developed on regular FPGAs and then migrated into a fixed version that more resembles ASIC implementations. Alternate or coordinating implementations may migrate ImageInspector controller features to a final ASIC instead of or in addition to FPGAs. Depending on the implementation all of the aforementioned embedded components and microprocessors may be considered the "CPU" and/or "processor" for the ImageInspector.

Power Source

The power source 2286 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2286 is connected to at least one of the interconnected subsequent components of the ImageInspector thereby providing an electric current to all subsequent components. In one example, the power source 2286 is connected to the system bus component 2204. In an alternative embodiment, an outside power source 2286 is provided through a connection across the I/O 2208 interface. For example, a USB and/or IEEE 1394 connection carries both data and power across the connection and is therefore a suitable source of power.

Interface Adapters

Interface bus(ses) 2207 may accept, connect, and/or communicate to a number of interface adapters, conventionally although not necessarily in the form of adapter cards, such as but not limited to: input output interfaces (I/O) 2208, storage interfaces 2209, network interfaces 2210, and/or the like. Optionally, cryptographic processor interfaces 2227 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, a such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2209 may accept, communicate, and/or connect to a number of storage devices such as, but not limited to: storage devices 2214, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2210 may accept, communicate, and/or connect to a communications network 2213. Through a communications network 2213, the ImageInspector controller is accessible through remote clients 2233b (e.g., computers with web browsers) by users 2233a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed ImageInspector), architectures may similarly be employed to pool, load balance, and/or otherwise increase the communicative bandwidth required by the ImageInspector controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2210 may be used to engage with various communications network types 2213. For example, multiple network interfaces may be employed to allow for the communication over broadcast, multicast, and/or unicast networks.

Input Output interfaces (I/O) 2208 may accept, communicate, and/or connect to user input devices 2211, peripheral devices 2212, cryptographic processor devices 2228, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video a signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2211 often are a type of peripheral device 512 (see is below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2212 may be connected and/or communicate to I/O and/or other facilities of the like such as network interfaces, storage interfaces, directly to the interface bus, system bus, the CPU, and/or the like. Peripheral devices may be external, internal and/or part of the ImageInspector controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., a cameras).

It should be noted that although user input devices and peripheral devices may be employed, the ImageInspector controller may be embodied as an embedded, dedicated, and/or monitor-less (i.e., headless) device, wherein access would be provided over a network interface connection.

Cryptographic units such as, but not limited to, microcontrollers, processors 2226, interfaces 2227, and/or devices 2228 may be attached, and/or communicate with the ImageInspector controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2229. However, memory is a fungible technology and resource, thus, any number of memory embodiments may be employed in lieu of or in concert with one another. It is to be understood that the ImageInspector controller and/or a computer systemization may employ various forms of memory 2229. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2229 will include ROM 2206, RAM 2205, 17 and a storage device 2214. A storage device 2214 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

Component Collection

The memory 2229 may contain a collection of program and/or database components and/or data such as, but not limited to: operating system component(s) 2215 (operating system); information server component(s) 2216 (information server); user interface component(s) 2217 (user interface); Web browser component(s) 2218 (Web browser); database(s) 2219; mail server component(s) 2221; mail client component(s) 2222; cryptographic server component(s) 2220 (cryptographic server); the ImageInspector component(s) 2235; and/or the like (i.e., collectively a component collection). These components may be stored and accessed from the storage devices and/or from storage devices accessible through an interface bus. Although non-conventional program components such as those in the component collection, typically, are stored in a local storage device 2214, they may also be loaded and/or stored in memory such as: peripheral devices, RAM, remote storage facilities through a communications network, ROM, various forms of memory, and/or the like.

Operating System

The operating system component 2215 is an executable program component facilitating the operation of the ImageInspector controller. Typically, the operating system facilitates access of I/O, network interfaces, peripheral devices, storage devices, and/or the like. The operating system may be a highly fault tolerant, scalable, and secure system such as: Apple Macintosh OS X (Server); AT&T Plan 9; Be OS; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/NT/Vista/XP (Server), Palm OS, and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the ImageInspector controller to communicate with other entities through a is communications network 2213. Various communication protocols may be used by the ImageInspector controller as a subcarrier transport mechanism for interaction, such as, but not limited to: multicast, TCP/IP, UDP, unicast, and/or the like.

Information Server

An information server component 2216 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective−) C (++), C# and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging a protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or is the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the ImageInspector controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the ImageInspector database 2219, operating systems, other program components, user interfaces, Web browsers, and/or the like.

Access to the ImageInspector database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the ImageInspector. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the ImageInspector as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XP/Vista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2217 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component a collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2218 is a stored program component that is is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the ImageInspector enabled nodes. The combined application may be nugatory on systems employing standard Web browsers.

Mail Server

A mail server component 2221 is a stored program component that is executed by a CPU 2203. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C# and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the ImageInspector.

Access to the ImageInspector mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2222 is a stored program component that is executed by a CPU 2203. The mail client may be a conventional mail viewing a application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2220 is a stored program component that is executed by a CPU 2203, cryptographic processor 2226, cryptographic processor interface 2227, cryptographic processor device 2228, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, a public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the ImageInspector may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the ImageInspector component to engage in secure transactions if so desired. The cryptographic component facilitates the secure accessing of resources on the ImageInspector and facilitates the access of secured resources on remote systems; i.e., it may act as a client and/or server of secured resources. Most frequently, the cryptographic component communicates with information servers, operating systems, a other program components, and/or the like. The cryptographic component may contain, communicate, generate, obtain, and/or provide program component, system, user, and/or data communications, requests, and/or responses.

The ImageInspector Database

The ImageInspector database component 2219 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the ImageInspector database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections a by some common attributes. Object-oriented databases perform similarly to relational databases with the exception that objects are not just pieces of data but may have other types of capabilities encapsulated within a given object. If the ImageInspector database is implemented as a data-structure, the use of the ImageInspector database 2219 may be integrated into another component such as the ImageInspector component 2235. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the database component 2219 includes several tables 2219*a-f*. A users table 2219*a* includes fields such as, but not limited to: a user_ID, user_name, user_password, user_bank_ID, account_ID, transaction_ID, user_accountNo, user_transaction, user_hardware, and/or the like. The user table may support and/or track multiple entity accounts on a ImageInspector. A hardware table 2219*b* includes fields such as, but not limited to: hardware_ID, hardware_type, hardware_name, data_formatting_requirements, bank_ID, protocols, addressing_info, usage_history, hardware_requirements, user_ID, and/or the like. A transaction table 2219C includes fields such as, but not limited to trans-action_ID, transaction_time, transaction_account, transaction_payee, transaction_bank, transaction_payer, transaction_status, transaction_clearance, and/or the like. A check table 2219*d* includes fields such as check_ID, account_ID, transaction_ID, image_timestamp, image_MICR, image_status, image_user, image_device, image_account and/or the like. An accounts table 2219*e* includes fields such as, but not limited to account_ID, user_ID, bank_ID, account_number, routing_number, account_type, account_amount, account_limit, and/or the like. An Image Quality Thresholds table 2219*f* includes fields such as threshold_MICR, threshold_CAR, threshold_contrast, threshold_condition, and/or the like.

In one embodiment, the ImageInspector database may interact with other database systems. For example, employing a distributed database system, queries and data access by search ImageInspector component may treat the combination of the ImageInspector database, an integrated data security layer database as a single database entity.

In one embodiment, user programs may contain various user interface primitives, which may serve to update the ImageInspector. Also, various accounts may require custom database tables depending upon the environments and the types of clients the ImageInspector may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2219*a-f*. The ImageInspector may be configured to keep track of various settings, inputs, and parameters via database controllers.

The ImageInspector database may communicate to and/or with other components in a component collection, including itself, and/or facilities of the like. Most frequently, the ImageInspector database communicates with the ImageInspector component, other program components, and/or the like. The database may contain, retain, and provide information regarding other nodes and data.

The ImageInspectors

The ImageInspector component 2235 is a stored program component that is executed by a CPU. In one embodiment, the ImageInspector component incorporates any and/or all combinations of the aspects of the ImageInspector that was discussed in the previous figures. As such, the ImageInspector affects accessing, obtaining and the provision of information, services, transactions, and/or the like across various communications networks.

The ImageInspector transforms uploaded check images and check deposit information inputs via ImageInspector components image upload component 2241, image analysis component 2242 (example embodiments of which may be found in FIGS. 15A-16D), MICR extraction component 2244 (example embodiments of which may be found at 718 in FIGS. 7A-7C), TIFF generation component 2245, CAR Extraction component 2246 (example embodiments of which may be found at 722 in FIGS. 7A-7C), cash letter generation component 2248 (example embodiments of which may be found at 725 in FIGS. 7A-7C), soft post component 2243, endorsement detection component 2247 (example embodiments of which may be found at 715 in FIGS. 7A-7C and FIGS. 17A-17C), representment detection component 2249 (example embodiments of which may be found in FIGS. 17A-18C), multiple check cropping component 2250 (example embodiments of which may be found in FIGS. 2A-3F), smart check cropping component 2251 (example embodiments of which may be found in FIGS. 4A-4D), and/or image inspection component 2252 (example embodiments of which may be found in FIGS. 5A-5D) into deposit confirmation outputs. Alternative embodiments of the ImageInspector components are discussed in FIGS. 7A-7C.

The ImageInspector component enabling access of information between nodes may be developed by employing standard development tools and languages such as, but not limited to: Apache components, Assembly, ActiveX, binary executables, (ANSI) (Objective–) C (++), C# and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the ImageInspector server employs a cryptographic server to encrypt and decrypt communications. The ImageInspector component may communicate to and/or with other components in a component collection, including itself, and/or facilities of the like. Most frequently, the ImageInspector component communicates with the ImageInspector database, operating systems, other program components, and/or the like. The ImageInspector may contain, communicate, generate, obtain, and/or provide program component, system, user, and/or data communications, requests, and/or responses.

Distributed ImageInspectors

The structure and/or operation of any of the ImageInspector node a controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the ImageInspector controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from a the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the ImageInspector controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
   $input=" ";
   $input=socket_read($client, 1024);
   $data.=$input;
}while($input !=" ");
// parse data to extract variables
$obj=json_decode($data, true);
// store input data in a database
mysql_connect("201.408.185.132",$DBserver,$password);
// access database server
mysql_select("CLIENT_DB.SQL"); // select database to append
mysql_query("INSERT INTO UserTable (transmission) VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:
http://www.xav.com/perl/site/lib/SOAP/Parser.html
http://publib.boulder.ibm.com/infocenter/tivihelp/v2rl/index.jsp?topic=/com.ibm.IBMDI. doc/referenceguide295.htm
and other parser implementations:
http://publib.boulder.ibm.com/infocenter/tivihelp/v2rl/index.jsp?topic=/com.ibm.IBMDI. doc/referenceguide259.htm
all of which are hereby expressly incorporated by reference.

Additional embodiments of the ImageInspector may comprise the following:

1. A processor-implemented financial instrument deposit method, comprising:
receiving a request to remotely deposit a plurality of financial instrument from a depositor via a user interface;
obtaining an image comprising a plurality of images of a plurality of negotiable instruments;
dividing the obtained image into a plurality of sub-images, each sub-image comprising an image of a negotiable instrument;
processing each of the plurality of the sub-images by removing background portions from each of the plurality of the sub-images;
obtaining a plurality of deposit amounts for the plurality of negotiable instruments;
associating each obtained deposit amount with each processed sub-image; and
transmitting each processed sub-image associated with the obtained deposit amount to a remote deposit server.

2. The method of claim 1, further comprising:
receiving a remote deposit processing component for instantiation on the depositor device.

3. The method of claim 1, further comprising:
obtaining depositor identification information from the remote deposit processing component.

4. The method of claim 1, further comprising:
capturing an image of a plurality of negotiable instruments via an image capture component communicatively coupled to a depositor owned device.

5. The method of claim 4, wherein the depositor owned device comprises one of a personal computer, a smart phone, a facsimile machine.

6. The method of claim 4, wherein the image capture component comprises one of a general purpose scanner, a camera and a video camera.

7. The method of claim 1, further comprising:
dividing the obtained image evenly into a plurality of sub-images.

9. The method of claim 1, further comprising:
converting the obtained image into a grayscale image; and generating a grayscale pixel value map of the obtained image.

10. The method of claim 9, further comprising:
dividing the obtained image based on the grayscale pixel value map, wherein portions with low grayscale values are background portions.

11. The method of claim 1, further comprising:
determining edges of a financial instrument image within each sub-image; and
cropping each sub-image to obtain the financial instrument image.

12. The method of claim 1, further comprising:
generating a remote deposit data structure including the processed sub-images and remote deposit metadata.

13. The method of claim 12, wherein the remote deposit metadata comprises at least one of:
a deposit amount;
a user name;
a deposit account number; and
a bank routing number.

14. The method of claim 1, further comprising instructing a depositor to align a plurality of financial instruments showing front sides of the financial instruments.

15. The method of claim 1, further comprising instructing a depositor to align a plurality of financial instruments showing back sides of the financial instruments.

16. The method of claim 1, further comprising
receiving an indication of disapproval of financial instrument images; and
providing instructions to a depositor to obtain new captures of the financial instrument images.

17. The method of claim 1, further comprising:
prompting a depositor to select an edge of a financial instrument image via a user interface.

18. The method of claim 17, wherein the depositor is requested to select a lower left corner and a upper right corner of a rectangular financial instrument image.

19. The method of claim 1, further comprising:
down sampling the obtained image to generate a scaled image;
generating an enhanced bitonal virtual image out of the scaled image;
detecting locations of a plurality of financial instruments on the bitonal virtual image;
dividing the bitonal virtual image into lanes based on the location of the plurality of financial instruments;

determining locations of edges of a financial instrument on each lane;

projecting the locations of financial instrument edges on the virtual image to the unscaled obtained image; and cropping the obtained image based on the projected locations of financial a instrument edges.

20. The method of claim 19, wherein the down sampling generates the scaled image at a size of a quarter of a size of the obtained image.

21. The method of claim 19, wherein generating a bitonal virtual image further comprises:

converting the scaled image into a grayscale image;

generating a histogram of the grayscale image;

calculating an average pixel value of the grayscale image; and setting the average pixel value as a threshold for bitonalization.

22. The method of claim 21, further comprising:

applying a media filter to remove noise and dust on the scaled image; and applying a Gaussian Blur filter to remove inconspicuous noise.

23. The method of claim 21, further comprising:

dilating dark pixels on the scaled image; and inverting the dilated image.

24. The method of claim 23, further comprising:

removing left-over details on the inverted image by applying a media filter with a plus mask.

25. The method of claim 19, wherein the enhanced bitonal virtual image comprises a light foreground indicating financial instrument portions and a dark background.

26. The method of claim 19, wherein detecting locations of a plurality of financial instruments on the bitonal virtual image further comprises:

dividing the bitonal virtual image into a plurality of consecutive rows;

scanning downward from a top row to a bottom of the virtual image;

for each row, determining whether the row is on a boundary of a light foreground and a dark background; and record location of the row when it is on the boundary of a light foreground and a dark background;

27. The method of claim 26, wherein the row has a width of 6 pixels.

28. The method of claim 26, wherein the row has a width of 3% of a total height of the virtual image.

29. The method of claim 26, wherein the determining whether the row is on a boundary of a light foreground and a dark background further comprises:

calculating an average pixel value of the row;

compare the average pixel value with a threshold;

designating the row as a financial instrument boundary when the average pixel value is greater than the threshold.

30. The method of claim 29, wherein the threshold is obtained from past image processing heuristics.

31. The method of claim 19, further comprising:

comparing the number of detected financial instruments on the bitonal virtual image with a user indicated number.

32. The method of claim 31, further comprising:

sending an error message when the number of detected financial instruments on the bitonal virtual image does not match the user indicated number.

33. The method of claim 31, further comprising:

determining an overlapped financial instrument portion o the bitonal virtual a image by comparing the detected financial instrument with a stored financial instrument dimension; and dividing the overlapped financial instrument portion based on heuristics.

34. The method of claim 19, wherein determining locations of edges of a financial instrument on each lane further comprises:

dividing each lane into a plurality of rows and columns;

determining a middle point of the lane;

scanning rows upwards and downwards from the middle point to locate a top edge of the financial instrument and a bottom edge of the financial instrument; and scanning columns leftwards and rightwards from the middle point to locate a left edge of the financial instrument and a right edge of the financial instrument.

35. The method of claim 34, further comprising:

calculating an average pixel value of a scanned row;

compare the average pixel value with a threshold; and designating the row as a financial instrument edge when the average pixel value is greater than the threshold.

36. The method of claim 35, further comprising:

calculating four corners based on the intersections of the detected top edge, bottom edge, left edge and right edge;

projecting the four corners on the virtual image to the original obtained image; and generating a rectangular box based on the projected four corners on the obtained image for cropping.

37. A financial instrument deposit processor-readable medium storing a plurality of processing instructions, comprising issuable instructions by a processor to:

receive a request to remotely deposit a plurality of financial instrument from a depositor via a user interface;

obtain an image comprising a plurality of images of a plurality of negotiable instruments;

divide the obtained image into a plurality of sub-images, each sub-image comprising an image of a negotiable instrument;

process each of the plurality of the sub-images by removing background portions from each of the plurality of the sub-images;

obtain a plurality of deposit amounts for the plurality of negotiable instruments;

associate each obtained deposit amount with each processed sub-image; and transmit each processed sub-image associated with the obtained deposit amount to a remote deposit server.

38. The processor-readable medium of claim 37, further comprising issuable instructions by a processor to:

receive a remote deposit processing component for instantiation on the depositor device.

39. The processor-readable medium of claim 37, further comprising issuable instructions by a processor to:

obtain depositor identification information from the remote deposit processing component.

40. The processor-readable medium of claim 37, further comprising issuable instructions by a processor to:

capture an image of a plurality of negotiable instruments via an image capture a component communicatively coupled to a depositor owned device.

41. The processor-readable medium of claim 40, wherein the depositor owned device comprises one of a personal computer, a smart phone, a facsimile machine.

42. The processor-readable medium of claim 40, wherein the image capture component comprises one of a general purpose scanner, a camera and a video camera.

43. The processor-readable medium of claim 37, further comprising issuable instructions by a processor to:

divide the obtained image evenly into a plurality of sub-images.

44. The processor-readable medium of claim 37, further comprising issuable instructions by a processor to:
converting the obtained image into a grayscale image; and
generating a grayscale pixel value map of the obtained image.

45. The processor-readable medium of claim 44, further comprising issuable instructions by a processor to:
divide the obtained image based on the grayscale pixel value map, wherein portions with low grayscale values are background portions.

46. The processor-readable medium of claim 37, further comprising issuable instructions by a processor to:
determine edges of a financial instrument image within each sub-image; and
crop each sub-image to obtain the financial instrument image.

47. The processor-readable medium of claim 37, further comprising issuable instructions by a processor to:
generate a remote deposit data structure including the processed sub-images and remote deposit metadata.

48. The processor-readable medium of claim 47, wherein the remote deposit metadata comprises at least one of:
a deposit amount;
a user name;
a deposit account number; and
a bank routing number.

49. The processor-readable medium of claim 37, further comprising issuable instructions by a processor to instruct a depositor to align a plurality of financial instruments showing front sides of the financial instruments.

50. The processor-readable medium of claim 37, further comprising issuable instructions by a processor to instruct a depositor to align a plurality of financial instruments showing back sides of the financial instruments.

51. The processor-readable medium of claim 37, further comprising issuable instructions by a processor to:
receive an indication of disapproval of financial instrument images; and
provide instructions to a depositor to obtain new captures of the financial instrument images.

52. The processor-readable medium of claim 37, further comprising issuable instructions by a processor to:
prompt a depositor to select an edge of a financial instrument image via a user interface.

53. The processor-readable medium of claim 52, wherein the depositor is requested to select a lower left corner and a upper right corner of a rectangular financial instrument image.

54. The processor-readable medium of claim 37, further comprising issuable instructions by a processor to:
down sample the obtained image to generate a scaled image;
generate an enhanced bitonal virtual image out of the scaled image;
detect locations of a plurality of financial instruments on the bitonal virtual image;
divide the bitonal virtual image into lanes based on the location of the plurality of financial instruments;
determine locations of edges of a financial instrument on each lane;
project the locations of financial instrument edges on the virtual image to the unscaled obtained image; and
crop the obtained image based on the projected locations of financial instrument edges.

55. The processor-readable medium of claim 54, wherein the down sampling generates the scaled image at a size of a quarter of a size of the obtained image.

56. The processor-readable medium of claim 54, wherein generating a bitonal virtual image further comprises:
converting the scaled image into a grayscale image;
generating a histogram of the grayscale image;
calculating an average pixel value of the grayscale image; and
setting the average pixel value as a threshold for bitonalization.

57. The processor-readable medium of claim 56, further comprising issuable instructions by a processor to:
apply a media filter to remove noise and dust on the scaled image; and
apply a Gaussian Blur filter to remove inconspicuous noise.

58. The processor-readable medium of claim 56, further comprising issuable instructions by a processor to:
dilate dark pixels on the scaled image; and
invert the dilated image.

59. The processor-readable medium of claim 58, further comprising issuable instructions by a processor to:
remove left-over details on the inverted image by applying a media filter with a plus mask.

60. The processor-readable medium of claim 56, wherein the enhanced bitonal virtual image comprises a light foreground indicating financial instrument portions and a dark background.

61. The processor-readable medium of claim 56, wherein detecting locations of a plurality of financial instruments on the bitonal virtual image further comprises:
dividing the bitonal virtual image into a plurality of consecutive rows;
scanning downward from a top row to a bottom of the virtual image;
for each row, determining whether the row is on a boundary of a light foreground and a dark background; and
record location of the row when it is on the boundary of a light foreground and a dark background;

62. The processor-readable medium of claim 61, wherein the row has a width of 6 pixels.

63. The processor-readable medium of claim 61, wherein the row has a width of 3% of a total height of the virtual image.

64. The processor-readable medium of claim 61, wherein the determining whether the row is on a boundary of a light foreground and a dark background further comprises:
calculating an average pixel value of the row;
compare the average pixel value with a threshold;
designating the row as a financial instrument boundary when the average pixel value is greater than the threshold.

65. The processor-readable medium of claim 64, wherein the threshold is obtained from past image processing heuristics.

66. The processor-readable medium of claim 56, further comprising issuable instructions by a processor to:
compare the number of detected financial instruments on the bitonal virtual image with a user indicated number.

67. The processor-readable medium of claim 66, further comprising issuable instructions by a processor to:
send an error message when the number of detected financial instruments on the bitonal virtual image does not match the user indicated number.

68. The processor-readable medium of claim 67, further comprising issuable instructions by a processor to:
determine an overlapped financial instrument portion o the bitonal virtual image by comparing the detected financial instrument with a stored financial instrument dimension; and
divide the overlapped financial instrument portion based on heuristics.

69. The processor-readable medium of claim 56, wherein determining locations a of edges of a financial instrument on each lane further comprises:
dividing each lane into a plurality of rows and columns;
determining a middle point of the lane;
scanning rows upwards and downwards from the middle point to locate a top edge of the financial instrument and a bottom edge of the financial instrument; and
scanning columns leftwards and rightwards from the middle point to locate a left edge of the financial instrument and a right edge of the financial instrument.

70. The processor-readable medium of claim 69, further comprising issuable instructions by a processor to:
calculate an average pixel value of a scanned row;
compare the average pixel value with a threshold; and
designate the row as a financial instrument edge when the average pixel value is greater than the threshold.

71. The processor-readable medium of claim 70, further comprising issuable instructions by a processor to:
calculate four corners based on the intersections of the detected top edge, bottom edge, left edge and right edge;
project the four corners on the virtual image to the original obtained image; and
generate a rectangular box based on the projected four corners on the obtained image for cropping.

72. A financial instrument deposit apparatus, comprising:
a memory;
a processor disposed in communication with said memory, and configured to issue a plurality of processing instructions stored in the memory, wherein the processor issues instructions to:
receive a request to remotely deposit a plurality of financial instrument from a depositor via a user interface;
obtain an image comprising a plurality of images of a plurality of negotiable instruments;
divide the obtained image into a plurality of sub-images, each sub-image comprising an image of a negotiable instrument;
process each of the plurality of the sub-images by removing background portions from each of the plurality of the sub-images;
obtain a plurality of deposit amounts for the plurality of negotiable instruments;
associate each obtained deposit amount with each processed sub-image; and
transmit each processed sub-image associated with the obtained deposit amount to a remote deposit server.

73. The apparatus of claim 72, wherein the processor further issues instructions to:
receive a remote deposit processing component for instantiation on the depositor device.

74. The apparatus of claim 72, wherein the processor further issues instructions to:
obtain depositor identification information from the remote deposit processing component.

75. The apparatus of claim 72, wherein the processor further issues instructions to:
capture an image of a plurality of negotiable instruments via an image capture a component communicatively coupled to a depositor owned device.

76. The apparatus of claim 75, wherein the depositor owned device comprises one of a personal computer, a smart phone, a facsimile machine.

77. The apparatus of claim 75, wherein the image capture component comprises one of a general purpose scanner, a camera and a video camera.

78. The apparatus of claim 72, wherein the processor further issues instructions to:
divide the obtained image evenly into a plurality of sub-images.

79. The apparatus of claim 72, wherein the processor further issues instructions to:
converting the obtained image into a grayscale image; and
generating a grayscale pixel value map of the obtained image.

80. The apparatus of claim 79, wherein the processor further issues instructions to:
divide the obtained image based on the grayscale pixel value map, wherein portions with low grayscale values are background portions.

81. The apparatus of claim 72, wherein the processor further issues instructions to:
determine edges of a financial instrument image within each sub-image; and
crop each sub-image to obtain the financial instrument image.

82. The apparatus of claim 72, wherein the processor further issues instructions to:
generate a remote deposit data structure including the processed sub-images and remote deposit metadata.

83. The apparatus of claim 82, wherein the remote deposit metadata comprises at least one of:
a deposit amount;
a user name;
a deposit account number; and
a bank routing number.

84. The apparatus of claim 72, wherein the processor further issues instructions to: instruct a depositor to align a plurality of financial instruments showing front sides of the financial instruments.

85. The apparatus of claim 72, wherein the processor further issues instructions to: instruct a depositor to align a plurality of financial instruments showing back sides of the financial instruments.

86. The apparatus of claim 72, wherein the processor further issues instructions to:
receive an indication of disapproval of financial instrument images; and
provide instructions to a depositor to obtain new captures of the financial instrument images.

87. The apparatus of claim 72, wherein the processor further issues instructions to:
prompt a depositor to select an edge of a financial instrument image via a user interface.

88. The apparatus of claim 87, wherein the depositor is requested to select a lower left corner and a upper right corner of a rectangular financial instrument image.

89. The apparatus of claim 72, wherein the processor further issues instructions a to:
down sample the obtained image to generate a scaled image;
generate an enhanced bitonal virtual image out of the scaled image; detect locations of a plurality of financial instruments on the bitonal virtual image;
divide the bitonal virtual image into lanes based on the location of the plurality of financial instruments;
determine locations of edges of a financial instrument on each lane;
project the locations of financial instrument edges on the virtual image to the unscaled obtained image; and
crop the obtained image based on the projected locations of financial instrument edges.

90. The apparatus of claim 89, wherein the down sampling generates the scaled image at a size of a quarter of a size of the obtained image.

91. The processor-readable medium of claim 89, wherein generating a bitonal virtual image further comprises:
converting the scaled image into a grayscale image;
generating a histogram of the grayscale image;
calculating an average pixel value of the grayscale image; and
setting the average pixel value as a threshold for bitonalization.

92. The apparatus of claim 91, wherein the processor further issues instructions to:
apply a media filter to remove noise and dust on the scaled image; and
apply a Gaussian Blur filter to remove inconspicuous noise.

93. The apparatus of claim 92, wherein the processor further issues instructions to:
dilate dark pixels on the scaled image; and
invert the dilated image.

94. The apparatus of claim 93, wherein the processor further issues instructions to:
remove left-over details on the inverted image by applying a media filter with a plus mask.

95. The apparatus of claim 91, wherein the enhanced bitonal virtual image comprises a light foreground indicating financial instrument portions and a dark background.

96. The apparatus of claim 91, wherein detecting locations of a plurality of financial instruments on the bitonal virtual image further comprises:
dividing the bitonal virtual image into a plurality of consecutive rows;
scanning downward from a top row to a bottom of the virtual image;
for each row, determining whether the row is on a boundary of a light foreground and a dark background; and
record location of the row when it is on the boundary of a light foreground and a dark background;

97. The apparatus of claim 96, wherein the row has a width of 6 pixels.

98. The apparatus of claim 96, wherein the row has a width of 3% of a total height of the virtual image.

99. The apparatus of claim 96, wherein the determining whether the row is on a boundary of a light foreground and a dark background further comprises:
calculating an average pixel value of the row;
compare the average pixel value with a threshold;
designating the row as a financial instrument boundary when the average pixel value is greater than the threshold.

100. The apparatus of claim 99, wherein the threshold is obtained from past image processing heuristics.

101. The apparatus of claim 91, wherein the processor further issues instructions to:
compare the number of detected financial instruments on the bitonal virtual image with a user indicated number.

102. The apparatus of claim 101, wherein the processor further issues instructions to:
send an error message when the number of detected financial instruments on the bitonal virtual image does not match the user indicated number.

103. The apparatus of claim 102, wherein the processor further issues instructions to:
determine an overlapped financial instrument portion o the bitonal virtual image by comparing the detected financial instrument with a stored financial instrument dimension; and
divide the overlapped financial instrument portion based on heuristics.

104. The apparatus of claim 91, wherein determining locations of edges of a financial instrument on each lane further comprises:
dividing each lane into a plurality of rows and columns;
determining a middle point of the lane;
scanning rows upwards and downwards from the middle point to locate a top edge of the financial instrument and a bottom edge of the financial instrument; and scanning columns leftwards and rightwards from the middle point to locate a left edge of the financial instrument and a right edge of the financial instrument.

105. The apparatus of claim 105, wherein the processor further issues instructions to:
calculate an average pixel value of a scanned row;
compare the average pixel value with a threshold; and
designate the row as a financial instrument edge when the average pixel value is greater than the threshold.

106. The apparatus of claim 105, wherein the processor further issues instructions to:
calculate four corners based on the intersections of the detected top edge, bottom edge, left edge and right edge;
project the four corners on the virtual image to the original obtained image; and
generate a rectangular box based on the projected four corners on the obtained image for cropping.

107. A financial instrument image preparation system, comprising:
means to receive a request to remotely deposit a plurality of financial instrument from a depositor via a user interface;
means to obtain an image comprising a plurality of images of a plurality of negotiable instruments;
means to divide the obtained image into a plurality of sub-images, each sub-image comprising an image of a negotiable instrument;
means to process each of the plurality of the sub-images by removing background portions from each of the plurality of the sub-images;
means to obtain a plurality of deposit amounts for the plurality of negotiable instruments;
means to associate each obtained deposit amount with each processed sub-image; and
means to transmit each processed sub-image associated with the obtained deposit amount to a remote deposit server.

108. The system of claim 107, further comprising:
means to receive a remote deposit processing component for instantiation on the depositor device.

109. The system of claim 107, further comprising:
means to obtain depositor identification information from the remote deposit processing component.

110. The system of claim 107, further comprising:
means to capture an image of a plurality of negotiable instruments via an image capture component communicatively coupled to a depositor owned device.

111. The system of claim 110, wherein the depositor owned device comprises one of a personal computer, a smart phone, a facsimile machine.

112. The system of claim 110, wherein the image capture component comprises one of a general purpose scanner, a camera and a video camera.

113. The system of claim 110, further comprising:
means to divide the obtained image evenly into a plurality of sub-images.

114. The system of claim 107, further comprising:
means to convert the obtained image into a grayscale image; and means to generate a grayscale pixel value map of the obtained image.

115. The system of claim 114, further comprising:
means to divide the obtained image based on the grayscale pixel value map, wherein portions with low grayscale values are background portions.

116. The system of claim 114, further comprising:
means to determine edges of a financial instrument image within each sub-image; and
means to crop each sub-image to obtain the financial instrument image.

117. The system of claim 114, further comprising:
means to generate a remote deposit data structure including the processed sub-images and remote deposit metadata.

118. The system of claim 117, wherein the remote deposit metadata comprises at least one of:
a deposit amount;
a user name;
a deposit account number; and
a bank routing number.

119. The system of claim 107, further comprising:
means to instruct a depositor to align a plurality of financial instruments showing front sides of the financial instruments.

120. The system of claim 107, further comprising:
means to instruct a depositor to align a plurality of financial instruments showing back sides of the financial instruments.

121. The system of claim 107, further comprising:
means to receive an indication of disapproval of financial instrument images; and
means to provide instructions to a depositor to obtain new captures of the financial instrument images.

122. The system of claim 107, further comprising:
means to prompt a depositor to select an edge of a financial instrument image via a user interface.

123. The system of claim 122, wherein the depositor is requested to select a lower left corner and a upper right corner of a rectangular financial instrument image.

124. The system of claim 107, further comprising:
means to down sample the obtained image to generate a scaled image;
means to generate an enhanced bitonal virtual image out of the scaled image;
means to detect locations of a plurality of financial instruments on the bitonal virtual image;
means to divide the bitonal virtual image into lanes based on the location of the plurality of financial instruments;
means to determine locations of edges of a financial instrument on each lane;
means to project the locations of financial instrument edges on the virtual image to the unscaled obtained image; and
means to crop the obtained image based on the projected locations of financial instrument edges.

125. The system of claim 124, wherein the down sampling generates the scaled image at a size of a quarter of a size of the obtained image.

126. The system of claim 125, wherein generating a bitonal virtual image further comprises:
converting the scaled image into a grayscale image;
generating a histogram of the grayscale image;
calculating an average pixel value of the grayscale image; and
setting the average pixel value as a threshold for bitonalization.

127. The system of claim 126, further comprising:
means to apply a media filter to remove noise and dust on the scaled image; and
means to apply a Gaussian Blur filter to remove inconspicuous noise.

128. The system of claim 126, further comprising:
means to dilate dark pixels on the scaled image; and
means to invert the dilated image.

129. The system of claim 126, further comprising:
means to remove left-over details on the inverted image by applying a media filter with a plus mask.

130. The system of claim 129, wherein the enhanced bitonal virtual image comprises a light foreground indicating financial instrument portions and a dark background.

131. The system of claim 124, wherein detecting locations of a plurality of financial instruments on the bitonal virtual image further comprises:
dividing the bitonal virtual image into a plurality of consecutive rows;
scanning downward from a top row to a bottom of the virtual image;
for each row, determining whether the row is on a boundary of a light foreground and a dark background; and
recording location of the row when it is on the boundary of a light foreground and a dark background;

132. The system of claim 131, wherein the row has a width of 6 pixels.

133. The system of claim 131, wherein the row has a width of 3% of a total height of the virtual image.

134. The system of claim 131, wherein the determining whether the row is on a boundary of a light foreground and a dark background further comprises:
calculating an average pixel value of the row;
compare the average pixel value with a threshold;
designating the row as a financial instrument boundary when the average pixel value is greater than the threshold.

135. The system of claim 134, wherein the threshold is obtained from past image processing heuristics.

136. The system of claim 134, further comprising:
means to compare the number of detected financial instruments on the bitonal virtual image with a user indicated number.

137. The system of claim 136, further comprising:
means to send an error message when the number of detected financial instruments on the bitonal virtual image does not match the user indicated number.

138. The system of claim 137, further comprising:
means to determine an overlapped financial instrument portion o the bitonal virtual image by comparing the detected financial instrument with a stored financial instrument dimension; and
means to divide the overlapped financial instrument portion based on heuristics.

139. The system of claim 124, wherein determining locations of edges of a financial instrument on each lane further comprises:
dividing each lane into a plurality of rows and columns;
determining a middle point of the lane;
scanning rows upwards and downwards from the middle point to locate a top edge of the financial instrument and a bottom edge of the financial instrument; and
scanning columns leftwards and rightwards from the middle point to locate a left edge of the financial instrument and a right edge of the financial instrument.

140. The system of claim 137, further comprising:
means to calculate an average pixel value of a scanned row;
means to compare the average pixel value with a threshold; and
means to designate the row as a financial instrument edge when the average pixel value is greater than the threshold.

141. The system of claim 140, further comprising:
  means to calculate four corners based on the intersections of the detected top edge, bottom edge, left edge and right edge;
  means to project the four corners on the virtual image to the original obtained image; and
  means to generate a rectangular box based on the projected four corners on the obtained image for cropping.

1. A processor-implemented financial instrument image assessment method, comprising:
  obtaining a financial instrument image from a depositor owned device communicatively coupled to an image capture component, the financial instrument image captured by the image capture component;
  generating an initial image quality score for the obtained financial instrument image;
  determining whether the generated initial image quality score passes an image quality threshold;
  proceeding to process the financial instrument image for deposit when the generated image quality score exceeds the image quality threshold; and
  providing a denial notice to the depositor owned device when the generated image quality score fails to meet the image quality threshold.

2. The method of claim 1, wherein the depositor owned device is any of a personal computer, a smart phone, and a cellular phone.

3. The method of claim 1, wherein the image capture component is any of a scanner, a digital camera, and a web camera.

4. The method of claim 1, wherein the image quality score is related to at least one of:
  image contrast level;
  MICR OCR readability;
  CAR OCR readability;
  endorsement detection;
  financial instrument dimension matching;
  histogram distribution;
  corner detection noise; and
  darkness and lightness balance.

5. The method of claim 1, further comprises:
  conducting a hierarchical analysis for image assessment.

6. The method of claim 5, wherein the hierarchical analysis comprises:
  performing an initial image quality check;
  determining whether the initial image quality check meets a first threshold; and
  proceeding with further image assessment if the first threshold is met.

7. The method of claim 6, wherein the initial image quality check is related to a contrast level of the obtained financial instrument image.

8. The method of claim 7, further comprising:
  determining a range of the contrast level of the obtained financial instrument image;
  determining a type of edge detection procedure based on the range of the contrast level.

9. The method of claim 8, further comprising:
  proceeding with a four-sided edge detection and cropping procedure if the contrast level is within a good range; and
  proceeding with an alternative edge detection and cropping procedure if the contrast level is within a medium acceptable range.

10. The method of claim 6, further comprising:
  providing an image denial notice to the depositor if the first threshold is not met.

11. The method of claim 1, wherein the image quality threshold is pre-determined by a system operator.

12. The method of claim 1, wherein the image quality threshold is dynamically obtained via statistical analysis.

13. The method of claim 12, wherein the image quality threshold is obtained via analyzing past image assessment data.

14. The method of claim 1, further comprising:
  analyzing image properties of the obtained financial instrument image; and
  determining a type of image source based on the properties of the obtained financial instrument image.

15. The method of claim 14, wherein the type of image source is one of a scanner, a camera, a cellular phone built-in camera, and a web camera.

16. The method of claim 14, further comprising:
  retrieving heuristics of previously processed image data of the type of image source.

17. The method of claim 14, further comprising:
  determining a hierarchical structure to assess the obtained financial instrument image based on the type of the image source.

18. The method of claim 17, further comprising:
  determining an image assessment threshold based on thresholds of previously processed images based on the type of the image source.

19. The method of claim 8, further comprising:
  determining a second threshold conditioned on the range of the contrast level of the obtained financial instrument image.

20. The method of claim 19, wherein the conditional second threshold is related to MICR readability.

21. The method of claim 19, wherein the conditional second threshold related to MICR Readability is 70% when the contrast level is within a good range.

22. The method of claim 19, wherein the conditional second threshold related to MICR Readability is 80% when the contrast level is within a medium range.

23. A financial instrument image assessment processor-readable medium storing a plurality of processing instructions, comprising issuable instructions by a processor to:
  obtain a financial instrument image from a depositor owned device communicatively coupled to an image capture component, the financial instrument image captured by the image capture component;
  generate an image quality score for the obtained financial instrument image;
  determine whether the generated image quality score passes an image quality threshold;
  proceed to process the financial instrument image for deposit when the generated image quality score exceeds the image quality threshold; and provide a denial notice to the depositor owned device when the generated image quality score fails to meet the image quality threshold.

24. The processor-readable medium of claim 23, wherein the depositor owned device is any of a personal computer, a smart phone, and a cellular phone.

25. The processor-readable medium of claim 23, wherein the image capture component is any of a scanner, a digital camera, and a web camera.

26. The processor-readable medium of claim 23, wherein the image quality score is related to at least one of:
  image contrast level;
  MICR OCR readability;
  CAR OCR readability;
  endorsement detection;
  financial instrument dimension matching;
  histogram distribution;
  corner detection noise; and
  darkness and lightness balance.

27. The processor-readable medium of claim 23, further comprises: conducting a hierarchical analysis for image assessment.

28. The processor-readable medium of claim 23, wherein the hierarchical analysis comprises:
performing an initial image quality check;
determining whether the initial image quality check meets a first threshold; and
proceeding with further image assessment if the first threshold is met.

29. The processor-readable medium of claim 28, wherein the initial image quality check is related to a contrast level of the obtained financial instrument image.

30. The processor-readable medium of claim 29, further comprising instructions to:
determine a range of the contrast level of the obtained financial instrument image;
determine a type of edge detection procedure based on the range of the contrast level.

31. The processor-readable medium of claim 29, further comprising instructions issuable by the processor to:
proceed with a four-sided edge detection and cropping procedure if the contrast level is within a good range; and
proceed with an alternative edge detection and cropping procedure if the contrast level is within a medium acceptable range.

32. The processor-readable medium of claim 31, further comprising instructions issuable by the processor to: provide an image denial notice to the depositor if the first a threshold is not met.

33. The processor-readable medium of claim 23, wherein the image quality threshold is pre-determined by a system operator.

34. The processor-readable medium of claim 23, wherein the image quality threshold is dynamically obtained via statistical analysis.

35. The processor-readable medium of claim 23, wherein the image quality threshold is obtained via analyzing past image assessment data.

36. The processor-readable medium of claim 23, further comprising instructions issuable by the processor to:
analyze image properties of the obtained financial instrument image; and
determine a type of image source based on the properties of the obtained financial instrument image.

37. The processor-readable medium of claim 36, wherein the type of image source is one of a scanner, a camera, a cellular phone built-in camera, and a web camera.

38. The processor-readable medium of claim 37, further comprising instructions issuable by the processor to:
retrieve heuristics of previously processed image data of the type of image source.

39. The processor-readable medium of claim 38, further comprising instructions issuable by the processor to:
determine a hierarchical structure to assess the obtained financial instrument image based on the type of the image source.

40. The processor-readable medium of claim 39, further comprising instructions issuable by the processor to:
determine an image assessment threshold based on thresholds of previously processed images based on the type of the image source.

41. The processor-readable medium of claim 39, further comprising instructions issuable by the processor to:
determine a second threshold conditioned on the range of the contrast level of the obtained financial instrument image.

42. The processor-readable medium of claim 41, wherein the conditional second threshold is related to MICR readability.

43. The processor-readable medium of claim 41, wherein the conditional second threshold related to MICR Readability is 70% when the contrast level is within a good range.

44. The processor-readable medium of claim 41, wherein the conditional second threshold related to MICR Readability is 80% when the contrast level is within a medium range.

45. A financial instrument image assessment apparatus, comprising:
a memory;
a processor disposed in communication with said memory, and configured to issue a plurality of processing instructions stored in the memory, wherein the processor issues instructions to:
obtain a financial instrument image from a depositor owned device communicatively coupled to an image capture component, the financial instrument image captured by the image capture component;
generate an image quality score for the obtained financial instrument image;
determine whether the generated image quality score passes an image quality threshold;
a proceed to process the financial instrument image for deposit when the generated image quality score exceeds the image quality threshold; and
provide a denial notice to the depositor owned device when the generated image quality score fails to meet the image quality threshold.

46. The apparatus of claim 45, wherein the depositor owned device is any of a personal computer, a smart phone, and a cellular phone.

47. The apparatus of claim 45, wherein the image capture component is any of a scanner, a digital camera, and a web camera.

48. The apparatus of claim 45, wherein the image quality score is related to at least one of:
image contrast level;
MICR OCR readability;
CAR OCR readability;
endorsement detection;
financial instrument dimension matching;
histogram distribution;
corner detection noise; and
darkness and lightness balance.

49. The apparatus of claim 45, wherein the processor further issues instructions to:
conduct a hierarchical analysis for image assessment.

50. The apparatus of claim 49, wherein the hierarchical analysis comprises:
performing an initial image quality check;
determining whether the initial image quality check meets a first threshold; and
proceeding with further image assessment if the first threshold is met.

51. The apparatus of claim 50, wherein the initial image quality check is related to a contrast level of the obtained financial instrument image.

52. The apparatus of claim 51, wherein the processor further issues instructions to
determine a range of the contrast level of the obtained financial instrument image;
determine a type of edge detection procedure based on the range of the contrast level.

53. The apparatus of claim 52, wherein the processor further issues instructions to proceed with a four-sided edge detection and cropping procedure if the contrast level is within a good range; and proceed with an alternative edge detection and cropping procedure if the contrast level is within a medium acceptable range.

54. The apparatus of claim 53, wherein the processor further issues instructions to provide an image denial notice to the depositor if the first threshold is not met.

55. The apparatus of claim 54, wherein the image quality threshold is pre-determined by a system operator.

56. The apparatus of claim 54, wherein the image quality threshold is dynamically obtained via statistical analysis.

57. The apparatus of claim 45, wherein the image quality threshold is obtained via analyzing past image assessment data.

58. The apparatus of claim 45, further comprising instructions issuable by the processor to:

analyze image properties of the obtained financial instrument image; and determine a type of image source based on the properties of the obtained a financial instrument image.

59. The apparatus of claim 58, wherein the type of image source is one of a scanner, a camera, a cellular phone built-in camera, and a web camera.

60. The apparatus of claim 59, wherein the processor further issues instructions to retrieve heuristics of previously processed image data of the type of image source.

61. The apparatus of claim 60, wherein the processor further issues instructions to:

determine a hierarchical structure to assess the obtained financial instrument image based on the type of the image source.

62. The apparatus of claim 61, wherein the processor further issues instructions to:

determine an image assessment threshold based on thresholds of previously processed images based on the type of the image source.

63. The apparatus of claim 62, wherein the processor further issues instructions to:

determine a second threshold conditioned on the range of the contrast level of the obtained financial instrument image.

64. The apparatus of claim 63, wherein the conditional second threshold is related to MICR readability.

65. The apparatus of claim 63, wherein the conditional second threshold related to MICR Readability is 70% when the contrast level is within a good range.

66. The apparatus of claim 63, wherein the conditional second threshold related to MICR Readability is 80% when the contrast level is within a medium range.

67. A financial instrument image assessment system, comprising:

means to obtain a financial instrument image from a depositor owned device communicatively coupled to an image capture component, the financial instrument image captured by the image capture component;

means to generate an image quality score for the obtained financial instrument image;

means to determine whether the generated image quality score passes an image quality threshold;

means to proceed to process the financial instrument image for deposit when the generated image quality score exceeds the image quality threshold; and means to provide a denial notice to the depositor owned device when the generated image quality score fails to meet the image quality threshold.

68. The system of claim 67, wherein the depositor owned device is any of a personal computer, a smart phone, and a cellular phone.

69. The system of claim 67, wherein the image capture component is any of a scanner, a digital camera, and a web camera.

70. The system of claim 67, wherein the image quality score is related to at least one of:

image contrast level;

MICR OCR readability;

CAR OCR readability;

endorsement detection;

financial instrument dimension matching;

histogram distribution;

corner detection noise; and darkness and lightness balance.

71. The system of claim 67, wherein the processor further issues instructions to: conduct a hierarchical analysis for image assessment.

72. The system of claim 71, wherein the hierarchical analysis comprises:

performing an initial image quality check;

determining whether the initial image quality check meets a first threshold; and proceeding with further image assessment if the first threshold is met.

73. The system of claim 72, wherein the initial image quality check is related to a contrast level of the obtained financial instrument image.

74. The system of claim 73, further comprising:

means to determine a range of the contrast level of the obtained financial instrument image;

means to determine a type of edge detection procedure based on the range of the contrast level.

75. The system of claim 74, further comprising:

means to proceed with a four-sided edge detection and cropping procedure if the contrast level is within a good range; and means to proceed with an alternative edge detection and cropping procedure if the contrast level is within a medium acceptable range.

76. The system of claim 75, wherein the processor further issues instructions to provide an image denial notice to the depositor if the first threshold is not met.

77. The system of claim 76, wherein the image quality threshold is pre-determined by a system operator.

78. The system of claim 76, wherein the image quality threshold is dynamically obtained via statistical analysis.

79. The system of claim 76, wherein the image quality threshold is obtained via analyzing past image assessment data.

80. The system of claim 67, further comprising:

means to analyze image properties of the obtained financial instrument image; and means to determine a type of image source based on the properties of the obtained financial instrument image.

81. The system of claim 80, wherein the type of image source is one of a scanner, a camera, a cellular phone built-in camera, and a web camera.

82. The system of claim 81, further comprising:

means to retrieve heuristics of previously processed image data of the type of image source.

83. The system of claim 82, further comprising:

means to determine a hierarchical structure to assess the obtained financial instrument image based on the type of the image source.

84. The system of claim 83, further comprising:
means to determine an image assessment threshold based on thresholds of previously processed images based on the type of the image source.

85. The system of claim 74, further comprising: means to determine a second threshold conditioned on the range of the contrast level of the obtained financial instrument image.

86. The system of claim 85, wherein the conditional second threshold is related to MICR readability.

87. The system of claim 85, wherein the conditional second threshold related to MICR Readability is 70% when the contrast level is within a good range.

88. The system of claim 85, wherein the conditional second threshold related to MICR Readability is 80% when the contrast level is within a medium range.

89. The method of claim 8, wherein the good range of the contrast level is less than 0.03.

90. The method of claim 8, wherein the medium acceptable range of the contrast level is between 0.03 and 0.15.

91. The method of claim 8, wherein the good range of the contrast level is less than 0.02.

92. The method of claim 8, wherein the medium acceptable range of the contrast level is between 0.02 and 0.2.

93. The processor-readable medium of claim 31, wherein the good range of the contrast level is less than 0.03.

94. The processor-readable medium of claim 31, wherein the medium acceptable range of the contrast level is between 0.03 and 0.15.

95. The processor-readable medium of claim 31, wherein the good range of the contrast level is less than 0.02.

96. The processor-readable medium of claim 31, wherein the medium acceptable range of the contrast level is between 0.02 and 0.2.

97. The apparatus of claim 53, wherein the good range of the contrast level is less than 0.03.

98. The apparatus of claim 53, wherein the medium acceptable range of the contrast level is between 0.03 and 0.15.

99. The apparatus of claim 53, wherein the good range of the contrast level is less than 0.02.

100. The apparatus of claim 53, wherein the medium acceptable range of the contrast level is between 0.02 and 0.2.

101. The system of claim 74, wherein the good range of the contrast levels is less than 0.03.

102. The system of claim 74, wherein the medium acceptable range of the contrast level is between 0.03 and 0.15.

103. The system of claim 74, wherein the good range of the contrast level is less than 0.02.

104. The system of claim 74, wherein the medium acceptable range of the contrast level is between 0.02 and 0.2.

1. A processor-implemented financial instrument image preparation method, comprising:
instantiating a remote deposit processing image preparation component;
obtaining a financial instrument image comprising a financial instrument and a background;
determining via the remote deposit processing image preparation component, an edge between the financial instrument and the background on the financial instrument image as a cropping border;
removing the background on the financial instrument image by cropping the financial instrument image along the cropping border; and
processing the cropped financial instrument image for remote deposit.

2. The method of claim 1, wherein the financial instrument image is received at a remote server from a depositor owned device.

3. The method of claim 1, wherein the financial instrument image is obtained at a depositor owned device.

4. The method of claim 1, wherein the financial instrument image is captured by an image capture device.

5. The method of claim 4, wherein the depositor owned device comprises one of a personal computer, a smart phone, a facsimile machine.

6. The method of claim 4, wherein the image capture component comprises one of a general purpose scanner, a camera and a video camera.

7. The method of claim 1, further comprising:
converting the financial instrument image into a grayscale image.

8. The method of claim 1, further comprising:
down sampling the obtained image to generate a scaled image;
generating an enhanced bitonal virtual image out of the scaled image;
determining locations of edges of the financial instrument on the virtual image; and
projecting the locations of financial instrument edges on the virtual image to the unscaled obtained image; and
cropping the obtained image based on the projected locations of financial instrument edges.

9. The method of claim 8, wherein the down sampling generates the scaled image at a size of a quarter of a size of the obtained image.

10. The method of claim 8, wherein generating a bitonal virtual image further comprises:
converting the scaled image into a grayscale image;
generating a histogram of the grayscale image;
calculating an average pixel value of the grayscale image; and
setting the average pixel value as a threshold for bitonalization.

11. The method of claim 8, wherein generating a bitonal virtual image further comprises:
applying a media filter to remove noise and dust on the scaled image; and
applying a Gaussian Blur filter to remove inconspicuous noise.

12. The method of claim 11, further comprising:
dilating dark pixels on the scaled image; and
inverting the dilated image.

13. The method of claim 12, further comprising:
removing left-over details on the inverted image by applying a media filter with a plus mask.

14. The method of claim 8, wherein the enhanced bitonal virtual image comprises a light foreground indicating the financial instrument and a dark background.

15. The method of claim 8, wherein determining locations of edges of the financial instrument on the virtual image further comprises:
dividing the bitonal virtual image into a plurality of consecutive rows and consecutive columns; and
determining a starting point for edge detection.

16. The method of claim 15, wherein the row and the column have a width of 6 pixels.

17. The method of claim 15, wherein the row and the column has a width of 3% of a total height of the virtual image.

18. The method of claim 15, wherein the starting point is the middle point of the virtual image.

19. The method of claim 15, further comprising:
scanning rows upwards from the starting point until a top boundary of a light foreground and a dark background is detected;

scanning rows downwards from the starting point until a bottom boundary of the light foreground and the dark background is detected;

scanning columns leftwards from the starting point until a left boundary of the light foreground and the dark background is detected; and scanning columns rightwards from the starting point until a right boundary of the light foreground and the dark background is detected.

20. The method of claim 19, further comprising:
for each scanner row, determining whether the row is on a boundary of a light foreground and a dark background 21. The method of claim 20, further comprising:
calculating an average pixel value of the row;
compare the average pixel value with a threshold;
designating the row as a financial instrument boundary when the average pixel value is greater than the threshold.

22. The method of claim 21, wherein the threshold is obtained from past image processing heuristics.

23. The method of claim 19, further comprising:
calculating four corners based on the intersections of the detected top edge, bottom edge, left edge and right edge;
projecting the four corners on the virtual image to the original obtained image; and
generating a rectangular box based on the projected four corners on the obtained image for cropping.

24. The method of claim 1, further comprising:
cropping a portion at top of the obtained image based on heuristics.

25. The method of claim 24, wherein the cropped portion is 20% of the top of the obtained image.

26. The method of claim 24, further comprising:
designating a top edge of the cropped image as a top edge of the financial instrument;
detecting remaining edges of the financial instrument on the cropped image.

27. A financial instrument image preparation apparatus, comprising:
a memory;
a processor disposed in communication with said memory, and configured to issue a plurality of processing instructions stored in the memory, wherein the processor issues instructions to:
obtain a financial instrument image comprising a financial instrument and a background;
determine an edge between the financial instrument and the background on the financial instrument image as a cropping border;
remove the background on the financial instrument image by cropping the financial instrument image along the cropping border; and
process the cropped financial instrument image for remote deposit.

28. The apparatus of claim 27, wherein the financial instrument image is received at a remote server from a depositor owned device.

29. The apparatus of claim 27, wherein the financial instrument image is obtained at a depositor owned device.

30. The apparatus of claim 27, wherein the financial instrument image is captured by an image capture device.

31. The apparatus of claim 30, wherein the depositor owned device comprises one of a personal computer, a smart phone, a facsimile machine.

32. The apparatus of claim 31, wherein the image capture component comprises one of a general purpose scanner, a camera and a video camera.

33. The apparatus of claim 27, wherein the processor issues instructions to:
convert the financial instrument image into a grayscale image.

34. The apparatus of claim 27, wherein the processor issues instructions to:
down sample the obtained image to generate a scaled image;
generate an enhanced bitonal virtual image out of the scaled image;
determine locations of edges of the financial instrument on the virtual image; and
project the locations of financial instrument edges on the virtual image to the unscaled obtained image; and
crop the obtained image based on the projected locations of financial instrument edges.

35. The apparatus of claim 34, wherein the down sampling generates the scaled image at a size of a quarter of a size of the obtained image.

36. The apparatus of claim 34, wherein generating a bitonal virtual image further comprises:
converting the scaled image into a grayscale image;
generating a histogram of the grayscale image;
calculating an average pixel value of the grayscale image; and
setting the average pixel value as a threshold for bitonalization.

37. The apparatus of claim 34, wherein generating a bitonal virtual image further comprises:
applying a media filter to remove noise and dust on the scaled image; and
applying a Gaussian Blur filter to remove inconspicuous noise.

38. The apparatus of claim 37, wherein the processor issues instructions to:
dilate dark pixels on the scaled image; and
invert the dilated image.

39. The apparatus of claim 38, wherein the processor issues instructions to:
remove left-over details on the inverted image by applying a media filter with a plus mask.

40. The apparatus of claim 34, wherein the enhanced bitonal virtual image comprises a light foreground indicating the financial instrument and a dark background.

41. The apparatus of claim 34, wherein determining locations of edges of the financial instrument on the virtual image further comprises:
dividing the bitonal virtual image into a plurality of consecutive rows and consecutive columns; and
determining a starting point for edge detection.

42. The apparatus of claim 41, wherein the row and the column have a width of 6 pixels.

43. The apparatus of claim 41, wherein the row and the column has a width of 3% of a total height of the virtual image.

44. The apparatus of claim 41, wherein the starting point is the middle point of the virtual image.

45. The apparatus of claim 41, wherein the processor issues instructions to:
scan rows upwards from the starting point until a top boundary of a light foreground and a dark background is detected;
scan rows downwards from the starting point until a bottom boundary of the light foreground and the dark background is detected;

scan columns leftwards from the starting point until a left boundary of the light foreground and the dark background is detected; and scan columns rightwards from the starting point until a right boundary of the light foreground and the dark background is detected.

46. The apparatus of claim 45, wherein the processor issues instructions to:

for each scanner row, determine whether the row is on a boundary of a light foreground and a dark background.

47. The apparatus of claim 46, wherein the processor issues instructions to:

calculate an average pixel value of the row;
compare the average pixel value with a threshold;
designate the row as a financial instrument boundary when the average pixel value is greater than the threshold.

48. The apparatus of claim 47, wherein the threshold is obtained from past image processing heuristics.

49. The apparatus of claim 47, wherein the processor issues instructions to:

calculate four corners based on the intersections of the detected top edge, bottom edge, left edge and right edge;
project the four corners on the virtual image to the original obtained image; and
generate a rectangular box based on the projected four corners on the obtained image for cropping.

50. The apparatus of claim 27, wherein the processor issues instructions to:

crop a portion at top of the obtained image based on heuristics.

51. The apparatus of claim 50, wherein the cropped portion is 20% of the top of the obtained image.

52. The apparatus of claim 27, wherein the processor issues instructions to:

designate a top edge of the cropped image as a top edge of the financial instrument;
detect remaining edges of the financial instrument on the cropped image.

53. A financial instrument image preparation processor-readable medium storing a plurality of processing instructions, comprising issuable instructions by a processor to:

obtain a financial instrument image comprising a financial instrument and a background;
determine an edge between the financial instrument and the background on the financial instrument image as a cropping border;
remove the background on the financial instrument image by cropping the financial instrument image along the cropping border; and
process the cropped financial instrument image for remote deposit.

54. The processor-readable medium of claim 53, wherein the financial instrument image is received at a remote server from a depositor owned device.

55. The processor-readable medium of claim 53, wherein the financial a instrument image is obtained at a depositor owned device.

56. The processor-readable medium of claim 53, wherein the financial instrument image is captured by an image capture device.

57. The processor-readable medium of claim 53, wherein the depositor owned device comprises one of a personal computer, a smart phone, a facsimile machine.

58. The processor-readable medium of claim 57, wherein the image capture component comprises one of a general purpose scanner, a camera and a video camera.

59. The processor-readable medium of claim 53, further comprising instructions issuable by the processor to:

convert the financial instrument image into a grayscale image.

60. The processor-readable medium of claim 53, further comprising instructions issuable by the processor to:

down sample the obtained image to generate a scaled image;
generate an enhanced bitonal virtual image out of the scaled image;
determine locations of edges of the financial instrument on the virtual image; and
project the locations of financial instrument edges on the virtual image to the unsealed obtained image; and
crop the obtained image based on the projected locations of financial instrument edges.

61. The processor-readable medium of claim 60, wherein the down sampling generates the scaled image at a size of a quarter of a size of the obtained image.

62. The processor-readable medium of claim 61, wherein generating a bitonal virtual image further comprises:

a converting the scaled image into a grayscale image;
generating a histogram of the grayscale image;
calculating an average pixel value of the grayscale image; and
setting the average pixel value as a threshold for bitonalization.

63. The processor-readable medium of claim 62, wherein generating a bitonal virtual image further comprises:

applying a media filter to remove noise and dust on the scaled image; and
applying a Gaussian Blur filter to remove inconspicuous noise.

64. The processor-readable medium of claim 63, wherein the processor issues instructions to:

dilate dark pixels on the scaled image; and
invert the dilated image.

65. The processor-readable medium of claim 64, further comprising instructions issuable by the processor to:

remove left-over details on the inverted image by applying a media filter with a plus mask.

66. The processor-readable medium of claim 62, wherein the enhanced bitonal virtual image comprises a light foreground indicating the financial instrument and a dark background.

67. The processor-readable medium of claim 62, wherein determining locations of edges of the financial instrument on the virtual image further comprises:

dividing the bitonal virtual image into a plurality of consecutive rows and consecutive columns; and
determining a starting point for edge detection.

68. The processor-readable medium of claim 67, wherein the row and the column have a width of 6 pixels.

69. The processor-readable medium of claim 67, wherein the row and the column has a width of 3% of a total height of the virtual image.

70. The processor-readable medium of claim 67, wherein the starting point is the middle point of the virtual image.

71. The processor-readable medium of claim 67, further comprising instructions issuable by the processor to:

scan rows upwards from the starting point until a top boundary of a light foreground and a dark background is detected;
scan rows downwards from the starting point until a bottom boundary of the light foreground and the dark background is detected;

scan columns leftwards from the starting point until a left boundary of the light foreground and the dark background is detected; and scan columns rightwards from the starting point until a right boundary of the light foreground and the dark background is detected.

72. The processor-readable medium of claim 71, further comprising instructions issuable by the processor to:

for each scanner row, determine whether the row is on a boundary of a light foreground and a dark background.

73. The processor-readable medium of claim 72, further comprising instructions issuable by the processor to:

calculate an average pixel value of the row;

compare the average pixel value with a threshold;

designate the row as a financial instrument boundary when the average pixel value is greater than the threshold.

74. The processor-readable medium of claim 73, wherein the threshold is obtained from past image processing heuristics.

75. The processor-readable medium of claim 74, further comprising instructions issuable by the processor to:

calculate four corners based on the intersections of the detected top edge, bottom edge, left edge and right edge;

project the four corners on the virtual image to the original obtained image; and generate a rectangular box based on the projected four corners on the obtained image for cropping.

76. The processor-readable medium of claim 53, wherein the processor issues instructions to:

crop a portion at top of the obtained image based on heuristics.

77. The processor-readable medium of claim 76, wherein the cropped portion is 20% of the top of the obtained image.

78. The processor-readable medium of claim 53, wherein the processor issues instructions to:

designate a top edge of the cropped image as a top edge of the financial instrument;

detect remaining edges of the financial instrument on the cropped image.

79. A financial instrument image preparation system, comprising:

means to obtain a financial instrument image comprising a financial instrument and a background;

means to determine an edge between the financial instrument and the background on the financial instrument image as a cropping border;

means to remove the background on the financial instrument image by cropping the financial instrument image along the cropping border; and means to process the cropped financial instrument image for remote deposit.

80. The system of claim 79, wherein the financial instrument image is received at a remote server from a depositor owned device.

81. The system of claim 79, wherein the financial instrument image is obtained at a depositor owned device.

82. The system of claim 79, wherein the financial instrument image is captured by an image capture device.

83. The system of claim 79, wherein the depositor owned device comprises one of a personal computer, a smart phone, a facsimile machine.

84. The system of claim 83, wherein the image capture component comprises one of a general purpose scanner, a camera and a video camera.

85. The system of claim 79, further comprising means to: convert the financial instrument image into a grayscale image.

86. The system of claim 79, further comprising means to:

down sample the obtained image to generate a scaled image;

generate an enhanced bitonal virtual image out of the scaled image;

determine locations of edges of the financial instrument on the virtual image; and project the locations of financial instrument edges on the virtual image to the unscaled obtained image; and a crop the obtained image based on the projected locations of financial instrument edges.

87. The system of claim 86, wherein the down sampling generates the scaled image at a size of a quarter of a size of the obtained image.

88. The system of claim 87, wherein generating a bitonal virtual image further comprises:

converting the scaled image into a grayscale image;

generating a histogram of the grayscale image;

calculating an average pixel value of the grayscale image; and setting the average pixel value as a threshold for bitonalization.

89. The system of claim 88, wherein generating a bitonal virtual image further comprises:

applying a media filter to remove noise and dust on the scaled image; and applying a Gaussian Blur filter to remove inconspicuous noise.

90. The system of claim 89, wherein the processor issues instructions to:

dilate dark pixels on the scaled image; and invert the dilated image.

91. The system of claim 90, further comprising instructions issuable by the processor to:

remove left-over details on the inverted image by applying a media filter with a plus mask.

92. The system of claim 86, wherein the enhanced bitonal virtual image comprises a light foreground indicating the financial instrument and a dark background.

93. The system of claim 86, wherein determining locations of edges of the financial instrument on the virtual image further comprises:

dividing the bitonal virtual image into a plurality of consecutive rows and consecutive columns; and determining a starting point for edge detection.

94. The system of claim 93, wherein the row and the column have a width of 6 pixels.

95. The system of claim 93, wherein the row and the column has a width of 3% of a total height of the virtual image.

96. The system of claim 93, wherein the starting point is the middle point of the virtual image.

97. The system of claim 93, further comprising means to:

scan rows upwards from the starting point until a top boundary of a light foreground and a dark background is detected;

scan rows downwards from the starting point until a bottom boundary of the light foreground and the dark background is detected;

scan columns leftwards from the starting point until a left boundary of the light foreground and the dark background is detected; and scan columns rightwards from the starting point until a right boundary of the light foreground and the dark background is detected.

98. The system of claim 97, further comprising means to:
for each scanner row, determine whether the row is on a boundary of a light foreground and a dark background.

99. The system of claim 98, further comprising means to:
calculate an average pixel value of the row;
compare the average pixel value with a threshold;
designate the row as a financial instrument boundary when the average pixel value is greater than the threshold.

100. The system of claim 99, wherein the threshold is obtained from past image processing heuristics.

101. The system of claim 100, further comprising means to:
calculate four corners based on the intersections of the detected top edge, bottom edge, left edge and right edge;
project the four corners on the virtual image to the original obtained image; and
generate a rectangular box based on the projected four corners on the obtained image for cropping.

102. The system of claim 101, further comprising means to:
crop a portion at top of the obtained image based on heuristics.

103. The system of claim 102, wherein the cropped portion is 20% of the top of the obtained image.

104. The system of claim 103, further comprising means to:
designate a top edge of the cropped image as a top edge of the financial instrument;
detect remaining edges of the financial instrument on the cropped image.

In order to address various issues and advance the art, the entirety of this application for REMOTE DEPOSIT IMAGE INSPECTION APPARATUSES, METHODS AND SYSTEMS (including the Cover Page, Title, Headings, Field, Background, Summary, Brief Description of the Drawings, Detailed Description, Claims, Abstract, FIGURES, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any a number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a ImageInspector individual and/or enterprise user, database configuration and/or relational model, data type, data transmission and/or network framework, syntax structure, and/or the like, various embodiments of the ImageInspector, may be implemented that enable a great deal of flexibility and customization. For example, aspects of the ImageInspector may be adapted for electronic billing and payment. While various embodiments and discussions of the ImageInspector have been directed to remote deposit of financial instrument, however, it is to be understood that the embodiments described herein may be readily configured and/or customized for a wide variety of other applications and/or implementations.

What is claimed is:

1. A financial instrument image assessment method, comprising:
in a system having a memory comprising processor executable instructions, and a processor in communication with the memory, the processor:
obtaining a financial instrument image captured by an image capture component of a communication device;
analyzing a portion of the financial instrument image, wherein the portion of the financial instrument image is less than the whole financial instrument image;
generating an initial image quality score for the obtained financial instrument image based on a contrast image characteristic obtained from the analyzed portion of the financial instrument image;
determining whether the generated initial image quality score meets or exceeds an image quality threshold, wherein the initial image quality score is generated to be within a specified range of scores;
in response to determining that the initial image quality score meets the image quality threshold:
performing at least an edge detection process on the financial instrument image, wherein a type of edge detection process performed is based on the specified range of scores the initial image quality score corresponds to; and
processing the financial instrument image for deposit; and
in response to determining that the initial image quality score fails to meet the image quality threshold, sending a denial notice to the communication device.

2. The method of claim 1, wherein the communication device is any of a personal computer, a smart phone, and a cellular phone.

3. The method of claim 1, wherein the image capture component is any of a scanner, a digital camera, and a web camera.

4. The method of claim 1, wherein the image quality score is related to at least one of:
- image contrast level;
- MICR OCR readability;
- CAR OCR readability;
- endorsement detection;
- financial instrument dimension matching;
- histogram distribution;
- corner detection noise; or
- darkness and lightness balance.

5. The method of claim 1, further comprising:
- applying a four-sided edge detection and cropping procedure if the contrast level is within a first predetermined range of scores; and
- applying an alternative edge detection and cropping procedure if the contrast level is within a second predetermined range of scores that is lower than the first predetermined range of scores.

6. The method of claim 1, wherein the image quality threshold is pre-determined by a system operator.

7. The method of claim 1, wherein the image quality threshold is dynamically obtained via statistical analysis.

8. The method of claim 7, wherein the image quality threshold is obtained via analyzing past image assessment data.

9. The method of claim 1, further comprising:
- analyzing image properties of the obtained financial instrument image;
- determining a type of image source based on the properties of the obtained financial instrument image; and
- determining the image quality threshold based on the type of image source.

10. The method of claim 9, wherein the type of image source is one of a scanner, a camera, a cellular phone built-in camera, or a web camera.

11. The method of claim 9, further comprising:
- retrieving heuristics of previously processed image data of the type of image source.

12. The method of claim 9, further comprising:
- determining a hierarchical structure to assess the obtained financial instrument image based on the type of the image source.

13. The method of claim 12, further comprising:
- determining an image assessment threshold based on thresholds of previously processed images based on the type of the image source.

14. A non-transitory computer-readable medium storing a plurality of processing instructions, comprising instructions configured to cause a processor to:
- obtain a financial instrument image captured by an image capture component of a communication device;
- analyze a portion of the financial instrument image, wherein the portion of the financial instrument image is less than an entirety of the financial instrument image;
- generate an initial image quality score for the obtained financial instrument image based on a contrast characteristic obtained from the analyzed portion of the financial instrument image;
- determine whether the generated initial image quality score meets or exceeds an image quality threshold, wherein the initial image quality score is generated to be within a specified range of scores;
- in response to determining that the initial image quality score meets the image quality threshold:
  - performing at least an edge detection process on the financial instrument image, wherein a type of edge detection process performed is based on the specified range of scores the initial image quality score corresponds to, and
  - processing the financial instrument image for deposit; and
- in response to determining that the initial image quality score fails to meet the image quality threshold, sending a denial notice to the communication device.

15. A financial instrument deposit apparatus, comprising:
- a memory;
- a processor in communication with the memory, and configured to execute a plurality of processing instructions stored in the memory to:
  - obtain a financial instrument image captured by an image capture component of a communication device;
  - analyze a portion of the financial instrument image, wherein the portion of the financial instrument image is less than an entirety of the financial instrument image;
  - generate an initial image quality score for the obtained financial instrument image based on a contrast image characteristic obtained from the analyzed portion of the financial instrument image;
  - determine whether the generated initial image quality score meets or exceeds an image quality threshold, wherein the initial image quality score is generated to be within a specified range of scores;
  - in response to determining that the initial image quality score meets the image quality threshold;
    - performing at least an edge detection process on the financial instrument image, wherein a type of edge detection process is applied based on the specified range of scores the initial image quality score corresponds to; and
    - processing the financial instrument image for deposit; and
  - in response to determining that the initial image quality score fails to meet the image quality threshold, provide a denial notice to the communication device.

16. The method of claim 1, wherein the initial image quality score is further generated based on a non-contrast image characteristic of the portion of the financial instrument image.

17. The method of claim 1, wherein the portion of the financial instrument image corresponds to a portion depicting a MICR line on the financial instrument image.

* * * * *